United States Patent
Faustman

(10) Patent No.: US 12,509,521 B2
(45) Date of Patent: Dec. 30, 2025

(54) AGONISTIC TUMOR NECROSIS FACTOR RECEPTOR SUPERFAMILY POLYPEPTIDES

(71) Applicant: The General Hospital Corporation, Boston, MA (US)

(72) Inventor: Denise L. Faustman, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 1085 days.

(21) Appl. No.: 17/294,008

(22) PCT Filed: Nov. 15, 2019

(86) PCT No.: PCT/US2019/061828
§ 371 (c)(1),
(2) Date: May 14, 2021

(87) PCT Pub. No.: WO2020/102739
PCT Pub. Date: May 22, 2020

(65) Prior Publication Data
US 2022/0002423 A1 Jan. 6, 2022

Related U.S. Application Data

(60) Provisional application No. 62/767,735, filed on Nov. 15, 2018.

(51) Int. Cl.
*C07K 16/28* (2006.01)
*C07K 16/30* (2006.01)
*C12N 15/86* (2006.01)

(52) U.S. Cl.
CPC .......... *C07K 16/2875* (2013.01); *C07K 16/30* (2013.01); *C12N 15/86* (2013.01); *C07K 2317/33* (2013.01); *C07K 2317/565* (2013.01)

(58) Field of Classification Search
None
See application file for complete search history.

(56) References Cited

U.S. PATENT DOCUMENTS

| | | |
|---|---|---|
| 4,309,418 A | 1/1982 | Green |
| 4,457,916 A | 7/1984 | Hayashi et al. |
| 4,495,282 A | 1/1985 | Ohnishi et al. |
| 4,677,063 A | 6/1987 | Mark et al. |
| 4,677,064 A | 6/1987 | Mark et al. |
| 4,681,760 A | 7/1987 | Fathman |
| 4,791,101 A | 12/1988 | Adolf |
| 4,816,567 A | 3/1989 | Cabilly et al. |
| 4,879,226 A | 11/1989 | Wallace et al. |
| 4,963,354 A | 10/1990 | Shepard et al. |
| 4,985,241 A | 1/1991 | Zimmerman et al. |
| 5,002,876 A | 3/1991 | Sreekrishna et al. |
| 5,059,530 A | 10/1991 | Oshima et al. |
| 5,139,481 A | 8/1992 | Faustman et al. |
| 5,215,743 A | 6/1993 | Singh et al. |
| 5,283,058 A | 2/1994 | Faustman |
| 5,288,852 A | 2/1994 | Yamada et al. |
| 5,370,870 A | 12/1994 | Wong |
| 5,487,984 A | 1/1996 | Allet et al. |
| 5,538,854 A | 7/1996 | Faustman |
| 5,560,908 A | 10/1996 | Satoh et al. |
| 5,593,698 A | 1/1997 | Weiner et al. |
| 5,677,425 A | 10/1997 | Bodmer et al. |
| 5,783,216 A | 7/1998 | Faustman |
| 5,821,337 A | 10/1998 | Carter et al. |
| 5,843,425 A | 12/1998 | Sachs et al. |
| 5,843,452 A | 12/1998 | Wiedmann et al. |
| 5,874,306 A | 2/1999 | Beattie et al. |
| 5,919,452 A | 7/1999 | Le et al. |
| 5,939,532 A | 8/1999 | Nakamura et al. |
| 6,046,031 A | 4/2000 | Ni et al. |
| 6,056,952 A | 5/2000 | Rosenberg |
| 6,159,461 A | 12/2000 | Besmer et al. |
| 6,165,737 A | 12/2000 | Wang et al. |

(Continued)

FOREIGN PATENT DOCUMENTS

| | | |
|---|---|---|
| CN | 1980696 A | 6/2007 |
| CN | 101084014 A | 12/2007 |

(Continued)

OTHER PUBLICATIONS

Lightle et al., Mutations within a human IgG2 antibody form distinct and homogeneous disulfide isomers but do not affect Fc gamma receptor or C1q binding, Protein Science, vol. 19: 753-762, Publication Date: Jan. 29, 2010 (Year: 2010).*

(Continued)

*Primary Examiner* — Peter J Reddig
*Assistant Examiner* — Cheng Lu
(74) *Attorney, Agent, or Firm* — Clark & Elbing LLP

(57) ABSTRACT

Described are agonistic TNFR2 polypeptides, such as antibodies and antigen-binding fragments thereof, and the use of these polypeptides to stimulate the proliferation of regulatory T cells (Treg cells) and/or myeloid-derived suppressor cells (MDSCs), as well as to inhibit the function of, reduce the proliferation of, and/or directly kill, T effector cells, such as CD8+ T effector cells. The polypeptides, such as antibodies and antigen-binding fragments thereof, of the disclosure can be used, for example, to suppress autoimmunity and inflammation, as well as to promote the protection, healing, preservation, and/or regeneration of a wide variety of tissues and organs, such as tissues and organs containing TNFR2+ cells.

18 Claims, 16 Drawing Sheets
Specification includes a Sequence Listing.

(56) References Cited

U.S. PATENT DOCUMENTS

| | | |
|---|---|---|
| 6,177,076 B1 | 1/2001 | Lattime et al. |
| 6,284,879 B1 | 9/2001 | Faustman |
| 6,414,218 B1 | 7/2002 | Faustman et al. |
| 6,420,139 B1 | 7/2002 | Classen |
| 6,491,908 B1 | 12/2002 | Rosenberg |
| 6,599,710 B1 | 7/2003 | Faustman |
| 6,617,171 B2 | 9/2003 | Faustman et al. |
| 6,660,487 B2 | 12/2003 | Faustman |
| 6,709,833 B2 | 3/2004 | Fukui et al. |
| 6,773,705 B1 | 8/2004 | Faustman et al. |
| 6,844,011 B1 | 1/2005 | Faustman |
| 6,866,843 B2 | 3/2005 | Habener et al. |
| 6,923,959 B2 | 8/2005 | Habener et al. |
| 6,984,380 B1 | 1/2006 | Faustman |
| 7,015,037 B1 | 3/2006 | Furcht et al. |
| 7,438,902 B2 | 10/2008 | Habener et al. |
| 7,485,293 B1 | 2/2009 | Faustman |
| 7,510,877 B2 | 3/2009 | Yilmaz et al. |
| 7,537,756 B2 | 5/2009 | Habener et al. |
| 7,582,313 B2 | 9/2009 | Faustman |
| 7,628,988 B2 | 12/2009 | Faustman |
| 8,017,392 B2 | 9/2011 | Faustman |
| 8,021,693 B2 | 9/2011 | Faustman |
| 8,173,129 B2 | 5/2012 | Faustman |
| 8,314,213 B2 | 11/2012 | Bernett et al. |
| 8,697,077 B2 | 4/2014 | Faustman |
| 9,522,181 B2 | 12/2016 | Faustman |
| 9,676,862 B2 | 6/2017 | Ellmark et al. |
| 9,821,010 B2 | 11/2017 | Faustman |
| 10,765,700 B2 | 9/2020 | Faustman |
| 10,906,982 B2 | 2/2021 | Faustman |
| 10,988,543 B2 | 4/2021 | Thompson |
| 11,844,814 B2 | 12/2023 | Faustman |
| 11,859,002 B2 | 1/2024 | Faustman |
| 12,269,891 B2 | 4/2025 | Faustman |
| 2002/0106689 A1 | 8/2002 | Faustman et al. |
| 2002/0123472 A1 | 9/2002 | Faustman |
| 2002/0187548 A1 | 12/2002 | Keller et al. |
| 2003/0005469 A1 | 1/2003 | Faustman et al. |
| 2003/0031657 A1 | 2/2003 | Habener et al. |
| 2004/0028658 A1 | 2/2004 | Faustman |
| 2004/0031066 A9 | 2/2004 | Faustman et al. |
| 2004/0229785 A1 | 11/2004 | Faustman |
| 2004/0235160 A1 | 11/2004 | Nishikawa et al. |
| 2005/0043514 A1 | 2/2005 | Fukui et al. |
| 2005/0158288 A1 | 7/2005 | Faustman |
| 2005/0158302 A1 | 7/2005 | Faustman et al. |
| 2005/0181502 A1 | 8/2005 | Furcht et al. |
| 2005/0244386 A1 | 11/2005 | Habener et al. |
| 2006/0062769 A1 | 3/2006 | Habener et al. |
| 2007/0116688 A1 | 5/2007 | Faustman |
| 2008/0102054 A1 | 5/2008 | Faustman |
| 2008/0175830 A1 | 7/2008 | Steinman et al. |
| 2008/0176796 A1 | 7/2008 | Bradley et al. |
| 2009/0028877 A1 | 1/2009 | Iida et al. |
| 2010/0068177 A1 | 3/2010 | Faustman |
| 2010/0298232 A1 | 11/2010 | Liu |
| 2011/0236374 A1 | 9/2011 | Shitara et al. |
| 2012/0045435 A1 | 2/2012 | Deisher |
| 2012/0066777 A1 | 3/2012 | Kawamura et al. |
| 2012/0115739 A1 | 5/2012 | Schmittling et al. |
| 2012/0196919 A1 | 8/2012 | Brown et al. |
| 2013/0064831 A1 | 3/2013 | Humphrey |
| 2014/0096274 A1 | 4/2014 | Quax et al. |
| 2014/0121123 A1 | 5/2014 | Wang et al. |
| 2014/0369973 A1 | 12/2014 | Bernstein et al. |
| 2015/0099707 A1 | 4/2015 | Pastan et al. |
| 2015/0110794 A1 | 4/2015 | Sato et al. |
| 2015/0366909 A1 | 12/2015 | Faustman |
| 2016/0280765 A1 | 9/2016 | Dorvillius et al. |
| 2017/0158771 A1 | 6/2017 | Glennie et al. |
| 2017/0226217 A1 | 8/2017 | Ellmark et al. |
| 2018/0044430 A1 | 2/2018 | Chiu et al. |
| 2019/0135929 A1 | 5/2019 | Faustman |
| 2019/0202925 A1 | 7/2019 | Thompson |
| 2020/0270355 A1 | 8/2020 | Faustman |
| 2021/0301028 A1 | 9/2021 | Thompson |
| 2021/0317221 A1 | 10/2021 | Faustman |
| 2021/0340268 A1 | 11/2021 | Faustman |
| 2022/0002423 A1 | 1/2022 | Faustman |
| 2022/0112299 A1 | 4/2022 | Faustman |
| 2023/0174659 A1 | 6/2023 | Faustman |
| 2023/0295326 A1 | 9/2023 | Faustman |
| 2023/0383003 A1 | 11/2023 | Faustman |

FOREIGN PATENT DOCUMENTS

| | | | |
|---|---|---|---|
| CN | 103249742 A | 8/2013 | |
| CN | 107441491 A | 12/2017 | |
| CN | 107849142 A | 3/2018 | |
| CN | 108271377 A | 7/2018 | |
| EP | 0612529 A2 | 8/1994 | |
| EP | 2295588 A1 | 3/2011 | |
| JP | 2010-531138 A | 9/2010 | |
| WO | WO-92/04033 A1 | 3/1992 | |
| WO | WO-93/02690 A1 | 2/1993 | |
| WO | WO-94/09137 A1 | 4/1994 | |
| WO | WO-95/24914 A1 | 9/1995 | |
| WO | WO-95/25533 A1 | 9/1995 | |
| WO | WO-97/08328 A1 | 3/1997 | |
| WO | WO-97/13844 A1 | 4/1997 | |
| WO | WO-97/21802 A1 | 6/1997 | |
| WO | WO-99/53953 A2 | 10/1999 | |
| WO | WO-99/59632 A1 | 11/1999 | |
| WO | WO-00/53209 A1 | 9/2000 | |
| WO | WO-01/44472 A1 | 6/2001 | |
| WO | WO-01/91793 A1 | 12/2001 | |
| WO | WO-02/26819 A2 | 4/2002 | |
| WO | WO-2004/003164 A2 | 1/2004 | |
| WO | WO-2004022097 A1 | 3/2004 | |
| WO | WO-2005/042727 A2 | 5/2005 | |
| WO | WO-2005107802 A2 | 11/2005 | |
| WO | WO-2006/038027 A2 | 4/2006 | |
| WO | WO-2006/109044 A2 | 10/2006 | |
| WO | WO-2006/119107 A2 | 11/2006 | |
| WO | WO-2008/157394 A2 | 12/2008 | |
| WO | WO-2010/124259 A1 | 10/2010 | |
| WO | WO-2011044368 A1 | 4/2011 | |
| WO | WO-2011/107989 A1 | 9/2011 | |
| WO | WO-2011109789 A2 | 9/2011 | |
| WO | WO-2012035141 A1 | 3/2012 | |
| WO | WO-2012/122464 A1 | 9/2012 | |
| WO | WO-2012/174522 A1 | 12/2012 | |
| WO | WO-2013011063 A1 * | 1/2013 | |
| WO | WO-2014/015101 A1 | 1/2014 | |
| WO | WO-2014/124134 A1 | 8/2014 | |
| WO | WO-2015/145360 A1 | 10/2015 | |
| WO | WO-2015/184099 A1 | 12/2015 | |
| WO | WO-2016/032547 A1 | 3/2016 | |
| WO | WO-2016/187068 A1 | 11/2016 | |
| WO | WO-2017040312 A1 * | 3/2017 | ........... A61K 38/191 |
| WO | WO-2017060144 A1 | 4/2017 | |
| WO | WO-2017/083525 A1 | 5/2017 | |
| WO | WO-2017/197331 A2 | 11/2017 | |
| WO | WO-2018/064307 A2 | 4/2018 | |
| WO | WO-2018/092907 A1 | 5/2018 | |
| WO | WO-2018/115003 A2 | 6/2018 | |
| WO | WO-2019/094559 A2 | 5/2019 | |
| WO | WO-2020/041361 A1 | 2/2020 | |
| WO | WO-2020/102739 A1 | 5/2020 | |
| WO | WO-2020/193718 A1 | 10/2020 | |

OTHER PUBLICATIONS

Janeway et al., Immunology Third Edition, Garland Publishing Inc. 1997, Chapter 3, Structure of the Antibody Molecule and Immunoglobulin Genes, pp. 3:1-3:11 (Year: 1997).*

Rudikoff et al., Single amino acid substitution altering antigen-binding specificity, PNAS, USA, 1982, 79: 1979-1983 (Year: 1982).*

Lee et al., An antibody engineering platform using amino acid networks: A case study in development of antiviral therapeutics, Antiviral Research, 192 (2021) 105105 (Year: 2021).*

(56) References Cited

OTHER PUBLICATIONS

IMGT Scientific Chart, downloaded from https://www.imgt.org (Year: 2024).*
Chen et al., "Therapy: Paradoxical effects of targeting TNF signalling in the treatment of autoimmunity," Nat Rev Rheumatol. 12(11):625-6 (2016).
Shaikh et al., "TNF Receptor Type II as an Emerging Drug Target for the Treatment of Cancer, Autoimmune Diseases, and Graft-Versus-Host Disease: Current Perspectives and In Silico Search for Small Molecule Binders," Front Immunol. 9:1382 (2018) (6 pages).
Hoffmann et al., "Large-scale in vitro expansion of polyclonal human CD4(+)CD25$^{high}$ regulatory T cells," Blood. 104(3):895-903 (2004).
International Search Report and Written Opinion for International Patent Application No. PCT/US14/15101, mailed Jun. 24, 2014 (14 pages).
EPO Communication Pursuant to Rules 161(2) and 162 EPC for International Application No. 14748807.6, dated Oct. 15, 2015 (2 pages).
Brod et al., "New clinical trial in newly diagnosed type 1 diabetes," <http://www.diabetesstation.org/articles/brod.htm>, retrieved Jun. 19, 2001 (2 pages).
EPO Communication pursuant to Article 94(3) EPC for European Application No. 00914899.0, dated May 25, 2012 (9 pages).
EPO Invitation pursuant to Article 94(3) and Rule 71(1) EPC for European Application No. 00914899.0, dated Jun. 2, 2014 (4 pages).
EPO Summons to attend oral proceedings pursuant to Rule 115(1) EPC for European Application No. 00914899.0, dated Nov. 12, 2014 (6 pages).
EPO Communication pursuant to Article 94(3) and Rule 71(1) EPC for European Application No. 00914899.0, dated Mar. 6, 2015 (3 pages).
EPO Communication under Rule 71(3) EPC for European Application No. 00914899.0, dated Jun. 23, 2015 (6 pages).
Extended European Search Report for European Application No. 12005556.1, dated Sep. 2, 2014 (8 pages).
EPO Communication pursuant to Rule 69 EPC for European Application No. 12005556.1, dated Oct. 7, 2014 (2 pages).
EPO Communication pursuant to Article 94(3) EPC for European Application No. 12005556.1, dated Jul. 2, 2015 (7 pages).
EPO Summons to attend oral proceedings pursuant to Rule 115(1) EPC for European Application No. 12005556.1, dated Dec. 18, 2015 (4 pages).
International Search Report for International Application No. PCT/US00/06239, mailed Jul. 31, 2000 (2 pages).
Bleumink et al., "Etanercept-induced subacute cutaneous lupus erythematosus," Rheumatology. 40(11):1317-1319 (2001).
Burnham et al., "Oral BCG vaccine in Crohn's disease," Gut. 20(3):229-233 (1979).
Cairns et al., "New onset systemic lupus erythematosus in a patient receiving etanercept for rheumatoid arthritis," Ann Rheum Dis. 61(11):1031-2 (2002).
Charles et al., "Assessment of antibodies to double-stranded DNA induced in rheumatoid arthritis patients following treatment with infliximab, a monoclonal antibody to tumor necrosis factor alpha: findings in open-label and randomized placebo-controlled trials," Arthritis Rheum. 43(11):2383-90 (2000).
Declaration of Dr. Denise Faustman from U.S. Appl. No. 10/775,487, dated Jun. 14, 2007 (13 pages).
Declaration of Denise Faustman, M.D., Ph.D., from U.S. Appl. No. 10/851,983, dated Jul. 3, 2007 (7 pages).
Engleman et al., "Treatment of NZB/NZW F$_1$ hybrid mice with Mycobacterium bovis strain BCG or type II interferon preparations accelerates autoimmune disease," Arthritis Rheum. 24(11):1396-1402 (1981).
Enayati et al., "Association of anti-tumor necrosis factor therapy with the development of multiple sclerosis," J Clin Gastroenterol. 39(4): 303-6 (2005) (1 page) (Abstract only).

Feldmann et al., "Role of cytokines in rheumatoid arthritis," Annu Rev Immunol. 14:397-440 (1996) (1 page) (Abstract only).
Galaria et al., "Leukocytoclastic vasculitis due to etanercept," J Rheumatol. 27(8):2041-4 (2000) (1 page) (Abstract only).
Jarrett et al., "Anti-tumor necrosis factor-alpha therapy-induced vasculitis: case series," J Rheumatol. 30(10):2287-91 (2003) (1 page) (Abstract only).
Klinkhoff, "Biological agents for rheumatoid arthritis: targeting both physical function and structural damage," Drugs. 64(12):1267-83 (2004) (Abstract only).
Lipsky et al., "Infliximab and methotrexate in the treatment of rheumatoid arthritis," N Engl J Med. 343(22):1594-1602 (2000).
Moreland et al., "Etanercept therapy in rheumatoid arthritis: a randomized, controlled trial," Ann Intern Med. 130(6):478-486 (1999).
Sandborn, "Strategies targeting tumor necrosis factor in Crohn's disease," Acta Gastroenterol Belg. 64(2):170-2 (2001) (1 page) (Abstract only).
Sandborn et al., "Antitumor necrosis factor therapy for inflammatory bowel disease: a review of agents, pharmacology, clinical results, and safety," Inflamm Bowel Dis. 5(2):119-33 (1999) (Abstract only).
Schaible, "Long term safety of infliximab," Can J Gastroenterol. 14(Suppl C):29C-32C (2000) (Abstract only).
Shakoor et al., "Drug-induced systemic lupus erythematosus associated with etanercept therapy," Lancet. 359(9306):579-80 (2002) (Absract only).
Swale et al., "Etanercept-induced systemic lupus erythematosus," Clin Exp Dermatol. 28(6):604-607 (2003).
Thomas et al., "Demyelination during anti-tumor necrosis factor alpha therapy with infliximab for Crohn's disease," Inflamm Bowel Dis. 10(1):28-31 (2004) (Abstract only).
Vermeire et al., "Autoimmunity associated with anti-tumor necrosis factor alpha treatment in Crohn's disease: a prospective cohort study," Gastroenterology. 125(1):32-9 (2003) (1 page) (Abstract only).
Examination Report issued in Australian Patent Application No. 2003247840, dated Jan. 31, 2008 (4 pages).
International Search Report for International Patent Application No. PCT/US03/20578, mailed Apr. 27, 2004 (1 page).
International Search Report for International Patent Application No. PCT/US03/36531, mailed Jul. 14, 2004 (1 page).
Examiner's Report for Canadian Patent Application No. 2,543,745, dated Jul. 15, 2011 (4 pages).
EPO Communication Enclosing Supplementary European Search Report for EP Application No. 03762242.0, dated Jun. 8, 2009 (8 pages).
EPO Communication Pursuant to Article 94(3) EPC issued in European Patent Application No. 03762242.0, dated Oct. 30, 2009 (2 pages).
EPO Communication Pursuant to Article 94(3) EPC issued in European Patent Application No. 03762242.0, dated Dec. 1, 2011 (4 pages).
EPO Communication Pursuant to Article 94(3) EPC issued in European Patent Application No. 04817543.4, dated Jan. 22, 2010 (5 pages).
Extended European Search Report for European Patent Application No. 11008889.5, dated Apr. 12, 2012 (10 pages).
Faustman et al., "Stem cells in the spleen: Therapeutic potential for Sjogren's syndrome, type I diabetes, and other disorders," available in PMC Jul. 21, 2014, published in final edited form as: Int J Biochem Cell Biol. 42(10):1576-9 (2010) (8 pages).
EPO Communication Pursuant to Article 94(3) EPC issued in European Patent Application No. 11008889.5, dated Mar. 4, 2013 (4 pages).
EPO Communication Pursuant to Article 94(3) EPC for European Patent Application No. 11008889.5, dated Mar. 19, 2014 (4 pages).
EPO Communication Pursuant to Article 94(3) EPC for European Patent Application No. 11008889.5, dated Oct. 27, 2014 (5 pages).
Extended European Search Report for European Application No. 14189654.8, dated Feb. 16, 2015 (7 pages).
Bercovici et al., "Systemic administration of agonist peptide blocks the progression of spontaneous CD8-mediated autoimmune diabe-

(56) References Cited

OTHER PUBLICATIONS tes in transgenic mice without bystander damage," J Immunol. 165(1):202-10 (2000) (10 pages).
Faustman et al., "TNF receptor 2 pathway: drug target for autoimmune diseases," Nat Rev Drug Discov. 9(6):482-93 (2010).
Watt et al., "Specific alternative HOX11 transcripts are expressed in paediatric neural tumours and T-cell acute lymphoblastic leukaemia," Gene. 323:89-99 (2003) (1 page) (Abstract only).
Wilson et al., "Bone-marrow haematopoietic-stem-cell niches," Nat Rev Immunol. 6(2):93-106 (2006).
International Preliminary Report on Patentability for International Application No. PCT/US2014/015101, issued Aug. 11, 2015 (9 pages).
Technical Data Sheet for Purified Rat Anti-Human CD120b, BD Pharmingen™ (2011) (2 pages).
Extended European Search Report for European Application No. 14748807.6, dated Jul. 15, 2016 (10 pages).
Communication pursuant to Rules 70(2) and 70a(2) EPC for European Application No. 14748807.6, dated Aug. 2, 2016 (1 page).
Chopra et al., "Exogenous TNFR2 activation protects from acute GvHD via host T reg cell expansion," J Exp Med. 213(9):1881-1900 (2016) (21 pages).
Product Data Sheet for TNF RII/TNFRSF1B Inhibition of TNF-alpha-induced Cyototoxicity and Neutralization by Human TNF RII/TNFRSF1B Antibody. Retrieved Aug. 1, 2017. R&D Systems Inc. (3 pages).
Pillay et al., "Antibodies in oncology," N Biotechnol. 28(5):518-529 (2011).
International Search Report and Written Opinion for International Application No. PCT/US17/32513, mailed Oct. 25, 2017 (17 pages).
Kretschmer et al., "Strong antigenic selection shaping the immunoglobulin heavy chain repertoire of B-1a lymphocytes in lambda 2(315) transgenic mice," Eur J Immunol. 32(8):2317-27 (2002).
Sedger et al., "Poxvirus tumor necrosis factor receptor (TNFR)-like T2 proteins contain a conserved preligand assembly domain that inhibits cellular TNFR1-induced cell death," J Virol. 80(18):9300-9 (2006).
Wagner, "Making and using antibodies," <http://www-users.med.cornell.edu/~jawagne/Antibody_Approaches.html>, accessed Aug. 8, 2016 (7 pages).
Diaw et al., "Structural and affinity studies of IgM polyreactive natural autoantibodies," J Immunol. 158(2):968-76 (1997).
Trad et al., "Clonal Progression during the T Cell-Dependent B Cell Antibody Response Depends on the Immunoglobulin $D_H$ Gene Segment Repertoire," Front Immunol. 5(385):1-11 (2014).
International Search Report and Written Opinion for International Application No. PCT/US16/32547, mailed Aug. 31, 2016 (24 pages).
Yu et al., "Complex Interplay between Epitope Specificity and Isotype Dictates the Biological Activity of Antihuman CD40 Antibodies," Cancer Cell. 33(4):1-12 (Apr. 2018) (17 pages).
International Preliminary Report on Patentability for International Application No. PCT/US2016/032547, issued Nov. 21, 2017 (16 pages).
International Preliminary Report on Patentability for International Application No. PCT/US2017/032513, mailed Nov. 22, 2018 (8 pages).
Chen et al., "The phenotypic and functional consequences of tumour necrosis factor receptor type 2 expression on CD4(+) FoxP3(+) regulatory T cells," Immunology. 133(4):426-33 (2011).
Ji et al., "Cutting Edge: The Natural Ligand for Glucocorticoid-Induced TNF Receptor-Related Protein Abrogates Regulatory T Cell Suppression," J Immunol. 172(10):5823-7 (2004).
Extended European Search Report for European Application No. 18199457.5, dated May 2, 2019 (7 pages).
Santee et al., "Human tumor necrosis factor receptor p75/80 (CD120b) gene structure and promoter characterization," J Biol Chem. 271(35):21151-9 (1996).
International Search Report and Written Opinion for International Application No. PCT/US18/59779, mailed Apr. 18, 2019 (19 pages).

MacCallum et al., "Antibody-antigen interactions: contact analysis and binding site topography," J Mol Biol. 262(5):732-45 (1996) (14 pages).
Ban et al., "Strategic Internal Covalent Cross-Linking of TNF Produces a Stable TNF Trimer With Improved TNFR2 Signaling," Mol Cell Ther. 3:7 (2015) (6 pages).
Torrey et al., "Targeting TNFR2 With Antagonistic Antibodies Inhibits Proliferation of Ovarian Cancer Cells and Tumor-Associated $T_{regs}$," Sci Signal. 10(462):eaaf8608 (2017) (13 pages).
Lamminmäki et al., "Crystal Structure of a Recombinant Anti-Estradiol Fab Fragment in Complex With 17beta-Estradiol," J Biol Chem. 276(39):36687-94 (2001).
Chen et al., "Enhancement and destruction of antibody function by somatic mutation: unequal occurrence is controlled by V gene combinatorial associations," EMBO J. 14(12):2784-94 (1995).
Rudinger, "Characteristics of the amino acids as components of a peptide hormone sequence," in Peptide Hormones, Parsons, ed., University Park Press, Jun. 1976, pp. 1-7.
Extended European Search Report for European Application No. 17796980.5, dated Mar. 5, 2020 (12 pages).
International Preliminary Report on Patentability for International Application No. PCT/US2018/059779, mailed May 22, 2020 (11 pages).
International Search Report and Written Opinion for International Application No. PCT/US2019/047330, mailed Nov. 20, 2019 (15 pages).
International Preliminary Report on Patentability for International Application No. PCT/US2019/047330, issued Feb. 23, 2021 (7 pages).
Yan et al., "Construction of a synthetic phage-displayed Nanobody library with CDR3 regions randomized by trinucleotide cassettes for diagnostic applications," J Transl Med. 12:343 (2014) (12 pages).
Williams et al., "Phenotypic screening reveals TNFR2 as a promising target for cancer immunotherapy," Oncotarget. 7(42):68278-68291 (2016).
Extended European Search Report for European Application No. 18875602.7, dated Jul. 19, 2021 (12 pages).
International Search Report and Written Opinion for PCT/US2021/032540, mailed Oct. 29, 2021 (15 pages).
Office Action for Japanese Application No. 2018-127922, mailed May 14, 2019 (5 pages).
Chopra et al., "Tumor necrosis factor receptor 2-dependent homeostasis of regulatory T cells as a player in TNF-induced experimental metastasis," Carcinogenesis. 34(6):1296-303 (2013).
Office Action for Japanese Patent Application No. 2020-204143, mailed Dec. 16, 2021 (6 pages).
Extended European Search Report for European Patent Application No. 21175520.2, dated Dec. 10, 2021 (7 pages).
Office Action for Korean Application No. 10-2018-7036235, dated Nov. 29, 2021 (11 pages).
Office Action for Chinese Patent Application No. 201780043276.X, issued Dec. 2, 2021 (17 pages).
Fischer et al., "Selective Targeting of TNF Receptors as a Novel Therapeutic Approach," Front Cell Dev Biol. 8:401 (May 2020) (21 pages).
"Potential New Cancer Therapy Could Target Tumors Two Ways," National Cancer Institute, <https://www.cancer.gov/news-events/cancer-currents-blog/2017/tnfr2-target-tumors>, dated Feb. 15, 2017, retrieved on Mar. 14, 2022 (6 pages).
Stevens et al., "Overcoming the challenges of topical antibody administration for improving healing outcomes: a review of recent laboratory and clinical approaches," Wound Practice Res. 25(4):188-94 (2017).
Extended European Search Report for European Patent Application No. 19852179.1, dated May 6, 2022 (9 pages).
Yang et al., "Optimizing TNFR2 antagonism for immunotherapy with tumor microenvironment specificity," J Leukoc Biol. 107(6):971-80 (2020) (10 pages).
Morris et al., "Selective Blockade of TNFR1 Improves Clinical Disease and Bronchoconstriction in Experimental RSV Infection," Viruses. 12(10):1176 (Oct. 17, 2020) (20 pages).

(56) References Cited

OTHER PUBLICATIONS

Yang et al., "Role of TNF-TNF Receptor 2 Signal in Regulatory T Cells and Its Therapeutic Implications," Front Immunol. 9:784 (Apr. 19, 2018) (11 pages).
Barnes et al., "Susceptibility to Burkholderia pseudomallei is associated with host immune responses involving tumor necrosis factor receptor-1 (TNFR1) and TNF receptor-2 (TNFR2)," FEMS Immunol Med Microbiol. 52(3):379-88 (Feb. 22, 2008).
Liang et al., "Distinct Role of TNFR1 and TNFR2 in Protective Immunity Against Orientia tsutsugamushi Infection in Mice," Front Immunol. 13:867924 (Apr. 11, 2022) (17 pages).
Extended European Search Report for European Application No. 19885048.9, dated Nov. 30, 2022 (12 pages).
English Translation of Office Action for Chinese Patent Application No. 201980089022.0, mailed Oct. 10, 2023 (9 pages).
English Translation of Office Action for Japanese Patent Application No. 2021-526263, mailed Oct. 31, 2023 (3 pages).
Gage, "Mammalian neural stem cells," Science. 287(5457):1433-1438 (2000).
Gage et al., "Multipotent progenitor cells in the adult dentate gyrus," J Neurobiol. 36:249-266 (1998).
Ganoth et al., "A multicomponent system that degrades proteins conjugated to ubiquitin. Resolution of factors and evidence for ATP-dependent complex formation," J Biol Chem. 263(25):12412-12419 (1988).
Gaur et al., "Induction of islet allotolerance in nonhuman primates," Ann NY Acad Sci. 958:199-203 (2002).
Gazda et al., "Diabetes results from a late change in the autoimmune response of NOD mice," J Autoimmun. 10(3):261-270 (1997).
Ghosh et al., "Activation in vitro of NF-kappaB by phosphorylation of its inhibitor IkappaB," Nature. 344(6267):678-682 (1990).
Goldberg, "Functions of the proteasome: The lysis at the end of the tunnel," Science. 268:522-523 (1995).
Goldberg, "The mechanism and functions of ATP-dependent proteases in bacterial and animal cells," Eur J Biochem. 203:9-23 (1992).
Graves et al., "Lack of association between early childhood immunizations and beta-cell autoimmunity," Diabetes Care. 22:1694-7 (1999).
Grewal et al., "Local expression of transgene encoded TNFalpha in islets prevents autoimmune diabetes in nonobese diabetic (NOD) mice by preventing the development of auto-reactive islet-specific T Cells," J Exp Med. 184:1963-1974 (1996).
Grilli et al., "Neuroprotection by aspirin and sodium salicylate through blockade of NF-kappaB activation," Science. 274:1383-1385 (1996).
Gronostajski et al., "The ATP dependence of the degradation of short- and long-lived proteins in growing fibroblasts," J Biol Chem. 260(6):3344-3349 (1985).
Gueckel et al., "Mutations in the yeast proteasome beta-Type subunit Pre3 uncover position-dependent effects on proteasomal peptidase activity and in vivo function," J Biol Chem. 273(31):19443-19452 (1998).
Haas et al., "Pathways of ubiquitin conjugation," FASEB J. 11:1257-1268 (1997).
Hartwell et al., "Aberrant cytokine regulation in macrophages from young autoimmune-prone mice: Evidence that the intrinsic defect in MRL macrophage IL-1 expression is transcriptionally controlled," Mol Immunol. 32(10):743-751 (1995).
Hayashi et al., "Essential role of human leukocyte antigen-encoded proteasome subunits in NF-kappaB activation and prevention of tumor necrosis factor-alpha-induced apoptosis," J Biol Chem. 275(7):5238-5247 (2000).
Hayashi et al., "NOD mice are defective in proteasome production and activation of NF-kappaB," Mol Cell Biol. 19(12):8646-8659 (1999).
Hershko et al., "The ubiquitin system for protein degradation," Annu Rev Biochem. 61: 761-807 (1992).
Hester et al., "Studies on the cytophilic properties of human beta2-microglobulin. II. The role of histocompatibility antigens," Scand J Immunol. 9(2):125-134 (1979).
Hsu et al., "TRADD-TRAF2 and TRADD-FADD interactions define two distinct TNF receptor 1 signal transduction pathways," Cell. 84:299-308 (1996).
Hyafil et al., "Dissociation and exchange of the beta$_2$-microglobulin subunit of HLA-A and HLA-B antigens," Proc Natl Acad Sci USA. 76(11):5834-5838 (1979).
Jackson et al., "Hematopoietic potential of stem cells isolated from murine skeletal muscle," Proc Natl Acad Sci USA. 96(25):14482-14486 (1999).
Jacob et al., "Monoclonal anti-tumor necrosis factor antibody renders non-obese diabetic mice hypersensitive to irradiation and enhances insulitis development," Int Immunol. 4(5):611-614 (1992).
Jacob et al., "Prevention of diabetes in nonobese diabetic mice by tumor necrosis factor (TNF): Similarities between TNF-alpha and interleukin 1," Proc Natl Acad Sci USA. 87:968-972 (1990).
Jacob et al., "Tumour necrosis factor-alpha in murine autoimmune 'lupus' nephritis," Nature. 331:356-358 (1988).
Jakubowski et al., "Phase I trial of intramuscularly administered tumor necrosis factor in patients with advanced cancer," J Clin Oncol. 7(3):298-303 (1989).
Jiang et al., "Pluripotency of mesenchymal stem cells derived from adult marrow," Nature. 418:41-49 (2002).
Johansson et al., "Identification of a neural stem cell in the adult mammalian central nervous system," Cell. 96:25-34 (1999).
Juang et al., "Beneficial influence of glycemic control upon the growth and function of transplanted islets," Diabetes. 43:1334-1339 (1994).
Kaijzel et al., "Functional analysis of a human tumor necrosis factor alpha (TNF-alpha) promoter polymorphism related to joint damage in rheumatoid arthritis," Mol Med. 4:724-733 (1998).
Kanzler et al., "Hox11 acts cell autonomously in spleen development and its absence results in altered cell fate of mesenchymal spleen precursors," Devel Biol. 234:231-243 (2001).
Kaufman et al., "Patterns of hemopoietic reconstitution in nonobese diabetic mice: dichotomy of allogeneic resistance versus competitive advantage of disease-resistant marrow," J Immunol. 158(5):2435-2442 (1997).
Kawasaki et al., "Prevention of type 1 diabetes: from the view point of beta cell damage," Diabetes Res Clin Pract. 66:S27-S32 (2004).
Kieran et al., "The DNA binding subunit of NF-kappaB is identical to factor KBF1 and homologous to the rel oncogene product," Cell. 62:1007-18 (1990).
Koarada et al., "B Cells lacking RP105, a novel B cell antigen, in systemic lupus erythematosus," Arthritis & Rheumatism. 42(12):2593-600 (1999).
Kodama et al., "Islet regeneration during the reversal of autoimmune diabetes in NOD mice," Science. 302:1223-1227 (2003).
Kopp et al., "Inhibition of NF-kappaB by sodium salicylate and aspirin," Science. 265(5174):956-959 (1994).
Krause et al., "Multi-organ, multi-lineage engraftment by a single bone marrow-derived stem cell," Cell. 105:369-377 (2001).
Kuehnle et al., "The therapeutic potential of stem cells from adults," BMJ. 325(7360):372-6 (2002).
Kwon et al., "Evidence for involvement of the proteasome complex (26S) and NFkappaB in IL-1 beta-induced nitric oxide and prostaglandin production by rat islets and RINm5F Cells," Diabetes. 47(4):583-591 (1998).
Kwon et al., "Interleukin-1beta-induced nitric oxide synthase expression by rat pancreatic beta-cells: Evidence for the involvement of nuclear factor kappaB in the signaling mechanism," Endocrinology. 136(11):4790-4795 (1995).
Laakko et al., "Versatility of merocyanine 540 for the flow cytometric detection of apoptosis in human and murine cells," J Immunol Methods. 261(1-2):129-139 (2002).
Lammert et al., "Induction of pancreatic differentiation by signals from blood vessels," Science. 294:564-567 (2001).
Lanza et al., "Transplantation of encapsulated canine islets into spontaneously diabetic BB/Wor rats without immunosuppression," Endocrinology. 131(2):637-642 (1992).
Lapchak et al., "Tumor necrosis factor production is deficient in diabetes-prone BB rats and can be corrected by complete Freund's

(56) References Cited

OTHER PUBLICATIONS adjuvant: A possible immunoregulatory role of tumor necrosis factor in the prevention of diabetes," Clin Immunol Immunopathol. 65(2):129-134 (1992).
Lawrence et al., "Differential hepatocyte toxicity of recombinant Apo2L/TRAIL versions," Nat Med. 7(4):383-385 (2001).
Lewis et al., "Integrins regulate the apoptotic response to DNA damage through modulation of p53," Proc Natl Acad Sci USA. 99(6):3627-3632 (2002).
Li et al., "Use of Donor beta 2-Microglobulin-Deficient Transgenic Mouse Liver Cells for Isografts, Allografts, and Xenografts," Transplantation. 55(4):940-6 (1993).
Li et al., "Reduced expression of peptide-loaded HLA class I molecules on multiple sclerosis lymphocytes," Ann Neurol. 38(2):147-154 (1995).
Macchi et al., "Impaired apoptosis in mitogen-stimulated lymphocytes of patients with multiple sclerosis," NeuroReport. 10(25):399-402 (1999).
Mak et al., "Signaling for survival and apoptosis in the immune system," Arthritis Res. 4(Suppl 3):S243-S252 (2002).
Markiewicz et al., "Long-term T cell memory requires the surface expression of self-peptide/major histocompatibility complex molecules," Proc Natl Acad Sci USA. 95(6):3065-70 (1998).
Markmann et al., "Indefinite survival of MHC class I-deficient murine pancreatic islet allografts," Transplantation. 54(6):1085-1089 (1992).
Matsumoto et al., "Liver organogenesis promoted by endothelial cells prior to vascular function," Science. 294(5542):559-563 (2001).
Mayer-Proschel et al., "Isolation of lineage-restricted neuronal precursors from multipotent neuroepithelial stem cells," Neuron. 19(4):773-785 (1997).
McGuire et al., "An enzyme related to the high molecular weight multicatalytic proteinase, macropain, participates in a ubiquitin-mediated, ATP-stimulated proteolytic pathway in soluble extracts of BHK 21/C13 fibroblasts," Biochim Biophys Acta. 967(2):195-203 (1988).
McInerney et al., "Prevention of insulitis and diabetes onset by treatment with complete Freund's adjuvant in NOD mice," Diabetes. 40(6):715-725 (1991).
McKay, "Mammalian deconstruction for stem cell reconstruction," Nat Med. 6(7):747-8 (2000).
Mercurio et al., "p105 and p98 precursor proteins play an active role in NF-kappa B-mediated signal transduction," Genes Dev. 7(4):705-718 (1993).
Mestas et al., "Of mice and not men: Differences between mouse and human immunology," J Immunol. 172(5):2731-2738 (2004).
Mezey et al., "Turning blood into brain: cells bearing neuronal antigens generated in vivo from bone marrow," Science. 290(5497):1779-1782 (2000).
Miller et al., "Both the Lyt-2$^+$ and L3T4$^+$ T cell subsets are required for the transfer of diabetes in nonobese diabetic mice," J Immunol. 140(1):52-8 (1988).
Mittelman et al., "A phase I pharmacokinetic study of recombinant human tumor necrosis factor administered by a 5-day continuous infusion," Invest New Drugs. 10(3):183-190 (1992).
Miyazaki et al., "Predominance of T lymphocytes in pancreatic islets and spleen of pre-diabetic non-obese diabetic (NOD) mice: a longitudinal study," Clin Exp Immunol. 60(3):622-630 (1985).
Morrison, "Stem cell potential: Can anything make anything?" Curr Biol. 11(1):R7-R9 (2001).
Nomikos et al., "Combined treatment with nicotinamide and desferrioxamine prevents islet allograft destruction in NOD mice," Diabetes. 35(11):1302-1304 (1986).
Offield et al., "PDX-1 is required for pancreatic outgrowth and differentiation of the rostral duodenum," Development. 122(3):983-995 (1996).
Ono et al., "IDDM in BB rats. Enhanced MHC class I heavy-chain gene expression in pancreatic islets," Diabetes. 37(10):1411-1418 (1988).

Orlowski, "The multicatalytic proteinase complex, a major extralysosomal proteolytic system," Biochemistry. 29(45):10289-10297 (1990).
Osorio et al., "Beta-2 microglobulin gene disruption prolongs murine islet allograft survival in NOD mice," Transplant Proc. 26(2):752 (1994).
Palombella et al., "The ubiquitin-proteasome pathway is required for processing the NF-kappa B1 precursor protein and the activation of NF-kappa B," Cell. 78(5):773-785 (1994).
Pestano et al., "Inactivation of misselected CD8 T cells by CD8 gene methylation and cell death," Science. 284(5417):1187-91 (1999).
Petersen et al., "Bone marrow as a potential source of hepatic oval cells," Science. 284(5417):1168-70 (1999).
Pozzilli, "BCG vaccine in insulin-dependent diabetes mellitus," Lancet. 349(9064):1520-1 (1997).
Pontesilli et al., "Circulating lymphocyte populations and autoantibodies in non-obese diabetic (NOD) mice: a longitudinal study," Clin Exp Immunol. 70(1):84-93 (1987).
Prieto et al., "Apoptotic rate: A new indicator for the quantification of the incidence of apoptosis in cell cultures," Cytometry. 48(4):185-93 (2002).
Qin et al., "Complete Freund's adjuvant-induced T cells prevent the development and adoptive transfer of diabetes in nonobese diabetic mice," J Immunol. 150(5):2072-80 (1993).
Raab et al., "In vitro evaluation of methotrexate and azathioprine for antipsoriatic activity," Arch Derm Res. 253(1):77-84 (1975).
Rabinovitch et al., "TNF-alpha down-regulates type 1 cytokines and prolongs survival of syngeneic islet grafts in nonobese diabetic mice," J Immunol. 159(12):6298-6303 (1997).
Rabinovitch et al., "Tumor necrosis factor mediates the protective effect of Freund's adjuvant against autoimmune diabetes in BB rats," J Autoimmun. 8(3):357-366 (1995).
Rajagopalan et al., "Pathogenic anti-DNA autoantibody-inducing T helper cell lines from patients with active lupus nephritis: isolation of $CD4^-8^-$ T helper cell lines that express the gamma delta T-cell antigen receptor," Proc Natl Acad Sci USA. 87(18):7020-7024 (1990).
Ramiya et al., "Reversal of insulin-dependent diabetes using islets generated in vitro from pancreatic stem cells," Nat Med. 6(3):278-282 (2000).
Rechsteiner, "Ubiquitin-mediated pathways for intracellular proteolysis," Annu Rev Cell Biol. 3:1-30 (1987).
Rietze et al., "Purification of a pluripotent neural stem cell from the adult mouse brain," Nature. 412(6848):736-739 (2001).
Roberts et al., "Hox11 controls the genesis of the spleen," Nature. 368(6473):747-749 (1994).
Robertson et al., "Preservation of insulin mRNA levels and insulin secretion in HIT cells by avoidance of chronic exposure to high glucose concentrations," J Clin Invest. 90(2):320-325 (1992).
Rolfe et al., "The ubiquitin-mediated proteolytic pathway as a therapeutic area," J Mol Med. 75(1):5-17 (1997).
Rosenthal, "Prometheus's vulture and the stem-cell promise," N Engl J Med. 349(3):267-74 (2003).
Ryu et al., "Reversal of established autoimmune diabetes by restoration of endogenous beta cell function," J Clin Invest. 108(1):63-72 (2001).
Sadelain et al., "Prevention of type I diabetes in NOD mice by adjuvant immunotherapy," Diabetes. 39(5):583-9 (1990).
Sarin et al., "Cytotoxic effect of TNF and lymphotoxin on T lymphoblasts," J Immunol. 155(8):3716-3718 (1995).
Satoh et al., "Inhibition of type 1 diabetes in BB rats with recombinant human tumor necrosis factor-alpha," J Immunol. 145(5):1395-1399 (1990).
Satoh et al., "Recombinant human tumor necrosis factor alpha suppresses autoimmune diabetes in nonobese diabetic mice," J Clin Invest. 84(4):1345-1348 (1989).
Schatz et al., "Defective inducer T-cell function before the onset of insulin-dependent diabetes mellitus," J Autoimmun. 4(1):125-136 (1991).
Schmidt et al., "Interspecies exchange of beta 2-microglobulin and associated MHC and differentiation antigens," Immunogenetics. 13(6):483-91 (1981).

(56) References Cited

OTHER PUBLICATIONS

Serrano et al., "Non-HLA associations with autoimmune diseases," Autoimmun Rev. 5(3):209-214 (2006).
Serup, "Panning for pancreatic stem cells," Nat Genet. 25(2):134-135 (2000).
Serup et al., "Islet and stem cell transplantation for treating diabetes," BMJ. 322 (7277):29-32 (2001).
Shehadeh et al., "Effect of adjuvant therapy on development of diabetes in mouse and man," Lancet. 343(8899):706-707 (1994).
Shihabuddin et al., "Adult spinal cord stem cells generate neurons after transplantation in the adult dentate gyrus," J Neurosci. 20(23):8727-8735 (2000).
Silva et al., "Prevention of autoimmune diabetes through immunostimulation with Q fever complement-fixing antigen," Ann NY Acad Sci. 1005:423-430 (2003).
Song et al., "Tumor necrosis factor-related apoptosis-inducing ligand (TRAIL) is an inhibitor of autoimmune inflammation and cell cycle progression," J Exp Med. 191(7):1095-1103 (2000).
Speiser et al., "Loss of ATP-dependent proteolysis with maturation of reticulocytes and erythrocytes," J Biol Chem. 257(23):14122-14127 (1982).
Sreenan et al., "Increased beta-cell proliferation and reduced mass before diabetes onset in the nonobese diabetic mouse," Diabetes. 48(5):989-996 (1999).
Stephens et al., "Protection of NIT-1 pancreatic beta-cells from immune attack by inhibition of NF-kappaB," J Autoimmun. 10(3):293-298 (1997).
Sun et al., "MHC class I multimers," Arthritis Res. 3(5):265-269 (2001).
Szodoray et al., "Programmed cell death in rheumatoid arthritis peripheral blood T-cell subpopulations determined by laser scanning cytometry," Lab Invest. 83(12):1839-1848 (2003).
Tartaglia et al., "The two different receptors for tumor necrosis factor mediate distinct cellular responses," Proc Natl Acad Sci USA. 88(20):9292-9296 (1991).
Terada et al., "Bone marrow cells adopt the phenotype of other cells by spontaneous cell fusion," Nature. 416(6880):542-545 (2002).
Toma et al., "Isolation of multipotent adult stem cells from the dermis of mammalian skin," Nat Cell Bio. 3:778-784 (2001).
Townsley et al., "Dominant-negative cyclin-selective ubiquitin carrier protein E2-C/UbcH10 blocks cells in metaphase," Proc Natl Acad Sci USA. 94:2362-2367 (1997).
Trowsdale et al., "Sequences encoded in the class II region of the MHC related to the 'ABC' superfamily of transporters," Nature. 348(6303):741-4 (1990).
Ulaeto et al., "A T-cell dormant state in the autoimmune process of nonobese diabetic mice treated with complete Freund's adjuvant," Proc Natl Acad Sci USA. 89:3927-3931 (1992).
Van der Kooy et al., "Why stem cells?," Science. 287:1439-1441 (2000).
Van Nocker et al., "The multiubiquitin-chain-binding protein Mcb1 is a component of the 26S proteasome in *Saccharomyces cerevisiae* and plays a nonessential, substrate-specific role in protein turnover," Mol Cell Biol. 16(11):6020-6028 (1996).
Van Noort et al., "Cell biology of autoimmune diseases," Int Rev Cytol. 178:127-206 (1998).
Vidal-Puig et al., "Tolerance to peripheral tissue is transient and maintained by tissue-specific class I expression," Transplant Proc. 26(6):3314-6 (1994).
Vogel, "Stem cell research. Studies cast doubt on plasticity of adult cells," Science. 295:1989,1991 (2002).
Von Herrath et al., "In vivo treatment with a MHC class I-restricted blocking peptide can prevent virus-induced autoimmune diabetes," J Immunol. 161:5087-5096 (1998).
Wang et al., "Prevention of recurrence of IDDM in islet-transplanted diabetic NOD mice by adjuvant immunotherapy," Diabetes. 41:114-117 (1992).
Watt et al., "Out of Eden: stem cells and their niches," Science. 287:1427-30 (2000).
Waxman et al., "Demonstration of two distinct high molecular weight proteases in rabbit reticulocytes, one of which degrades ubiquitin conjugates," J Biol Chem. 262(6):2451-2457 (1987).
Weissman, "Translating stem and progenitor cell biology to the clinic: barriers and opportunities," Science. 287:1442-1446 (2000).
Weringer et al., "Identification of T cell subsets and Class I and Class II antigen expression in islet grafts and pancreatic islets of diabetic BioBreeding/Worcester rats," Am J Pathol. 132(2):292-303 (1988).
Wicker et al., "Transfer of autoimmune diabetes mellitus with splenocytes from nonobese diabetic (NOD) mice," Diabetes. 35:855-860 (1986).
Willis et al., "Type 1 Diabetes in insulin-treated adult-onset diabetic subjects," Diabetes Res Clin Pract. 42:49-53 (1998).
Winston, "Embryonic stem cell research: the case for . . . ," Nat Med. 7(4):396-397 (2001).
Wong et al., "Identification of an MHC class I-restricted autoantigen in Type I Diabetes by screening an organ-specific cDNA library," Nat Med. 5(9):1026-1031 (1999).
Xu et al., "MHC/peptide tetramer-based studies of T cell function," J Immunol Methods. 268(1):21-28 (2002).
Yan et al., "Reduced expression of Tap1 and Lmp2 antigen-processing genes in the nonobese diabetic (NOD) mouse due to a mutation in their shared bidirectional promoter," J Immunol. 159(6):3068-3080 (1997).
Ying et al., "Changing potency by spontaneous fusion," Nature. 416(6880):545-548 (2002).
Zöller et al., "Apoptosis resistance in peripheral blood lymphocytes of alopecia areata patients," Retrieved from Science Direct, published in: J Autoimmun. 23(3):241-256 (2004) (30 pages).
Schuppan, "Current concepts of celiac disease pathogenesis," Gastroenterology. 119(1):234-242 (2000).
Beers et al., Disorders of Carbohydrate Metabolism: Diabetes Mellitus. *The Merck Manual of Diagnosis and Therapy, 17th Ed.* Merck Research Laboratories, 165-171 (1999) (5 pages).
Gupta, "Molecular steps of tumor necrosis factor receptor-mediated apoptosis," Curr Mol Med. 1(3):317-324 (2001).
Hymowitz et al., "Toward small-molecule agonists of TNF receptors," Nat Chem Biol. 1(7):353-354 (2005).
Rath et al., "TNF-induced signaling in apoptosis," J Clin Immunol. 19(6):350-364 (1999).
Totpal et al., "TNF and its receptor antibody agonist differ in mediation of cellular responses," J Immunol. 153:2248-2257 (1994).
Kodama et al., "The therapeutic potential of tumor necrosis factor for autoimmune disease: A mechanistically based hypothesis," Cell Mol Life Sci. 62:1850-1862 (2005).
Aldrich et al., "Positive selection of self- and alloreactive CD8+ T cells in Tap-1 mutant mice," Proc Natl Acad Sci USA. 91(14):6525-8 (1994).
Alison et al., "Hepatocytes from non-hepatic adult stem cells," Nature. 406(6793):257 (2000).
Allen et al., "Effect of bacillus Calmette-Guerin vaccination on new-onset type 1 diabetes," Diabetes Care. 22(10):1703-7 (1999).
Altomonte et al., "Serum levels of interleukin-1b, tumour necrosis factor-a and interleukin-2 in rheumatoid arthritis. Correlation with disease activity," Clin Rheumatol. 11(2):202-205 (1992).
Anderson et al., "Can stem cells cross lineage boundaries?," Nat Med. 7(4):393-5 (2001).
Anderson et al., "The NOD mouse: a model of immune dysregulation," Annu Rev Immunol. 23:447-485 (2005).
Aristarkhov et al., "E2-C, a cyclin-selective ubiquitin carrier protein required for the destruction of mitotic cyclins," Proc Natl Acad Sci USA. 93(9):4294-9 (1996).
Baeza et al., "Pancreatic regenerating gene overexpression in the nonobese diabetic mouse during active diabetogenesis," Diabetes. 45(1):67-70 (1996) (5 pages).
Baeza et al., "Reg protein: a potential beta-cell-specific growth factor?," Diabetes Metab. 22(4):229-34 (1996).
Baeza et al., "Specific reg II gene overexpression in the non-obese diabetic mouse pancreas during active diabetogenesis," FEBS Letters. 416(3):364-8 (1997).

(56) References Cited

OTHER PUBLICATIONS

Aranda et al., "Analysis of intestinal lymphocytes in mouse colitis mediated by transfer of CD4+, CD45RB$^{high}$ T Cells to SCID recipients," J Immunol. 158(7):3464-3473 (1997).
Genestier et al., "Immunosuppressive properties of methotrexate: Apoptosis and clonal deletion of activated peripheral T Cells," J Clin Invest. 102(2):322-328 (1998).
Gerich et al., "Advances in diabetes for the millennium: Understanding insulin resistance," MedGenMed. 6(3 Suppl.):11 (2004) (9 pages).
Gottlieb et al., "Cell acidification in apoptosis: Granulocyte colony-stimulating factor delays programmed cell death in neutrophils by up-regulating the vacuolar H$^+$-ATPase," Proc Natl Acad Sci USA. 92(13):5965-5968 (1995).
Al-Awqati et al., "Stem cells in the kidney," Kidney Int. 61(2):387-95 (2002).
Anderson et al., "Studies on the cytophilic properties of human beta2 microglobulin," J Immunol. 114(3):997-1000 (1975).
Ashton-Rickardt et al., "Peptide contributes to the specificity of positive selection of CD8+ T Cells in the thymus," Cell. 73(5):1041-9 (1993).
Ashton-Rickardt et al., "Evidence for a differential avidity model of T cell selection in the thymus," Cell. 76(4):651-63 (1994).
Atkinson et al., "The NOD mouse model of type 1 diabetes: As good as it gets?," Nat Med. 5(6):601-4 (1999).
Baeuerle et al., "NF-kappaB: Ten years after," Cell. 87(1):13-20 (1996).
Baik et al., "BCG vaccine prevents insulitis in low dose streptozotocin-induced diabetic mice," Diabetes Res Clin Pract. 46(2):91-97 (1999).
Baldwin, "The NF-kappaB and IkappaB proteins: new discoveries and insights," Ann Rev Immunol. 14:649-683 (1996).
Ban et al., "Selective death of autoreactive T Cells in human diabetes by TNF or TNF receptor 2 agonism," Proc Natl Acad Sci USA. 105(36):13644-13649 (2008).
Barres, "A new role for glia: generation of neurons!," Cell. 97(6):667-70 (1999).
Baxter et al., "Mycobacteria precipitate an SLE-like syndrome in diabetes-prone NOD mice," Immunology. 83(2):227-231 (1994).
Beg et al., "An essential role for NF-kappaB in preventing TNF-alpha-induced cell death," Science. 274(5288):782-784 (1996).
Bernabeu et al., "Beta2-microglobulin from serum associates with MHC class I antigens on the surface of cultured cells," Nature. 308:642-645 (1984) (Abstract only) (2 pages).
Bendelac et al., "Syngeneic transfer of autoimmune diabetes from diabetic NOD mice to healthy neonates. Requirement for both L3T4$^+$ and Lyt-2$^+$ T Cells," J Exp Med. 166(4):823-832 (1987).
Bill et al., "Use of soluble MHC class II/peptide multimers to detect antigen-specific T cells in human disease," Arthritis Res. 4:261-265 (2002).
Bjornson et al., "Turning brain into blood: A hematopoietic fate adopted by adult neural stem cells in vivo," Science. 283(5401):534-537 (1999).
Boches et al., "Role for the adenosine triphosphate-dependent proteolytic pathway in reticulocyte maturation," Science. 215(4535):978-980 (1982).
Brás et al., "Diabetes-prone NOD mice are resistant to *Mycobacterium avium* and the infection prevents autoimmune disease," Immunology. 89:20-25 (1996).
Brayer et al., "Alleles from chromosomes 1 and 3 of NOD mice combine to influence Sjögren's syndrome-like autoimmune exocrinopathy," J. Rheumatol. 27(8):1896-1904 (2000).
Brazelton et al., "From marrow to brain: expression of neuronal phenotypes in adult mice," Science. 290:1775-1779 (2000).
Brod et al., "Ingested interferon alpha suppresses Type I diabetes in non-obese diabetic mice," Diabetologia. 41(10):1227-1232 (1998).
Brodbeck et al., "Genetic determination of nephrogenesis: the Pax/Eya/Six gene network," Pediatr Nephrol. 19(3):249-255 (2004) (1 page) (Abstract Only).
Bunting et al., "Enforced P-glycoprotein pump function in murine bone marrow cells results in expansion of side population stem cells in vitro and repopulating cells in vivo," Blood. 96(3):902-909 (2000).
Cavallo et al., "BCG vaccine with and without nicotinamide in recent onset IDDM: a multicenter randomized trial," Second Congress of the Immunology of Diabetes Society, Canberra, Australia, Dec. 8-11, 1996. Autoimmunity. 24(Suppl. 1):18 (1996).
Caetano et al., "Effect of methotrexate (MTX) on NAD(P)+ dehydrogenases of Hela cells: malic enzyme, 2-oxoglutarate and isocitrate dehydrogenases," Cell Biochem Funct. 15(4):259-264 (1997).
Chatenoud et al., "CD3 antibody-induced dominant self tolerance in overtly diabetic NOD mice," J Immunol. 158(6):2947-2954 (1997).
Choi et al., "Prevention of encephalomyocarditis virus-induced diabetes by live recombinant *Mycobacterium bovis* bacillus Calmette-Guérin in susceptible mice," Diabetes. 49 (9):1459-1467 (2000).
Cole et al., "Two ParaHox genes, SpLox and SpCdx, interact to partition the posterior endoderm in the formation of a functional gut," Development. 136(4):541-549 (2009).
Colucci et al., "Programmed cell death in the pathogenesis of murine IDDM: resistance to apoptosis induced in lymphocytes by cyclophosphamide," J Autoimmunity. 9:271-276 (1996).
Corbett et al., "Nitric oxide mediates cytokine-induced inhibition of insulin secretion by human islets of Langerhans," Proc Natl Acad Sci USA. 90(5):1731-1735 (1993).
Coux et al., "Enzymes catalyzing ubiquitination and proteolytic processing of the p105 precursor of nuclear factor kappaB1," J Biol Chem. 273(15):8820-8828 (1998).
Couzin, "Diabetes studies conflict on power of spleen cells," Science. 311:1694 (2006).
Darzynkiewicz et al., "Use of flow and laser scanning cytometry to study mechanisms regulating cell cycle and controlling cell death," Clinics in Laboratory Medicine. 21(4):857-873 (2001).
Dear et al., "The Hox11 gene is essential for cell survival during spleen development," Development. 121(9):2909-2915 (1995).
Declaration of Dr. Denise Faustman under 37 C.F.R. § 1.132 regarding U.S. Appl. No. 10/358,664, dated May 13, 2009 (4 pages).
Dieguez-Acuna et al., "Characterization of mouse spleen cells by subtractive proteomics," Mol Cell Proteomics. 4(10):1459-1470 (2005).
Dieguez-Acuna et al., "Proteomics identifies multipotent and low oncogenic risk stem cells of the spleen," Int J Biochem Cell Biol. 42(10):1651-60 (2010) (10 pages).
Dilts et al., "Autoimmune diabetes: The involvement of benign and malignant autoimmunity," J Autoimmun. 12:229-232 (1999).
Dinarello, "Interleukin-1, Interleukin-1 receptors and Interleukin-1 receptor antagonist," Intern Rev Immunol. 16:457-499 (1998).
Driscoll et al., "The proteasome (multicatalytic protease) is a component of the 1500-kDa proteolytic complex which degrades ubiquitin-conjugated proteins," J Biol Chem. 265(9):4789-4792 (1990).
Durand et al., "Mesenchymal lineage potentials of aorta-gonad-mesonephros stromal clones," Haematologica. 91(9):1172-1179 (2006).
Eglitis et al., "Hematopoietic cells differentiate into both microglia and macroglia in the brains of adult mice," Proc Natl Acad Sci USA. 94:4080-4085 (1997).
Elliott et al., "Effect of bacille Calmette-Guérin vaccination on C-peptide secretion in children newly diagnosed with IDDM," Diabetes Care. 21(10):1691-1693 (1998).
Eytan et al., "ATP-dependent incorporation of 20S protease into the 26S complex that degrades proteins conjugated to ubiquitin," Proc Natl Acad Sci USA. 86:7751-7755 (1989).
Fan et al., "Generation of p50 subunit of NF-kappaB by processing of p105 through an ATP-dependent pathway," Nature. 354:395-398 (1991).
Faustman et al., "Abnormal T-lymphocyte subsets in Type I Diabetes," Diabetes. 38:1462-1468 (1989).
Faustman et al., "Linkage of faulty major histocompatibility complex class I to autoimmune diabetes," Science. 254:1756-1761 (1991).
Faustman et al., "Murine pancreatic beta-Cells express H-2K and H-2D but not Ia antigens," J Exp Med. 151(6):1563-1568 (1980).

(56) References Cited

OTHER PUBLICATIONS

Faustman et al., "Prevention of xenograft rejection by masking donor HLA class I antigens," Science. 252:1700-1702 (1991).
Faustman et al., "T-lymphocyte changes linked to autoantibodies. Association of insulin autoantibodies with CD4+CD45R+ lymphocyte subpopulation in prediabetic subjects," Diabetes. 40(5):590-597 (1991).
Feldman et al., "Anti-TNFalpha therapy is useful in rheumatoid arthritis and Crohn's disease: Analysis of the mechanism of action predicts utility in other diseases," Transplant Proc. 30(8):4126-4127 (1998).
Ferrando et al., "Adult T-Cell ALL patients whose lymphoblasts express the HOX11 oncogene have an excellent prognosis when treated with chemotherapy and are not candidates for allogeneic bone marrow transplantation in first remission," Blood. 11: Abstract 578 (2002) (1 page).
Fischer et al., "An improved flow cytometric assay for the determination of cytotoxic T lymphocyte activity," J Immunol Methods. 259:159-169 (2002).
Foulis, "C.L. Oakley lecture (1987). The pathogenesis of beta cell destruction in Type I (insulin-dependent) diabetes mellitus," J Pathol. 152(3):141-148 (1987).
Fu et al., "Antigen processing and autoimmunity: Evaluation of mRNA abundance and function of HLA-Linked genes," Ann NY Acad Sci. 842:138-155 (1998).
Fu et al., "Defective major histocompatibility complex class I expression on lymphoid cells in autoimmunity," J Clin Invest. 91:2301-2307 (1993).
Fukada et al., "Two signals are necessary for cell proliferation induced by a cytokine receptor gp130: Involvement of STAT3 in anti-apoptosis," Immunity. 5:449-460 (1996).
Gazda et al., "Regulation of autoimmune diabetes: characteristics of non-islet-antigen specific therapies," Immunol Cell Biol. 74: 401-407 (1996).
Glas et al., "The CD8+ T Cell repertoire in beta2-microglobulin-deficient mice is biased towards reactivity against self-major histocompatibility class I," J Exp Med. 179(2):661-672 (1994).
Hao et al., "Effect of mycophenolate mofetil on islet allografting to chemically induced or spontaneously diabetic animals," Transplant Proc. 24(6): 2843-2844 (1992).
Harada et al., "Prevention of overt diabetes and insulitis in NOD mice by a single BCG vaccination," Diabetes Res Clin Pract. 8:85-89 (1990).
Hostikka et al., "The mouse Hoxc11 gene: genomic structure and expression pattern," Mech Dev. 70(1-2):133-145 (1998) (Abstract Only).
Horsfall et al., "Characterization and specificity of B-cell responses in lupus induced by *Mycobacterium bovis* in NOD/Lt mice," Immunology. 95(1):8-17 (1998).
Horwitz et al., "Recombinant bacillus Calmette-Guerin (BCG) vaccines expressing the *Mycobacterium tuberculosis* 30-kDa major secretory protein induce greater protective immunity against *tuberculosis* than conventional BCG vaccines in a highly susceptible animal model," Proc Natl Acad Sci USA. 97(25):13853-13858 (2000).
Humphreys-Beher et al., "New concepts for the development of autoimmune exocrinopathy derived from studies with the NOD mouse model," Arch Oral Biol. 44(Suppl 1):S21-S25 (1999) (Abstract Only) (2 pages).
Klingensmith et al., "Vaccination with BCG at diagnosis does not alter the course of IDDM," Diabetes 57th Annual Meeting and Scientific Sessions, Jun. 21-24, Boston MA. 40(Suppl 1):193A, 0744 (1997) (3 pages) (Abstract Only).
Kodama et al., "Regenerative medicine: A radical reappraisal of the spleen," Trends Mol Med. 11(6):271-276 (2005).
Kouskoff et al., "Organ-specific disease provoked by systemic autoimmunity," Cell. 87(5):811-22 (1996) (1 page) (Abstract only).
Koyama et al., "Hox11 genes establish synovial joint organization and phylogenetic characteristics in developing mouse zeugopod skeletal elements," Development. 137(22): 3795-800 (2010) (Abstract Only).
Lahav-Baratz et al., "Reversible phosphorylation controls the activity of cyclosome-associated cyclin-ubiquitin ligase," Proc Natl Acad Sci USA. 92:9303-9307 (1995).
Lakey et al., "BCG immunotherapy prevents recurrence of diabetes in islet grafts transplanted into spontaneously diabetic NOD mice," Transplantation. 57(8):1213-1217 (1994).
Li et al., "Abnormal class I assembly and peptide presentation in the nonobese diabetic mouse," Proc Natl Acad Sci USA. 91(23):11128-11132 (1994).
Ljunggren et al., "MHC class I expression and $CD8^+$ T cell development in TAP1/beta2-microglobulin double mutant mice," Int Immunol. 7(6):975-984 (1995).
Marriott, "TNF-alpha antagonists: Monoclonal antibodies, soluble receptors, thalidomide and other novel approaches," Expert Opin Invest Drugs. 6(8):1105-1108 (1997).
Murthi et al., "Novel homeobox genes are differentially expressed in placental microvascular endothelial cells compared with macrovascular cells," Placenta. 29(7):624-630 (2008).
Paolillo et al., "The effect of Bacille Calmette-Guérin on the evolution of new enhancing lesions to hypointense T1 lesions in relapsing remitting MS," J Neurol. 250(2):247-248 (2003).
Qin et al., "BCG vaccination prevents insulin-dependent diabetes mellitus (IDDM) in NOD mice after disease acceleration with cyclophosphamide," J Autoimmun. 10(3):271-278 (1997).
Quintana et al., "Experimental autoimmune myasthenia gravis in naive non-obese diabetic (NOD/LtJ) mice: susceptibility associated with natural IgG antibodies to the acetylcholine receptor," Int Immunol. 15(1):11-16 (2003).
Raju et al., "Characterization and developmental expression of Tlx-1, the murine homolog of HOX11," Mech Dev. 44(1):51-64 (1993).
Ristori et al., "Use of Bacille Calmette-Guèrin (BCG) in multiple sclerosis," Neurology. 53(7):1588-1589 (1999).
Roberts et al., "Developmental expression of Hox11 and specification of splenic cell fate," Am J Pathol. 146(5):1089-1101 (1995).
Robinson et al., "Elevated levels of cysteine protease activity in saliva and salivary glands of the nonobese diabetic (NOD) mouse model for Sjögren Syndrome," Proc Natl Acad Sci USA. 94:5767-5771 (1997).
Robinson et al., "A novel NOD-derived murine model of primary Sjögren's Syndrome," Arthritis Rheum. 41(1):150-156 (1998).
Sears et al., "NF-kappaB p105 processing via the ubiquitin-proteasome pathway," J Biol Chem. 273(3):1409-1419 (1998).
Serreze et al., "Th1 to Th2 cytokine shifts in nonobese diabetic mice: Sometimes an outcome, rather than the cause, of diabetes resistance elicited by immunostimulation," J Immunol. 166(2):1352-1359 (2001).
Shohami et al., "Dual role of tumor necrosis factor alpha in brain injury," Cytokine Growth Factor Rev. 10(2):119-130 (1999).
Singh et al., "Can progression of IDDM be prevented in newly diagnosed patients by BCG immunotherapy?" Diabetes Metab Rev. 13(4):320-321 (1997).
Slack, "Stem cells in epithelial tissues," Science. 287:1431-1433 (2000).
Storms et al., "Hoechst dye efflux reveals a novel $CD7^+CD34^-$ lymphoid progenitor in human umbilical cord blood," Blood. 96(6):2125-2133 (2000).
Shehadeh et al., "Repeated BCG vaccination is more effective than a single dose in preventing diabetes in non-obese diabetic (NOD) mice," Isr J Med Sci. 33(11):711-715 (1997).
Swirski et al., "Identification of splenic reservoir monocytes and their deployment to inflammatory sites," available in PMC Jan. 7, 2010, published in final edited form as: Science. 325(5940):612-616 (2009) (12 pages).
Tamura et al., "In vivo differentiation of stem cells in the aorta-gonad-mesonephros region of mouse embryo and adult bone marrow," Exp Hematol. 30(8):957-966 (2002) (Abstract Only).
Tran et al., "Reversal of Sjögren's-like syndrome in non-obese diabetic mice," Ann Rheum Dis. 66:812-814 (2007).

(56) References Cited

OTHER PUBLICATIONS

Wellik et al., "Hox11 paralogous genes are essential for metanephric kidney induction," Genes Dev. 16:1423-1432 (2002).
Wellik, "The role of Hox11 paralogous genes in prostate development," Grant Detail. (2009) (1 page)(Abstract only).
Yagi et al., "Possible mechanism of the preventive effect of BCG against diabetes mellitus in NOD Mouse. I. Generation of suppressor macrophages in spleen cells of BCG-vaccinated mice," Cell Immunol. 138(1):130-141 (1991).
Yagi et al., "Possible mechanism of the preventive effect of BCG against diabetes mellitus in NOD Mouse. II. Suppression of pathogenesis by macrophage transfer from BCG-vaccinated mice," Cell Immunol. 138:142-149 (1991).
Yang et al., "Effect of tumor necrosis factor alpha on insulin-dependent diabetes mellitus in NOD Mice. I. The early development of autoimmunity and the diabetogenic process," J Exp Med. 180(3):995-1004 (1994).
Zulewski et al., "Multipotential nestin-positive stem cells isolated from adult pancreatic islets differentiate ex vivo into pancreatic endocrine, exocrine, and hepatic phenotypes," Diabetes. 50:521-533 (2001).
International Search Report for International Application No. PCT/US2004/037998, mailed Feb. 28, 2008 (2 pages).
Written Opinion for International Application No. PCT/US2004/037998, mailed Feb. 28, 2008 (3 pages).
Supplementary Partial European Search Report for European Application No. 04817543, dated Oct. 6, 2009 (4 pages).
Fischer et al., "A Tnf receptor 2 selective agonist rescues human neurons from oxidative stress-induced cell death," PloS One. 6(11):e27621 (2011) (11 pages).
Loetscher et al., "Human tumor necrosis factor alpha (TNFalpha) mutants with exclusive specificity for the 55-kDa or 75-kDa TNF receptors," J Biol Chem. 268(35):26350-26357 (1993).
Van Zee et al., "A human tumor necrosis factor (TNF) alpha mutant that binds exclusively to the p55 TNF receptor produces toxicity in the baboon," J Exp Med. 179(4):1185-1191 (1994).
Welborn et al., "A human tumor necrosis factor p75 receptor agonist stimulates in vitro T cell proliferation but does not produce inflammation or shock in the baboon," J Exp Med. 184(1):165-171 (1996).
Creasey et al., "Biological effects of recombinant human tumor necrosis factor and its novel muteins on tumor and normal cell lines," Cancer Res. 47(1):145-9 (1987).
Tavernier et al., "Analysis of the structure-function relationship of tumour necrosis factor. Human/mouse chimeric TNF proteins: general properties and epitope analysis," J Mol Biol. 211(2):493-501 (1990).
Benkler et al., "Parkinson's disease, autoimmunity, and olfaction," Int J Neurosci. 119(12):2133-43 (2009) (Abstract only) (1 page).
Cebrián et al., "MHC-I expression renders catecholaminergic neurons susceptible to T-cell-mediated degeneration," Nat Commun. 5:3633 (2014) (Abstract only) (1 page).
D'Andrea, "Add Alzheimer's disease to the list of autoimmune diseases," Med Hypotheses. 64(3):458-63 (2005) (Abstract only) (2 pages).
Christen et al., "A dual role for TNF-alpha in type 1 diabetes: islet-specific expression abrogates the ongoing autoimmune process when induced late but not early during pathogenesis," J Immunol. 166(12):7023-32 (2001).
Communication pursuant to Article 94(3) EPC for European Patent Application No. 14189654.8, dated Oct. 19, 2016 (5 pages).
Mera et al., "The spleen contributes stem cells to peripheral blood stem cell transplants," J Stem Cell Res Ther. 4(11):1000253 (2014) (4 pages).
International Search Report and Written Opinion for International Application No. PCT/US2015/030282, mailed Aug. 17, 2015 (18 pages).
International Preliminary Report on Patentability for International Patent Application No. PCT/US2015/030282, mailed Nov. 24, 2016 (12 pages).
International Search Report and Written Opinion for International Application No. PCT/US16/49064, mailed Jan. 5, 2017 (19 pages).
Vagima et al., "MT1-MMP and RECK are involved in human CD34+ progenitor cell retention, egress, and mobilization," J Clin Invest. 119(3):492-503 (2009).
Khalili et al., "Mesenchymal stromal cells improve salivary function and reduce lymphocytic infiltrates in mice with Sjögren's-like disease," PLoS One. 7(6):e38615 (2012) (11 pages).
Khalili et al., "Treatment for salivary gland hypofunction at both initial and advanced stages of Sjögren-like disease: a comparative study of bone marrow therapy versus spleen cell therapy with a 1-year monitoring period," Cytotherapy. 16(3):412-23 (2014).
Khalili et al., "Bone marrow cells are a source of undifferentiated cells to prevent Sjögren's syndrome and to preserve salivary glands function in the non-obese diabetic mice," available in PMC Jun. 13, 2013, published in final edited form as: Int J Biochem Cell Biol. 42(11):1893-9 (2010) (18 pages).
Dong et al., "Essential protective role of tumor necrosis factor receptor 2 in neurodegeneration," Proc Natl Acad Sci USA. 113(43):12304-9 (2016).
Madsen et al., "Oligodendroglial TNFR2 mediates membrane TNF-dependent repair in experimental autoimmune encephalomyelitis by promoting oligodendrocyte differentiation and remyelination," J Neurosci. 36(18):5128-43 (2016).
Blüml et al., "Antiinflammatory effects of tumor necrosis factor on hematopoietic cells in a murine model of erosive arthritis," Arthritis Rheum. 62(6):1608-19 (2010).
Zachs et al., "Noninvasive ultrasound stimulation of the spleen to treat inflammatory arthritis," Nat Commun. 10:951 (2019) (10 pages).
Yang et al., "A variant of TNFR2-Fc fusion protein exhibits improved efficacy in treating experimental rheumatoid arthritis," PLoS Comput Biol. 6(2):e1000669 (2010) (7 pages).
Okubo et al., "Homogeneous Expansion of Human T-Regulatory Cells Via Tumor Necrosis Factor Receptor 2," Sci Rep. 3:3153 (2013) (11 pages).
Almoallim et al., "Anti-tumor necrosis factor-alpha induced systemic lupus erythematosus," Open Rheumatol J. 6:315-9 (2012).
Chen et al., "Contrasting effects of TNF and anti-TNF on the activation of effector T cells and regulatory T cells in autoimmunity," available in PMC Dec. 1, 2012, published in final edited form as: FEBS Lett. 585(23):3611-8 (2011) (16 pages).
Extended European Search Report for European Patent Application No. 16842699.7, dated May 10, 2019 (10 pages).
Okubo et al., "Supplemental Information: Homogeneous Expansion of Human T-Regulatory Cells Via Tumor Necrosis Factor Receptor 2," Sci Rep. 3:3153 (2013) (8 pages).
Beilhack et al., "A Selective TNFR2 Agonist Expands Host Treg Cells in Vivo to Protect from Acute Graft-Versus-Host Disease," Blood. 124(21):1099 (2014) (Abstract only) (5 pages).
Hycult Biotech, "Certificate of Analysis—Technical Data Sheet," dated Mar. 19, 2018 (2 pages).
Hycult Biotech, "Product Brochure," 2009 (36 pages).
Leeuwenberg et al., "Lipopolysaccharide LPS-mediated soluble TNF receptor release and TNF receptor expression by monocytes. Role of CD14, LPS binding protein, and bactericidal/permeability-increasing protein," J Immunol. 152(10):5070-6 (1994) (8 pages).
R&D Systems, "Human TNF RII/TNFRSF1B Antibody," dated Jul. 7, 2018 (1 page).
Faustman et al., "TNF Receptor 2 and Disease: Autoimmunity and Regenerative Medicine," Front Immunol. 4:478 (2013) (8 pages).
Invitation to Pay Additional Fees for International Application No. PCT/US2019/061828, dated Feb. 5, 2020 (3 pages).
Kim, "Regulation of Immune Cell Functions by Metabolic Reprogramming," J Immunol Res. 2018:8605471 (2018).
International Search Report and Written Opinion for International Application No. PCT/US19/61828, mailed Mar. 30, 2020 (17 pages).
International Preliminary Report on Patentability for International Patent Application No. PCT/US2019/061828, mailed May 27, 2021 (12 pages).
Extended European Search Report for European Application No. 21803059.1, dated Apr. 30, 2024 (10 pages).

(56) References Cited

OTHER PUBLICATIONS

English Translation of Office Action for Korean Application No. 10-2022-7020235, dated Jan. 2, 2023 (6 pages).
Examination Report for Australian Patent Application No. 2017263833, dated Jun. 1, 2023 (3 pages).
Office Action for Canadian Application No. 3,023,930, dated May 17, 2023 (6 pages).
English Translation of Notice of Reason for Rejection for Japanese Application No. 2021-509865, mailed Aug. 8, 2023 (2 pgs).
Office Action for Canadian Application No. 2,985,816, dated Jun. 22, 2023 (8 pages).
Office Action for Canadian Application No. 3,109,954, dated Oct. 12, 2023 (7 pages).
International Preliminary Report on Patentability for International Application No. PCT/US22/13273, issued Jul. 20, 2023 (8 pages).
International Search Report and Written Opinion for International Application No. PCT/US22/13273, mailed Dec. 13, 2022 (17 pages).
EPO Communication Pursuant to Article 94(3) EPC issued in European Patent Application No. 19852179.1, dated Jan. 18, 2024 (5 pages).
Qiu et al., "Engineering an anti-CD52 antibody for enhanced deamidation stability," MAbs. 11(7):1266-75 (Oct. 2019).
English Translation of Office Action for Chinese Application No. 201980068984.8, mailed Mar. 1, 2024 (9 pages).
Peppel et al: "A Tumor Necrosis Factor (TNF) Receptor IGG Heavy Chain Chimeric Protein as a Bivalent Antagonist of TNF Activity", Journal of Experimental Medicine, Rockefeller University Press, US, 174(6), Dec. 1, 1991 (Dec. 1, 1991), pp. 1483-1489.
Vanamee et al: "Structural principles of tumor necrosis factor superfamily signaling", Sci. Signal. 11, Jan. 2, 2018 (12 pages).
Naismith et al: "Crystallographic evidence for dimerization of unliganded tumor necrosis factor receptor", Journal of Biological Chemistry, American Society for Biochemistry and Molecular Biology, US, 270 (22), Jun. 2, 1995, pp. 13303-13307.
Extended European Search Report for European Application No. 23190358.4, mailed May 15, 2024 (8 pages).
Van der Most et al., "Tumor eradication after cyclophosphamide depends on concurrent depletion of regulatory T cells: a role for cycling TNFR2-expressing effector-suppressor T cells in limiting effective chemotherapy," Cancer Immunol Immunother. 58(8):1219-28 (Aug. 2009) (Epub Dec. 2008).
Chen et al., "TNFR2 is critical for the stabilization of the CD4+ Foxp3+ regulatory T cell phenotype in the inflammatory environment," J Immunol. 190(3):1076-84 (Feb. 2013) (Epub Dec. 2012) (11 pages).
Turner et al., "Mechanism of TNFa-induced IL-1a, IL-1β and IL-6 expression in human cardiac fibroblasts: Effects of statins and thiazolidinediones," Cardiovasc Res. 76(1):81-90 (Oct. 2007) (Epub Jun. 2007).
Lubrano di Ricco et al., "Tumor necrosis factor receptor family costimulation increases regulatory T-cell activation and function via NF-κB," Eur J Immunol. 50(7):972-985 (Jul. 2020).
ABCAM, "Anti-TNF Receptor II Antibody [MR2-1]", accessed/downloaded on Sep. 19, 2025, from: https://doc.abcam.com/datasheets/active/ab8161/en-us/tnf-receptor-ii-antibody-mr2-1-ab8161.pdf (4 pages).

\* cited by examiner

FIG. 1

```
            10         20         30         40         50
     MAPVAVWAAL AVGLELWAAA HALPAQVAFT PYAPEPGSTC RLREYYDQTA
            60         70         80         90        100
     QMCCSKCSPG QHAKVFCTKT SDTVCDSCED STYTQLWNWV PECLSCGSRC
           110        120        130        140        150
     SSDQVETQAC TREQNRICTC RPGWYCALSK QEGCRLCAPL RKCRPGFGVA
           160        170        180        190        200
     RPGTETSDVV CKPCAPGTFS NTTSSTDICR PHQICNVVAI PGNASMDAVC
           210        220        230        240        250
     TSTSPTRSMA PGAVHLPQPV STRSQHTQPT PEPSTAPSTS FLLPMGPSPP
           260        270        280        290        300
     AEGSTGDFAL PVGLIVGVTA LGLLIIGVVN CVIMTQVKKK PLCLQREAKV
           310        320        330        340        350
     PHLPADKARG TQGPEQQHLL ITAPSSSSSS LESSASALDR RAPTRNQPQA
           360        370        380        390        400
     PGVEASGAGE ARASTGSSDS SPGGHGTQVN VTCIVNVCSS SDHSSQCSSQ
           410        420        430        440        450
     ASSTMGDTDS SPSESPKDEQ VPFSKEECAF RSQLETPETL LGSTEEKPLP
           460
     LGVPDAGMKP S
```

FIG. 8A     FIG. 8B

Responder only

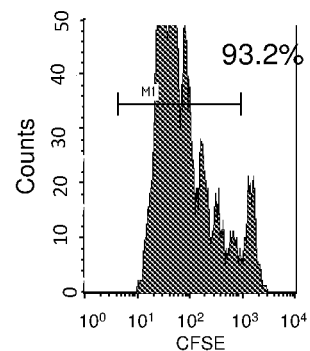

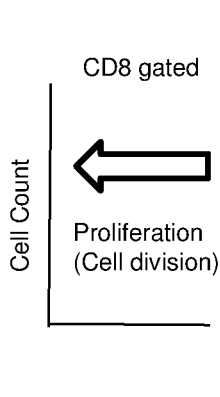

FIG. 8C   Tresp : Treg = 4 : 1

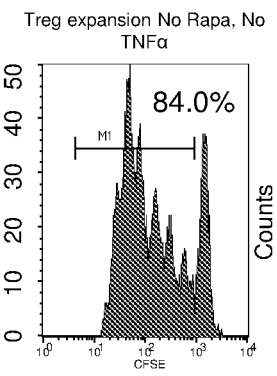 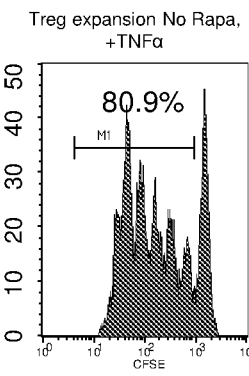 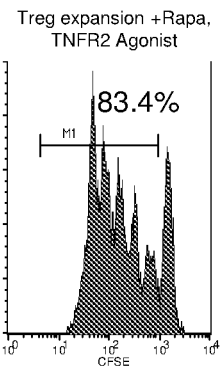

Treg expansion No Rapa, No TNFα — 84.0%  
Treg expansion No Rapa, +TNFα — 80.9%  
Treg expansion +Rapa, TNFR2 Agonist — 83.4%

FIG. 8D   Tresp : Treg = 2 : 1

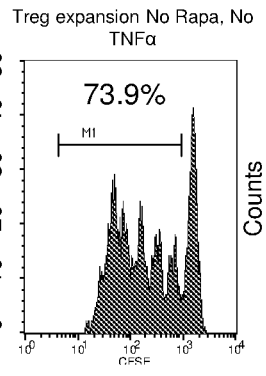 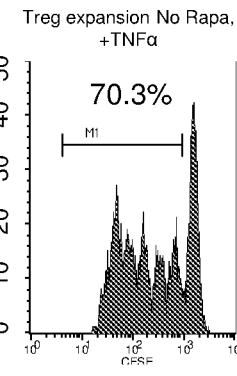 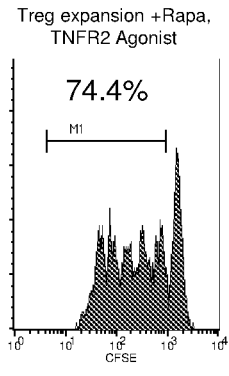

Treg expansion No Rapa, No TNFα — 73.9%  
Treg expansion No Rapa, +TNFα — 70.3%  
Treg expansion +Rapa, TNFR2 Agonist — 74.4%

FIG. 8E   Tresp : Treg = 1 : 1

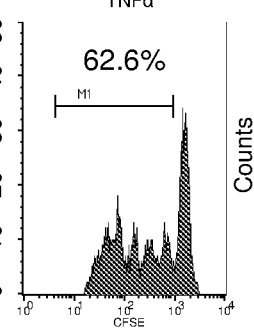 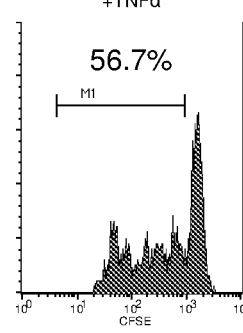 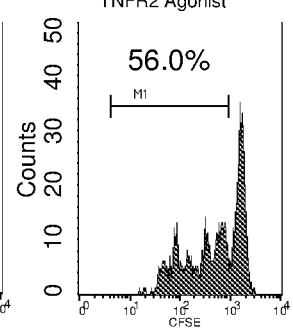

Treg expansion No Rapa, No TNFα — 62.6%  
Treg expansion No Rapa, +TNFα — 56.7%  
Treg expansion +Rapa, TNFR2 Agonist — 56.0%

CPT1A

CPT1B

AMPK (PRKAA1)

FIG. 13A

| Peptide | Position | Sequence | Agonist Affinity | Reading |
|---|---|---|---|---|
| TNFR2 | hTNFR2 (23-207) | 20kD | 4+ | 1.2 |
| S04062 | hTNFR2 (1-20) | LPAQVAFTPYAPEPGSTCRL | - | 0 |
| S03931 | hTNFR2 (9-28) | PYAPEPGSTCRLREYYDQTA | - | 0 |
| S04063 | hTNFR2 (17-36) | TCRLREYYDQTAQMCCSKCS | - | 0 |
| S03933 | hTNFR2 (26-45) | QTAQMCCSKCSPGQHAKVFC | 1+ | 0 |
| S04064 | hTNFR2 (34-53) | KCSPGQHAKVFCTKTSDTVC | - | 0 |
| S04065 | hTNFR2 (42-61) | KVFCTKTSDTVCDSCEDSTY | - | 0 |
| S04066 | hTNFR2 (50-69) | DTVCDSCEDSTYTQLWNWVP | - | 0 |
| S04067 | hTNFR2 (58-77) | DSTYTQLWNWVPECLSCGSR | - | 0 |
| S04068 | hTNFR2 (66-85) | NWVPECLSCGSRCSSDQVET | - | 0 |

FIG. 13B

| | Peptide | Position | Sequence | Agonist Affinity | Reading |
|---|---|---|---|---|---|
| CRD2 | S04069 | hTNFR2 (74-93) | CGSRCSSDQVETQACTREQN | - | 0 |
| | S04070 | hTNFR2 (82-101) | QVETQACTREQNRICTCRPG | - | 0 |
| | S04071 | hTNFR2 (90-109) | REQNRICTCRPGWYCALSKQ | 2+ | 0 |
| | S04072 | hTNFR2 (98-117) | CRPGWYCALSKQEGCRLCAP | 1+ | 0 |
| | S04073 | hTNFR2 (106-125) | LSKQEGCRLCAPLRKCRPGF | 2+- | 0 |
| | S03935 | hTNFR2 (108-127) | KQEGCRLCAPLRKCRPGFGV | 2+- | 0 |
| | S04074 | hTNFR2 (114-133) | LCAPLRKCRPGFGVARPGTE | - | 0 |
| | S04075 | hTNFR2 (122-141) | RPGFGVARPGTETSDVVCKP | - | 0 |
| | S04076 | hTNFR2 (130-149) | PGTETSDVVCKPCAPGTFSN | - | 0 |
| | S04077 | hTNFR2 (138-157) | VCKPCAPGTFSNTTSSTDIC | - | 0 |
| | S04078 | hTNFR2 (146-165) | TFSNTTSSTDICRPHQICNV | - | 0 |
| | S04079 | hTNFR2 (154-174) | TDICRPHQICNVVAIPGNAS | - | 0 |
| | S04080 | hTNFR2 (162-181) | ICNVVAIPGNASMDAVCTST | - | 0 |

FIG. 15

| Position | Sequence | TNFR2 Agonist | | TNFR2 Agonist + TNFα | |
|---|---|---|---|---|---|
| | | Affinity | Reading | Affinity | Reading |
| hTNFR2 (23-207) | 20kD | 4+ | 1.2 | 4+ | 1.2 |
| hTNFR2 (1-20) | LPAQVAFTPYAPEPGSTCRL | - | 0 | - | 0 |
| hTNFR2 (9-28) | PYAPEPGSTCRLREYYDQTA | - | 0 | - | 0 |
| hTNFR2 (17-36) | TCRLREYYDQTAQMCCSKCS | - | 0 | - | 0 |
| hTNFR2(26-45) | QTAQMCCSKCSPGQHAKVFC | 1+ | 0.1 | - | 0 |
| hTNFR2(34-53) | KCSPGQHAKVFCTKTSDTVC | 1+ | 0 | - | 0 |
| hTNFR2 (42-61) | KVFCTKTSDTVCDSCEDSTY | - | 0 | - | 0 |
| hTNFR2 (50-69) | DTVCDSCEDSTYTQLWNWVP | - | 0 | - | 0 |
| hTNFR2 (58-77) | DSTYTQLWNWVPECLSCGSR | - | 0 | - | 0 |
| hTNFR2 (66-85) | NWVPECLSCGSRCSSDQVET | - | 2 | - | 0 |
| hTNFR2 (74-93) | CGSRCSSDQVETQACTREQN | - | 2 | - | 0 |
| hTNFR2 (82-101) | QVETQACTREQNRICTCRPG | - | 2 | - | 0 |
| hTNFR2 (90-109) | REQNRICTCRPGWYCALSKQ | 2+ | 2 | - | 0 |
| hTNFR2(98-117) | CRPGWYCALSKQEGCRLCAP | 1+ | 2 | - | 0 |
| hTNFR2(106-125) | LSKQEGCRLCAPLRKCRPGF | - | 2 | - | 0 |
| hTNFR2 (108-127) | KQEGCRLCAPLRKCRPGFGV | - | 0 | - | 0 |
| hTNFR2(114-133) | LCAPLRKCRPGFGVARPGTE | - | 0 | - | 0 |
| hTNFR2 (122-141) | RPGFGVARPGTETSDVVCKP | - | 0 | - | 0 |
| hTNFR2 (130-149) | PGTETSDVVCKPCAPGTFSN | - | 0 | - | 0 |
| hTNFR2 (138-157) | VCKPCAPGTFSNTTSSTDIC | - | 0 | - | 0 |
| hTNFR2 (146-165) | TFSNTTSSTDICRPHQICNV | - | 0 | - | 0 |
| hTNFR2 (154-174) | TDICRPHQICNVVAIPGNAS | - | 0 | - | 0 |
| hTNFR2 (162-181) | ICNVVAIPGNASMDAVCTST | - | 0 | - | 0 |
| hTNFR2 (170-189) | GNASMDAVCTSTSPTRSMAP | - | 0 | - | 0 |

AGONISTIC TUMOR NECROSIS FACTOR RECEPTOR SUPERFAMILY POLYPEPTIDES

SEQUENCE LISTING

This application contains a Sequence Listing which has been submitted electronically in ASCII format and is hereby incorporated by reference in its entirety. Said ASCII copy, created on Nov. 15, 2019, is named 00786-582WO2_Sequence_Listing_11.15.19_ST25 and is 28,722 bytes in size.

BACKGROUND OF THE INVENTION

Maintaining control of the cell-mediated and humoral immune responses is an important facet of healthy immune system activity. The aberrant regulation of T cell and B cell driven immune reactions has been associated with a wide array of human diseases, as the inappropriate mounting of an immune response against various self and foreign antigens plays a causal role in such pathologies as autoimmune disorders, asthma, allergic reactions, graft-versus-host disease, transplantation graft rejection, and a variety of other immunological disorders. These diseases are mediated by T and B lymphocytes that exhibit reactivity against self antigens and those derived from non-threatening sources, such as allergens or transplantation allografts. Regulatory T cells (Treg cells) have evolved in order to inhibit the activity of immune cells that are cross-reactive with "self" major histocompatability complex (MHC) proteins and other benign antigens. Treg cells represent a heterogeneous class of T cells that can be distinguished based on their unique surface protein presentation. The most well-understood populations of Treg cells include CD4+, CD25+, FoxP3+ Treg cells and CD17+ Treg cells. The precise mechanisms by which these cells mediate suppression of autoreactive T cells is the subject of ongoing investigations, though it has been shown that certain classes of Treg cells inhibit production of the proliferation-inducing cytokine IL-2 in target T cells and may additionally sequester IL-2 from autoreactive cells by virtue of the affinity of CD25 (a subdomain of the IL-2 receptor) for IL-2 (Josefowicz et al., Ann. Rev. Immun., 30:531-564 (2012)). Moreover, it has been shown that CD4+, CD25+, FoxP3+ Treg cells are also present in B cell-rich areas and are capable of directly suppressing immunoglobulin production independent of their ability to attenuate $T_H2$-cell activity (Lim et al., J. Immunol., 175:4180-4183 (2005)).

There is currently a need for improved therapies that can augment Treg cell survival and proliferation for use in treatments targeting such diseases as autoimmune disorders, graft-versus-host disease, allograft rejection, allergic reactions, asthma, and inflammation, among others.

SUMMARY OF THE INVENTION

Described herein are agonistic tumor necrosis factor receptor superfamily polypeptides, such as single-chain polypeptides, antibodies, antigen-binding fragments thereof, and constructs thereof. For instance, featured are agonistic tumor necrosis factor receptor 2 (TNFR2)-binding polypeptides, such as single-chain polypeptides, antibodies, antigen-binding fragments thereof, and constructs thereof. Human TNFR2 contains four cysteine-rich domains (CRDs): CRD1 (amino acid residues 48-76 of SEQ ID NO: 1), CRD2 (amino acid residues 78-120 of SEQ ID NO: 1), CRD3 (amino acid residues 121-162 of SEQ ID NO: 1), and CRD4 (amino acid residues 162-202 of SEQ ID NO: 1). Agonistic TNFR2 polypeptides described herein include those that bind one or more epitopes within CRD1, CRD2, and/or CRD3 of TNFR2, such as those that bind one or more epitopes of TNFR2 exclusively within CRD1 and/or CRD2, for example, without binding TNFR2 within CRD4.

The agonistic TNFR2 polypeptides described herein include human IgG1, IgG2, IgG3, and IgG4 isotype antibodies and antigen-binding fragments thereof that specifically bind TNFR2 at one or more of the epitopes detailed above. In some embodiments, the TNFR2 polypeptides of the disclosure contain a mutant human IgG1 or IgG2 heavy chain constant 1 (CH1) domain that lacks a cysteine residue at position 127 of the CH1 domain amino acid sequence, such as TNFR2 polypeptides (e.g., antibodies or antigen-binding fragments thereof) containing a mutant human IgG1 or IgG2 CH1 domain having a C127S mutation (according to Kabat numbering). The present disclosure in based, in part, on the surprising discovery that antibodies and antigen-binding fragments thereof exhibit markedly superior TNFR2 agonist properties when these molecules are in the form of an IgG2-B isotype relative to other antibody isotypes.

The agonistic TNFR2 polypeptides described herein also include those that bind TNFR2 at at least two sites (e.g., the polypeptides have two or more antigen-binding sites, in which TNFR2 is the "antigen"). These binding sites may be spatially separated from one another by fewer than about 133 Å. Advantageously, agonistic TNFR2 polypeptides having antigen-binding sites separated by fewer than 133 Å activate TNFR2 signal transduction with a greater potency than polypeptides that specifically bind TNFR2 at one or more of the epitopes described above, but that contain TNFR2-binding sites separated from one another by greater than about 133 Å. For example, agonistic TNFR2 polypeptides of the disclosure include IgG1 antibodies and antigen-binding fragments thereof that contain TNFR2-binding sites separated from one another by about 117 Å and IgG3 antibodies and antigen-binding fragments thereof that contain TNFR2-binding sites separated from one another by about 125 Å.

Also featured are agonistic TNFR2 polypeptides that adopt a single disulfide-bonded isoform and pharmaceutical compositions containing the same. For example, pharmaceutical compositions of the disclosure include those containing an agonist TNFR2-binding polypeptide in which, e.g., 10%, 20%, 30%, 40%, 50%, 60%, 70%, 80%, 90%, 95%, 96%, 97%, 98%, 99%, 99.9%, 99.99%, or more, of the polypeptide in the pharmaceutical composition is present in a single disulfide-bonded isoform. Agonistic TNFR2-binding polypeptides that adopt a human IgG2-B isoform exhibit substantially superior TNFR2 agonist effects relative to TNFR2-binding polypeptides that adopt other human IgG2 isoforms, such as the IgG2-A, IgG2-A/$B_1$, and IgG2-A/$B_2$. Thus, TNFR2 polypeptides that adopt a single disulfide-bonded isoform can be prepared as pharmaceutical compositions and administered in methods of treatment described herein to promote robust TNFR2 agonistic effects.

Agonistic TNFR2 polypeptides of the present disclosure exhibit one or more beneficial biological properties, such as the ability to promote the proliferation and stabilization of regulatory T cells (Treg cells) and/or myeloid-derived suppressor cells (MDSCs). Additionally, or alternatively, agonistic TNFR2 polypeptides can be administered to promote the reciprocal contraction of, and/or to directly kill, T effector cells, such as cytotoxic CD8+ T cells. This may occur, for instance, by the indirect expansion of Treg cell proliferation and activity or by the direct killing of T effector cells. Therefore, the designation of TNFR2 polypeptides as agonists refers to their capacity to promote the proliferation and activity of Treg cells and/or MDSCs, and, for clarity, does indicate activation of an undesirable T effector cell response. The polypeptides (e.g., single-chain polypeptides, antibodies, antigen-binding fragments thereof, and constructs thereof) described herein can be used for the treatment of a variety of pathologies, including autoimmune diseases, inflammatory diseases, and others, as well as to promote the proliferation, healing, protection, and/or regeneration of tissues that express TNFR2, such as neurons and brain-associated tissues, rendering the polypeptides of the disclosure useful, for example, for the treatment of such neurological diseases as Parkinson's disease, multiple sclerosis, Alzheimer's disease, and other neurodegenerative disorders.

In a first aspect, the invention features polypeptides, such as single-chain polypeptides, antibodies, antigen-binding fragments thereof, and constructs thereof, that specifically bind human TNFR2 at an epitope defined by one or more amino acids within cysteine-rich domain (CRD) 1 (CRD1), CRD2, and/or CRD3 and that do not specifically bind human TNFR2 at an epitope defined by one or more amino acids within CRD4. In some embodiments, the polypeptide:
  (a) contains a human IgG1 or IgG2 CH1 domain having a deletion or substitution at cysteine residue 127;
  (b) contains antigen-binding sites separated from one another by a distance of fewer than about 133 Å;
  (c) contains a complementarity determining region-heavy chain 1 (CDR-H1) having the amino acid sequence of:
    (i) GZ$^1$TFZ$^3$Z$^2$YZ$^3$Z$^4$ (SEQ ID NO: 2);
    (ii) GYTFTDYNI (SEQ ID NO: 3) or an amino acid sequence having up to two conservative amino acid substitutions relative to the sequence; or
    (iii) GYTFTDYNL (SEQ ID NO: 4) or an amino acid sequence having up to two conservative amino acid substitutions relative to the sequence;
    wherein each $Z^1$ is independently a naturally occurring amino acid including a side-chain including an aromatic substituent;
    each $Z^2$ is independently a naturally occurring amino acid including an anionic side-chain at physiological pH;
    each $Z^3$ is independently a naturally occurring amino acid including a polar, uncharged side-chain at physiological pH; and
    each $Z^4$ is independently leucine or isoleucine; and/or
  (d) contains a framework region having the amino acid sequence of TJDJSJJJX$^1$YX$^2$X$^3$LJX$^4$LJS (SEQ ID NO: 5) or an amino acid sequence having 10 or more of the residues of SEQ ID NO: 5, wherein each J is independently a naturally occurring amino acid; each $X^1$ is independently A, V, or F; each $X^2$ is independently M or I; each $X^3$ is independently E or Q; and each $X^4$ is independently S or R.

In some embodiments, the polypeptides, such as single-chain polypeptides, antibodies, antigen-binding fragments thereof, and constructs thereof, contain a human IgG1 or IgG2 CH1 domain that lacks a cysteine residue at position 127 of the amino acid sequence of the IgG1 or IgG2 CH1 domain (according to the Kabat numbering scheme). For example, the polypeptide (e.g., a single-chain polypeptide, antibody, antigen-binding fragment thereof, or construct thereof) may contain a human IgG1 or IgG2 CH1 domain having an amino acid other than cysteine, such as a serine residue, at position 127 of the amino acid sequence of the CH1 domain.

In some embodiments, the IgG1 CH1 domain has an amino acid sequence that is at least 85% identical (e.g., at least 85%, 86%, 87%, 88%, 89%, 90%, 91%, 92%, 93%, 94%, or 95% identical, or morel to the amino acid sequence of:

```
                                        (SEQ ID NO: 6)
ASTKGPSVFPLAPCSKSTSGGTAALGCLVKDYFPEPVTVSWNSGAL

TSGVHTFPAVLQSSGLYSLSSVVTVPSSSLGTQTYICNVNHKPSNT

KVDKKV,
``` e.g., provided that the IgG1 CH1 domain contains a serine residue at position 127 of the IgG1 CH1 domain amino acid sequence (according to Kabat numbering, as described herein). The IgG1 CH1 domain may have, for example, an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 6, e.g., provided that the IgG1 CH1 domain contains a serine residue at position 127 of the IgG1 CH1 domain amino acid sequence. In some embodiments, the IgG1 CH1 domain has an amino acid sequence that is at least 95% identical to the amino acid sequence of SEQ ID NO: 6, e.g., provided that the IgG1 CH1 domain contains a serine residue at position 127 of the IgG1 CH1 domain amino acid sequence. In some embodiments, the IgG1 CH1 domain has the amino acid sequence of SEQ ID NO: 6. In some embodiments, the IgG1 CH1 domain has an amino acid sequence differing from SEQ ID NO: 6 only by way of a C127S substitution (according to Kabat numbering, as described herein). In these embodiments, the IgG1 CH1 domain has the amino acid sequence of:

```
                                        (SEQ ID NO: 7)
ASTKGPSVFPLAPSSKSTSGGTAALGCLVKDYFPEPVTVSWNSGAL

TSGVHTFPAVLQSSGLYSLSSVVTVPSSSLGTQTYICNVNHKPSNT

KVDKKV.
```

In some embodiments, the IgG2 CH1 domain has an amino acid sequence that is at least 85% identical (e.g., at least 85%, 86%, 87%, 88%, 89%, 90%, 91%, 92%, 93%, 94%, 95%, 96%, 97%, 98%, 99%, or 100% identical) to the amino acid sequence of:

```
                                        (SEQ ID NO: 8)
ASTKGPSVFPLAPCSRSTSESTAALGCLVKDYFPEPVTVSWNSGAL

TSGVHTFPAVLQSSGLYSLSSVVTVPSSNFGTQTYTCNVDHKPSNT

KVDKTV,
``` e.g., provided that the IgG2 CH1 domain contains a serine residue at position 127 of the IgG2 CH1 domain amino acid sequence (according to Kabat numbering, as described herein). The IgG2 CH1 domain may have, for example, an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 8, e.g., provided that the IgG2 CH1 domain contains a serine residue at position 127 of the IgG2 CH1 domain amino acid sequence. In some embodiments, the IgG2 CH1 domain has an amino acid sequence that is at least 95% identical to the amino acid sequence of SEQ ID NO: 8, e.g., provided that the IgG2 CH1 domain contains a serine residue at position 127 of the IgG2 CH1 domain amino acid sequence. In some embodiments, the IgG2 CH1 domain has the amino acid sequence of SEQ ID NO: 8. In some embodiments, the IgG2 CH1 domain has an amino acid sequence differing from SEQ ID NO: 8 only by way of a C127S substitution (according to Kabat numbering, as described herein). In these embodiments, the IgG2 CH1 domain has the amino acid sequence of:

```
                                              (SEQ ID NO: 9)
ASTKGPSVFPLAPSSRSTSESTAALGCLVKDYFPEPVTVSWNSGAL

TSGVHTFPAVLQSSGLYSLSSVVTVPSSNFGTQTYTCNVDHKPSNT

KVDKTV.
```

In some embodiments, the polypeptide (e.g., a single-chain polypeptide, antibody, antigen-binding fragment thereof, or construct thereof) has an IgG3 or IgG4 isotype.

The polypeptide (e.g., a single-chain polypeptide, antibody, antigen-binding fragment thereof, or construct thereof) may contain antigen-binding sites (e.g., two or more antigen-binding sites, such as from two to ten, two to nine, two to eight, two to seven, two to six, two to five, two, or three antigen-binding sites) that are separated from one another by a distance of fewer than about 133 Å (e.g., by a distance of from about 90 Å to about 132 Å, such as a distance of about 90 Å, 91 Å, 92 Å, 93 Å, 94 Å, 95 Å, 96 Å, 97 Å, 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, 127 Å, 128 Å, 129 Å, 130 Å, 131 Å, or 132 Å. In some embodiments, the antigen-binding sites are separated from one another by a distance of from about 95 Å to about 130 Å, such as a distance of about 95 Å, 96 Å, 97 Å, 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, 127 Å, 128 Å, 129 Å, or 130 Å. In some embodiments, the antigen-binding sites are separated from one another by a distance of from about 98 Å to about 128 Å, such as a distance of about 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, 127 Å, or 128 Å.

For example, the polypeptide (e.g., a single-chain polypeptide, antibody, antigen-binding fragment thereof, or construct thereof) may contain antigen-binding sites that are separated from one another by a distance of from about 105 Å to about 127 Å, such as by a distance of about 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, or 127 Å. In some embodiments, the antigen-binding sites are separated from one another by a distance of from about 110 Å to about 122 Å, such as by a distance of about 110 Å, 111 Å, 112 Å, 113 Å, 114 Å, 115 Å, 116 Å, 117 Å, 118 Å, 119 Å, 120 Å, 121 Å, or 122 Å. In some embodiments, the antigen-binding sites are separated from one another by a distance of from about 115 Å to about 119 Å, such as by a distance of about 115 Å, 116 Å, 117 Å, 118 Å, or 119 Å. In some embodiments, the antigen-binding sites are separated from one another by a distance of about 117 Å. In some embodiments, the polypeptide (e.g., a single-chain polypeptide, antibody, antigen-binding fragment thereof, or construct thereof) has an antigen-binding arm separation as described above, and has an IgG1 isotype.

In some embodiments, the polypeptide (e.g., a single-chain polypeptide, antibody, antigen-binding fragment thereof, or construct thereof) contains antigen-binding sites that are separated from one another by a distance of from about 115 Å to about 132 Å, such as by a distance of about 115 Å, 116 Å, 117 Å, 118 Å, 119 Å, 120 Å, 121 Å, 122 Å, 123 Å, 124 Å, 125 Å, 126 Å, 127 Å, 128 Å, 129 Å, 130 Å, 131 Å, or 132 Å. In some embodiments, the antigen-binding sites are separated from one another by a distance of from about 120 Å to about 129 Å, such as by a distance of about 120 Å, 121 Å, 122 Å, 123 Å, 124 Å, 125 Å, 126 Å, 127 Å, 128 Å, or 129 Å. In some embodiments, the antigen-binding sites are separated from one another by a distance of from about 123 Å to about 127 Å, such as by a distance of about 123 Å, 124 Å, 125 Å, 126 Å, or 127 Å. In some embodiments, the antigen-binding sites are separated from one another by a distance of about 125 Å. In some embodiments, the polypeptide (e.g., a single-chain polypeptide, antibody, antigen-binding fragment thereof, or construct thereof) has an antigen-binding arm separation as described above, and has an IgG3 isotype.

In some embodiments, the polypeptide (e.g., a single-chain polypeptide, antibody, antigen-binding fragment thereof, or construct thereof) contains a CDR-H1 having the amino acid sequence of:
(a) GZ$^1$TFZ$^3$Z$^2$YZ$^3$Z$^4$ (SEQ ID NO: 2);
(b) GYTFTDYNI (SEQ ID NO: 3) or an amino acid sequence having up to two conservative amino acid substitutions relative to the sequence; or
(c) GYTFTDYNL (SEQ ID NO: 4) or an amino acid sequence having up to two conservative amino acid substitutions relative to the sequence;
wherein each $Z^1$ is independently a naturally occurring amino acid including a side-chain including an aromatic substituent;
each $Z^2$ is independently a naturally occurring amino acid including an anionic side-chain at physiological pH;
each $Z^3$ is independently a naturally occurring amino acid including a polar, uncharged side-chain at physiological pH; and
each $Z^4$ is independently leucine or isoleucine.

In some embodiments, the polypeptide (e.g., a single-chain polypeptide, antibody, antigen-binding fragment thereof, or construct thereof) specifically binds human TNFR2 at an epitope defined by one or more amino acids within CRD1, such as at an epitope defined by one or more of amino acid residues 56-60 (KCSPG) within SEQ ID NO: 1. In some embodiments, the polypeptide specifically binds human TNFR2 at an epitope defined by one or more amino acids within CRD2. In some embodiments, the polypeptide thereof specifically binds human TNFR2 at an epitope defined by one or more amino acids within CRD3.

In some embodiments, the polypeptide (e.g., a single-chain polypeptide, antibody, antigen-binding fragment thereof, or construct thereof) further contains one or more, or all, of the following CDRs:
(a) a CDR-H2 having the amino acid sequence INPNY-DST (SEQ ID NO: 10) or an amino acid sequence having up to two conservative amino acid substitutions relative to the sequence;

(b) a CDR-H3 having the amino acid sequence CARGN-SWYFDV (SEQ ID NO: 11) or an amino acid sequence having up to two conservative amino acid substitutions relative to the sequence;

(c) a CDR-L1 having the amino acid sequence SSVRY (SEQ ID NO: 12) or an amino acid sequence having up to two conservative amino acid substitutions relative to the sequence;

(d) a CDR-L2 having the amino acid sequence LTS or an amino acid sequence having up to two conservative amino acid substitutions relative to the sequence; and (e) a CDR-L3 having the amino acid sequence CQQWSSNPLT (SEQ ID NO: 13) or an amino acid sequence having up to two conservative amino acid substitutions relative to the sequence.

In some embodiments, the polypeptide (e.g., a single-chain polypeptide, antibody, antigen-binding fragment thereof, or construct thereof) contains one or more, or all, of the following CDRs:

```
(a) a CDR-H2 having the amino acid sequence
                                    (SEQ ID NO: 10)
INPNYDST;

(b) a CDR-H3 having the amino acid sequence
                                    (SEQ ID NO: 11)
CARGNSWYFDV;

(c) a CDR-L1 having the amino acid sequence
                                    (SEQ ID NO: 12)
SSVRY;

(d) a CDR-L2 having the amino acid sequence
LTS;
and (e) a CDR-L3 having the amino acid sequence
                                    (SEQ ID NO: 13)
CQQWSSNPLT.

In some embodiments, the CDR-H1 has the amino
acid sequence
                                    (SEQ ID NO: 3)
GYTFTDYNI
``` or an amino acid sequence having up to two conservative amino acid substitutions relative to the sequence.

In some embodiments, the polypeptide contains the following CDRs:

```
(a) a CDR-H1 having the amino acid sequence
                                    (SEQ ID NO: 3)
GYTFTDYNI;

(b) a CDR-H2 having the amino acid sequence
                                    (SEQ ID NO: 10)
INPNYDST;

(c) a CDR-H3 having the amino acid sequence
                                    (SEQ ID NO: 11)
CARGNSWYFDV;

(d) a CDR-L1 having the amino acid sequence
                                    (SEQ ID NO: 12)
SSVRY;

(e) a CDR-L2 having the amino acid sequence
LTS;
and (f) a CDR-L3 having the amino acid sequence
                                    (SEQ ID NO: 13)
CQQWSSNPLT.
```

In some embodiments, the polypeptide (e.g., a single-chain polypeptide, antibody, antigen-binding fragment thereof, or construct thereof) contains a heavy chain variable domain ($V_H$) having an amino acid sequence that is at least 85% identical (e.g., at least 85%, 86%, 87%, 88%, 89%, 90%, 91%, 92%, 93%, 94%, 95%, 96%, 97%, 98%, 99%, or 100% identical) to the amino acid sequence of SEQ ID NO: 14. In some embodiments, the polypeptide contains a heavy chain variable domain ($V_H$) having an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 14. In some embodiments, the polypeptide contains a heavy chain variable domain ($V_H$) having an amino acid sequence that is at least 95% identical (e.g., at least 95%, 96%, 97%, 98%, 99%, or 100% identical) to the amino acid sequence of SEQ ID NO: 14. In some embodiments, the polypeptide contains a heavy chain variable domain ($V_H$) having the amino acid sequence of SEQ ID NO: 14.

In some embodiments, the CDR-H1 has the amino acid sequence GYTFTDYNL (SEQ ID NO: 4) or an amino acid sequence having up to two conservative amino acid substitutions relative to the sequence.

In some embodiments, the polypeptide contains the following CDRs:

```
(a) a CDR-H1 having the amino acid sequence
                                    (SEQ ID NO: 4)
GYTFTDYNL;

(b) a CDR-H2 having the amino acid sequence
                                    (SEQ ID NO: 10)
INPNYDST;

(c) a CDR-H3 having the amino acid sequence
                                    (SEQ ID NO: 11)
CARGNSWYFDV;

(d) a CDR-L1 having the amino acid sequence
                                    (SEQ ID NO: 12)
SSVRY;

(e) a CDR-L2 having the amino acid sequence
LTS;
and (f) a CDR-L3 having the amino acid sequence
                                    (SEQ ID NO: 13)
CQQWSSNPLT.
```

In some embodiments, the polypeptide (e.g., a single-chain polypeptide, antibody, antigen-binding fragment thereof, or construct thereof) contains a heavy chain variable domain ($V_H$) having an amino acid sequence that is at least 85% identical (e.g., at least 85%, 86%, 87%, 88%, 89%, 90%, 91%, 92%, 93%, 94%, 95%, 96%, 97%, 98%, 99%, or 100% identical) to the amino acid sequence of SEQ ID NO: 15. In some embodiments, the polypeptide contains a heavy chain variable domain ($V_H$) having an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 15. In some embodiments, the polypeptide contains a heavy chain variable domain ($V_H$) having an amino acid sequence that is at least 95% identical (e.g., at least 95%, 96%, 97%, 98%, 99%, or 100% identical) to the amino acid sequence of SEQ ID NO: 15. In some embodiments, the polypeptide contains a heavy chain variable domain ($V_H$) having the amino acid sequence of SEQ ID NO: 15.

In some embodiments, the polypeptide (e.g., a single-chain polypeptide, antibody, antigen-binding fragment thereof, or construct thereof) contains a non-native constant region, such as a human constant region. In some embodiments, the polypeptide lacks all or a portion of an Fc domain, lacks all or a portion of a native Fc domain, or lacks an Fc domain altogether.

In some embodiments, the polypeptide (e.g., a single-chain polypeptide, antibody, antigen-binding fragment thereof, or construct thereof) contains a framework region having the amino acid sequence of TJDJSJJJX$^1$YX$^2$X$^3$LJX$^4$LJS (SEQ ID NO: 5) or an amino acid sequence having 10 or more of the residues of SEQ ID NO: 5, wherein each J is independently a naturally occurring amino acid; each X$^1$ is independently A, V, or F; each X$^2$ is independently M or I; each X$^3$ is independently E or Q; and each X$^4$ is independently S or R. For example, the polypeptide may contain a framework region having an amino acid sequence selected from:

(a) TVDKSSSTAYMELRSLTS (SEQ ID NO: 16) or an amino acid sequence having up to two conservative amino acid substitutions relative to the sequence;
(b) TADTSSNTAYIQLSSLTS (SEQ ID NO: 17) or an amino acid sequence having up to two conservative amino acid substitutions relative to the sequence;
(c) TADTSTDTAYMELSSLRS (SEQ ID NO: 18) or an amino acid sequence having up to two conservative amino acid substitutions relative to the sequence;
(d) TRDTSISTAYMELSRLTS (SEQ ID NO: 19) or an amino acid sequence having up to two conservative amino acid substitutions relative to the sequence;
(e) TFYMELSSLRS (SEQ ID NO: 20) or an amino acid sequence having up to two conservative amino acid substitutions relative to the sequence;
(f) TRDTSISTAYMELNRLTS (SEQ ID NO: 21) or an amino acid sequence having up to two conservative amino acid substitutions relative to the sequence;
(g) TRDTSTNTVYMELTSLRS (SEQ ID NO: 22) or an amino acid sequence having up to two conservative amino acid substitutions relative to the sequence; and
(h) TADTSTDRAYMELSSLRS (SEQ ID NO: 23) or an amino acid sequence having up to two conservative amino acid substitutions relative to the sequence.

In some embodiments, the framework region is positioned adjacent to a CDR-H2 within the polypeptide (e.g., a single-chain polypeptide, antibody, antigen-binding fragment thereof, or construct thereof). In some embodiments, the framework region is positioned adjacent to a CDR-H3 within the polypeptide. In some embodiments, the framework region is positioned between the CDR-H2 and CDR-H3.

In some embodiments, the polypeptide (e.g., a single-chain polypeptide, antibody, antigen-binding fragment thereof, or construct thereof) specifically binds an epitope of TNFR2 corresponding to one or more amino acids residues of:

(a) amino acids 56-60 of SEQ ID NO: 1 (KCSPG);

(b) amino acids 101-107 of SEQ ID NO: 1 (CSSDQVET);

(c) amino acids 115-142 of SEQ ID NO: 1 (NRICTCRPGWYCALSKQEGCRLCAPLRK);

(d) amino acids 26-45 of SEQ ID NO: 1 (QTAQMCCSKCSPGQHAKVFC);

-continued (e) amino acids 90-109 of SEQ ID NO: 1 (REQNRICTCRPGWYCALSKQ);

(f) amino acids 98-117 of SEQ ID NO: 1 (CRPGWYCALSKQEGCRLCAP);

(g) amino acids 106-125 of SEQ ID NO: 1 (LSKQEGCRLCAPLRKCRPGF);
and/or (h) amino acids 108-127 of SEQ ID NO: 1 (KQEGCRLCAPLRKCRPGFGV).

In some embodiments, the polypeptide (e.g., a single-chain polypeptide, antibody, antigen-binding fragment thereof, or construct thereof) specifically binds TNFR2 (e.g., human TNFR2) with a $K_D$ of no greater than about 10 nM, such as a $K_D$ of no greater than about 1 nM. For example, the polypeptide (e.g., a single-chain polypeptide, antibody, antigen-binding fragment thereof, or construct thereof) may specifically bind TNFR2 with a $K_D$ of from about 1 pM to about 10 nM, such as a $K_D$ of about 1 pM, 5 pM, 10 pM, 15 pM, 20 pM, 25 pM, 30 pM, 35 pM, 40 pM, 45 pM, 50 pM, 55 pM, 60 pM, 65 pM, 70 pM, 75 pM, 80 pM, 85 pM, 90 pM, 95 pM, 100 pM, 105 pM, 110 pM, 115 pM, 120 pM, 125 pM, 130 pM, 135 pM, 140 pM, 145 pM, 150 pM, 155 pM, 160 pM, 165 pM, 170 pM, 175 pM, 180 pM, 185 pM, 190 pM, 195 pM, 200 pM, 205 pM, 210 pM, 215 pM, 220 pM, 225 pM, 230 pM, 235 pM, 240 pM, 245 pM, 250 pM, 255 pM, 260 pM, 265 pM, 270 pM, 275 pM, 280 pM, 285 pM, 290 pM, 295 pM, 300 pM, 305 pM, 310 pM, 315 pM, 320 pM, 325 pM, 330 pM, 335 pM, 340 pM, 345 pM, 350 pM, 355 pM, 360 pM, 365 pM, 370 pM, 375 pM, 380 pM, 385 pM, 390 pM, 395 pM, 400 pM, 405 pM, 410 pM, 415 pM, 420 pM, 425 pM, 430 pM, 435 pM, 440 pM, 445 pM, 450 pM, 455 pM, 460 pM, 465 pM, 470 pM, 475 pM, 480 pM, 485 pM, 490 pM, 495 pM, 500 pM, 505 pM, 510 pM, 515 pM, 520 pM, 525 pM, 530 pM, 535 pM, 540 pM, 545 pM, 550 pM, 555 pM, 560 pM, 565 pM, 570 pM, 575 pM, 580 pM, 585 pM, 590 pM, 595 pM, 600 pM, 605 pM, 610 pM, 615 pM, 620 pM, 625 pM, 630 pM, 635 pM, 640 pM, 645 pM, 650 pM, 655 pM, 660 pM, 665 pM, 670 pM, 675 pM, 680 pM, 685 pM, 690 pM, 695 pM, 700 pM, 705 pM, 710 pM, 715 pM, 720 pM, 725 pM, 730 pM, 735 pM, 740 pM, 745 pM, 750 pM, 755 pM, 760 pM, 765 pM, 770 pM, 775 pM, 780 pM, 785 pM, 790 pM, 795 pM, 800 pM, 805 pM, 810 pM, 815 pM, 820 pM, 825 pM, 830 pM, 835 pM, 840 pM, 845 pM, 850 pM, 855 pM, 860 pM, 865 pM, 870 pM, 875 pM, 880 pM, 885 pM, 890 pM, 895 pM, 900 pM, 905 pM, 910 pM, 915 pM, 920 pM, 925 pM, 930 pM, 935 pM, 940 pM, 945 pM, 950 pM, 955 pM, 960 pM, 965 pM, 970 pM, 975 pM, 980 pM, 985 pM, 990 pM, 995 pM, 1 nM, 5 nM, or 10 nM, among other values.

The polypeptide (e.g., a single-chain polypeptide, antibody, antigen-binding fragment thereof, or construct thereof) may specifically bind TNFR2 to form an antibody-antigen complex with a $k_{on}$ of at least about $10^4$ $M^{-1}s^{-1}$ or $10^5$ $M^{-1}s^{-1}$, such as a $k_{on}$ of from about $1\times10^4$ $M^{-1}s^{-1}$ to about $1\times10^8$ $M^{-1}s^{-1}$. For example, the polypeptide (e.g., a single-chain polypeptide, antibody, antigen-binding fragment thereof, or construct thereof) may specifically bind TNFR2 to form an antibody-antigen complex with a $k_{on}$ of about $1\times10^4$ $M^{-1}s^{-1}$, $2\times10^4$ $M^{-1}s^{-1}$, $3\times10^4$ $M^{-1}s^{-1}$, $4\times10^4$ $M^{-1}s^{-1}$, $5\times10^4$ $M^{-1}s^{-1}$, $6\times10^4$ $M^{-1}s^{-1}$, $7\times10^4$ $M^{-1}s^{-1}$, $8\times10^4$ $M^{-1}s^{-1}$, $9\times10^4$ $M^{-1}s^{-1}$, $1\times10^5$ $M^{-1}s^{-1}$, $2\times10^5$ $M^{-1}s^{-1}$, $3\times10^5$ $M^{-1}s^{-1}$, $4\times10^5$ $M^{-1}s^{-1}$, $5\times10^5$ $M^{-1}s^{-1}$, $6\times10^5$ $M^{-1}s^{-1}$, $7\times10^5$ $M^{-1}s^{-1}$, $8\times10^5$ $M^{-1}s^{-1}$, $9\times10^5$ $M^{-1}s^{-1}$, $1\times10^6$ $M^{-1}s^{-1}$, $2\times10^6$ $M^{-1}s^{-1}$, $3\times10^6$ $M^{-1}s^{-1}$, $4\times10^6$ $M^{-1}s^{-1}$, $5\times10^6$ $M^{-1}s^{-1}$, $6\times10^6 M^{-1}s^{-1}$, $7\times10^6 M^{-1}s^{-1}$, $8\times10^6 M^{-1}s^{-1}$, $9\times10^6 M^{-1}s^{-1}$, $1\times10^7 M^{-1}s^{-1}$, $2\times10^7 M^{-1}s^{-1}$, $3\times10^7 M^{-1}s^{-1}$, $4\times10^7 M^{-1}s^{-1}$, $5\times10^7 M^{-1}s^{-1}$, $6\times10^7 M^{-1}s^{-1}$, $7\times10^7 M^{-1}s^{-1}$, $8\times10^7 M^{-1}s^{-1}$, $9\times10^7 M^{-1}s^{-1}$, or $1\times10^8 M^{-1}s^{-1}$.

The polypeptide (e.g., a single-chain polypeptide, antibody, antigen-binding fragment thereof, or construct thereof) may specifically bind TNFR2 to form an antibody-antigen complex that dissociates with a $k_{off}$ of, for example, no greater than about $10^{-3}s^{-1}$ or $10^{-4}s^{-1}$, such as a $k_{off}$ of from about $10^{-6}s^{-1}$ to about $10^{-3}s^{-1}$ (e.g., a $k_{off}$ of about $1\times10^{-6}s^{-1}$, $2\times10^{-6}s^{-1}$, $3\times10^{-6}s^{-1}$, $4\times10^{-6}s^{-1}$, $5\times10^{-6}s^{-1}$, $6\times10^{-6}s^{-1}$, $7\times10^{-6}$ $s^{-1}$, $8\times10^{-6}s^{-1}$, $9\times10^{-6}s^{-1}$, $1\times10^{-5}s^{-1}$, $2\times10^{-5}s^{-1}$, $3\times10^{-5}s^{-1}$, $4\times10^{-5}s^{-1}$, $5\times10^{-5}s^{-1}$, $6\times10^{-5}s^{-1}$, $7\times10^{-5}$ $s^{-1}$, $8\times10^{-5}s^{-1}$, $9\times10^{-5}s^{-1}$, $1\times10^{-4}s^{-1}$, $2\times10^{-4}s^{-1}$, $3\times10^4$ $s^{-1}$, $4\times10^{-4}s^{-1}$, $5\times10^4$ $s^{-1}$, $6\times10^{-4}s^{-1}$, $7\times10^{-4}s^{-1}$, $8\times10^4$ $s^{-1}$, $9\times10^{-4}s^{-1}$, or $1\times10^{-3}s^{-1}$).

Polypeptides, such as single-chain polypeptides, antibodies, antigen-binding fragments thereof, and constructs thereof, described herein may stimulate TNFR2 signaling, e.g., in a cell that expresses TNFR2, such as a Treg cell (e.g., a Treg cell that expresses CD25h), myeloid-derived suppressor cell (MDSC), and/or a TNFR2+ tissue cell, such as a neuron or other cell of the central nervous system, thereby promoting healing, regeneration, proliferation, and/or protection of the cell. In some embodiments, the polypeptide increases expression of one or more genes selected from the group consisting of cIAP2, TRAF2, Etk, VEGFR2, PI3K, Akt, a protein involved in the angiogenic pathway, an IKK complex, RIP, NIK, MAP3K, a protein involved in the NFkB pathway, NIK, JNK, AP-1, a MEK (e.g., MEK1, MEK7), MKK3, NEMO, IL2R, Foxp3, IL2, TNF, lymphotoxin, lymphotoxin α, lymphotoxin β, TNFSF18, IL2RA, IKZF2/4, CTLA4, TGF-beta, CHUK, NFKBIE, NFKBIA, MAP3K11, TRAF3, relB, TNF, CXCR3, PDL1 (CD274), IL2RA, IL7R, MAP3K1, MAP, MAP3K4, NFKBIB, TANK, TBK1, TNFAIP3, NFKBIA, TNFRSF1B, TRAF2, relB, LTA, EP300, and CREBBP, as assessed, for example, by observing an increase in the expression of one or more of the above genes or by other methods known in the art for assessing gene activation. For instance, agonist TNFR2 single-chain polypeptides, antibodies, antigen-binding fragments thereof, and constructs thereof may promote the expression or post-translational modification (e.g., phosphorylation) of one or more proteins involved in Treg, MDSC, and/or TNFR2+ cell activation. The polypeptide may decrease the expression of, for example, IL4.

For example, the polypeptides of the disclosure may increase expression or post-translational modification (e.g., phosphorylation) of one or more proteins selected from the group consisting of cIAP2, TRAF2, Etk, VEGFR2, PI3K, Akt, a protein involved in the angiogenic pathway, an IKK complex, RIP, NIK, MAP3K, a protein involved in the NFkB pathway, NIK, JNK, AP-1, a MEK (e.g., MEK1, MEK7), MKK3, NEMO, IL2R, Foxp3, IL2, TNF, lymphotoxin, lymphotoxin α, lymphotoxin β, TNFSF18, IL2RA, IKZF2/4, CTLA4, TGF-beta, CHUK, NFKBIE, NFKBIA, MAP3K11, TRAF3, relB, TNF, CXCR3, PDL1 (CD274), IL2RA, IL7R, MAP3K1, MAP, MAP3K4, NFKBIB, TANK, TBK1, TNFAIP3, NFKBIA, TNFRSF1B, TRAF2, relB, LTA, EP300, and CREBBP, e.g., by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, or 100% relative to the expression or post-translational modification (e.g., phosphorylation) of one or more of these proteins isolated from a sample not treated with an agonistic TNFR2 single-chain polypeptide, antibody, antigen-binding fragment thereof, or construct thereof described herein. Exemplary assays that can be used to determine expression level and phosphorylation state are known in the art and include, e.g., Western blot assays to determine protein content and quantitative reverse transcription polymerase chain reaction (RT-PCR) experiments to determine mRNA content. In some embodiments, the TNFR2 polypeptides (e.g., single-chain polypeptides, antibodies, antigen-binding fragments thereof, and constructs thereof) are dominant TNFR2 agonists, and their agonistic activity may be further enhanced when used in combination with a natural TNFR2 ligand, such as TNFα, Bacillus Calmette-Guérin (BCG), and/or a growth-promoting agent, such as IL-2.

Agonist TNFR2 polypeptides, such as single-chain polypeptides, antibodies, antigen-binding fragments thereof, and constructs thereof, described herein may stimulate a metabolic shift from glycolysis to glutaminolysis and fatty acid oxidation among peripheral lymphocytes (e.g., human peripheral lymphocytes), which is evidence of an increase in proliferation of Treg cells.

Agonist TNFR2 polypeptides, such as single-chain polypeptides, antibodies, antigen-binding fragments thereof, and constructs thereof, described herein may induce an increase in itaconate production (e.g., by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 200%, 300%, 400%, 500%, 1,000%, or more, relative to cells (e.g., peripheral lymphocytes) not treated with the agonist TNFR2 polypeptide.

Agonist TNFR2 polypeptides (e.g., single-chain polypeptides, antibodies, antigen-binding fragments thereof, and constructs thereof) described herein may exhibit one or more, or all, of the following properties:

(a) promote the proliferation of, or increase the stability and maintenance of Treg cells (e.g., thereby increasing the quantity or quality of Treg cells in a population of cells by about 1.1-fold, 1.2-fold, 1.3-fold, 1.4-fold, 1.5-fold, 1.6-fold, 1.7-fold, 1.8-fold, 1.9-fold, 2-fold, 2.1-fold, 2.2-fold, 2.3-fold, 2.4-fold, 2.5-fold, 2.6-fold, 2.7-fold, 2.8-fold, 2.9-fold, 3-fold, 3.1-fold, 3.2-fold, 3.3-fold, 3.4-fold, 3.5-fold, 3.6-fold, 3.7-fold, 3.8-fold, 3.9-fold, 4-fold, 4.1-fold, 4.2-fold, 4.3-fold, 4.4-fold, 4.5-fold, 4.6-fold, 4.7-fold, 4.8-fold, 4.9-fold, 5-fold, 5.1-fold, 5.2-fold, 5.3-fold, 5.4-fold, 5.5-fold, 5.6-fold, 5.7-fold, 5.8-fold, 5.9-fold, 6-fold, 6.1-fold, 6.2-fold, 6.3-fold, 6.4-fold, 6.5-fold, 6.6-fold, 6.7-fold, 6.8-fold, 6.9-fold, 7-fold, 7.1-fold, 7.2-fold, 7.3-fold, 7.4-fold, 7.5-fold, 7.6-fold, 7.7-fold, 7.8-fold, 7.9-fold, 8-fold, 8.1-fold, 8.2-fold, 8.3-fold, 8.4-fold, 8.5-fold, 8.6-fold, 8.7-fold, 8.8-fold, 8.9-fold, 9-fold, 9.1-fold, 9.2-fold, 9.3-fold, 9.4-fold, 9.5-fold, 9.6-fold, 9.7-fold, 9.8-fold, 9.9-fold, 10-fold, 20-fold, 30-fold, 40-fold, 50-fold, 60-fold, 70-fold, 80-fold, 90-fold, 100-fold, or more, relative to a population of cells not exposed to the polypeptide), for instance, by binding and activating TNFR2 on the Treg cell surface;

(b) promote the proliferation of, or increase the stability of, MDSCs (e.g., thereby increasing the quantity or quality of MDSCs in a population of cells by about 1.1-fold, 1.2-fold, 1.3-fold, 1.4-fold, 1.5-fold, 1.6-fold, 1.7-fold, 1.8-fold, 1.9-fold, 2-fold, 2.1-fold, 2.2-fold, 2.3-fold, 2.4-fold, 2.5-fold, 2.6-fold, 2.7-fold, 2.8-fold, 2.9-fold, 3-fold, 3.1-fold, 3.2-fold, 3.3-fold, 3.4-fold, 3.5-fold, 3.6-fold, 3.7-fold, 3.8-fold, 3.9-fold, 4-fold, 4.1-fold, 4.2-fold, 4.3-fold, 4.4-fold, 4.5-fold, 4.6-fold, 4.7-fold, 4.8-fold, 4.9-fold, 5-fold, 5.1-fold, 5.2-fold, 5.3-fold, 5.4-fold, 5.5-fold, 5.6-fold, 5.7-fold, 5.8-fold, 5.9-fold, 6-fold, 6.1-fold, 6.2-fold, 6.3-fold, 6.4-fold, 6.5-fold, 6.6-fold, 6.7-fold, 6.8-fold, 6.9-fold, 7-fold, 7.1-fold, 7.2-fold, 7.3-fold, 7.4-fold, 7.5-fold, 7.6-fold, 7.7-fold, 7.8-fold, 7.9-fold, 8-fold, 8.1-fold, 8.2-fold, 8.3-fold, 8.4-fold, 8.5-fold, 8.6-fold, 8.7-fold, 8.8-fold, 8.9-fold, 9-fold, 9.1-fold, 9.2-fold, 9.3-fold, 9.4-fold, 9.5-fold, 9.6-fold, 9.7-fold, 9.8-fold, 9.9-fold, 10-fold, 20-fold, 30-fold, 40-fold, 50-fold, 60-fold, 70-fold, 80-fold, 90-fold, 100-fold, or more, relative to a population of cells not exposed to the polypeptide), for instance, by binding and activating TNFR2 on the MDSC surface;

(c) kill or inhibit expansion of T effector cells, such as CD8+ T cells (e.g., thereby decreasing the quantity of CD8+ effector T cells in a population of cells by about 1.1-fold, 1.2-fold, 1.3-fold, 1.4-fold, 1.5-fold, 1.6-fold, 1.7-fold, 1.8-fold, 1.9-fold, 2-fold, 2.1-fold, 2.2-fold, 2.3-fold, 2.4-fold, 2.5-fold, 2.6-fold, 2.7-fold, 2.8-fold, 2.9-fold, 3-fold, 3.1-fold, 3.2-fold, 3.3-fold, 3.4-fold, 3.5-fold, 3.6-fold, 3.7-fold, 3.8-fold, 3.9-fold, 4-fold, 4.1-fold, 4.2-fold, 4.3-fold, 4.4-fold, 4.5-fold, 4.6-fold, 4.7-fold, 4.8-fold, 4.9-fold, 5-fold, 5.1-fold, 5.2-fold, 5.3-fold, 5.4-fold, 5.5-fold, 5.6-fold, 5.7-fold, 5.8-fold, 5.9-fold, 6-fold, 6.1-fold, 6.2-fold, 6.3-fold, 6.4-fold, 6.5-fold, 6.6-fold, 6.7-fold, 6.8-fold, 6.9-fold, 7-fold, 7.1-fold, 7.2-fold, 7.3-fold, 7.4-fold, 7.5-fold, 7.6-fold, 7.7-fold, 7.8-fold, 7.9-fold, 8-fold, 8.1-fold, 8.2-fold, 8.3-fold, 8.4-fold, 8.5-fold, 8.6-fold, 8.7-fold, 8.8-fold, 8.9-fold, 9-fold, 9.1-fold, 9.2-fold, 9.3-fold, 9.4-fold, 9.5-fold, 9.6-fold, 9.7-fold, 9.8-fold, 9.9-fold, 10-fold, 20-fold, 30-fold, 40-fold, 50-fold, 60-fold, 70-fold, 80-fold, 90-fold, 100-fold, or more, relative to a population of cells not exposed to the polypeptide); and/or (d) promote proliferation of, and/or directly expand, TNFR2-expressing parenchymal cells, such as a cells of the central and peripheral nervous system and their associated structures (e.g., by about 1.1-fold, 1.2-fold, 1.3-fold, 1.4-fold, 1.5-fold, 1.6-fold, 1.7-fold, 1.8-fold, 1.9-fold, 2-fold, 2.1-fold, 2.2-fold, 2.3-fold, 2.4-fold, 2.5-fold, 2.6-fold, 2.7-fold, 2.8-fold, 2.9-fold, 3-fold, 3.1-fold, 3.2-fold, 3.3-fold, 3.4-fold, 3.5-fold, 3.6-fold, 3.7-fold, 3.8-fold, 3.9-fold, 4-fold, 4.1-fold, 4.2-fold, 4.3-fold, 4.4-fold, 4.5-fold, 4.6-fold, 4.7-fold, 4.8-fold, 4.9-fold, 5-fold, 5.1-fold, 5.2-fold, 5.3-fold, 5.4-fold, 5.5-fold, 5.6-fold, 5.7-fold, 5.8-fold, 5.9-fold, 6-fold, 6.1-fold, 6.2-fold, 6.3-fold, 6.4-fold, 6.5-fold, 6.6-fold, 6.7-fold, 6.8-fold, 6.9-fold, 7-fold, 7.1-fold, 7.2-fold, 7.3-fold, 7.4-fold, 7.5-fold, 7.6-fold, 7.7-fold, 7.8-fold, 7.9-fold, 8-fold, 8.1-fold, 8.2-fold, 8.3-fold, 8.4-fold, 8.5-fold, 8.6-fold, 8.7-fold, 8.8-fold, 8.9-fold, 9-fold, 9.1-fold, 9.2-fold, 9.3-fold, 9.4-fold, 9.5-fold, 9.6-fold, 9.7-fold, 9.8-fold, 9.9-fold, 10-fold, 20-fold, 30-fold, 40-fold, 50-fold, 60-fold, 70-fold, 80-fold, 90-fold, 100-fold, or more, relative to a population of cells not exposed to the polypeptide).

For example, an agonistic TNFR2 polypeptide, such as a single-chain polypeptide, antibody, antigen-binding fragment thereof, or construct, described herein can be used to increase the total quantity of Treg, MDSC, and/or parenchymal cells in a patient (such as a human patient) or within a sample (e.g., a sample isolated from a patient, such as a human patient undergoing treatment for a disease described herein) relative to a patient or sample, respectively, not treated with the polypeptide. For instance, the parenchymal cells may be one of various subsets of lymphoid cells or central nervous system-associated cells, such as neurons.

In some embodiments, the TNFR2 polypeptide (e.g., a single-chain polypeptide, antibody, antigen-binding fragment thereof, and construct thereof) can be used to increase the proliferation or expansion of, and/or to directly augment, Treg cells (e.g., activated Treg cells that express CD25h), MDSCs, and/or parenchymal cells that express TNFR2. For instance, the parenchymal cells may be one of various subsets of lymphoid cells or central nervous system-associated cells, such as neurons.

Agonistic TNFR2 polypeptides (e.g., single-chain polypeptides, antibodies, antigen-binding fragments thereof, and constructs thereof) described herein may bind TNFR2 on the surface of a MDSC (e.g., a cell that expresses all or a subset of proteins and small molecules selected from the group consisting of B7-1 (CD80), B7-H1 (PD-L1), CCR2, CD1d, CD1d1, CD2, CD31 (PECAM-1), CD43, CD44, complement component C5a R1, F4/80 (EMR1), Fcγ RIII (CD16), Fcγ RII (CD32), Fcγ RIIA (CD32a), Fcγ RIIB (CD32b), Fcγ RIIB/C (CD32b/c), Fcγ RIIC (CD32c), Fcγ RIIIA (CD16A), Fcγ RIIIB (CD16b), galectin-3, GP130, Gr-1 (Ly-6G), ICAM-1 (CD54), IL-1 RI, IL-4Rα, IL-6Rα, integrin α4 (CD49d), integrin αL (CD11a), integrin αM (CD11 b), M-CSFR, MGL1 (CD301a), MGL1/2 (CD301a/b), MGL2 (CD301b), nitric oxide, PSGL-1 (CD162), L-selectin (CD62L), siglec-3 (CD33), transferrin receptor (TfR), VEGFR1 (Flt-1), and VEGFR2 (KDR or Flk-1)). Particularly, MDSCs do not express proteins selected from the group consisting of B7-2 (CD86), B7-H4, CD11c, CD14, CD21, CD23 (FcεRII), CD34, CD35, CD40 (TNFRSF5), CD117 (c-kit), HLA-DR, and Sca-1 (Ly6). Binding of TNFR2 on the MDSC may increase proliferation or stability the MDSC and/or may directly expand the MDSC, such as by preventing apoptosis of the MDSC. Polypeptides, such as single-chain polypeptides, antibodies, antigen-binding fragments thereof, and constructs thereof, described herein may not require TNFα to promote proliferation of Treg cells, parenchymal cells (e.g., TNFR2-expressing cells), and/or MDSCs, although in some cases, TNFα or an agonistic TNFα mutein (e.g., an agonistic TNFα mutein described in WO 2016/029043, the disclosure of which is incorporated herein by reference in its entirety) may be combined with an agonistic TNFR2 polypeptide of the present disclosure, thereby further augmenting the proliferative effect.

In some embodiments, the polypeptides described herein, such as single-chain polypeptides, antibodies, antigen-binding fragments thereof, and constructs thereof, augment the proliferation of, and/or directly stabilize or proliferate, Treg cells with a greater potency in a patient suffering from autoimmune disease relative to a subject that does not have autoimmunity. In some embodiments, the polypeptides described herein, such as single-chain polypeptides, antibodies, antigen-binding fragments thereof, and constructs thereof, augment the proliferation of, and/or directly expand, Treg cells with a greater potency in the microenvironment of autoimmunity relative to a site that is free of autoimmunity.

In some embodiments, the polypeptides described herein, such as single-chain polypeptides, antibodies, antigen-binding fragments thereof, and constructs thereof, augment or stabilize the proliferation of, and/or directly kill, MDSCs with a greater potency in a patient suffering from graft-versus-host disease (GVHD) relative to a subject that does not have GVHD. In some embodiments, the polypeptides described herein, such as single-chain polypeptides, antibodies, antigen-binding fragments thereof, and constructs thereof, increase the proliferation of, and/or directly expand, MDSCs with a greater potency in the microenvironment of GVHD relative to a site that is free of GVHD.

For example, agonistic TNFR2 polypeptides (e.g., single-chain polypeptides, antibodies, antigen-binding fragments thereof, and constructs thereof) described herein may bind TNFR2 on the surface of a cytotoxic T cells of patients suffering from autoimmunity or GVHD, and may increase proliferation of the MDSC and/or promote the death of CTLs. For instance, the polypeptides described herein, such as single-chain polypeptides, antibodies, antigen-binding fragments thereof, and constructs thereof, may exhibit an $IC_{50}$ for expanding the proliferation of Treg cells and/or MDSCs in the microenvironment of the autoimmunity or GVHD that is less than the $IC_{50}$ of the polypeptides for expanding the proliferation of Treg cells and/or MDSCs at a site distant from the disease, such as an $IC_{50}$ that is diminished by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 100-fold, 1,000-fold, 10,000-fold, or more.

In some embodiments, the polypeptides described herein, such as single-chain polypeptides, antibodies, antigen-binding fragments thereof, and constructs thereof, kill or eliminate T effector cells, such as CD8+ cytotoxic T cells, with a greater potency in a patient suffering from autoimmunity or GVHD than a subject that is free of these diseases. In some embodiments, the polypeptides described herein, such as single-chain polypeptides, antibodies, antigen-binding fragments thereof, and constructs thereof, contract T effector cells, such as CD8+ cytotoxic T cells, with a greater potency in the microenvironment of an autoimmune reaction or GVHD relative to a site that is free of autoimmunity or GVHD.

For instance, in some embodiments, the polypeptides described herein, such as single-chain polypeptides, antibodies, antigen-binding fragments thereof, and constructs thereof, directly kill T effector cells, such as CD8+ cytotoxic T cells, with an $EC_{50}$ in an autoimmune patient that is less than the $EC_{50}$ of the polypeptides for killing T effector cells in a subject without autoimmunity by, for example, 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 100-fold, 1,000-fold, 10,000-fold, or more.

In some embodiments, the TNFR2 agonist polypeptide is one that is identified and/or produced by a method of the disclosure. Methods of the disclosure for identifying and/or producing TNFR2 agonist polypeptides include those having the steps of:

(a) contacting a mixture of antibodies or fragments thereof with at least one peptide containing five or more continuous or discontinuous amino acid residues within CRD1 and/or CRD2 of TNFR2;

(b) separating antibodies or fragments thereof that specifically bind the peptide from the mixture, thereby producing an enriched antibody mixture containing at least one the TNFR2 agonist antibody or antigen-binding fragment; and (c) exposing the enriched antibody mixture to at least one peptide containing five or more continuous or discontinuous amino acid residues within CRD3 and/or CRD4 of TNFR2 and retaining antibodies or fragments thereof that do not specifically bind the peptide, thereby producing an antibody mixture containing at least one TNFR2 agonist antibody or antigen-binding fragment thereof.

In some embodiments, the method includes determining the amino acid sequence of one or more of the antibodies or antigen-binding fragments thereof in the enriched antibody mixture. In some embodiments, the peptide of (a) and/or (c) is bound to a surface. The antibody or antigen-binding fragment thereof may be expressed on the surface of a phage, bacterial cell, or yeast cell. In some embodiments, the antibody or antigen-binding fragment thereof is expressed as one or more polypeptide chains non-covalently bound to ribosomes or covalently bound to mRNA or cDNA. In some embodiments, the peptide of (a) and/or (c) is conjugated to a detectable label, such as a fluorescent molecule (e.g., green fluorescent protein, cyan fluorescent protein, yellow fluorescent protein, red fluorescent protein, phycoerythrin, allophycocyanin, hoescht, 4',6-diamidino-2-phenylindole (DAPI), propidium iodide, fluorescein, coumarin, rhodamine, tetramethylrhoadmine, or cyanine) or an epitope tag (e.g., a maltose-binding protein, glutathione-S-transferase, a poly-histidine tag, a FLAG-tag, a myc-tag, human influenza hemagglutinin (HA) tag, biotin, or streptavidin). In some embodiments, steps (a) and (b) are sequentially repeated one or more times (e.g., from one to ten times, two to nine times, three to eight times, or four to seven times, such as two times, three times, four times, five times, six times, seven times, eight times, nine times, or ten times, or more).

In some embodiments, the polypeptide is an antibody or antigen-binding fragment thereof selected from the group consisting of a monoclonal antibody or antigen-binding fragment thereof, a polyclonal antibody or antigen-binding fragment thereof, a human antibody or antigen-binding fragment thereof, a humanized antibody or antigen-binding fragment thereof, a primatized antibody or antigen-binding fragment thereof, a bispecific antibody or antigen-binding fragment thereof, a multi-specific antibody or antigen-binding fragment thereof, a dual-variable immunoglobulin domain, a monovalent antibody or antigen-binding fragment thereof, a chimeric antibody or antigen-binding fragment thereof, a single-chain Fv molecule (scFv), a diabody, a triabody, a nanobody, an antibody-like protein scaffold, a domain antibody, a Fv fragment, a Fab fragment, a F(ab')2 molecule, and a tandem scFv (taFv).

In some embodiments, the polypeptide is a human antibody or antigen-binding fragment thereof, a humanized antibody or antigen-binding fragment thereof, or a chimeric antibody or antigen-binding fragment thereof.

In some embodiments, the polypeptide is a single-chain polypeptide.

In some embodiments, the polypeptide is a bispecific antibody, such as a bispecific monoclonal antibody, in which one arm of the antibody specifically binds TNFR2 and the other specifically binds an immune checkpoint protein, such as PD-1, PD-L1, or CTLA-4, among others described herein. The arm of the bispecific antibody that specifically binds TNFR2 may specifically bind, for example, an epitope of human TNFR2 defined by one or more amino acids within CRD1, CRD2, and/or CRD3, but does not bind an epitope of human TNFR2 defined by one or more amino acids within CRD4. In some embodiments, the arm of the bispecific antibody that specifically binds TNFR2 specifically binds an epitope of human TNFR2 corresponding to one or more of:

```
(a) amino acids 56-60 of SEQ ID NO: 1
(KCSPG);

(b) amino acids 101-107 of SEQ ID NO: 1
(CSSDQVET);
```

-continued (c) amino acids 115-142 of SEQ ID NO: 1
(NRICTCRPGWYCALSKQEGCRLCAPLRK);

(d) amino acids 26-45 of SEQ ID NO: 1
(QTAQMCCSKCSPGQHAKVFC);

(e) amino acids 90-109 of SEQ ID NO: 1
(REQNRICTCRPGWYCALSKQ);

(f) amino acids 98-117 of SEQ ID NO: 1
(CRPGWYCALSKQEGCRLCAP);

(g) amino acids 106-125 of SEQ ID NO: 1
(LSKQEGCRLCAPLRKCRPGF);
and/or (h) amino acids 108-127 of SEQ ID NO: 1
(KQEGCRLCAPLRKCRPGFGV).

In some embodiments, the bispecific antibody contains one arm that specifically binds TNFR2, such as an epitope of human TNFR2 described above, and one arm that specifically binds an immune checkpoint protein specifically binds PD-1. In some embodiments, the arm of the bispecific antibody that specifically binds PD-1 is an agonist of PD-1 activity.

In some embodiments, the bispecific antibody contains one arm that specifically binds TNFR2, such as an epitope of human TNFR2 described above, and one arm that specifically binds PD-L1. In some embodiments, the arm of the bispecific antibody that specifically binds PD-L1 is an agonist of PD-L1 activity.

In some embodiments, the bispecific antibody contains one arm that specifically binds TNFR2, such as an epitope of human TNFR2 described above, and one arm that specifically binds CTLA-4. In some embodiments, the arm of the bispecific antibody that specifically binds CTLA-4 is an agonist of CTLA-4 activity.

A second aspect features a construct containing a first polypeptide domain and a second polypeptide domain. The first polypeptide domain and the second polypeptide domain are each, independently, an antigen-binding fragment of the first aspect or any of the embodiments thereof. The first polypeptide domain and the second polypeptide domain may be bound to one another, for example, by a covalent linker, such as a linker that contains (e.g., is) an amide bond or a disulfide bond.

A third aspect features a polynucleotide encoding the polypeptide (e.g., a single-chain polypeptide, antibody, antigen-binding fragment thereof, or construct thereof) of the first aspect and/or the construct of the second aspect or any of the embodiments thereof.

A fourth aspect features a vector encoding the polynucleotide of the third aspect. The vector may be an expression vector, such as a eukaryotic expression vector. In some embodiments, the vector is a viral vector, such as an adenovirus (e.g., a serotype 1-57 adenovirus, such as a serotype 2, 5, 11, 12, 24, 26, 34, 35, 40, 48, 49, 50, 52, or Pan9 adenovirus), retrovirus (e.g., a γ-retrovirus or a lentivirus), poxvirus, adeno-associated virus, baculovirus, herpes simplex virus, or a vaccinia virus (e.g., a modified vaccinia Ankara virus).

A fifth aspect features an isolated host cell containing the polynucleotide of the third aspect and/or the vector of the fourth aspect. The host cell may be a prokaryotic cell or a eukaryotic cell, such as a mammalian cell (e.g., a Chinese hamster ovary (CHO) cell or HEK cell). The host cell may be one that is described, e.g., in Dinnis and James, Biotechnology and Bioengineering 91:180-189, 2005, the disclosure of which is incorporated herein by reference.

A sixth aspect features a pharmaceutical composition containing a polypeptide (e.g., a single-chain polypeptide, antibody, antigen-binding fragment thereof, or construct thereof) that specifically binds human TNFR2 and exhibits an agonistic effect on TNFR2 activity upon the binding. The polypeptide may be, for example, an antibody or antigen-binding fragment of the first aspect or any of the embodiments thereof. In some embodiments, at least 10% of the antibody or antigen-binding fragment thereof in the pharmaceutical composition is present in a single disulfide-bonded isoform, such as the IgG2-B or IgG2-A disulfide-bonded isoform. In some embodiments, about 10% to about 99.999% of the antibody or antigen-binding fragment thereof in the pharmaceutical composition is present in a single disulfide-bonded isoform, such as from about 11% to about 99.9%, about 12% to about 99.9%, about 13% to about 99.9%, about 14% to about 99.9%, about 15% to about 99%, about 16% to about 99.9%, about 17% to about 99.9%, about 18% to about 99.9%, about 19% to about 99.9%, about 20% to about 99.9%, about 21% to about 99.9%, about 22% to about 99.9%, about 23% to about 99.9%, about 24% to about 99.9%, about 25% to about 99.9%, about 26% to about 99.9%, about 27% to about 99.9%, about 28% to about 99.9%, about 29% to about 99.9%, about 30% to about 99.9%, about 31% to about 99.9%, about 32% to about 99.9%, about 33% to about 99.9%, about 34% to about 99.9%, about 35% to about 99.9%, about 36% to about 99.9%, about 37% to about 99.9%, about 38% to about 99.9%, about 39% to about 99.9%, about 40% to about 99.9%, about 41% to about 99.9%, about 42% to about 99.9%, about 43% to about 99.9%, about 44% to about 99.9%, about 45% to about 99.9%, about 46% to about 99.9%, about 47% to about 99.9%, about 48% to about 99.9%, about 49% to about 99.9%, about 50% to about 99.9%, about 51% to about 99.9%, about 52% to about 99.9%, about 53% to about 99.9%, about 54% to about 99.9%, about 55% to about 99.9%, about 56% to about 99.9%, about 57% to about 99.9%, about 58% to about 99.9%, about 59% to about 99.9%, about 60% to about 99.9%, about 61% to about 99.9%, about 62% to about 99.9%, about 63% to about 99.9%, about 64% to about 99.9%, about 65% to about 99.9%, about 66% to about 99.9%, about 67% to about 99.9%, about 68% to about 99.9%, about 69% to about 99.9%, about 70% to about 99.9%, about 71% to about 99.9%, about 72% to about 99.9%, about 73% to about 99.9%, about 74% to about 99.9%, about 75% to about 99.9%, about 76% to about 99.9%, about 77% to about 99.9%, about 78% to about 99.9%, about 79% to about 99.9%, about 80% to about 99.9%, about 81% to about 99.9%, about 82% to about 99.9%, about 83% to about 99.9%, about 84% to about 99.9%, about 85% to about 99.9%, about 86% to about 99.9%, about 87% to about 99.9%, about 88% to about 99.9%, about 89% to about 99.9%, about 90% to about 99.9%, about 91% to about 99.9%, about 92% to about 99.9%, about 93% to about 99.9%, about 94% to about 99.9%, about 95% to about 99.9%, about 96% to about 99.9%, about 97% to about 99.9%, about 98% to about 99.9%, or about 99% to about 99.99% of the antibody or antigen-binding fragment thereof.

In some embodiments, at least about 10% of the antibody or antigen-binding fragment thereof in the pharmaceutical composition is present in a single disulfide-bonded isoform. In some embodiments, at least about 15% of the antibody or antigen-binding fragment thereof in the pharmaceutical composition is present in a single disulfide-bonded isoform. In some embodiments, at least about 20% of the antibody or antigen-binding fragment thereof in the pharmaceutical composition is present in a single disulfide-bonded isoform. In some embodiments, at least about 25% of the antibody or antigen-binding fragment thereof in the pharmaceutical composition is present in a single disulfide-bonded isoform. In some embodiments, at least about 30% of the antibody or antigen-binding fragment thereof in the pharmaceutical composition is present in a single disulfide-bonded isoform. In some embodiments, at least about 35% of the antibody or antigen-binding fragment thereof in the pharmaceutical composition is present in a single disulfide-bonded isoform. In some embodiments, at least about 40% of the antibody or antigen-binding fragment thereof in the pharmaceutical composition is present in a single disulfide-bonded isoform. In some embodiments, at least about 45% of the antibody or antigen-binding fragment thereof in the pharmaceutical composition is present in a single disulfide-bonded isoform. In some embodiments, at least about 50% of the antibody or antigen-binding fragment thereof in the pharmaceutical composition is present in a single disulfide-bonded isoform. In some embodiments, at least about 60% of the antibody or antigen-binding fragment thereof in the pharmaceutical composition is present in a single disulfide-bonded isoform. In some embodiments, at least about 65% of the antibody or antigen-binding fragment thereof in the pharmaceutical composition is present in a single disulfide-bonded isoform. In some embodiments, at least about 70% of the antibody or antigen-binding fragment thereof in the pharmaceutical composition is present in a single disulfide-bonded isoform. In some embodiments, at least about 75% of the antibody or antigen-binding fragment thereof in the pharmaceutical composition is present in a single disulfide-bonded isoform. In some embodiments, at least about 80% of the antibody or antigen-binding fragment thereof in the pharmaceutical composition is present in a single disulfide-bonded isoform. In some embodiments, at least about 85% of the antibody or antigen-binding fragment thereof in the pharmaceutical composition is present in a single disulfide-bonded isoform. In some embodiments, at least about 90% of the antibody or antigen-binding fragment thereof in the pharmaceutical composition is present in a single disulfide-bonded isoform. In some embodiments, at least about 95% of the antibody or antigen-binding fragment thereof in the pharmaceutical composition is present in a single disulfide-bonded isoform. In some embodiments, at least about 96% of the antibody or antigen-binding fragment thereof in the pharmaceutical composition is present in a single disulfide-bonded isoform. In some embodiments, at least about 97% of the antibody or antigen-binding fragment thereof in the pharmaceutical composition is present in a single disulfide-bonded isoform. In some embodiments, at least about 98% of the antibody or antigen-binding fragment thereof in the pharmaceutical composition is present in a single disulfide-bonded isoform. In some embodiments, at least about 99% of the antibody or antigen-binding fragment thereof in the pharmaceutical composition is present in a single disulfide-bonded isoform. In some embodiments, at least about 99.9% of the antibody or antigen-binding fragment thereof in the pharmaceutical composition is present in a single disulfide-bonded isoform.

In some embodiments, the antibody or antigen-binding fragment thereof yields only a single detectable band upon gel electrophoresis analysis performed under non-reducing conditions.

In some embodiments, the single disulfide-bonded isoform of the antibody or antigen-binding fragment is IgG2-B, as described herein. In some embodiments, the single disulfide-bonded isoform of the antibody or antigen-binding fragment is IgG2-A, as described herein.

Additionally or alternatively, the pharmaceutical composition may contain the construct of the second aspect or any embodiments thereof, the polynucleotide of the third aspect or any embodiments thereof, the vector of the fourth aspect or any embodiments thereof, and/or the host cell of the fifth aspect or any embodiments thereof. The pharmaceutical composition may further contain a pharmaceutically acceptable carrier or excipient.

In some embodiments, the polypeptide (e.g., a single-chain polypeptide, antibody, antigen-binding fragment thereof, or construct thereof) is present in the pharmaceutical composition in an amount of from about 0.001 mg/ml to about 100 mg/ml, such as an amount of from about 0.01 mg/ml to about 10 mg/ml.

The pharmaceutical composition may further contain an additional therapeutic agent, such as an immunotherapy agent. In some embodiments, the immunotherapy agent is selected from the group consisting of an agonistic anti-CTLA-4 agent, an agonistic anti-PD-1 agent, an agonistic anti-PD-L1 agent, an agonistic anti-PD-L2 agent, an agonistic anti-CD27 agent, an agonistic anti-CD30 agent, an agonistic anti-CD40 agent, an agonistic anti-4-1 BB agent, an agonistic anti-GITR agent, an agonistic anti-OX40 agent, an agonistic anti-TRAILR1 agent, an agonistic anti-TRAILR2 agent, an agonistic anti-TWEAK agent, an agonistic anti-TWEAKR agent, an agonistic anti-cell surface lymphocyte protein agent, an agonistic anti-BRAF agent, an agonistic anti-MEK agent, an agonistic anti-CD33 agent, an agonistic anti-CD20 agent, an agonistic anti-HLA-DR agent, an agonistic anti-HLA class I agent, an agonistic anti-CD52 agent, an agonistic anti-A33 agent, an agonistic anti-GD3 agent, an agonistic anti-PSMA agent, an agonistic anti-Ceacan 1 agent, an agonistic anti-Galedin 9 agent, an agonistic anti-HVEM agent, an agonistic anti-VISTA agent, an agonistic anti-B7 H4 agent, an agonistic anti-HHLA2 agent, an agonistic anti-CD155 agent, an agonistic anti-CD80 agent, an agonistic anti-BTLA agent, an agonistic anti-CD160 agent, an agonistic anti-CD28 agent, an agonistic anti-CD226 agent, an agonistic anti-CEACAM1 agent, an agonistic anti-TIM3 agent, an agonistic anti-TIGIT agent, an agonistic anti-CD96 agent, an agonistic anti-CD70 agent, an agonistic anti-CD27 agent, an agonistic anti-LIGHT agent, an agonistic anti-CD137 agent, an agonistic anti-DR4 agent, an agonistic anti-CR5 agent, an agonistic anti-TNFRS agent, an agonistic anti-TNFR1 agent, an agonistic anti-FAS agent, an agonistic anti-CD95 agent, an agonistic anti-TRAIL agent, an agonistic anti-DR6 agent, an agonistic anti-EDAR agent, an agonistic anti-NGFR agent, an agonistic anti-OPG agent, an agonistic anti-RANKL agent, an agonistic anti-LTβ receptor agent, an agonistic anti-BCMA agent, an agonistic anti-TACI agent, an agonistic anti-BAFFR agent, an agonistic anti-EDAR2 agent, an agonistic anti-TROY agent, and an agonistic anti-RELT agent. For example, the immunotherapy agent may be an agonistic anti-CTLA-4 agent, an agonistic anti-PD-1 agent, or an agonistic anti-PD-L1 agent.

In some embodiments, the immunotherapy agent is selected from the group consisting of an agonistic anti-CTLA-4 antibody or antigen-binding fragment thereof, an agonistic anti-PD-1 antibody or antigen-binding fragment thereof, an agonistic anti-PD-L1 antibody or antigen-binding fragment thereof, an agonistic anti-PD-L2 antibody or antigen-binding fragment thereof, an agonistic anti-CD27 antibody or antigen-binding fragment thereof, an agonistic anti-CD30 antibody or antigen-binding fragment thereof, an agonistic anti-CD40 antibody or antigen-binding fragment thereof, an agonistic anti-4-1 BB antibody or antigen-binding fragment thereof, an agonistic anti-GITR antibody or antigen-binding fragment thereof, an agonistic anti-OX40 antibody or antigen-binding fragment thereof, an agonistic anti-TRAILR1 antibody or antigen-binding fragment thereof, an agonistic anti-TRAILR2 antibody or antigen-binding fragment thereof, an agonistic anti-TWEAK antibody or antigen-binding fragment thereof, an agonistic anti-TWEAKR antibody or antigen-binding fragment thereof, an agonistic anti-cell surface lymphocyte protein antibody or antigen-binding fragment thereof, an agonistic anti-BRAF antibody or antigen-binding fragment thereof, an agonistic anti-MEK antibody or antigen-binding fragment thereof, an agonistic anti-CD33 antibody or antigen-binding fragment thereof, an agonistic anti-CD20 antibody or antigen-binding fragment thereof, an agonistic anti-HLA-DR antibody or antigen-binding fragment thereof, an agonistic anti-HLA class I antibody or antigen-binding fragment thereof, an agonistic anti-CD52 antibody or antigen-binding fragment thereof, an agonistic anti-A33 antibody or antigen-binding fragment thereof, an agonistic anti-GD3 antibody or antigen-binding fragment thereof, an agonistic anti-PSMA antibody or antigen-binding fragment thereof, an agonistic anti-Ceacan 1 antibody or antigen-binding fragment thereof, an agonistic anti-Galedin 9 antibody or antigen-binding fragment thereof, an agonistic anti-HVEM antibody or antigen-binding fragment thereof, an agonistic anti-VISTA antibody or antigen-binding fragment thereof, an agonistic anti-B7 H4 antibody or antigen-binding fragment thereof, an agonistic anti-HHLA2 antibody or antigen-binding fragment thereof, an agonistic anti-CD155 antibody or antigen-binding fragment thereof, an agonistic anti-CD80 antibody or antigen-binding fragment thereof, an agonistic anti-BTLA antibody or antigen-binding fragment thereof, an agonistic anti-CD160 antibody or antigen-binding fragment thereof, an agonistic anti-CD28 antibody or antigen-binding fragment thereof, an agonistic anti-CD226 antibody or antigen-binding fragment thereof, an agonistic anti-CEACAM1 antibody or antigen-binding fragment thereof, an agonistic anti-TIM3 antibody or antigen-binding fragment thereof, an agonistic anti-TIGIT antibody or antigen-binding fragment thereof, an agonistic anti-CD96 antibody or antigen-binding fragment thereof, an agonistic anti-CD70 antibody or antigen-binding fragment thereof, an agonistic anti-CD27 antibody or antigen-binding fragment thereof, an agonistic anti-LIGHT antibody or antigen-binding fragment thereof, an agonistic anti-CD137 antibody or antigen-binding fragment thereof, an agonistic anti-DR4 antibody or antigen-binding fragment thereof, an agonistic anti-CR5 antibody or antigen-binding fragment thereof, an agonistic anti-TNFRS antibody or antigen-binding fragment thereof, an agonistic anti-TNFR1 antibody or antigen-binding fragment thereof, an agonistic anti-FAS antibody or antigen-binding fragment thereof, an agonistic anti-CD95 antibody or antigen-binding fragment thereof, an agonistic anti-TRAIL antibody or antigen-binding fragment thereof, an agonistic anti-DR6 antibody or antigen-binding fragment thereof, an agonistic anti-EDAR antibody or antigen-binding fragment thereof, an agonistic anti-NGFR antibody or antigen-binding fragment thereof, an agonistic anti-OPG antibody or antigen-binding fragment thereof, an agonistic anti-RANKL antibody or antigen-binding fragment thereof, an agonistic anti-LTβ receptor antibody or antigen-binding fragment thereof, an agonistic anti-BCMA antibody or antigen-binding fragment thereof, an agonistic anti-TACI antibody or antigen-binding fragment thereof, an agonistic anti-BAFFR antibody or antigen-binding fragment thereof, an agonistic anti-EDAR2 antibody or antigen-binding fragment thereof, an agonistic anti-TROY antibody or antigen-binding fragment thereof, and an agonistic anti-RELT antibody or antigen-binding fragment thereof. For example, the immunotherapy agent may be an agonistic anti-CTLA-4 antibody or antigen-binding fragment thereof, an agonistic anti-PD-1 antibody or antigen-binding fragment thereof, or an agonistic anti-PD-L1 antibody or antigen-binding fragment thereof.

In some embodiments, the immunotherapy agent is an agonistic anti-cell surface lymphocyte protein antibody or antigen-binding fragment thereof, such as an antibody or antigen-binding fragment thereof that binds and promotes the activity of one or more of CD1, CD2, CD3, CD4, CD5, CD6, CD7, CD8, CD9, CD10, CD11, CD12, CD13, CD14, CD15, CD16, CD17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42, CD43, CD44, CD45, CD46, CD47, CD48, CD49, CD50, CD51, CD52, CD53, CD54, CD55, CD56, CD57, CD58, CD59, CD60, CD61, CD62, CD63, CD64, CD65, CD66, CD67, CD68, CD69, CD70, CD71, CD72, CD73, CD74, CD75, CD76, CD77, CD78, CD79, CD80, CD81, CD82, CD83, CD84, CD85, CD86, CD87, CD88, CD89, CD90, CD91, CD92, CD93, CD94, CD95, CD96, CD97, CD98, CD99, CD100, CD101, CD102, CD103, CD104, CD105, CD106, CD107, CD108, CD109, CD110, CD111, CD112, CD113, CD114, CD115, CD116, CD117, CD118, CD119, CD120, CD121, CD122, CD123, CD124, CD125, CD126, CD127, CD128, CD129, CD130, CD131, CD132, CD133, CD134, CD135, CD136, CD137, CD138, CD139, CD140, CD141, CD142, CD143, CD144, CD145, CD146, CD147, CD148, CD149, CD150, CD151, CD152, CD153, CD154, CD155, CD156, CD157, CD158, CD159, CD160, CD161, CD162, CD163, CD164, CD165, CD166, CD167, CD168, CD169, CD170, CD171, CD172, CD173, CD174, CD175, CD176, CD177, CD178, CD179, CD180, CD181, CD182, CD183, CD184, CD185, CD186, CD187, CD188, CD189, CD190, CD191, CD192, CD193, CD194, CD195, CD196, CD197, CD198, CD199, CD200, CD201, CD202, CD203, CD204, CD205, CD206, CD207, CD208, CD209, CD210, CD211, CD212, CD213, CD214, CD215, CD216, CD217, CD218, CD219, CD220, CD221, CD222, CD223, CD224, CD225, CD226, CD227, CD228, CD229, CD230, CD231, CD232, CD233, CD234, CD235, CD236, CD237, CD238, CD239, CD240, CD241, CD242, CD243, CD244, CD245, CD246, CD247, CD248, CD249, CD250, CD251, CD252, CD253, CD254, CD255, CD256, CD257, CD258, CD259, CD260, CD261, CD262, CD263, CD264, CD265, CD266, CD267, CD268, CD269, CD270, CD271, CD272, CD273, CD274, CD275, CD276, CD277, CD278, CD279, CD280, CD281, CD282, CD283, CD284, CD285, CD286, CD287, CD288, CD289, CD290, CD291, CD292, CD293, CD294, CD295, CD296, CD297, CD298, CD299, CD300, CD301, CD302, CD303, CD304, CD305, CD306, CD307, CD308, CD309, CD310, CD311, CD312, CD313, CD314, CD315, CD316, CD317, CD318, CD319, and/or CD320.

In some embodiments, the immunotherapy agent is an agent (e.g., a polypeptide, antibody, antigen-binding fragment thereof, a single-chain polypeptide, or construct thereof) that binds a chemokine or lymphokine. For instance, the immunotherapy agent may be an agent (e.g., polypeptide, antibody, antigen-binding fragment thereof, single-chain polypeptide, or construct thereof) that bind and activates one or more, or all, of CXCL1, CXCL2, CXCL3, CXCL8, CCL2 and CCLS. In some embodiments, the immunotherapy agent is an agent (e.g., a polypeptide, antibody, antigen-binding fragment thereof, a single-chain polypeptide, or construct thereof) that binds and activates one or more, or all, of CCL3, CCL4, CCL8, and CCL22.

In some embodiments, the pharmaceutical composition contains a bispecific antibody, such as a bispecific monoclonal antibody, in which one arm of the antibody specifically binds TNFR2 and the other specifically binds an immune checkpoint protein, such as PD-1, PD-L1, or CTLA-4, among others described herein. The arm of the bispecific antibody that specifically binds TNFR2 may specifically bind, for example, an epitope of human TNFR2 defined by one or more amino acids within CRD1, CRD2, and/or CRD3, but not an epitope defined by one or more amino acids within CRD4.

In some embodiments, the bispecific antibody contains one arm that specifically binds TNFR2, such as an epitope of human TNFR2 described above, and one arm that specifically binds an immune checkpoint protein specifically binds PD-1. In some embodiments, the arm of the bispecific antibody that specifically binds PD-1 is an agonist of PD-1 activity.

In some embodiments, the bispecific antibody contains one arm that specifically binds TNFR2, such as an epitope of human TNFR2 described above, and one arm that specifically binds PD-L1. In some embodiments, the arm of the bispecific antibody that specifically binds PD-L1 is an agonist of PD-L1 activity.

In some embodiments, the bispecific antibody contains one arm that specifically binds TNFR2, such as an epitope of human TNFR2 described above, and one arm that specifically binds CTLA-4. In some embodiments, the arm of the bispecific antibody that specifically binds CTLA-4 is an agonist of CTLA-4 activity.

In some embodiments, the additional therapeutic agent in the pharmaceutical composition is TNFα, an agonistic TNFα mutein (e.g., an agonistic TNFα mutein described in WO 2016/029043, the disclosure of which is incorporated herein by reference in its entirety), or BCG.

In some embodiments, the pharmaceutical composition does not contain an anti-TNFα agent, such as an anti-TNFα antibody or antigen-binding fragment thereof. In some embodiments, the pharmaceutical composition does not contain infliximab, etanercept, certolizumab, golimumab, or adalimumab.

A seventh aspect features a method of producing the polypeptide (e.g., a single-chain polypeptide, antibody, antigen-binding fragment thereof, or construct thereof) of the first aspect and/or the construct of the second aspect or any embodiments thereof. The method may include expressing a polynucleotide encoding the polypeptide or construct in a host cell (e.g., a host cell described herein) and recovering the polypeptide from host cell medium.

An eighth aspect features a method of inhibiting an immune response, such as an immune response mediated by a B cell or T cell (e.g., a CD8+T effector cell) in a mammalian subject (e.g., a human subject) by administering to the subject the polypeptide (e.g., a single-chain polypeptide, antibody, antigen-binding fragment thereof, or construct thereof) of the first aspect or any embodiments thereof, the construct of the second aspect or any embodiments thereof, the polynucleotide of the third aspect or any embodiments thereof, the vector of the fourth aspect or any embodiments thereof, the host cell of the fifth aspect or any embodiments thereof, and/or the pharmaceutical composition of the sixth aspect or any embodiments thereof.

A ninth aspect features a method of treating an immunological disease in a mammalian subject (e.g., a human subject) by administering to the subject the polypeptide (e.g., a single-chain polypeptide, antibody, antigen-binding fragment thereof, or construct thereof) of the first aspect or any embodiments thereof, the construct of the second aspect or any embodiments thereof, the polynucleotide of the third aspect or any embodiments thereof, the vector of the fourth aspect or any embodiments thereof, the host cell of the fifth aspect or any embodiments thereof, and/or the pharmaceutical composition of the sixth aspect or any embodiments thereof.

In some embodiments, the subject is in need of a tissue or organ regeneration. The tissue or organ may be, for example, pancreas, salivary gland, pituitary gland, kidney, heart, lung, hematopoietic system, cranial nerves, heart, aorta, olfactory gland, ear, nerves, structures of the head, eye, thymus, tongue, bone, liver, small intestine, large intestine, gut, lung, brain, skin, peripheral nervous system, central nervous system, spinal cord, breast, embryonic structures, embryos, or testes.

In some embodiments, the immunological disease is an autoimmune disease, a neurological condition, an allergy, asthma, macular degeneration, muscular atrophy, a disease related to miscarriage, atherosclerosis, bone loss, a musculoskeletal disease, obesity, GVHD, or an allograft rejection.

In some embodiments, the autoimmune disease is type I diabetes, Alopecia Areata, Ankylosing Spondylitis, Antiphospholipid Syndrome, Autoimmune Addison's Disease, Autoimmune Hemolytic Anemia, Autoimmune Hepatitis, Behcet's Disease, Bullous Pemphigoid, Cardiomyopathy, Celiac Sprue-Dermatitis, Chronic Fatigue Immune Dysfunction Syndrome (CFIDS), Chronic Inflammatory Demyelinating Polyneuropathy, Churg-Strauss Syndrome, Cicatricial Pemphigoid, CREST Syndrome, Cold Agglutinin Disease, Crohn's Disease, Essential Mixed Cryoglobulinemia, Fibromyalgia-Fibromyositis, Graves' Disease, Guillain-Barré, Hashimoto's Thyroiditis, Hypothyroidism, Idiopathic Pulmonary Fibrosis, Idiopathic Thrombocytopenia Purpura (ITP), IgA Nephropathy, Juvenile Arthritis, Lichen Planus, Lupus, Ménière's Disease, Mixed Connective Tissue Disease, Multiple Sclerosis, Myasthenia Gravis, Pemphigus Vulgaris, Pernicious Anemia, Polyarteritis Nodosa, Polychondritis, Polyglandular Syndromes, Polymyalgia Rheumatica, Polymyositis and Dermatomyositis, Primary Agammaglobulinemia, Primary Biliary Cirrhosis, Psoriasis, Raynaud's Phenomenon, Reiter's Syndrome, Rheumatic Fever, Rheumatoid Arthritis, Sarcoidosis, Scleroderma, Sjögren's Syndrome, Stiff-Man Syndrome, Takayasu Arteritis, Temporal Arteritis/Giant Cell Arteritis, Ulcerative Colitis, Uveitis, Vasculitis, Vitiligo, or Wegener's Granulomatosis.

In some embodiments, the neurological condition is a brain tumor, a brain metastasis, a spinal cord injury, schizophrenia, epilepsy, Amyotrophic lateral sclerosis (ALS), Parkinson's disease, Alzheimer's disease, Huntington's disease, or stroke.

In some embodiments, the allergy is a food allergy, seasonal allergy, pet allergy, hives, hay fever, allergic conjunctivitis, poison ivy allergy oak allergy, mold allergy, drug allergy, dust allergy, cosmetic allergy, or chemical allergy.

In some embodiments, the allograft rejection is skin graft rejection, bone graft rejection, vascular tissue graft rejection, ligament graft rejection, or organ graft rejection.

In some embodiments, the ligament graft rejection is cricothyroid ligament graft rejection, periodontal ligament graft rejection, suspensory ligament of the lens graft rejection, palmar radiocarpal ligament graft rejection, dorsal radiocarpal ligament graft rejection, ulnar collateral ligament graft rejection, radial collateral ligament graft rejection, suspensory ligament of the breast graft rejection, anterior sacroiliac ligament graft rejection, posterior sacroiliac ligament graft rejection, sacrotuberous ligament graft rejection, sacrospinous ligament graft rejection, inferior pubic ligament graft rejection, superior pubic ligament graft rejection, anterior cruciate ligament graft rejection, lateral collateral ligament graft rejection, posterior cruciate ligament graft rejection, medial collateral ligament graft rejection, cranial cruciate ligament graft rejection, caudal cruciate ligament graft rejection, or patellar ligament graft rejection.

In some embodiments, the organ graft rejection is heart graft rejection, lung graft rejection, kidney graft rejection, liver graft rejection, pancreas graft rejection, intestine graft rejection, or thymus graft rejection.

In some embodiments, the GVHD arises from a bone marrow transplant or one or more blood cells selected from the group consisting of hematopoietic stem cells, common myeloid progenitor cells, common lymphoid progenitor cells, megakaryocytes, monocytes, basophils, eosinophils, neutrophils, macrophages, T cells, B cells, natural killer cells, and dendritic cells.

A tenth aspect features a method of treating an inflammatory disease in a mammalian subject (e.g., a human subject) by administering to the subject the polypeptide (e.g., a single-chain polypeptide, antibody, antigen-binding fragment thereof, or construct thereof) of the first aspect or any embodiments thereof, the construct of the second aspect or any embodiments thereof, the polynucleotide of the third aspect or any embodiments thereof, the vector of the fourth aspect or any embodiments thereof, the host cell of the fifth aspect or any embodiments thereof, and/or the pharmaceutical composition of the sixth aspect or any embodiments thereof.

In some embodiments, the inflammatory disease is acute or chronic inflammation. In some embodiments, the inflammatory disease is selected from the group consisting of osteoarthritis, fibrotic lung disease, and cardiac inflammation.

An eleventh aspect features a method of healing, protecting, proliferating, and/or regenerating TNFR2+ tissue in a mammalian subject (e.g., a human subject) by administering to the subject the polypeptide (e.g., a single-chain polypeptide, antibody, antigen-binding fragment thereof, or construct thereof) of the first aspect or any embodiments thereof, the construct of the second aspect or any embodiments thereof, the polynucleotide of the third aspect or any embodiments thereof, the vector of the fourth aspect or any embodiments thereof, the host cell of the fifth aspect or any embodiments thereof, and/or the pharmaceutical composition of the sixth aspect or any embodiments thereof.

In some embodiments, the TNFR2+ tissue is selected from the group consisting of pancreas, salivary gland, pituitary gland, kidney, heart, lung, hematopoietic system, cranial nerves, heart, aorta, olfactory gland, ear, nerve, eye, thymus, tongue, bone, liver, small intestine, large intestine, gastrointestinal, lung, brain, skin, peripheral nervous system, central nervous system, spinal cord, breast, embryonic structures, embryo, or testes tissue.

In some embodiments of the eighth, ninth, tenth, and/or eleventh aspect, the method further includes administering to the human an immunotherapy agent. The immunotherapy agent may be, e.g., selected from the group consisting of an agonistic anti-CTLA-4 agent, an agonistic anti-PD-1 agent, an agonistic anti-PD-L1 agent, an agonistic anti-PD-L2 agent, an agonistic anti-CD27 agent, an agonistic anti-CD30 agent, an agonistic anti-CD40 agent, an agonistic anti-4-1 BB agent, an agonistic anti-GITR agent, an agonistic anti-OX40 agent, an agonistic anti-TRAILR1 agent, an agonistic anti-TRAILR2 agent, an agonistic anti-TWEAK agent, an agonistic anti-TWEAKR agent, an agonistic anti-cell surface lymphocyte protein agent, an agonistic anti-BRAF agent, an agonistic anti-MEK agent, an agonistic anti-CD33 agent, an agonistic anti-CD20 agent, an agonistic anti-HLA-DR agent, an agonistic anti-HLA class I agent, an agonistic anti-CD52 agent, an agonistic anti-A33 agent, an agonistic anti-GD3 agent, an agonistic anti-PSMA agent, an agonistic anti-Ceacan 1 agent, an agonistic anti-Galedin 9 agent, an agonistic anti-HVEM agent, an agonistic anti-VISTA agent, an agonistic anti-B7 H4 agent, an agonistic anti-HHLA2 agent, an agonistic anti-CD155 agent, an agonistic anti-CD80 agent, an agonistic anti-BTLA agent, an agonistic anti-CD160 agent, an agonistic anti-CD28 agent, an agonistic anti-CD226 agent, an agonistic anti-CEACAM1 agent, an agonistic anti-TIM3 agent, an agonistic anti-TIGIT agent, an agonistic anti-CD96 agent, an agonistic anti-CD70 agent, an agonistic anti-CD27 agent, an agonistic anti-LIGHT agent, an agonistic anti-CD137 agent, an agonistic anti-DR4 agent, an agonistic anti-CR5 agent, an agonistic anti-TNFRS agent, an agonistic anti-TNFR1 agent, an agonistic anti-FAS agent, an agonistic anti-CD95 agent, an agonistic anti-TRAIL agent, an agonistic anti-DR6 agent, an agonistic anti-EDAR agent, an agonistic anti-NGFR agent, an agonistic anti-OPG agent, an agonistic anti-RANKL agent, an agonistic anti-LTβ receptor agent, an agonistic anti-BCMA agent, an agonistic anti-TACI agent, an agonistic anti-BAFFR agent, an agonistic anti-EDAR2 agent, an agonistic anti-TROY agent, and an agonistic anti-RELT agent. For example, the immunotherapy agent may be an agonistic anti-CTLA-4 agent, an agonistic anti-PD-1 agent, or an agonistic anti-PD-L1 agent.

The immunotherapy agent administered to the human may be, for example, selected from the group consisting of an agonistic anti-CTLA-4 antibody or antigen-binding fragment thereof, an agonistic anti-PD-1 antibody or antigen-binding fragment thereof, an agonistic anti-PD-L1 antibody or antigen-binding fragment thereof, an agonistic anti-PD-L2 antibody or antigen-binding fragment thereof, an agonistic anti-CD27 antibody or antigen-binding fragment thereof, an agonistic anti-CD30 antibody or antigen-binding fragment thereof, an agonistic anti-CD40 antibody or antigen-binding fragment thereof, an agonistic anti-4-1 BB antibody or antigen-binding fragment thereof, an agonistic anti-GITR antibody or antigen-binding fragment thereof, an agonistic anti-OX40 antibody or antigen-binding fragment thereof, an agonistic anti-TRAILR1 antibody or antigen-binding fragment thereof, an agonistic anti-TRAILR2 antibody or antigen-binding fragment thereof, an agonistic anti-TWEAK antibody or antigen-binding fragment thereof, an agonistic anti-TWEAKR antibody or antigen-binding fragment thereof, an agonistic anti-cell surface lymphocyte protein antibody or antigen-binding fragment thereof, an agonistic anti-BRAF antibody or antigen-binding fragment thereof, an agonistic anti-MEK antibody or antigen-binding fragment thereof, an agonistic anti-CD33 antibody or antigen-binding fragment thereof, an agonistic anti-CD20 antibody or antigen-binding fragment thereof, an agonistic anti-HLA-DR antibody or antigen-binding fragment thereof, an agonistic anti-HLA class I antibody or antigen-binding fragment thereof, an agonistic anti-CD52 antibody or antigen-binding fragment thereof, an agonistic anti-A33 antibody or antigen-binding fragment thereof, an agonistic anti-GD3 antibody or antigen-binding fragment thereof, an agonistic anti-PSMA antibody or antigen-binding fragment thereof, an agonistic anti-Ceacan 1 antibody or antigen-binding fragment thereof, an agonistic anti-Galedin 9 antibody or antigen-binding fragment thereof, an agonistic anti-HVEM antibody or antigen-binding fragment thereof, an agonistic anti-VISTA antibody or antigen-binding fragment thereof, an agonistic anti-B7 H4 antibody or antigen-binding fragment thereof, an agonistic anti-HHLA2 antibody or antigen-binding fragment thereof, an agonistic anti-CD155 antibody or antigen-binding fragment thereof, an agonistic anti-CD80 antibody or antigen-binding fragment thereof, an agonistic anti-BTLA antibody or antigen-binding fragment thereof, an agonistic anti-CD160 antibody or antigen-binding fragment thereof, an agonistic anti-CD28 antibody or antigen-binding fragment thereof, an agonistic anti-CD226 antibody or antigen-binding fragment thereof, an agonistic anti-CEACAM1 antibody or antigen-binding fragment thereof, an agonistic anti-TIM3 antibody or antigen-binding fragment thereof, an agonistic anti-TIGIT antibody or antigen-binding fragment thereof, an agonistic anti-CD96 antibody or antigen-binding fragment thereof, an agonistic anti-CD70 antibody or antigen-binding fragment thereof, an agonistic anti-CD27 antibody or antigen-binding fragment thereof, an agonistic anti-LIGHT antibody or antigen-binding fragment thereof, an agonistic anti-CD137 antibody or antigen-binding fragment thereof, an agonistic anti-DR4 antibody or antigen-binding fragment thereof, an agonistic anti-CR5 antibody or antigen-binding fragment thereof, an agonistic anti-TNFRS antibody or antigen-binding fragment thereof, an agonistic anti-TNFR1 antibody or antigen-binding fragment thereof, an agonistic anti-FAS antibody or antigen-binding fragment thereof, an agonistic anti-CD95 antibody or antigen-binding fragment thereof, an agonistic anti-TRAIL antibody or antigen-binding fragment thereof, an agonistic anti-DR6 antibody or antigen-binding fragment thereof, an agonistic anti-EDAR antibody or antigen-binding fragment thereof, an agonistic anti-NGFR antibody or antigen-binding fragment thereof, an agonistic anti-OPG antibody or antigen-binding fragment thereof, an agonistic anti-RANKL antibody or antigen-binding fragment thereof, an agonistic anti-LTβ receptor antibody or antigen-binding fragment thereof, an agonistic anti-BCMA antibody or antigen-binding fragment thereof, an agonistic anti-TACI antibody or antigen-binding fragment thereof, an agonistic anti-BAFFR antibody or antigen-binding fragment thereof, an agonistic anti-EDAR2 antibody or antigen-binding fragment thereof, an agonistic anti-TROY antibody or antigen-binding fragment thereof, and an agonistic anti-RELT antibody or antigen-binding fragment thereof. For example, the immunotherapy agent may be an agonistic anti-CTLA-4 antibody or antigen-binding fragment thereof, an agonistic anti-PD-1 antibody or antigen-binding fragment thereof, or an agonistic anti-PD-L1 antibody or antigen-binding fragment thereof.

In some embodiments of the eighth, ninth, tenth, and/or eleventh aspect, the method includes administering to the mammal (e.g., a human) an agonistic anti-cell surface lymphocyte protein antibody or antigen-binding fragment thereof, such as an antibody or antigen-binding fragment thereof that binds and activates one or more of CD1, CD2, CD3, CD4, CD5, CD6, CD7, CD8, CD9, CD10, CD11, CD12, CD13, CD14, CD15, CD16, CD17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42, CD43, CD44, CD45, CD46, CD47, CD48, CD49, CD50, CD51, CD52, CD53, CD54, CD55, CD56, CD57, CD58, CD59, CD60, CD61, CD62, CD63, CD64, CD65, CD66, CD67, CD68, CD69, CD70, CD71, CD72, CD73, CD74, CD75, CD76, CD77, CD78, CD79, CD80, CD81, CD82, CD83, CD84, CD85, CD86, CD87, CD88, CD89, CD90, CD91, CD92, CD93, CD94, CD95, CD96, CD97, CD98, CD99, CD100, CD101, CD102, CD103, CD104, CD105, CD106, CD107, CD108, CD109, CD110, CD111, CD112, CD113, CD114, CD115, CD116, CD117, CD118, CD119, CD120, CD121, CD122, CD123, CD124, CD125, CD126, CD127, CD128, CD129, CD130, CD131, CD132, CD133, CD134, CD135, CD136, CD137, CD138, CD139, CD140, CD141, CD142, CD143, CD144, CD145, CD146, CD147, CD148, CD149, CD150, CD151, CD152, CD153, CD154, CD155, CD156, CD157, CD158, CD159, CD160, CD161, CD162, CD163, CD164, CD165, CD166, CD167, CD168, CD169, CD170, CD171, CD172, CD173, CD174, CD175, CD176, CD177, CD178, CD179, CD180, CD181, CD182, CD183, CD184, CD185, CD186, CD187, CD188, CD189, CD190, CD191, CD192, CD193, CD194, CD195, CD196, CD197, CD198, CD199, CD200, CD201, CD202, CD203, CD204, CD205, CD206, CD207, CD208, CD209, CD210, CD211, CD212, CD213, CD214, CD215, CD216, CD217, CD218, CD219, CD220, CD221, CD222, CD223, CD224, CD225, CD226, CD227, CD228, CD229, CD230, CD231, CD232, CD233, CD234, CD235, CD236, CD237, CD238, CD239, CD240, CD241, CD242, CD243, CD244, CD245, CD246, CD247, CD248, CD249, CD250, CD251, CD252, CD253, CD254, CD255, CD256, CD257, CD258, CD259, CD260, CD261, CD262, CD263, CD264, CD265, CD266, CD267, CD268, CD269, CD270, CD271, CD272, CD273, CD274, CD275, CD276, CD277, CD278, CD279, CD280, CD281, CD282, CD283, CD284, CD285, CD286, CD287, CD288, CD289, CD290, CD291, CD292, CD293, CD294, CD295, CD296, CD297, CD298, CD299, CD300, CD301, CD302, CD303, CD304, CD305, CD306, CD307, CD308, CD309, CD310, CD311, CD312, CD313, CD314, CD315, CD316, CD317, CD318, CD319, and/or CD320.

In some embodiments of the eighth, ninth, tenth, and/or eleventh aspect, the method includes administering to the mammal (e.g., a human) an agent (e.g., a polypeptide, antibody, antigen-binding fragment thereof, a single-chain polypeptide, or construct thereof) that binds and activates a chemokine or lymphokine. For instance, the immunotherapy agent may be an agent (e.g., polypeptide, antibody, antigen-binding fragment thereof, single-chain polypeptide, or construct thereof) that bind and activates the activity of one or more, or all, of CXCL1, CXCL2, CXCL3, CXCL8, CCL2 and CCL5. In some embodiments, the immunotherapy agent is an agent (e.g., a polypeptide, antibody, antigen-binding fragment thereof, a single-chain polypeptide, or construct thereof) that binds and activates one or more, or all, of CCL3, CCL4, CCL8, and CCL22.

In some embodiments of the eighth, ninth, tenth, and/or eleventh aspect, the mammal (e.g., human) is not administered an anti-TNFα agent, such as an anti-TNFα antibody or antigen-binding fragment thereof. In some embodiments of the eighth, ninth, tenth, and/or eleventh aspect, the mammal (e.g., human) is not administered infliximab, etanercept, certolizumab, golimumab, or adalimumab.

In some embodiments of the eighth, ninth, tenth, and/or eleventh aspect, the polypeptide, such as the single-chain polypeptide, antibody, antigen-binding fragment thereof, or construct, which specifically binds TNFR2 is administered to the mammal (e.g., a human) in an amount of from about 0.001 mg/kg to about 100 mg/kg, such as in an amount of from about 0.01 mg/kg to about 10 mg/kg.

A twelfth aspect features a kit containing the polypeptide (e.g., a single-chain polypeptide, antibody, antigen-binding fragment thereof, or construct thereof) of the first aspect or any embodiments thereof, the construct of the second aspect or any embodiments thereof, the polynucleotide of the third aspect or any embodiments thereof, the vector of the fourth aspect or any embodiments thereof, the host cell of the fifth aspect or any embodiments thereof, and/or the pharmaceutical composition of the sixth aspect or any embodiments thereof.

In some embodiments, the kit contains instructions for transfecting the vector into a host cell. Additionally or alternatively, the kit may contain instructions for expressing the polypeptide (e.g., a single-chain polypeptide, antibody, antigen-binding fragment thereof, or construct thereof) in the host cell. The kit may include a reagent that can be used to express the polypeptide (e.g., a single-chain polypeptide, antibody, antigen-binding fragment thereof, or construct thereof) in the host cell. In some embodiments, the kit includes instructions for administering the agent to a mammal (e.g., a human), such as a human patient suffering from a cell proliferation disorder and/or an infectious disease described herein. In some embodiments, the kit contains instructions for making or using the agent.

Definitions

As used herein, the term "about" refers to a value that is no more than 10% above or below the value being described. For example, the term "about 5 nM" indicates a range of from 4.5 nM to 5.5 nM.

As used herein, the terms "agonist TNFR2 antibody" and "agonistic TNFR2 antibody" refer to TNFR2 antibodies that are capable of promoting or increasing activation of TNFR2 and/or potentiating one or more signal transduction pathways mediated by TNFR2. For example, agonistic TNFR2 antibodies of the invention can promote or increase the proliferation of a population of Treg cells. Agonistic TNFR2 antibodies of the invention may promote or increase TNFR2 activation by binding TNFR2, e.g., so as to induce a conformational change that renders the receptor biologically active. For instance, agonistic TNFR2 antibodies may nucleate the trimerization of TNFR2 in a manner similar to the interaction between TNFR2 and its cognate ligand, TNFα, thus inducing TNFR2-mediated signalling. Agonistic TNFR2 antibodies of the invention may be capable of inducing the proliferation of CD4+, CD25+, FOXP3+ Treg cells. Agonistic TNFR2 antibodies of the invention may also be capable of suppressing the proliferation of B lymphocytes and/or cytotoxic T lymphocytes (e.g., CD8+ T cells), for example, through activation of immunomodulatory Treg cells or by directly binding TNFR2 on the surface of an immune effector cell (such as an autoreactive cytotoxic T cell) and inducing apoptosis. Unless otherwise noted, the terms "agonist TNFR2 antibody" and "agonistic TNFR2 antibody" also include antibody fragments, e.g., those described below, that retain the ability to bind TNFR2 and potentiate TNFR2 signal transduction.

As used herein, the term "antibody" (Ab) refers to an immunoglobulin molecule that specifically binds to, or is immunologically reactive with, a particular antigen, and includes polyclonal, monoclonal, genetically engineered and otherwise modified forms of antibodies, including but not limited to chimeric antibodies, humanized antibodies, heteroconjugate antibodies (e.g., bi- tri- and quad-specific antibodies, diabodies, triabodies, and tetrabodies), and antigen-binding fragments of antibodies, including e.g., Fab', F(ab')$_2$, Fab, Fv, recombinant IgG (rIgG) fragments, and scFv fragments. Moreover, unless otherwise indicated, the term "monoclonal antibody" (mAb) is meant to include both intact molecules, as well as antibody fragments (such as, for example, Fab and F(ab')$_2$ fragments) that are capable of specifically binding to a target protein. Fab and F(ab')$_2$ fragments lack the Fc fragment of an intact antibody, clear more rapidly from the circulation of the animal, and may have less non-specific tissue binding than an intact antibody (see Wahl et al., J. Nucl. Med. 24:316, 1983; incorporated herein by reference).

The term "antigen-binding fragment," as used herein, refers to one or more fragments of an antibody that retain the ability to specifically bind to a target antigen. The antigen-binding function of an antibody can be performed by fragments of a full-length antibody. The antibody fragments can be, e.g., a Fab, F(ab')$_2$, scFv, SMIP, diabody, a triabody, an affibody, a nanobody, an aptamer, or a domain antibody. Examples of binding fragments encompassed by the term "antigen-binding fragment" of an antibody include, but are not limited to: (i) a Fab fragment, a monovalent fragment consisting of the $V_L$, $V_H$, $C_L$, and $C_H1$ domains; (ii) a F(ab')$_2$ fragment, a bivalent fragment comprising two Fab fragments linked by a disulfide bridge at the hinge region; (iii) a Fd fragment consisting of the $V_H$ and $C_H1$ domains; (iv) a Fv fragment consisting of the $V_L$ and $V_H$ domains of a single arm of an antibody, (v) a dAb including $V_H$ and $V_L$ domains; (vi) a dAb fragment (Ward et al., Nature 341:544-546, 1989), which consists of a $V_H$ domain; (vii) a dAb which consists of a $V_H$ or a $V_L$ domain; (viii) an isolated complementarity determining region (CDR); and (ix) a combination of two or more isolated CDRs which may optionally be joined by a synthetic linker. Furthermore, although the two domains of the Fv fragment, $V_L$ and $V_H$, are coded for by separate genes, they can be joined, using recombinant methods, by a linker that enables them to be made as a single protein chain in which the $V_L$ and $V_H$ regions pair to form monovalent molecules (known as single chain Fv (scFv); see, e.g., Bird et al., Science 242:423-426, 1988, and Huston et al., Proc. Natl. Acad. Sci. USA 85:5879-5883, 1988). These antibody fragments can be obtained using conventional techniques known to those of skill in the art, and the fragments can be screened for utility in the same manner as intact antibodies. Antigen-binding fragments can be produced by recombinant DNA techniques, enzymatic or chemical cleavage of intact immunoglobulins, or, in some embodiments, by chemical peptide synthesis procedures known in the art.

As used herein, the terms "anti-tumor necrosis factor receptor 2 antibody," "TNFR2 antibody," "anti-TNFR2 antibody portion," and/or "anti-TNFR2 antibody fragment" and the like include any protein or peptide-containing molecule that includes at least a portion of an immunoglobulin molecule, such as but not limited to at least one complementarity determining region (CDR) of a heavy or light chain or a ligand binding portion thereof, a heavy chain or light chain variable region, a heavy chain or light chain constant region, a framework region, or any portion thereof, that is capable of specifically binding to TNFR2. TNFR2 antibodies also include antibody-like protein scaffolds, such as the tenth fibronectin type III domain ($^{10}$Fn3), which contains BC, DE, and FG structural loops similar in structure and solvent accessibility to antibody CDRs. The tertiary structure of the $^{10}$Fn3 domain resembles that of the variable region of the IgG heavy chain, and one of skill in the art can graft, e.g., the CDRs of a TNFR2 monoclonal antibody onto the fibronectin scaffold by replacing residues of the BC, DE, and FG loops of $^{10}$Fn3 with residues from the CDRH-1, CDRH-2, or CDRH-3 regions of a TNFR2 monoclonal antibody. The use of $^{10}$Fn3 domains as scaffolds for epitope grafting is described, e.g., in WO 2000/034784, the disclosure of which is incorporated herein by reference. Additional scaffold proteins encompassed by the term "anti-tumor necrosis factor receptor 2 antibody," "TNFR2 antibody," and the like include peptide-Fc fusion proteins (described, e.g., in WO 2012/122378; as well as in U.S. Pat. No. 8,633,297; the disclosures of each of which are incorporated herein by reference).

As used herein, the term "bispecific antibodies" refers to monoclonal, often human or humanized antibodies that have binding specificities for at least two different antigens. Bispecific TNFR2 antibodies of the invention may have binding specificities that are directed towards TNFR2 and any other antigen, e.g., for a cell-surface protein, receptor, receptor subunit, or tissue-specific antigen. A bispecific antibody may also be an antibody or antigen-binding fragment thereof that includes two separate antigen-binding domains (e.g., two scFvs joined by a linker). The scFvs may bind the same antigen or different antigens.

As used herein, the term "chimeric" antibody refers to an antibody having variable domain sequences (e.g., CDR sequences) derived from an immunoglobulin of one source organism, such as rat or mouse, and constant regions derived from an immunoglobulin of a different organism (e.g., a human, another primate, pig, goat, rabbit, hamster, cat, dog, guinea pig, member of the bovidae family (such as cattle, bison, buffalo, elk, and yaks, among others), cow, sheep, horse, or bison, among others). Methods for producing chimeric antibodies are known in the art. See, e.g., Morrison, 1985, Science 229(4719): 1202-7; Oi et al, 1986, BioTechniques 4:214-221; Gillies et al, 1985, J. Immunol. Methods 125:191-202; U.S. Pat. Nos. 5,807,715; 4,816,567; and 4,816,397; incorporated herein by reference.

As used herein, the term "complementarity determining region" (CDR) refers to a hypervariable region found both in the light chain and the heavy chain variable domains. The more highly conserved portions of variable domains are called the framework regions (FRs). As is appreciated in the art, the amino acid positions that delineate a hypervariable region of an antibody can vary, depending on the context and the various definitions known in the art. Some positions within a variable domain may be viewed as hybrid hypervariable positions in that these positions can be deemed to be within a hypervariable region under one set of criteria while being deemed to be outside a hypervariable region under a different set of criteria. One or more of these positions can also be found in extended hypervariable regions. The invention includes antibodies comprising modifications in these hybrid hypervariable positions. The variable domains of native heavy and light chains each comprise four framework regions that primarily adopt a β-sheet configuration, connected by three CDRs, which form loops that connect, and in some cases form part of, the β-sheet structure. The CDRs in each chain are held together in close proximity by the FR regions in the order FR1-CDR1-FR2-CDR2-FR3-CDR3-FR4 and, with the CDRs from the other antibody chains, contribute to the formation of the target binding site of antibodies (see Kabat et al, Sequences of Proteins of Immunological Interest (National Institute of Health, Bethesda, Md. 1987; incorporated herein by reference). As used herein, numbering of immunoglobulin amino acid residues is done according to the immunoglobulin amino acid residue numbering system of Kabat et al, unless otherwise indicated.

As used herein, the terms "conservative mutation," "conservative substitution," or "conservative amino acid substitution" refer to a substitution of one or more amino acids for one or more different amino acids that exhibit similar physicochemical properties, such as polarity, electrostatic charge, and/or steric volume. These properties are summarized for each of the twenty naturally-occurring amino acids in Table 1 below.

TABLE 1

Representative physicochemical properties of naturally-occurring amino acids

| Amino Acid | 3 Letter Code | 1 Letter Code | Side-chain Polarity | Electrostatic character at physiological pH (7.4) | Steric Volume[†] |
|---|---|---|---|---|---|
| Alanine | Ala | A | nonpolar | neutral | small |
| Arginine | Arg | R | polar | cationic | large |
| Asparagine | Asn | N | polar | neutral | intermediate |
| Aspartic acid | Asp | D | polar | anionic | intermediate |
| Cysteine | Cys | C | nonpolar | neutral | intermediate |
| Glutamic acid | Glu | E | polar | anionic | intermediate |
| Glutamine | Gln | Q | polar | neutral | intermediate |
| Glycine | Gly | G | nonpolar | neutral | small |
| Histidine | His | H | polar | Both neutral and cationic forms in equilibrium at pH 7.4 | large |
| Isoleucine | Ile | I | nonpolar | neutral | large |
| Leucine | Leu | L | nonpolar | neutral | large |
| Lysine | Lys | K | polar | cationic | large |
| Methionine | Met | M | nonpolar | neutral | large |
| Phenylalanine | Phe | F | nonpolar | neutral | large |
| Proline | Pro | P | nonpolar | neutral | intermediate |
| Serine | Ser | S | polar | neutral | small |
| Threonine | Thr | T | polar | neutral | intermediate |
| Tryptophan | Trp | W | nonpolar | neutral | bulky |
| Tyrosine | Tyr | Y | polar | neutral | large |
| Valine | Val | V | nonpolar | neutral | intermediate |

[†]based on volume in A$^3$: 50-100 is small, 100-150 is intermediate, 150-200 is large, and >200 is bulky From this table it is appreciated that the conservative amino acid families include, e.g., (i) G, A, V, L, I, P, and M; (ii) D and E; (iii) C, S and T; (iv) H, K and R; (v) N and Q; and (vi) F, Y and W. A conservative mutation or substitution is therefore one that substitutes one amino acid for a member of the same amino acid family (e.g., a substitution of Ser for Thr or Lys for Arg).

As used herein, the term "conjugate" refers to a compound formed by the chemical bonding of a reactive functional group of one molecule with an appropriately reactive functional group of another molecule. Conjugates may additionally be produced, e.g., as two polypeptide domains covalently bound to one another as part of a single polypeptide chain that is synthesized by the translation of a single RNA transcript encoding both polypeptides in frame with one another.

As used herein in the context of a TNFR2 agonist, the term "construct" refers to a fusion protein containing a first polypeptide domain bound to a second polypeptide domain. The polypeptide domains may each independently be agonist TNFR2 single chain polypeptides, for instance, as described herein. The first polypeptide domain may be covalently bound to the second polypeptide domain, for instance, by way of a linker, such as a peptide linker or a disulfide bridge, among others. Exemplary linkers that may be used to join the polypeptide domains of an agonistic TNFR2 construct include, without limitation, those that are described in Leriche et al., Bioorg. Med. Chem., 20:571-582 (2012), the disclosure of which is incorporated herein by reference in its entirety.

As used herein, the term "derivatized antibodies" refers to antibodies that are modified by a chemical reaction so as to cleave residues or add chemical moieties not native to an isolated antibody. Derivatized antibodies can be obtained by glycosylation, acetylation, pegylation, phosphorylation, amidation, derivatization by addition of known chemical protecting/blocking groups, proteolytic cleavage, and/or linkage to a cellular ligand or other protein. Any of a variety of chemical modifications can be carried out by known techniques, including, without limitation, specific chemical cleavage, acetylation, formylation, metabolic synthesis of tunicamycin, etc. using established procedures. Additionally, the derivative can contain one or more non-natural amino acids, e.g., using amber suppression technology (see, e.g., U.S. Pat. No. 6,964,859; incorporated herein by reference).

As used herein, the term "diabodies" refers to bivalent antibodies comprising two polypeptide chains, in which each polypeptide chain includes $V_H$ and $V_L$ domains joined by a linker that is too short (e.g., a linker composed of five amino acids) to allow for intramolecular association of VH and VL domains on the same peptide chain. This configuration forces each domain to pair with a complementary domain on another polypeptide chain so as to form a homodimeric structure. Accordingly, the term "triabodies" refers to trivalent antibodies comprising three peptide chains, each of which contains one VH domain and one VL domain joined by a linker that is exceedingly short (e.g., a linker composed of 1-2 amino acids) to permit intramolecular association of VH and VL domains within the same peptide chain. In order to fold into their native structure, peptides configured in this way typically trimerize so as to position the VH and VL domains of neighboring peptide chains spatially proximal to one another to permit proper folding (see Holliger et al., Proc. Natl. Acad. Sci. USA 90:6444-48, 1993; incorporated herein by reference).

As used herein, a "disulfide-bonded isoform" of an antibody or antigen-binding fragment thereof is a form of the antibody or antigen-binding fragment thereof having a particular internal disulfide bonding pattern. Disulfide-bonded isoforms are structural isomers of a given antibody or antigen-binding fragment thereof that do not differ from one another in amino acid sequence but exhibit different disulfide bond connectivities. For example, in the context of a human IgG2 antibody or variant thereof, the antibody may exist in one of four possible disulfide-bonded isoforms, represented herein as isoforms IgG2-A, IgG2-B, IgG2-A/$B_1$, and IgG2-A/$B_2$. The disulfide bonding connectivities within each of these isoforms are shown graphically in FIGS. 5A-5D.

As used herein, a "dominant agonist" of TNFR2 is an agonist (e.g., an agonistic polypeptide, such as a single-chain polypeptide, antibody, or antigen-binding fragment thereof) that is capable of promoting TNFR2 activation even in the absence of a natural TNFR2 ligand, such as TNFα. For example, a TNFR2 agonist is a dominant agonist if the $EC_{50}$ of the agonist increases by less than 200% (e.g., less than 200%, 100%, 50%, 45%, 40%, 35%, 30%, 25%, 20%, 15%, 10%, 5%, 1%, or less) in the absence of a natural TNFR2 ligand, such as TNFα. TNFR2 activation can be assessed, for instance, by measuring the proliferation of TNFR2+ cells, such as Treg cells, MDSCs, parenchymal cells, and cells of the central nervous system, among others, as well as by measuring the activation of NFκB signaling (e.g., by monitoring the expression of one or more genes selected from the group consisting of CHUK, NFKBIE, NFKBIA, MAP3K11, TRAF2, TRAF3, relB, and cIAP2/BIRC3 in a gene expression assay).

As used herein, a "dual variable domain immunoglobulin" ("DVD-Ig") refers to an antibody that combines the target-binding variable domains of two monoclonal antibodies via linkers to create a tetravalent, dual-targeting single agent. (Gu et al., Meth. Enzymol., 502:25-41, 2012; incorporated by reference herein). Suitable linkers for use in the light chains of the DVDs described herein include those identified on Table 2.1 on page 30 of Gu et al.: the short K chain linkers ADAAP (SEQ ID NO: 24) (murine) and TVAAP (SEQ ID NO: 25) (human); the long K chain linkers ADAAPTVSIFP (SEQ ID NO: 26) (murine) and TVAAPSVFIFPP (SEQ ID NO: 27) (human); the short A chain linker QPKAAP (SEQ ID NO: 28) (human); the long A chain linker QPKAAPSVTLFPP (SEQ ID NO: 29) (human); the GS-short linker GGSGG (SEQ ID NO: 30), the GS-medium linker GGSGGGGSG (SEQ ID NO: 31), and the GS-long linker GGSGGGGSGGGS (SEQ ID NO: 32) (all GS linkers are murine and human). Suitable linkers for use in the heavy chains of the DVDs include those identified on Table 2.1 on page 30 of Gu & Ghayur, 2012, Methods in Enzymology 502:25-41, incorporated by reference herein: the short linkers AKTTAP (SEQ ID NO: 33) (murine) and ASTKGP (SEQ ID NO: 34) (human); the long linkers AKTTAPSVYPLAP (SEQ ID NO: 35) (murine) and ASTKGPSVFPLAP (SEQ ID NO: 36) (human); the GS-short linker GGGGSG (SEQ ID NO: 37), the GS-medium linker GGGGSGGGGS (SEQ ID NO: 38), and the GS-long linker GGGGSGGGGSGGGG (SEQ ID NO: 39) (all GS linkers are murine and human).

As used herein, the term "endogenous" describes a molecule (e.g., a polypeptide, nucleic acid, or cofactor) that is found naturally in a particular organism (e.g., a human) or in a particular location within an organism (e.g., an organ, a tissue, or a cell, such as a human cell).

As used herein, the term "epitope" refers to a portion of an antigen that is recognized and bound by a polypeptide, such as an antibody, antigen-binding fragment thereof, single-chain polypeptide, or construct described herein. In the context of a protein antigen (such as TNFR2, e.g., human TNFR2 designated by SEQ ID NO: 1 or TNFR2 of a non-human mammal, such as a non-human mammal described herein), an epitope may be a continuous epitope, which is a single, uninterrupted segment of one or more amino acids covalently linked to one another by peptide bonds in which the component amino acids of the epitope are bound by the polypeptide (e.g., antibody, antigen-binding fragment thereof, single-chain polypeptide, or construct). Exemplary assays for determining the binding of an agonistic TNFR2 polypeptide to specific amino acids within an antigen are described in Example 1, below. Continuous epitopes may be composed, for instance, of 1, 5, 10, 15, 20, or more amino acids within an antigen, such as a TNFR2 protein described herein (for instance, human TNFR2 designated by SEQ ID NO: 1). For example, a continuous epitope may be composed of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more amino acids within an antigen). Examples of continuous epitopes on TNFR2 that are bound by agonistic polypeptides (e.g., single-chain polypeptides, antibodies, antigen-binding fragments thereof, and constructs) described herein include one or more continuous residues of, or all residues of, the KCSPG motif (SEQ ID NO: 40), as well as corresponding regions on TNFR2 proteins of non-human mammals (e.g., bison, cattle, and others described herein). In some embodiments, an epitope may be a discontinuous epitope, which contains two or more segments of amino acids each separated from one another in an antigen's amino acid sequence by one or more intervening amino acid residues. Discontinuous epitopes may be composed, for instance, of 1, 2, 3, 4, 5, 6, 7, 8, 9, 10, or more such segments of amino acid residues, such as segments containing (i) one or more amino acids from within the KCSPG motif (SEQ ID NO: 40) of human TNFR2, or an equivalent region of a non-human TNFR2, and (ii) one or more amino acids from elsewhere in cysteine cysteine-rich domain 1 (CRD1, residues 48-76) of human TNFR2, or an equivalent region of a non-human TNFR2.

As used herein, the term "exogenous" describes a molecule (e.g., a polypeptide, nucleic acid, or cofactor) that is not found naturally in a particular organism (e.g., a human) or in a particular location within an organism (e.g., an organ, a tissue, or a cell, such as a human cell). Exogenous materials include those that are provided from an external source to an organism or to cultured matter extracted there from.

As used herein, the term "framework region" or "FW region" includes amino acid residues that are adjacent to the CDRs. FW region residues may be present in, for example, human antibodies, rodent-derived antibodies (e.g., murine antibodies), humanized antibodies, primatized antibodies, chimeric antibodies, antibody fragments (e.g., Fab fragments), single-chain antibody fragments (e.g., scFv fragments), antibody domains, and bispecific antibodies, among others.

As used herein, the term "fusion protein" refers to a protein that is joined via a covalent bond to another molecule. A fusion protein can be chemically synthesized by, e.g., an amide-bond forming reaction between the N-terminus of one protein to the C-terminus of another protein. Alternatively, a fusion protein containing one protein covalently bound to another protein can be expressed recombinantly in a cell (e.g., a eukaryotic cell or prokaryotic cell) by expression of a polynucleotide encoding the fusion protein, for example, from a vector or the genome of the cell. A fusion protein may contain one protein that is covalently bound to a linker, which in turn is covalently bound to another molecule. Examples of linkers that can be used for the formation of a fusion protein include peptide-containing linkers, such as those that contain naturally occurring or non-naturally occurring amino acids. In some embodiments, it may be desirable to include D-amino acids in the linker, as these residues are not present in naturally-occurring proteins and are thus more resistant to degradation by endogenous proteases. Linkers can be prepared using a variety of strategies that are well known in the art, and depending on the reactive components of the linker, can be cleaved by enzymatic hydrolysis, photolysis, hydrolysis under acidic conditions, hydrolysis under basic conditions, oxidation, disulfide reduction, nucleophilic cleavage, or organometallic cleavage (Leriche et al., Bioorg. Med. Chem., 20:571-582, 2012).

As used herein, the term "heterospecific antibodies" refers to monoclonal, preferably human or humanized, antibodies that have binding specificities for at least two different antigens. Traditionally, the recombinant production of heterospecific antibodies is based on the co-expression of two immunoglobulin heavy chain-light chain pairs, where the two heavy chains have different specificities (Milstein et al., Nature 305:537, 1983). Similar procedures are disclosed, e.g., in WO 93/08829, U.S. Pat. Nos. 6,210,668; 6,193,967; 6,132,992; 6,106,833; 6,060,285; 6,037,453; 6,010,902; 5,989,530; 5,959,084; 5,959,083; 5,932,448; 5,833,985; 5,821,333; 5,807,706; 5,643,759, 5,601,819; 5,582,996, 5,496,549, 4,676,980, WO 91/00360, WO 92/00373, EP 03089, Traunecker et al., EMBO J. 10:3655 (1991), Suresh et al., Methods in Enzymology 121:210 (1986); incorporated herein by reference. Heterospecific antibodies can include Fc mutations that enforce correct chain association in multi-specific antibodies, as described by Klein et al, mAbs 4(6):653-663, 2012; incorporated herein by reference.

As used herein, the term "human antibody" refers to an antibody in which substantially every part of the protein (e.g., CDR, framework, $C_L$, $C_H$ domains (e.g., $C_H1$, $C_H2$, $C_H3$), hinge, ($V_L$, $V_H$)) is substantially non-immunogenic in humans, with only minor sequence changes or variations. A human antibody can be produced in a human cell (e.g., by recombinant expression), or by a non-human animal or a prokaryotic or eukaryotic cell that is capable of expressing functionally rearranged human immunoglobulin (e.g., heavy chain and/or light chain) genes. Further, when a human antibody is a single-chain antibody, it can include a linker peptide that is not found in native human antibodies. For example, an Fv can comprise a linker peptide, such as two to about eight glycine or other amino acid residues, which connects the variable region of the heavy chain and the variable region of the light chain. Human antibodies can be made by a variety of methods known in the art including phage display methods using antibody libraries derived from human immunoglobulin sequences. See U.S. Pat. Nos. 4,444,887 and 4,716,111; and PCT publications WO 1998/46645; WO 1998/50433; WO 1998/24893; WO 1998/16654; WO 1996/34096; WO 1996/33735; and WO 1991/10741; incorporated herein by reference. Human antibodies can also be produced using transgenic mice that are incapable of expressing functional endogenous immunoglobulins, but which can express human immunoglobulin genes. See, e.g., PCT publications WO 98/24893; WO 92/01047; WO 96/34096; WO 96/33735; U.S. Pat. Nos. 5,413,923; 5,625,126; 5,633,425; 5,569,825; 5,661,016; 5,545,806; 5,814,318; 5,885,793; 5,916,771; and 5,939,598; incorporated by reference herein.

As used herein, the term "humanized" antibodies refers to forms of non-human (e.g., murine) antibodies that are chimeric immunoglobulins, immunoglobulin chains or fragments thereof (such as Fv, Fab, Fab', F(ab')$_2$ or other target-binding subdomains of antibodies) which contain minimal sequences derived from non-human immunoglobulin. In general, the humanized antibody will comprise substantially all of at least one, and typically two, variable domains, in which all or substantially all of the CDR regions correspond to those of a non-human immunoglobulin. All or substantially all of the FR regions may also be those of a human immunoglobulin sequence. The humanized antibody can also comprise at least a portion of an immunoglobulin constant region (Fc), typically that of a human immunoglobulin consensus sequence. Methods of antibody humanization are known in the art. See, e.g., Riechmann et al., Nature 332:323-7, 1988; U.S. Pat. Nos. 5,530,101; 5,585,089; 5,693,761; 5,693,762; and 6,180,370 to Queen et al; EP239400; PCT publication WO 91/09967; U.S. Pat. No. 5,225,539; EP592106; and EP519596; incorporated herein by reference.

As used herein, the term "hydrophobic side-chain" refers to an amino acid side-chain that exhibits low solubility in water relative to, e.g., the steric or electronic properties of the chemical moieties present within the side-chain. Examples of amino acids containing hydrophobic side-chains include those containing unsaturated aliphatic hydrocarbons, such as alanine, valine, leucine, isoleucine, proline, and methionine, as well as amino acids containing aromatic ring systems that are electrostatically neutral at physiological pH, such as tryptophan, phenylalanine, and tyrosine.

As used herein, the term "immunotherapy agent" refers to a compound, such as an antibody, antigen-binding fragment thereof, single-chain polypeptide, or construct as described herein, that specifically binds an immune checkpoint protein (e.g., immune checkpoint receptor or ligand) and exerts an agonistic effect on the receptor or ligand, thereby promoting the signal transduction of the receptor or ligand and, e.g., downregulating the immune response. Immunotherapy agents include compounds, such as antibodies, antigen-binding fragments, single-chain polypeptides, and constructs, capable of specifically binding receptors expressed on the surfaces of hematopoietic cells, such as lymphocytes (e.g., T cells), and activating the signaling induced by the receptor or ligand that leads to tolerance towards, e.g., an endogenous ("self") antigen. Immunotherapy agents may augment the signaling induced by the receptor or ligand by, for example, 1%, 2%, 3%, 4%, 5%, 10%, 20%, 30%, 40%, 50%, 60%, 70%, 80%, 90%, 95%, 96%, 97%, 98%, 99%, 99.9%, 100%, 200%, 300%, 400%, 500%, or more, relative to the signaling induced by the receptor or ligand exhibited in the absence of the immunotherapy agent. Exemplary assays that can be used to measure the extent of receptor or ligand signaling include, for example, enzyme-linked immunosorbant assay (ELISA) techniques to measure protein expression alterations that are associated with a particular signal transduction pathway, as well as polymerase chain reaction (PCR)-based techniques, such as quantitative PCR, reverse-transcription PCR, and real-time PCR experiments useful for determining changes in gene expression associated with a particular signal transduction pathway, among others. Examples of immunotherapy agents include, e.g., antibodies or antigen-binding fragments thereof that specifically bind and activate one or more of OX40L, TL1A, CD40L, LIGHT, BTLA, LAGS, TIM3, Singlecs, ICOS, B7-H3, B7-H4, VISTA, TMIGD2, BTNL2, CD48, KIR, LIR, LIR antibody, ILT, NKG2D, NKG2A, MICA, MICB, CD244, CSF1R, IDO, TGFβ, CD39, CD73, CXCR4, CXCL12, SIRPA, CD47, VEGF, and neuropilin. Particular examples of immunotherapy agents that may be used in conjunction with the compositions and methods described herein include agonistic anti-PD-1 antibodies and antigen-binding fragments thereof, as well as agonistic anti-PD-L1 antibodies and antigen-binding fragments thereof, and agonistic anti-CTLA-4 antibodies and antigen-binding fragments thereof.

As used herein, the term "monoclonal antibody" refers to an antibody that is derived from a single clone, including any eukaryotic, prokaryotic, or phage clone, and not the method by which it is produced.

As used herein, the term "multi-specific antibodies" refers to antibodies that exhibit affinity for more than one target antigen. Multi-specific antibodies can have structures similar to full immunoglobulin molecules and include Fc regions, for example IgG Fc regions. Such structures can include, but not limited to, IgG-Fv, IgG-(scFv)$_2$, DVD-Ig, (scFv)$_2$-(scFv)$_2$-Fc and (scFv)$_2$-Fc-(scFv)$_2$. In case of IgG-(scFv)$_2$, the scFv can be attached to either the N-terminal or the C-terminal end of either the heavy chain or the light chain. Exemplary multi-specific molecules that include Fc regions and into which TNFR2 antibodies or antigen-binding fragments thereof can be incorporated have been reviewed by Kontermann, 2012, mAbs 4(2):182-197, Yazaki et al, 2013, Protein Engineering, Design & Selection 26(3): 187-193, and Grote et al, 2012, in Proetzel & Ebersbach (eds.), Antibody Methods and Protocols, Methods in Molecular Biology vol. 901, chapter 16:247-263; incorporated herein by reference. In some embodiments, antibody fragments can be components of multi-specific molecules without Fc regions, based on fragments of IgG or DVD or scFv. Exemplary multi-specific molecules that lack Fc regions and into which antibodies or antibody fragments can be incorporated include scFv dimers (diabodies), trimers (triabodies) and tetramers (tetrabodies), Fab dimers (conjugates by adhesive polypeptide or protein domains) and Fab trimers (chemically conjugated), are described by Hudson and Souriau, 2003, Nature Medicine 9:129-134; incorporated herein by reference.

As used herein, the term "myeloid-derived suppressor cell" or "MDSC" refers to a cell of the immune system that modulates the activity of a variety of effector cells and antigen-presenting cells, such as T cells, NK cells, dendritic cells, and macrophages, among others. Myeloid derived suppressor cells are distinguished by their gene expression profile, and express all or a subset of proteins and small molecules selected from the group consisting of B7-1 (CD80), B7-H1 (PD-L1), CCR2, CD1d, CD1d1, CD2, CD31 (PECAM-1), CD43, CD44, complement component C5a R1, F4/80 (EMR1), Fcγ RIII (CD16), Fcγ RII (CD32), Fcγ RIIA (CD32a), Fcγ RIIB (CD32b), Fcγ RIIB/C (CD32b/c), Fcγ RIIC (CD32c), Fcγ RIIIA (CD16A), Fcγ RIIIB (CD16b), galectin-3, GP130, Gr-1 (Ly-6G), ICAM-1 (CD54), IL-1 RI, IL-4Rα, IL-6Rα, integrin α4 (CD49d), integrin αL (CD11a), integrin αM (CD11 b), M-CSFR, MGL1 (CD301a), MGL1/2 (CD301a/b), MGL2 (CD301 b), nitric oxide, PSGL-1 (CD162), L-selectin (CD62L), siglec-3 (CD33), transferrin receptor (TfR), VEGFR1 (Flt-1), and VEGFR2 (KDR or Flk-1). Particularly, MDSCs do not express proteins selected from the group consisting of B7-2 (CD86), B7-H4, CD11c, CD14, CD21, CD23 (FcεRII), CD34, CD35, CD40 (TNFRSF5), CD117 (c-kit), HLA-DR, and Sca-1 (Ly6).

As used herein, the term "non-native constant region" refers to an antibody constant region that is derived from a source that is different from the antibody variable region or that is a human-generated synthetic polypeptide having an amino sequence that is different from the native antibody constant region sequence. For instance, an antibody containing a non-native constant region may have a variable region derived from a non-human source (e.g., a mouse, rat, or rabbit) and a constant region derived from a human source (e.g., a human antibody constant region), or a constant region derived from another primate, pig, goat, rabbit, hamster, cat, dog, guinea pig, member of the bovidae family (such as cattle, bison, buffalo, elk, and yaks, among others), cow, sheep, horse, or bison, among others).

As used herein, the term "percent (%) sequence identity" refers to the percentage of amino acid (or nucleic acid) residues of a candidate sequence that are identical to the amino acid (or nucleic acid) residues of a reference sequence after aligning the sequences and introducing gaps, if necessary, to achieve the maximum percent sequence identity (e.g., gaps can be introduced in one or both of the candidate and reference sequences for optimal alignment and non-homologous sequences can be disregarded for comparison purposes). Alignment for purposes of determining percent sequence identity can be achieved in various ways that are within the skill in the art, for instance, using publicly available computer software, such as BLAST, ALIGN, or Megalign (DNASTAR) software. Those skilled in the art can determine appropriate parameters for measuring alignment, including any algorithms needed to achieve maximal alignment over the full length of the sequences being compared. For example, a reference sequence aligned for comparison with a candidate sequence may show that the candidate sequence exhibits from 50% to 100% sequence identity across the full length of the candidate sequence or a selected portion of contiguous amino acid (or nucleic acid) residues of the candidate sequence. The length of the candidate sequence aligned for comparison purposes may be, for example, at least 30%, (e.g., 30%, 40, 50%, 60%, 70%, 80%, 90%, or 100%) of the length of the reference sequence. When a position in the candidate sequence is occupied by the same amino acid residue as the corresponding position in the reference sequence, then the molecules are identical at that position.

As used herein, the term "primatized antibody" refers to an antibody comprising framework regions from primate-derived antibodies and other regions, such as CDRs and/or constant regions, from antibodies of a non-primate source. Methods for producing primatized antibodies are known in the art. See e.g., U.S. Pat. Nos. 5,658,570; 5,681,722; and 5,693,780; incorporated herein by reference. For instance, a primatized antibody or antigen-binding fragment thereof described herein can be produced by inserting the CDRs of a non-primate antibody or antigen-binding fragment thereof into an antibody or antigen-binding fragment thereof that contains one or more framework regions of a primate.

As used herein, the term "operatively linked" in the context of a polynucleotide fragment is intended to mean that the two polynucleotide fragments are joined such that the amino acid sequences encoded by the two polynucleotide fragments remain in-frame.

As used herein, the term "pharmacokinetic profile" refers to the absorption, distribution, metabolism, and clearance of a therapeutic agent (e.g., a polypeptide, such as an agonistic TNFR2 antibody, antigen-binding fragment thereof, single-chain polypeptide, or construct of the disclosure) over time following administration of the drug to a patient.

As used herein, the term "regulatory sequence" includes promoters, enhancers and other expression control elements (e.g., polyadenylation signals) that control the transcription or translation, e.g., of antibody chain genes. Such regulatory sequences are described, for example, in Goeddel, Gene Expression Technology: Methods in Enzymology 185 (Academic Press, San Diego, CA, 1990); incorporated herein by reference.

As used herein, the term "scFv" refers to a single-chain Fv antibody in which the variable domains of the heavy chain and the light chain from an antibody have been joined to form one chain. scFv fragments contain a single polypeptide chain that includes the variable region of an antibody light chain (VL) (e.g., CDR-L1, CDR-L2, and/or CDR-L3) and the variable region of an antibody heavy chain (VH) (e.g., CDR-H1, CDR-H2, and/or CDR-H3) separated by a linker. The linker that joins the VL and VH regions of a scFv fragment can be a peptide linker composed of proteinogenic amino acids. Alternative linkers can be used to so as to increase the resistance of the scFv fragment to proteolytic degradation (e.g., linkers containing D-amino acids), in order to enhance the solubility of the scFv fragment (e.g., hydrophilic linkers such as polyethylene glycol-containing linkers or polypeptides containing repeating glycine and serine residues), to improve the biophysical stability of the molecule (e.g., a linker containing cysteine residues that form intramolecular or intermolecular disulfide bonds), or to attenuate the immunogenicity of the scFv fragment (e.g., linkers containing glycosylation sites). scFv molecules are known in the art and are described, e.g., in U.S. Pat. No. 5,892,019, Flo et al., (Gene 77:51, 1989); Bird et al., (Science 242:423, 1988); Pantoliano et al., (Biochemistry 30:10117, 1991); Milenic et al., (Cancer Research 51:6363, 1991); and Takkinen et al., (Protein Engineering 4:837, 1991). The VL and VH domains of a scFv molecule can be derived from one or more antibody molecules. It will also be understood by one of ordinary skill in the art that the variable regions of the scFv molecules described herein can be modified such that they vary in amino acid sequence from the antibody molecule from which they were derived. For example, in one embodiment, nucleotide or amino acid substitutions leading to conservative substitutions or changes at amino acid residues can be made (e.g., in CDR and/or framework residues). Alternatively or in addition, mutations are made to CDR amino acid residues to optimize antigen binding using art recognized techniques. scFv fragments are described, for example, in WO 2011/084714; incorporated herein by reference.

As used herein, the phrase "specifically binds" refers to a binding reaction which is determinative of the presence of an antigen in a heterogeneous population of proteins and other biological molecules that is recognized, e.g., by an antibody or antigen-binding fragment thereof, with particularity. An antibody or antigen-binding fragment thereof that specifically binds to an antigen will bind to the antigen with a $K_D$ of less than 100 nM. For example, an antibody or antigen-binding fragment thereof that specifically binds to an antigen will bind to the antigen with a $K_D$ of up to 100 nM (e.g., between 1 pM and 100 nM). An antibody or antigen-binding fragment thereof that does not exhibit specific binding to a particular antigen or epitope thereof will exhibit a $K_D$ of greater than 100 nM (e.g., greater than 500 nm, 1 μM, 100 μM, 500 μM, or 1 mM) for that particular antigen or epitope thereof. A variety of immunoassay formats may be used to select antibodies specifically immunoreactive with a particular protein or carbohydrate. For example, solid-phase ELISA immunoassays are routinely used to select antibodies specifically immunoreactive with a protein or carbohydrate. See, Harlow & Lane, Antibodies, A Laboratory Manual, Cold Spring Harbor Press, New York (1988) and Harlow & Lane, Using Antibodies, A Laboratory Manual, Cold Spring Harbor Press, New York (1999), for a description of immunoassay formats and conditions that can be used to determine specific immunoreactivity.

As used herein, the terms "subject" and "patient" refer to an organism that receives treatment (e.g., by administration of an agonistic TNFR2 polypeptide, such as an antibody, antigen-binding fragment thereof, single-chain polypeptide, or construct described herein) for a particular disease or condition, such as an immunological disorder (e.g., an autoimmune disease). Examples of subjects and patients include mammals, such as humans, primates, pigs, goats, rabbits, hamsters, cats, dogs, guinea pigs, members of the bovidae family (such as cattle, bison, buffalo, and yaks, among others), sheep, and horses, among others, receiving treatment for immunological diseases or conditions, for example, autoimmune disorders, graft-versus-host disease, allograft rejection, allergic reactions, and asthma, among others. A patient that may be treated using the compositions and methods described herein may have an established disease (e.g., an established immunological disorder, such as an autoimmune disease), in which case the patient has been diagnosed as having the disease and has shown symptoms of the disease for a prolonged period of time (e.g., over the course of days, weeks, months, or years). Alternatively, a patient may be symptomatic for a particular disease, such as an immunological disorder described herein, but has yet to be diagnosed with the disease by a physician. Other patients that may be treated using the compositions and methods described herein include those that have been diagnosed as having an immunological disorder, and may or may not be showing symptoms of the disease as of yet. For example, a patient eligible for treatment with the compositions and methods described herein may be described as diagnosed but asymptomatic if the patient has received a diagnosis of an immunological disorder, such as multiple sclerosis, e.g., by detection of depleted myelin sheath around one or more neurons of the patient due to the activity of autoreactive T cells, even though the patient may not yet be showing symptoms of multiple sclerosis (e.g., lack of balance, reduced cognitive performance, blurred vision, or attenuated coordination, among others). Another example of a patient that has been diagnosed with an immunological condition but is asymptomatic includes a patient that has been diagnosed with rheumatoid arthritis, e.g., by the detection of autoreactive T cells in a lymph sample isolated from the patient, even though the patient has not yet presented with the symptoms associated with this disease, such as joint pain, joint stiffness, and a decrease in the muscle range or movement, among others.

As used herein, the term "transfection" refers to any of a wide variety of techniques commonly used for the introduction of exogenous DNA into a prokaryotic or eukaryotic host cell, e.g., electroporation, lipofection, calcium-phosphate precipitation, DEAE-dextran transfection and the like.

As used herein, the terms "treat" or "treatment" refer to therapeutic treatment, in which the object is to inhibit or slow down (lessen) an undesired physiological change or disorder, such as an immunological disorder (e.g., autoimmune disease, allergic reaction, graft-versus-host disease, or allograft rejection). Beneficial or desired clinical results of treatment include, without limitation, alleviation of symptoms, diminishment of extent of disease, stabilized (i.e., not worsening) state of disease, delay or slowing of disease progression, amelioration or palliation of the disease state, and remission (whether partial or total), whether detectable or undetectable. Those in need of treatment include those already having the condition or disorder, as well as those prone to have the condition or disorder or those in which the condition or disorder is to be inhibited.

As used herein, the terms "tumor necrosis factor receptor superfamily," "TNFR superfamily," or "TNFRS" refer to a group of type I transmembrane proteins with a carboxy-terminal intracellular domain and an amino-terminal extracellular domain characterized by a common cysteine rich domain (CRD). The TNFR superfamily includes receptors that mediate cellular signaling as a consequence of binding to one or more ligands in the TNF superfamily. The TNFR superfamily can be divided into two subgroups: receptors containing the intracellular death domain and those lacking this domain. The death domain is an 80 amino acid motif that propagates apoptotic signal transduction cascades following receptor activation. Exemplary TNFR super family members that contain the intracellular death domain include TNFR1, while TNFR2 represents a TNFR super family protein that does not contain this domain. Members of the TNFR superfamily include TNFR1, TNFR2, RANK, CD30, CD40, Lymphotoxin beta receptor (LT-βR), OX40, Fas receptor, Decoy receptor 3 (DCR3), CD27, 4-1 BB, Death receptor 4 (DR4), Death receptor 5 (DR5), Decoy receptor 1 (DCR1), Decoy receptor 2 (DCR2), Osteoprotegrin, TWEAK receptor, TACI, BAFF receptor, Herpesvirus entry mediator, Nerve growth factor receptor, B cell maturation antigen, Glucocorticoid-induced TNFR-related, TROY, Death receptor 6 (DR6), Death receptor 3 (DR3), and Ectodysplasin A2 receptor.

As used herein the term "variable region CDR" includes amino acids in a CDR or complementarity determining region as identified using sequence or structure based methods. As used herein, the term "CDR" or "complementarity determining region" refers to the noncontiguous antigen-binding sites found within the variable regions of both heavy and light chain polypeptides. These particular regions have been described by Kabat et al., J. Biol. Chem. 252:6609-6616, 1977 and Kabat, et al., Sequences of Proteins of Immunological Interest, Fifth Edition, U.S. Department of Health and Human Services, NIH Publication No. 91-3242, 1991; by Chothia et al., (J. Mol. Biol. 196:901-917, 1987), and by MacCallum et al., (J. Mol. Biol. 262:732-745, 1996) where the definitions include overlapping or subsets of amino acid residues when compared against each other. In certain embodiments, the term "CDR" is a CDR as defined by Kabat based on sequence comparisons.

As used herein, the term "vector" includes a nucleic acid vector, e.g., a DNA vector, such as a plasmid, a RNA vector, virus or other suitable replicon (e.g., viral vector). A variety of vectors have been developed for the delivery of polynucleotides encoding exogenous proteins into a prokaryotic or eukaryotic cell. Examples of such expression vectors are disclosed in, e.g., WO 1994/11026; incorporated herein by reference. Expression vectors described herein contain a polynucleotide sequence as well as, e.g., additional sequence elements used for the expression of proteins and/or the integration of these polynucleotide sequences into the genome of a mammalian cell. Certain vectors that can be used for the expression of antibodies and antibody fragments described herein include plasmids that contain regulatory sequences, such as promoter and enhancer regions, which direct gene transcription. Other useful vectors for expression of antibodies and antibody fragments contain polynucleotide sequences that enhance the rate of translation of these genes or improve the stability or nuclear export of the mRNA that results from gene transcription. These sequence elements include, e.g., 5' and 3' untranslated regions, an internal ribosomal entry site (IRES), and polyadenylation signal site in order to direct efficient transcription of the gene carried on the expression vector. The expression vectors described herein may also contain a polynucleotide encoding a marker for selection of cells that contain such a vector. Examples of a suitable marker include genes that encode resistance to antibiotics, such as ampicillin, chloramphenicol, kanamycin, or nourseothricin.

As used herein, the term "VH" refers to the variable region of an immunoglobulin heavy chain of an antibody, including the heavy chain of an Fv, scFv, or Fab. References to "VL" refer to the variable region of an immunoglobulin light chain, including the light chain of an Fv, scFv, dsFv or Fab. Antibodies (Abs) and immunoglobulins (Igs) are glycoproteins having the same structural characteristics. While antibodies exhibit binding specificity to a specific target, immunoglobulins include both antibodies and other antibody-like molecules which lack target specificity. Native antibodies and immunoglobulins are usually heterotetrameric glycoproteins of about 150,000 Daltons, composed of two identical light (L) chains and two identical heavy (H) chains. Each heavy chain of a native antibody has at the amino terminus a variable domain (VH) followed by a number of constant domains. Each light chain of a native antibody has a variable domain at the amino terminus (VL) and a constant domain at the carboxy terminus

BRIEF DESCRIPTION OF THE FIGURES

FIG. 1 shows the amino acid sequence of human TNFR2, with highlighted regions showing exemplary epitopes that may be bound by a TNFR2 agonistic antibody of the disclosure. Human TNFR2 is numbered herein starting with an N-terminal methionine at position 1 and concluding with a C-terminal serine at position 461 (SEQ ID NO: 1). All references to amino acid positions within TNFR2 are made in the context of the TNFR2 numbering scheme shown in FIG. 1.

FIGS. 8A-8E are graphs showing the effect of TNFRAG1 on Treg proliferation in peripheral human lymphocytes. FIG. 8A shows the overall trend of reduced CD8+ Teff cells observed when peripheral lymphocytes were incubated with TNFRAG1. FIG. 8B shows the effect of TNFRAG1 on Teff cells alone. FIG. 8C shows the effect of TNFRAG1 on Teff cell quantity when incubated with a mixture containing Teff cells and Treg cells in a ratio of 4:1 either in the absence of rapamycin and TNFα (left), in the absence of rapamycin and in the presence of TNFα (middle), or in the presence of rapamycin and the absence of TNFα (right). FIG. 8D shows the effect of TNFRAG1 on Teff cell quantity when incubated with a mixture containing Teff cells and Treg cells in a ratio of 2:1 either in the absence of rapamycin and TNFα (left), in the absence of rapamycin and in the presence of TNFα (middle), or in the presence of rapamycin and the absence of TNFα (right). FIG. 8E shows the effect of TNFRAG1 on Teff cell quantity when incubated with a mixture containing Teff cells and Treg cells in a ratio of 1:1 either in the absence of rapamycin and TNFα (left), in the absence of rapamycin and in the presence of TNFα (middle), or in the presence of rapamycin and the absence of TNFα (right). In all experiments, cells were incubated with soluble anti-CD3 antibody (Hit3a) and IL-2 (50U/ml) in 10% FBS RPMI for 4 days.

FIGS. 13A and 13B are tables showing the results of an ELISA experiment confirming the epitopes on TNFR2 that are bound by TNFRAG1. Epitopes within cysteine-rich domain 2 (CRD2) are indicated with a bracket. The amino acid sequences shown in FIGS. 13A and 13B correspond, from the first sequence to the last sequence, to SEQ ID NOs: 49-70, respectively.

FIG. 15 is a table showing the results of an ELISA experiment further confirming the epitopes on TNFR2 that are bound by TNFRAG1. The amino acid sequences shown in FIG. 15 correspond, from the first sequence to the last sequence, to SEQ ID NOs: 49-71, respectively.

DETAILED DESCRIPTION

Figure 2:
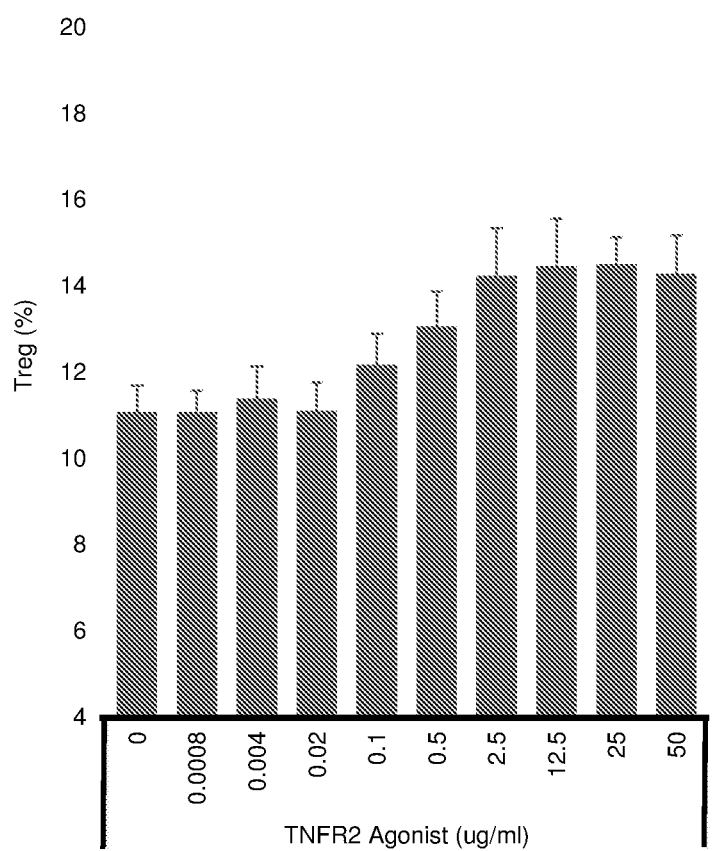
FIG. 2 is a graph showing the proliferative effect of an exemplary TNFR2 agonistic antibody of the disclosure on Treg cells. The results shown in this figure were obtained by incubation of the agonistic TNFR2 antibody TNFRAG1, described herein, at various concentrations (shown along the x-axis) with Treg cells for 48-72 hours. Values along the y-axis represent the percentage of Treg cells in the cell population studied. Data represent the average of 35 individual experiments.

Agonistic TNFR2 polypeptides described herein, such as single-chain polypeptides, antibodies, antigen-binding fragments thereof, and constructs thereof, may promote the proliferation, protection, healing, and/or regeneration of TNFR2-expressing cells. This may be effectuated, for instance, by binding TNFR2 (e.g., on the exterior surface of a regulatory T cell (Treg cell), myeloid-derived suppressor cell (MDSC), or TNFR2+ somatic cells (e.g., a parenchymal cell, such as a cell of the central nervous system (e.g., a neuron), among others) and inducing receptor trimerization. The activity of the TNFR2 agonist polypeptide may be augmented by the natural ligand, TNFα, such as membrane-bound trimeric TNFα. Without being limited by mechanism, this trimerization event may contribute to TNFR2 activation by bringing individual TNFR2 proteins into close proximity with one another, thereby promoting cell proliferation by way of the MAPK/NFκB/TRAF2/3 pathway. TNFR2 signal transduction is also characterized by secretion of soluble TNFR2 (sTNFR2) in a trimeric state, as well as by the dual activation of p300 and CBP, two intracellular proteins that bind the Foxp3 transcription site, thereby enhancing cell stability and maintenance. Importantly, activation of TNFR2 signaling has an inhibitory effect on T effector cells, such as CD8+ T cells. For these cells, TNFR2 agonism causes cell death.

Agonistic TNFR2 polypeptides described herein can be used to promote this trimerization event in a wide variety of TNFR2+ tissues. Thus, the compositions and methods described herein provide important physiological benefits, as the agonistic TNFR2 polypeptides of the disclosure may be used to elevate Treg cell and/or MDSC activity, and to diminish the activity of T effector cells, thereby suppressing autoimmunity, graft-versus-host disease (GVHD), inflammation, and graft rejection, among other pathologies described herein. The compositions and methods of the disclosure may also be used to directly kill effector T cells, such as CD8+ T cells, including those that react with endogenous ("self") antigens. Agonistic TNFR2 polypeptides described herein additionally provide the beneficial feature of stimulating regeneration of TNFR2+ tissues and organs, and can be used to treat a wide variety of diseases characterized by tissue degeneration and organ failure.

The TNFR2 polypeptides (e.g., antibodies, antigen-binding fragments thereof, single-chain polypeptides, and constructs) described herein specifically bind to epitopes within TNFR2 that promote receptor activation and the various advantageous biological activities described above. Human TNFR2 contains four cysteine-rich domains (CRDs): CRD1 (amino acid residues 48-76 of SEQ ID NO: 1), CRD2 (amino acid residues 78-120 of SEQ ID NO: 1), CRD3 (amino acid residues 121-162 of SEQ ID NO: 1), and CRD4 (amino acid residues 162-202 of SEQ ID NO: 1). Agonistic TNFR2 polypeptides described herein specifically bind TNFR2 at one or more epitopes within CRD1, CRD2, and/or CRD3. In some embodiments, the agonistic TNFR2 polypeptides do not bind epitopes within CRD4. For example, the polypeptides (e.g., single-chain polypeptides, antibodies, antigen-binding fragments thereof, or constructs thereof) of the disclosure may bind human TNFR2 at an epitope corresponding to one or more of the following residues:

```
(a) amino acids 56-60 of SEQ ID NO: 1
(KCSPG);

(b) amino acids 101-107 of SEQ ID NO: 1
(CSSDQVET);

(c) amino acids 115-142 of SEQ ID NO: 1
(NRICTCRPGWYCALSKQEGCRLCAPLRK);

(d) amino acids 26-45 of SEQ ID NO: 1
(QTAQMCCSKCSPGQHAKVFC);

(e) amino acids 90-109 of SEQ ID NO: 1
(REQNRICTCRPGWYCALSKQ);

(f) amino acids 98-117 of SEQ ID NO: 1
(CRPGWYCALSKQEGCRLCAP);

(g) amino acids 106-125 of SEQ ID NO: 1
(LSKQEGCRLCAPLRKCRPGF);
and/or (h) amino acids 108-127 of SEQ ID NO: 1
(KQEGCRLCAPLRKCRPGFGV),
``` or an equivalent epitope within TNFR2 of a non-human mammal, such as a non-human mammal described herein.

The present disclosure is based, in part, on the discovery that agonistic TNFR2 polypeptides (e.g., antibodies, antigen-binding fragments thereof, single-chain polypeptides, and constructs) demonstrate substantially improved TNFR2 activation effects when these molecules are in the form of an IgG2-B isotype. As described in the examples below, it has presently been discovered that this class of TNFR2 polypeptides exhibits a surprisingly superior ability to activate TNFR2 signaling, promote Treg cell and MDSC proliferation, and heal, protect, and regenerate TNFR2-expressing tissues and organs relative to TNFR2 polypeptides of other isotypes.

Another discovery underlying the present disclosure is the finding that agonistic TNFR2 polypeptides that contain antigen-binding sites spatially separated from one another by fewer than about 133 Å exhibit unexpectedly superior TNFR2 activation effects relative to polypeptides that specifically bind TNFR2 at one or more of the epitopes described above but that contain antigen-binding sites separated from one another by about 133 Å or more. Examples of such polypeptides include IgG1, IgG2, IgG3, and IgG4 antibodies and antigen-binding fragments thereof that contain antigen-binding sites separated from one another by from about 90 Å to about 133 Å, and particularly include IgG1 antibodies and antigen-binding fragments thereof that contain antigen-binding sites separated from one another by about 117 Å, as well as IgG3 antibodies and antigen-binding fragments thereof that contain antigen-binding sites separated from one another by about 125 Å.

Agonistic TNFR2 polypeptides of the disclosure can be formulated into pharmaceutical compositions. Preferably, the polypeptides present in the pharmaceutical composition adopt a single disulfide-bonded isoform. For example, pharmaceutical compositions of the disclosure include those containing an agonistic TNFR2 polypeptide in which, e.g., 10%, 20%, 30%, 40%, 50%, 60%, 70%, 80%, 90%, 95%, 96%, 97%, 98%, 99%, 99.9%, 99.99%, or more, of the polypeptide in the pharmaceutical composition is present in a single disulfide-bonded isoform. Agonistic TNFR2 polypeptides of the disclosure may advantageously adopt an IgG2-B disulfide-bonded isoform, which has surprisingly been found to promote a substantially more robust level of TNFR2 activation relative to other IgG2 disulfide-bonded isoforms, such as the IgG2-A, IgG2-A/B$_1$, and IgG2-A/B$_2$ isoforms. These isoforms are shown graphically in FIGS. 5A-5D. Polypeptides of the disclosure may be engineered to predominantly adopt an IgG2-B isoform, for example, by introducing mutations into the IgG2 heavy chain constant 1 (CH1) domain that prohibit the formation of other disulfide-bonded isoforms. Exemplary mutations in the amino acid sequence of a human IgG2 CH1 domain that promote the formation of the IgG2-B isoform at the exclusion of the remaining isoforms described above include the deletion and/or substitution of the cysteine residue at position 127 of a human IgG2 CH1 domain amino acid sequence (according to the Kabat numbering scheme, described herein), which is set forth in SEQ ID NO: 8. For example, to engineer an IgG2 antibody or antigen-binding fragment thereof so as to predominantly adopt the IgG2-B isoform, one may introduce conservative amino acid substitutions at cysteine residue 127 of SEQ ID NO: 8. An exemplary IgG2 CH1 domain that exists predominantly in the IgG2-B isoform has the amino acid sequence of SEQ ID NO: 9, which contains a C127S substitution relative to SEQ ID NO: 8.

The following biological activities are examples of agonistic TNFR2 phenotypes that are effectuated by polypeptides of the disclosure to a greater extent relative to TNFR2-binding polypeptides that (i) contain antigen-binding sites separated from one another by greater than 133 Å, and/or (ii) do not exist predominantly in a single disulfide-bonded isoform (e.g., the IgG2-B isoform):

(a) Augmentation of the proliferation of, and/or the direct expansion of, Treg cells, for instance, by binding and activation TNFR2 on the Treg cell surface;

(b) Augmentation of the proliferation of, and/or the direct expansion of, MDSCs, for instance, by binding and activating TNFR2 on the MDSC surface;

(c) Depletion of T effector cells, such as CD8+ T cells (e.g., self-reactive CD8+ T cells); and/or (d) Augmentation of the proliferation of, and/or the direct expansion of, TNFR2-expressing parenchymal cells.

The sections that follow provide a description of exemplary characteristics of the agonistic TNFR2 polypeptides described herein, such as single-chain polypeptides, antibodies, antigen-binding fragments thereof, and constructs thereof, as well as their use in therapeutic methods.

Figure 5A:
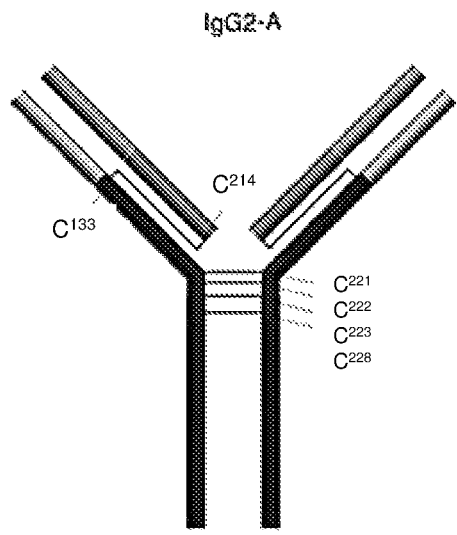
FIGS. 5A-5D are a series of schematics comparing the disulfide bonding arrangement present in each of the IgG2-A (FIG. 5A), IgG2-B (FIG. 5B), IgG2-A/B$_1$ (FIG. 5C), and IgG2-A/B$_2$ (FIG. 5D) isoforms of a human IgG2 isotype antibody. Thin lines represent disulfide bonds connecting various portions of each antibody heavy chain or light chain, which are represented by shaded rectangles. Heavy chains are represented by the longer, outermost rectangles of each antibody. Within each heavy chain, black shading denotes the constant region, and light shading denotes the variable region. Light chains are represented by the shorter, innermost rectangles of each antibody. Within each light chain, darker shading denotes the constant region, and lighter shading denotes the variable region.
Figure 5B:
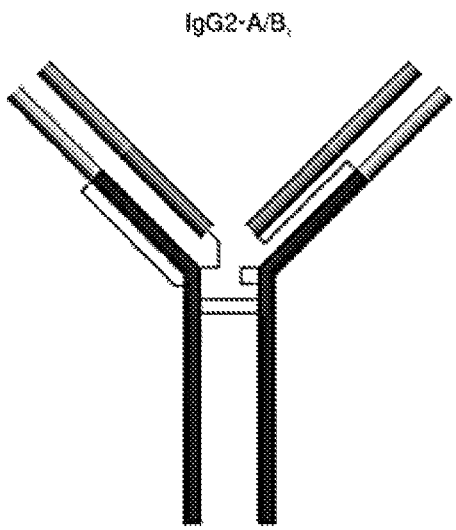
Figure 5C:
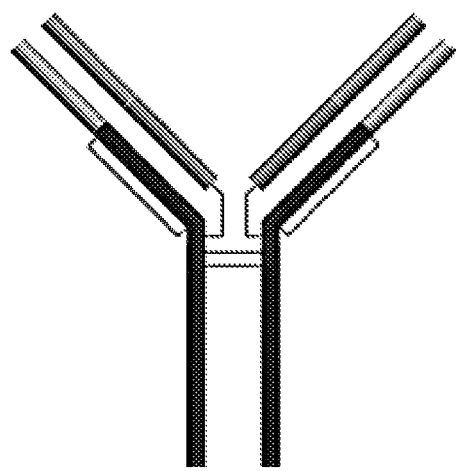
Figure 5D:
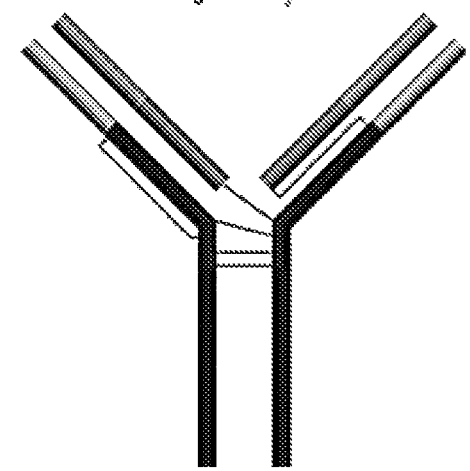

Agonistic TNFR2 Polypeptides
IgG Isotype Antibodies Promote Superior TNFR2 Agonism As described above and herein, robust TNFR2 activation is achieved by the TNFR2 agonist polypeptides (e.g., antibodies, antigen-binding fragments thereof, single-chain polypeptides, and constructs) described herein. Such polypeptides may have one or more, or all, of the CDRs of agonistic TNFR2 antibody TNFRAG1, described herein, or one or more CDRs having at least 85% sequence identity (e.g., at least 85%, 86%, 87%, 88%, 89%, 90%, 91%, 92%, 93%, 94%, 95%, 96%, 97%, 98%, 99%, 99.9%, or 100% sequence identity) to the corresponding CDR(s) of TNFRAG1) has a human IgG1, IgG2, IgG3, or IgG4 isotype. Particularly advantageous are those polypeptides with modified IgG1 and IgG2 isotypes, such as those that contain a CH1 domain that favors an IgG2-B disulfide-bonded isoform. The disulfide bonding pattern of the various isoforms of human IgG2 antibodies are shown in FIGS. 5A-5D. As shown in FIG. 5B, the IgG2-B isoform exhibits a disulfide bonding pattern that produces a narrower and more conformationally constrained structure relative to the other IgG2 isoforms. This structure is ideal for binding TNFR2 at the surface of a cell (e.g., a Treg cell, MDSC, or TNFR2-expressing parenchymal cell) and bringing the receptor monomers into proximity with one another so as to promote receptor trimerization, and thus, receptor activation.

To stabilize the IgG2-B disulfide-bonded isoform, mutations can be introduced into the IgG2 CH1 domain so as to prevent, or reduce the occurrence of, disulfide bonding between cysteine residues that are present as nonbonded thiols in the IgG2-B isoform. Mutations can also be introduced into the IgG2 CH1 domain to prevent the formation of all four isoform variants after administration of the antibody to a patient (e.g., a mammalian patient, such as a human), which may be caused by cysteine oxidation and reduction processes in vivo. Examples of such mutations are amino acid substitutions or deletions at residue C127 of the human IgG2 CH1 domain. By deleting this residue and/or modifying this site by way of an amino acid substitution (e.g., a conservative amino acid substitution), one can bias the disulfide bonding pattern in a population of IgG2 isoforms towards the IgG2-B isoform. A particularly advantageous mutation in the CH1 domain that can be used to favor the IgG2-B isoform is the C127S mutation.

Spacing Between Antigen-Binding Sites

Agonist TNFR2 polypeptides (e.g., single-chain polypeptides, antibody, antigen-binding fragment thereof, or construct thereof) described herein may contain antigen-binding sites (i.e., antigen-binding arms) that are separated from one another by a distance of fewer than 133 Å, which is the spacing observed between antigen-binding arms in human IgG2 isotype antibodies. As described in the examples below, it has been discovered that this spacing gives rise to antibodies having optimal TNFR2 agonistic properties. TNFR2 agonist polypeptides of the disclosure include those containing antigen-binding arms separated by, e.g., a distance of from about less than 133 Å such as a distance of 90 Å, 91 Å, 92 Å, 93 Å, 94 Å, 95 Å, 96 Å, 97 Å, 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, 127 Å, 128 Å, 129 Å, 130 Å, 131 Å, or 132 Å. In some embodiments, the antigen-binding sites are separated from one another by a distance of from about 95 Å to about 130 Å, such as a distance of about 95 Å, 96 Å, 97 Å, 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 5 Å, 116 Å, 117 Å, 118 Å, 119 Å, 120 Å, 121 Å, 122 Å, 123 Å, 124 Å, 125 Å, 126 Å, 127 Å, 128 Å, 129 Å, or 130 Å. In some embodiments, the antigen-binding sites are separated from one another by a distance of from about 98 Å to about 128 Å, such as a distance of about 98 Å, 99 Å, 100 Å, 101 Å, 102 Å, 103 Å, 104 Å, 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, 127 Å, or 128 Å.

For example, the polypeptide (e.g., a single-chain polypeptide, antibody, antigen-binding fragment thereof, or construct thereof) may contain antigen-binding sites that are separated from one another by a distance of from about 105 Å to about 127 Å, such as by a distance of about 105 Å, 106 Å, 107 Å, 108 Å, 109 Å, 110 Å, 111 Å, 112 Å, 113 Å, 114 Å, 115 Å, 116 Å, 117 Å, 118 Å, 119 Å, 120 Å, 121 Å, 122 Å, 123 Å, 124 Å, 125 Å, 126 Å, or 127 Å. In some embodiments, the antigen-binding sites are separated from one another by a distance of from about 110 Å to about 122 Å, such as by a distance of about 110 Å, 111 Å, 112 Å, 113 Å, 114 Å, 115 Å, 116 Å, 117 Å, 118 Å, 119 Å, 120 Å, 121 Å, or 122 Å. In some embodiments, the antigen-binding sites are separated from one another by a distance of from about 115 Å to about 119 Å, such as by a distance of about 115 Å, 116 Å, 117 Å, 118 Å, or 119 Å. In some embodiments, the antigen-binding sites are separated from one another by a distance of about 117 Å. In some embodiments, the polypeptide (e.g., a single-chain polypeptide, antibody, antigen-binding fragment thereof, or construct thereof) has an antigen-binding arm separation as described above, and has an IgG1 isotype.

In some embodiments, the polypeptide (e.g., a single-chain polypeptide, antibody, antigen-binding fragment thereof, or construct thereof) contains antigen-binding sites that are separated from one another by a distance of from about 115 Å to about 132 Å, such as by a distance of about 115 Å, 116 Å, 117 Å, 118 Å, 119 Å, 120 Å, 121 Å, 122 Å, 123 Å, 124 Å, 125 Å, 126 Å, 127 Å, 128 Å, 129 Å, 130 Å, 131 Å, or 132 Å. In some embodiments, the antigen-binding sites are separated from one another by a distance of from about 120 Å to about 129 Å, such as by a distance of about 120 Å, 121 Å, 122 Å, 123 Å, 124 Å, 125 Å, 126 Å, 127 Å, 128 Å, or 129 Å. In some embodiments, the antigen-binding sites are separated from one another by a distance of from about 123 Å to about 127 Å, such as by a distance of about 123 Å, 124 Å, 125 Å, 126 Å, or 127 Å. In some embodiments, the antigen-binding sites are separated from one another by a distance of about 125 Å. In some embodiments, the polypeptide (e.g., a single-chain polypeptide, antibody, antigen-binding fragment thereof, or construct thereof) has an antigen-binding arm separation as described above, and has an IgG3 isotype.

The TNFR2 agonistic polypeptides described herein may have, e.g., two, three, four, five, or more, antigen-binding arms separated by a distance specified above. Examples of antibody fragments that have two or more antigen-binding arms include, without limitation, diabodies, triabodies, F(ab')2 molecules, and tandem scFv (taFv) molecules, among others. Methods of generating these antibody fragments include peptide synthesis and recombinant protein expression techniques described herein and known in the art.

There exist a variety of methods for measuring the distance between antigen-binding arms of an antibody or antibody fragment. For example, distances between antigen-binding arms of an antibody can be made by analyzing the three-dimensional structure of an antibody or antibody fragment using computer software, such as through the use of PYMOL® and other molecular imaging software. Three-dimensional structures of polypeptides, such as antibodies and antibody fragments, can be calculated using the data obtained from X-ray crystallography experiments and nuclear magnetic resonance (NMR) techniques known in the art. Examples of X-ray crystallography and NMR methods that can be used to obtain three-dimensional polypeptide structures are described, e.g., in Eigenbrot et al., Journal of Molecular Biology, 229:969-995, 1993; and Huang et al., Science, 317:1930-1934, 2007, the disclosures of each of which are incorporated herein by reference in their entirety.

Structural Features of Variable and Constant Regions of Agonistic TNFR2 Polypeptides Among the molecular features of agonistic TNFR2 polypeptides (e.g., single-chain polypeptides, antibodies, antigen-binding fragments thereof, and constructs), the complementarity determining region-heavy chain 1 (CDR-H1) can dictate the TNFR2 binding properties of the molecule. In particular, TNFR2 polypeptides having a CDR-H1 as described below bind TNFR2 at one or more of the epitopes described herein as conferring agonistic activity. For example, agonistic TNFR2 polypeptides of the disclosure include those that have a CDR-H1 having the amino acid sequence of:

(a) $GZ^1TFZ^3Z^2YZ^3Z^4$ (SEQ ID NO: 2);
(b) GYTFTDYNI (SEQ ID NO: 3) or an amino acid sequence having up to two conservative amino acid substitutions relative to the sequence; or
(c) GYTFTDYNL (SEQ ID NO: 4) or an amino acid sequence having up to two conservative amino acid substitutions relative to the sequence;

wherein each $Z^1$ is independently a naturally occurring amino acid including a side-chain including an aromatic substituent;

each $Z^2$ is independently a naturally occurring amino acid including an anionic side-chain at physiological pH;

each $Z^3$ is independently a naturally occurring amino acid including a polar, uncharged side-chain at physiological pH; and each $Z^4$ is independently leucine or isoleucine.

The presence of the CDR-H1 motifs described above may confer the polypeptide (e.g., a single-chain polypeptide, antibody, antigen-binding fragment thereof, or construct thereof) with the ability to specifically bind human TNFR2 at an epitope defined by one or more amino acids within CRD1, such as at an epitope defined by one or more of amino acid residues 56-60 (KCSPG) within SEQ ID NO: 1. In some embodiments, in the presence of the CDR-H1, the polypeptide specifically binds human TNFR2 at an epitope defined by one or more amino acids within CRD2. In some embodiments, in the presence of the CDR-H1, the polypeptide thereof specifically binds human TNFR2 at an epitope defined by one or more amino acids within CRD3.

Agonistic TNFR2 polypeptides of the disclosure may further contain one or more, or all, of the following CDRs:

(a) a CDR-H2 having the amino acid sequence INPNYDST (SEQ ID NO: 10) or an amino acid sequence having up to two conservative amino acid substitutions relative to the sequence;
(b) a CDR-H3 having the amino acid sequence CARGNSWYFDV (SEQ ID NO: 11) or an amino acid sequence having up to two conservative amino acid substitutions relative to the sequence;
(c) a CDR-L1 having the amino acid sequence SSVRY (SEQ ID NO: 12) or an amino acid sequence having up to two conservative amino acid substitutions relative to the sequence;
(d) a CDR-L2 having the amino acid sequence LTS or an amino acid sequence having up to two conservative amino acid substitutions relative to the sequence; and
(e) a CDR-L3 having the amino acid sequence CQQWSSNPLT (SEQ ID NO: 13) or an amino acid sequence having up to two conservative amino acid substitutions relative to the sequence.

In some embodiments, the polypeptide (e.g., a single-chain polypeptide, antibody, antigen-binding fragment thereof, or construct thereof) contains a CDR-H1 as described above in combination with one or more, or all, of the following CDRs:

(a) a CDR-H2 having the amino acid sequence
(SEQ ID NO: 10)
INPNYDST;

(b) a CDR-H3 having the amino acid sequence
(SEQ ID NO: 11)
CARGNSWYFDV;

(c) a CDR-L1 having the amino acid sequence
(SEQ ID NO: 12)
SSVRY;

(d) a CDR-L2 having the amino acid sequence
LTS;
and (e) a CDR-L3 having the amino acid sequence
(SEQ ID NO: 13)
CQQWSSNPLT.

In some embodiments, the CDR-H1 has the amino acid sequence GYTFTDYNI (SEQ ID NO: 3) or an amino acid sequence having up to two conservative amino acid substitutions relative to the sequence. For example, agonistic TNFR2 polypeptides described herein may have the following CDRs:

(a) a CDR-H1 having the amino acid sequence
(SEQ ID NO: 3)
GYTFTDYNI;

(b) a CDR-H2 having the amino acid sequence
(SEQ ID NO: 10)
INPNYDST;

(c) a CDR-H3 having the amino acid sequence
(SEQ ID NO: 11)
CARGNSWYFDV;

(d) a CDR-L1 having the amino acid sequence
(SEQ ID NO: 12)
SSVRY;

(e) a CDR-L2 having the amino acid sequence
LTS;
and (f) a CDR-L3 having the amino acid sequence
(SEQ ID NO: 13)
CQQWSSNPLT.

In some embodiments, the polypeptide (e.g., a single-chain polypeptide, antibody, antigen-binding fragment thereof, or construct thereof) contains a heavy chain variable domain ($V_H$) having an amino acid sequence that is at least 85% identical (e.g., at least 85%, 86%, 87%, 88%, 89%, 90%, 91%, 92%, 93%, 94%, 95%, 96%, 97%, 98%, 99%, or 100% identical) to the amino acid sequence of SEQ ID NO: 14. In some embodiments, the polypeptide contains a heavy chain variable domain ($V_H$) having an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 14. In some embodiments, the polypeptide contains a heavy chain variable domain ($V_H$) having an amino acid sequence that is at least 95% identical (e.g., at least 95%, 96%, 97%, 98%, 99%, or 100% identical) to the amino acid sequence of SEQ ID NO: 14. In some embodiments, the polypeptide contains a heavy chain variable domain ($V_H$) having the amino acid sequence of SEQ ID NO: 14.

In some embodiments, the CDR-H1 has the amino acid sequence GYTFTDYNL (SEQ ID NO: 4) or an amino acid sequence having up to two conservative amino acid substitutions relative to the sequence.

In some embodiments, the polypeptide contains the following CDRs:

```
(a) a CDR-H1 having the amino acid sequence
                                    (SEQ ID NO: 4)
    GYTFTDYNL;

(b) a CDR-H2 having the amino acid sequence
                                    (SEQ ID NO: 10)
    INPNYDST;

(c) a CDR-H3 having the amino acid sequence
                                    (SEQ ID NO: 11)
    CARGNSWYFDV;

(d) a CDR-L1 having the amino acid sequence
                                    (SEQ ID NO: 12)
    SSVRY;

(e) a CDR-L2 having the amino acid sequence
    LTS;
    and (f) a CDR-L3 having the amino acid sequence
                                    (SEQ ID NO: 13)
    CQQWSSNPLT.
```

In some embodiments, the polypeptide (e.g., a single-chain polypeptide, antibody, antigen-binding fragment thereof, or construct thereof) contains a heavy chain variable domain ($V_H$) having an amino acid sequence that is at least 85% identical (e.g., at least 85%, 86%, 87%, 88%, 89%, 90%, 91%, 92%, 93%, 94%, 95%, 96%, 97%, 98%, 99%, or 100% identical) to the amino acid sequence of SEQ ID NO: 15. In some embodiments, the polypeptide contains a heavy chain variable domain ($V_H$) having an amino acid sequence that is at least 90% identical (e.g., at least 90%, 91%, 92%, 93%, 94%, 95%, 96%, 97%, 98%, 99%, or 100% identical) to the amino acid sequence of SEQ ID NO: 15. In some embodiments, the polypeptide contains a heavy chain variable domain ($V_H$) having an amino acid sequence that is at least 95% identical (e.g., at least 95%, 96%, 97%, 98%, 99%, or 100% identical) to the amino acid sequence of SEQ ID NO: 15. In some embodiments, the polypeptide contains a heavy chain variable domain ($V_H$) having the amino acid sequence of SEQ ID NO: 15.

In some embodiments, the polypeptide (e.g., a single-chain polypeptide, antibody, antigen-binding fragment thereof, or construct thereof) contains a non-native constant region, such as a human constant region. In some embodiments, the polypeptide lacks all or a portion of an Fc domain, lacks all or a portion of a native Fc domain, or lacks an Fc domain altogether.

Framework Regions of Agonistic TNFR2 Polypeptides.

Agonistic TNFR2 polypeptides of the disclosure (e.g., a single-chain polypeptide, antibody, antigen-binding fragment thereof, or construct thereof) may contain a framework region having the amino acid sequence of TJDJSJJJX$^1$YX$^2$X$^3$LJX$^4$LJS (SEQ ID NO: 5) or an amino acid sequence having 10 or more of the residues of SEQ ID NO: 5, wherein each J is independently a naturally occurring amino acid; each X$^1$ is independently A, V, or F; each X$^2$ is independently M or I; each X$^3$ is independently E or Q; and each X$^4$ is independently S or R. For example, the polypeptide may contain a framework region having an amino acid sequence selected from:

(a) TVDKSSSTAYMELRSLTS (SEQ ID NO: 16) or an amino acid sequence having up to two conservative amino acid substitutions relative to the sequence;

(b) TADTSSNTAYIQLSSLTS (SEQ ID NO: 17) or an amino acid sequence having up to two conservative amino acid substitutions relative to the sequence;

(c) TADTSTDTAYMELSSLRS (SEQ ID NO: 18) or an amino acid sequence having up to two conservative amino acid substitutions relative to the sequence;

(d) TRDTSISTAYMELSRLTS (SEQ ID NO: 19) or an amino acid sequence having up to two conservative amino acid substitutions relative to the sequence;

(e) TFYMELSSLRS (SEQ ID NO: 20) or an amino acid sequence having up to two conservative amino acid substitutions relative to the sequence;

(f) TRDTSISTAYMELNRLTS (SEQ ID NO: 21) or an amino acid sequence having up to two conservative amino acid substitutions relative to the sequence;

(g) TRDTSTNTVYMELTSLRS (SEQ ID NO: 22) or an amino acid sequence having up to two conservative amino acid substitutions relative to the sequence; and (h) TADTSTDRAYMELSSLRS (SEQ ID NO: 23) or an amino acid sequence having up to two conservative amino acid substitutions relative to the sequence.

The foregoing amino acid sequences recognize, and are bound by, MHC class II proteins, including human leukocyte antigens (HLA) DR and DQ, among others. Typically, antibodies that are found to contain amino acid sequences that bind MHC proteins are engineered to remove such motifs, since antibodies that bind MHC proteins are susceptible to being degraded upon administration to a patient (e.g., a mammalian patient, such as a human patient) and positioned on the exterior of an antigen-presenting cell of the immune system, thereby triggering an inappropriate immune response against the administered antibody. Methods of determining whether a particular amino acid sequence is prone to bind MHC molecules are known in the art, and are described, e.g., in Wang et al., BMC Bioinformatics 11:568, 2010; Nielsen et al., BMC Bioinformatics 8:238, 2007; Gonzalez-Galarza et al., Nucleic Acid Research 39:D913-D919, 2011; and Greenbaum et al., Immunogenetics 63:325, 2011, the disclosures of each of which are incorporated herein by reference in their entirety.

The framework regions described above are not immunogenic peptides, despite their propensity to bind MHC class II molecules. Rather, these amino acid sequences impart high affinity TNFR2 binding. Agonistic TNFR2 polypeptides of the disclosure that contain any of the foregoing framework region sequences exhibit the unexpected and beneficial property of high TNFR2 affinity without inducing an immunogenic response against the polypeptide upon administration of the polypeptide to a patient (e.g., a mammalian patient, such as a human).

Uniformity of Populations of TNFR2 Agonistic Polypeptides

Pharmaceutical compositions can be generated in which the TNFR2 agonistic polypeptide (e.g., antibody, antigen-binding fragment thereof, single-chain polypeptide, or construct thereof) described herein is present as a single disulfide-bonded isoform. For example, at least 10%, or more, of the polypeptide in the pharmaceutical composition may be present as a single disulfide-bonded isoform (e.g., the IgG2-B isoform). This may be achieved, for example, by way of amino acid substitutions or deletions at cysteine residue 127 of the wild-type human IgG1 or IgG2 CH1 domain, thereby preventing or reducing the occurrence of disulfide bonding that could give rise to an isoform other than, for example, IgG2-B (see, e.g., FIGS. 5A-5D). The pharmaceutical compositions of the disclosure include those in which, for example, about 10% to about 99.999% of the agonistic TNFR2 polypeptide in the pharmaceutical composition is present in a single disulfide-bonded isoform, such as the IgG2-B isoform. For example, pharmaceutical compositions of the disclosure include those containing an agonist TNFR2 polypeptide in which, e.g., 10%, 20%, 30%, 40%, 50%, 60%, 70%, 80%, 90%, 95%, 96%, 97%, 98%, 99%, 99.9%, 99.99%, or more, of the polypeptide in the pharmaceutical composition is present in a single disulfide-bonded isoform.

Techniques for measuring the relative quantities of various disulfide-bonded isoforms present in a sample of an agonist TNFR2 polypeptide include liquid chromatography techniques known in the art and described herein, such as those exemplified in Wypych et al., The Journal of Biological Chemistry, 283:16194-16205, 2008, the disclosure of which is incorporated herein by reference in its entirety.

Effects on TNFR2 on Signal Transduction Cascades

Agonistic TNFR2 polypeptides (e.g., single-chain polypeptides, antibodies, and antigen-binding fragments thereof) described herein are capable of interacting with, and augmenting the activity of, TNFR2. The TNFR2 polypeptides of the disclosure may bind TNFR2 at one or more specific epitopes that favor the formation of a TNFR2 trimer by bringing neighboring TNFR2 monomers into close proximity with one another. Trimerization of TNFR2 is particularly beneficial to receptor activation because it positions the TNFR2 monomers in conformation in which TNFα-binding sites are sterically available. This trimerization event may activate intracellular signaling by TNFR2, which, in turn, may promote proliferation of TNFR2-expressing cells, such as Treg cells, MDSCs, and/or TNFR2+ parenchymal cells. TNFR2 activation may also lead to elevated expression levels of CD274 (PDL1), PDCD1LG2 (PDL2), CD137 (4-1BB), and IKZF2.

Although TNFR2 activation gives rise to the expression of a variety of genes that may exert important therapeutic effects, the TNFR2 agonist polypeptides described herein may promote the expression of several proteins of particular therapeutic importance. Without being limited by mechanism, the TNFR2 polypeptides described herein may induce TNFR2-mediated cell healing, protection, proliferation, and/or regeneration by stimulating the expression of EP300 and CREB, two histone acetyl transferases that promote Foxp3 transcription. This biological activity is particularly significant, as it can promote flux through the cell cycle in TNFR2+ cells while causing the death of T effector cells, such as CD8+ T cells. The selective expansion of TNFR2+ cells and inhibition of T effector cells are some of the phenotypes that underlie the ability of agonistic TNFR2 polypeptides to treat autoimmunity, GVHD, inflammation, and other indications described herein.

One can monitor TNFR2 activation, for example, by measuring the expression of genes associated with the MAPK and TRAF2/3 signal cascade, such as the expression of genes whose transcription is mediated by NFκB (Faustman, et al., Nat. Rev. Drug Disc., 9:482-493, 2010, the disclosure of which is incorporated herein by reference).

Dual Proliferative and Cell Killing Effects of TNFR2 Agonist Polypeptides

Agonistic TNFR2 polypeptides disclosed herein, such as single-chain polypeptides, antibodies, antigen-binding fragments thereof, and constructs thereof, may not only promote the proliferation of Treg cells, MDSCs, and/or TNFR2+ parenchymal cells, but may also induce the death of T effector cells, such as CD8+ T effector cells (e.g., within a patient, such as a human patient). Agonistic TNFR2 polypeptides described herein may be capable, for instance, of increasing the total quantity of Treg cells, MDSCs, and/or TNFR2+ parenchymal cells in a sample treated with an agonist TNFR2 antibody or antigen-binding fragment thereof (such as a sample isolated from a human patient undergoing treatment for autoimmunity, GVHD, transplant rejection, allergies, chronic inflammatory disease, asthma, or another disorder described herein) by, e.g., 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, or more, relative to a sample not treated with an agonist TNFR2 antibody or antigen-binding fragment thereof. The ability of agonistic TNFR2 polypeptides (e.g., single-chain polypeptides, antibodies, and antigen-binding fragments) described herein to augment Treg, MDSC, and/or parenchymal cell growth may be due, in part, to the ability of these polypeptides to increase the quantity of soluble TNFR2 within a sample (e.g., a sample isolated from a human patient undergoing treatment for or autoimmunity, GVHD, transplant rejection, allergies, chronic inflammatory disease, asthma, or another disorder described herein).

The stimulation of Treg and MDSC proliferation engenders important therapeutic benefits, as these cells suppress the activity of T effector cells, such as autoreactive CD8+ T cells that mount an inappropriate immune response against self tissue. Similarly, the direct killing of T effector cells imparts therapeutic activity, as TNFR2 agonist polypeptides can be used to reduce the quantity of self-reactive T cells in a patient suffering from autoimmunity, GVHD, transplant rejection, allergies, chronic inflammatory disease, asthma, or another disorder described herein.

Through one or both of these mechanisms, TNFR2 agonist polypeptides of the disclosure can be used to suppress immunological conditions in a patient, such as a mammalian patient (e.g., a human patient).

Additionally, the ability of TNFR2 agonist polypeptides of the disclosure to stimulate proliferation of TNFR2+ parenchymal cells provides the beneficial effect of inducing tissue and organ regeneration. Exemplary TNFR2+ cells that can be induced to proliferate using the TNFR2 agonist polypeptides of the disclosure include, without limitation, cells of the pancreas, salivary gland, pituitary gland, kidney, heart, lung, hematopoietic system, cranial nerves, heart, aorta, olfactory gland, ear, nerves, structures of the head, eye, thymus, tongue, bone, liver, small intestine, large intestine, gut, lung, brain, skin, peripheral nervous system, central nervous system, spinal cord, breast, embryonic structures, embryos, and testes. Thus, TNFR2 agonist polypeptides described herein can be used to treat disorders in which the regeneration, protection, and/or healing of one or more of these cell types is desired. Exemplary diseases that can be treated using the TNFR2 agonist polypeptides of the disclosure are described herein.

Selective Modulation of Active ($CD25^{Hi}$ and $CD45RA^{Low}$) Treg Cells

Agonistic TNFR2 polypeptides (e.g., single-chain polypeptides, antibodies, antigen-binding fragments, and constructs thereof) described herein may be capable of augmenting the proliferation or increase the total quantity of Treg cells in a sample (e.g., a sample isolated from a human patient undergoing treatment for autoimmunity, GVHD, transplant rejection, allergies, chronic inflammatory disease, asthma, or another disorder described herein) and may act selectively on Treg cells in an actively-dividing state. For instance, agonistic TNFR2 antibodies or antigen-binding fragments thereof described herein may be capable of increasing the proliferation of Treg cells expressing $CD25^{Hi}$ and $CD45RA^{Low}$ by, e.g., 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, or more, relative to Treg cells that do not express the $CD25^{Hi}$ and $CD45RA^{Low}$ proteins, such as Treg cells that express $CD25^{Med}$ and $CD45RA^{Hi}$ proteins or even T cells that are not Treg cells.

TNFR2 Agonist Polypeptides are not Reliant on Additional TNFR2-Binding Agents for Activity Significantly, agonistic TNFR2 polypeptides, such as single-chain polypeptides, antibodies, or antigen-binding fragments thereof described herein, are capable of binding TNFR2 and augmenting TNFR2-mediated signaling without the need for the natural TNFR2 ligand, TNFα. Such agonists are referred to herein as dominant TNFR2 agonists. Agonistic TNFR2 polypeptides, such as antibodies, antigen-binding fragments thereof, single-chain polypeptides, and constructs described herein do not require TNFα to proliferate Treg cells, MDSCs, and/or TNFR2+ parenchymal cells. Without being limited by mechanism, agonistic TNFR2 polypeptides of the disclosure may exhibit this property due to the ability of these molecules to bind TNFR2 at particular epitopes that, when bound, stabilize the trimeric conformation of the receptor and its adjacent monomers. This structural configuration potentiates NFκB signaling and augments some of the fundamental signal transduction cascades associated with Treg, MDSC, and TNFR2+ parenchymal cell activation.

For instance, agonistic TNFR2 polypeptides, such as single-chain polypeptides, antibodies, antigen-binding fragments thereof, and constructs thereof described herein, may bind TNFR2 on the surface of a TNFR2+ cell, such as a Treg cell, MDSC, and/or TNFR2+ parenchymal cell and augment the proliferation of such cells in the presence or absence of TNFα. For example, agonistic TNFR2 polypeptides described herein may increase the proliferation of such cells by, e.g., 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 200%, 300%, 400% 500%, or more, relative to such cells that are not treated with the TNFR2 agonist polypeptide. The agonistic TNFR2 polypeptide (e.g., single-chain polypeptide, antibody, or antigen-biding fragment thereof) may exhibit an $EC_{50}$ value in a cell proliferation assay that is largely unchanged by the presence or absence of TNFα (e.g., an $EC_{50}$ value in the presence of TNFα that is changed by less than 50%, 45%, 40%, 35%, 25%, 20%, 15%, 10%, 9%, 8%, 7%, 6%, 5%, 4%, 3%, 2%, or less than 1% relative to the $EC_{50}$ value of the agonistic TNFR2 polypeptide (e.g., single-chain polypeptide, antibody, or antigen-binding fragment thereof) in the same cell proliferation assay in the absence of TNFα). Examples of Treg assays that can be used to measure the agonistic effects of TNFR2 antibodies are described herein, e.g., in Example 2 below. Similarly, agonistic TNFR2 polypeptides, such as single-chain polypeptides, antibodies, antigen-binding fragments thereof, and constructs thereof described herein, may augment TNFR2 signaling as assessed by measuring the expression of one or more genes selected from the group consisting of Foxp3, TNFSFSF18, IL2RA, IKZF2/4, CTLA4, TGF-beta, CHUK, NFKBIE, NFKBIA, MAP3K11, TRAF2, TRAF3, relB, TNF, CXCR3, PDL1 (CD274), IL2RA, IL7R, MAP3K1, MAP, MAP3K4, NFKBIB, TANK, TBK1, TNF, TNFAIP3, NFKBIA, MAP3K11, TNFRSF1B, TRAF2, relB, LTA, EP300, CREBBP, NFkB signaling proteins by, e.g., 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, or more, relative to such cells that are not treated with the TNFR2 agonist polypeptide. The agonistic TNFR2 polypeptide (e.g., single-chain polypeptide, antibody, or antigen-biding fragment thereof) may exhibit an $EC_{50}$ value in such a gene expression assay that is largely unchanged or augmented by the presence or absence of TNFα (e.g., an $EC_{50}$ value in the presence of TNFα that is changed by less than 50%, 45%, 40%, 35%, 25%, 20%, 15%, 10%, 9%, 8%, 7%, 6%, 5%, 4%, 3%, 2%, or less than 1% relative to the $EC_{50}$ value of the agonistic TNFR2 polypeptide (e.g., single-chain polypeptide, antibody, or antigen-binding fragment thereof) in the same gene expression assay in the absence of TNFα).

Activity of Antigen-Binding Fragments of Full-Length TNFR2 Agonist Antibodies

Agonistic TNFR2 antibodies described herein may augment proliferation of a Treg cell, MDSC, and/or parenchymal cell, and/or promote T effector cell death, with a similar potency as that exhibited by antigen-binding fragments of such antibodies. For instance, removal of the Fc region of an agonistic TNFR2 antibody described herein may not alter the ability of the molecule to promote the proliferation of Treg cells, MDSCs, and/or parenchymal cells, and/or to directly kill T effector cells (e.g., CD8+ autoreactive T cells) in a sample (e.g., a sample isolated from a human patient undergoing treatment for autoimmunity, GVHD, allergies, transplant rejection, or another condition as described herein). Agonistic TNFR2 antibodies and antigen-binding fragments thereof described herein may function, for instance, by a pathway distinct from antibody-dependent cellular cytotoxicity (ADCC), in which an Fc region is required to recruit effector proteins in order to induce cell death. Additionally, agonistic TNFR2 antibodies or antigen-binding fragments thereof may exhibit therapeutic activity in a variety of forms, such as a single-chain polypeptide (e.g., a single-chain polypeptide containing one or more CDRs covalently bound to one another, for instance, by an amide bond, a thioether bond, a carbon-carbon bond, or a disulfide bridge), a monoclonal antibody or antigen-binding fragment thereof, a polyclonal antibody or antigen-binding fragment thereof, a humanized antibody or antigen-binding fragment thereof, a primatized antibody or antigen-binding fragment thereof, a bispecific antibody or antigen-binding fragment thereof, a multi-specific antibody or antigen-binding fragment thereof, a dual-variable immunoglobulin domain, a monovalent antibody or antigen-binding fragment thereof, a chimeric antibody or antigen-binding fragment thereof, a single-chain Fv molecule (scFv), a diabody, a triabody, a nanobody, an antibody-like protein scaffold, a domain antibody, a Fv fragment, a Fab fragment, a $F(ab')_2$ molecule, and a tandem scFv (taFv), among others.

Specific Binding Properties of Agonistic TNFR2 Polypeptides

The specific binding of a polypeptide, such as a single-chain polypeptide, antibody, or antibody fragment described herein, to human TNFR2 can be determined by any of a variety of established methods. The affinity can be represented quantitatively by various measurements, including the concentration of antibody needed to achieve half-maximal activation of the TNFR2 receptor in vitro or in vivo ($EC_{50}$) and the equilibrium constant ($K_D$) of the antibody-TNFR2 complex dissociation. The equilibrium constant, $K_D$, that describes the interaction of TNFR2 with an antibody described herein is the chemical equilibrium constant for the dissociation reaction of a TNFR2-antibody complex into solvent-separated TNFR2 and antibody molecules that do not interact with one another.

Polypeptides (e.g., single-chain polypeptides, antibodies, and antigen-binding fragments) described herein include those that specifically bind to TNFR2 with a $K_D$ value of less than 100 nM (e.g., 95 nM, 90 nM, 85 nM, 80 nM, 75 nM, 70 nM, 65 nM, 60 nM, 55 nM, 50 nM, 45 nM, 40 nM, 35 nM, 30 nM, 25 nM, 20 nM, 15 nM, 10 nM, 5 nM, 4 nM, 3 nM, 2 nM, or 1 nM). In some embodiments, polypeptides (e.g., single-chain polypeptides, antibodies, antigen-binding fragments, and constructs thereof) described herein specifically bind to TNFR2 with a $K_D$ value of less than 1 nM (e.g., (e.g., 990 pM, 980 pM, 970 pM, 960 pM, 950 pM, 940 pM, 930 pM, 920 pM, 910 pM, 900 pM, 890 pM, 880 pM, 870 pM, 860 pM, 850 pM, 840 pM, 830 pM, 820 pM, 810 pM, 800 pM, 790 pM, 780 pM, 770 pM, 760 pM, 750 pM, 740 pM, 730 pM, 720 pM, 710 pM, 700 pM, 690 pM, 680 pM, 670 pM, 660 pM, 650 pM, 640 pM, 630 pM, 620 pM, 610 pM, 600 pM, 590 pM, 580 pM, 570 pM, 560 pM, 550 pM, 540 pM, 530 pM, 520 pM, 510 pM, 500 pM, 490 pM, 480 pM, 470 pM, 460 pM, 450 pM, 440 pM, 430 pM, 420 pM, 410 pM, 400 pM, 390 pM, 380 pM, 370 pM, 360 pM, 350 pM, 340 pM, 330 pM, 320 pM, 310 pM, 300 pM, 290 pM, 280 pM, 270 pM, 260 pM, 250 pM, 240 pM, 230 pM, 220 pM, 210 pM, 200 pM, 190 pM, 180 pM, 170 pM, 160 pM, 150 pM, 140 pM, 130 pM, 120 pM, 110 pM, 100 pM, 90 pM, 80 pM, 70 pM, 60 pM, 50 pM, 40 pM, 30 pM, 20 pM, 10 pM, 5 pM, or 1 pM).

Polypeptides described herein can also be characterized by a variety of in vitro binding assays. Examples of experiments that can be used to determine the $K_D$ or $EC_{50}$ of an agonistic TNFR2 polypeptide include, e.g., surface plasmon resonance, isothermal titration calorimetry, fluorescence anisotropy, ELISA-based assays, gene expression assays, and protein expression assays, among others. ELISA represents a particularly useful method for analyzing antibody activity, as such assays typically require minimal concentrations of antibodies. A common signal that is analyzed in a typical ELISA assay is luminescence, which is typically the result of the activity of a peroxidase conjugated to a secondary antibody that specifically binds a primary antibody (e.g., a TNFR2 antibody described herein). Polypeptides (e.g., single-chain polypeptides, antibodies, and antigen-binding fragments) described herein are capable of binding TNFR2 and epitopes therein, such as epitopes containing one or more continuous or discontinuous residues within CRD1, CRD2, and/or CRD3 of human TNFR2. Agonistic polypeptides described herein may additionally bind isolated peptides derived from TNFR2 that structurally pre-organize various residues in a manner that simulates the conformation of the above epitopes in the native protein. In a direct ELISA experiment, this binding can be quantified, e.g., by analyzing the luminescence that occurs upon incubation of an HRP substrate (e.g., 2,2'-azino-di-3-ethylbenzthiazoline sulfonate) with an antigen-antibody complex bound to a HRP-conjugated secondary antibody.

Kinetic Properties of Agonistic TNFR2 Polypeptides

In addition to the thermodynamic parameters of a TNFR2-polypeptide interaction, it is also possible to quantitatively characterize the kinetic association and dissociation of a polypeptide described herein with TNFR2. This can be done, e.g., by monitoring the rate of polypeptide-antigen (e.g., antibody-antigen) complex formation according to established procedures. For example, one can use surface plasmon resonance (SPR) to determine the rate constants for the formation ($k_{on}$) and dissociation ($k_{off}$) of an antibody-TNFR2 complex. These data also enable calculation of the equilibrium constant of ($K_D$) of antibody-TNFR2 complex dissociation, since the equilibrium constant of this unimolecular dissociation can be expressed as the ratio of the $k_{off}$ to $k_{on}$ values. SPR is a technique that is particularly advantageous for determining kinetic and thermodynamic parameters of receptor-antibody interactions since the experiment does not require that one component be modified by attachment of a chemical label. Rather, the receptor is typically immobilized on a solid metallic surface which is treated in pulses with solutions of increasing concentrations of antibody. Antibody-receptor binding induces distortion in the angle of reflection of incident light at the metallic surface, and this change in refractive index over time as antibody is introduced to the system can be fit to established regression models in order to calculate the association and dissociation rate constants of an antibody-receptor interaction.

Polypeptides (e.g., single-chain polypeptides, antibodies, antigen-binding fragments, and constructs thereof) described herein may exhibit high $k_{on}$ and low $k_{off}$ values upon interaction with TNFR2, consistent with high-affinity receptor binding. For example, polypeptides described herein may exhibit $k_{on}$ values in the presence of TNFR2 of greater than $10^4$ (e.g., $1.0 \times 10^4$ $1.5 \times 10^4$ $M^{-1}s^{-1}$, $2.0 \times 10^4$ $M^{-1}s^{-1}$, $2.5 \times 10^4$ $M^{-1}s^{-1}$, $3.0 \times 10^4$ $M^{-1}s^{-1}$, $3.5 \times 10^4$ $M^{-1}s^{-1}$, $4.0 \times 10^4$ $4.5 \times 10^4$ $M^{-1}s^{-1}$, $5.0 \times 10^4$ $M^{-1}s^{-1}$, $5.5 \times 10^4$ $M^{-1}$ $s^{-1}$, $6.0 \times 10^4$ $M^{-1}$ $s^{-1}$, $6.5 \times 10^4$ $M^{-1}$ $s^{-1}$, $7.0 \times 10^4$ $M^{-1}$ $s^{-1}$, $7.5 \times 10^4$ $M^{-1}$ $s^{-1}$, $8.0 \times 10^4$ $M^{-1}$ $s^{-1}$, $8.5 \times 10^4 M^{-1}$ $s^{-1}$, $9.0 \times 10^4$ $M^{-1}$ $s^{-1}$, $9.5 \times 10^4$ $M^{-1}$ $s^{-1}$, $1.0 \times 10^5$ $M^{-1}s^{-1}$, $1.5 \times 10^5$ $M^{-1}s^{-1}$, $2.0 \times 10^5$ $M^{-1}s^{-1}$, $2.5 \times 10^5$ $M^{-1}s^{-1}$, $3.0 \times 10^5$ $M^{-1}s^{-1}$, $3.5 \times 10^5$ $M^{-1}s^{-1}$, $4.0 \times 10^5$ $M^{-1}s^{-1}$, $4.5 \times 10^5$ $M^{-1}s^{-1}$, $5.0 \times 10^5$ $M^{-1}s^{-1}$, $5.5 \times 10^5 6.0 \times 10^5$ $M^{-1}s^{-1}$, $6.5 \times 10^5$ $M^{-1}s^{-1}$, $7.0 \times 10^5$ $M^{-1}s^{-1}$, $7.5 \times 10^5$ $M^{-1}s^{-1}$, $8.0 \times 10^5$ $M^{-1}s^{-1}$, $8.5 \times 10^5$ $M^{-1}$ $s^{-1}$, $9.0 \times 10^5$ $M^{-1}s^{-1}$, $9.5 \times 10^5$ $M^{-1}s^{-1}$, or $1.0 \times 10^6$ $M^{-1}$ $s^{-1}$). Polypeptides (e.g., single-chain polypeptides, antibodies, antigen-binding fragments, and constructs thereof) described herein may exhibit low $k_{off}$ values when bound to TNFR2, as these polypeptides are capable of interacting with distinct TNFR2 epitopes with a high affinity. Residues within these epitopes may form strong intermolecular contacts with TFNR2, which can slow the dissociation of the antibody-TNFR2 complex. This high receptor affinity can manifest in low $k_{off}$ values. For instance, polypeptides described herein may exhibit $k_{off}$ values of less than $10^{-3}s^{-1}$ when complexed to TNFR2 (e.g., $1.0 \times 10^{-3}s^{-1}$, $9.5 \times 10^4$ $s^{-1}$, $9.0 \times 10^4$ $s^{-1}$, $8.5 \times 10^4$ $s^{-1}$, $8.0 \times 10^{-4}$ $s^{-1}$, $7.5 \times 10^{-4}$ $s^{-1}$, $7.0 \times 10^{-4}s^{-1}$, $6.5 \times 10^{-4}s^{-1}$, $6.0 \times 10^{-4}s^{-1}$, $5.5 \times 10^{-4}s^{-1}$, $5.0 \times 10^{-4}$ $s^{-1}$, $4.5 \times 10^{-4}$ $s^{-1}$, $4.0 \times 10^{-4}$ $s^{-1}$, $3.5 \times 10^{-4}s^{-1}$, $3.0 \times 10^{-4}s^{-1}$, $2.5 \times 10^{-4}s^{-1}$, $2.0 \times 10^{-4}s^{-1}$, $1.5 \times 10^{-4}s^{-1}$, $1.0 \times 10^{-4}s^{-1}$, $9.5 \times 10^{-5}s^{-1}$, $9.0 \times 10^{-5}s^{-1}$, $8.5 \times 10^{-5}s^{-1}$, $8.0 \times 10^{-5}s^{-1}$, $7.5 \times 10^{-5}s^{-1}$, $7.0 \times 10^{-5}s^{-1}$, $6.5 \times 10^{-5}s^{-1}$, $6.0 \times 10^{-5}s^{-1}$, $5.5 \times 10^{-5}s^{-1}$, $5.0 \times 10^{-5}$ $s^{-1}$, $4.5 \times 10^{-5}s^{-1}$, $4.0 \times 10^{-5}$ $s^{-1}$, $3.5 \times 10^{-5}s^{-1}$, $3.0 \times 10^{-5}$ $s^{-1}$, $2.5 \times 10^{-5}s^{-1}$, $2.0 \times 10^{-5}$ $s^{-1}$, $1.5 \times 10^{-5}s^{-1}$, or $1.0 \times 10^{-5}s^{-1}$).

Epitopes within TNFR2 Bound by Agonistic TNFR2 Polypeptides

Agonistic TNFR2 polypeptides, such as dominant agonistic TNFR2 polypeptides (e.g., single-chain polypeptides, antibodies, antigen-binding fragments, and constructs thereof) described herein, may specifically bind one or more of the following residues of TNFR2:

```
(a) amino acids 56-60 of SEQ ID NO: 1
within human TNFR2
(KCSPG);

(b) amino acids 101-107 of SEQ ID NO: 1
within human TNFR2
(CSSDQVET);

(c) amino acids 115-142 of SEQ ID NO: 1
within human TNFR2
(NRICTCRPGWYCALSKQEGCRLCAPLRK);

(d) amino acids 26-45 of SEQ ID NO: 1
within human TNFR2
(QTAQMCCSKCSPGQHAKVFC);

(e) amino acids 90-109 of SEQ ID NO: 1
within human TNFR2
(REQNRICTCRPGWYCALSKQ);

(f) amino acids 98-117 of SEQ ID NO: 1
within human TNFR2
(CRPGWYCALSKQEGCRLCAP);

(g) amino acids 106-125 of SEQ ID NO: 1
within human TNFR2
(LSKQEGCRLCAPLRKCRPGF);

(h) amino acids 108-127 of SEQ ID NO: 1
within human TNFR2
(KQEGCRLCAPLRKCRPGFGV);
``` and/or
(i) an equivalent epitope within TNFR2 of a non-human mammal, such as a non-human mammal described herein, an epitope that exhibits at least 85% sequence identity (e.g., 85%, 90%, 95%, 97%, 99%, or 100% sequence identity) to any of the foregoing epitopes, and/or an epitope that contains one or more conservative amino acid substitutions relative to any of the above epitopes.

In some embodiments, agonistic TNFR2 polypeptides, such as dominant agonistic TNFR2 polypeptides (e.g., single-chain polypeptides, antibodies, antigen-binding fragments, and constructs thereof) described herein do not bind to epitopes containing or more, or all, of residues of 142-146 of SEQ ID NO: 1 within human TNFR2 (KCRPG, SEQ ID NO: 41).

One exemplary procedure that can be used to predict the proliferative, regenerative, healing, or protective activity of a TNFR2 polypeptide described herein is to determine the affinity of the antibody or antibody fragment for a peptide containing the KCSPG motif (SEQ ID NO: 40), such as a linear or cyclic peptide that contains this motif. The peptide may be, for example, structurally pre-organized by virtue of one or more conformational constraints (e.g., backbone or side-chain-to-side-chain cyclization) in a manner that simulates the three-dimensional orientation of the KCSPG motif (SEQ ID NO: 40). For example, agonistic TNFR2 polypeptides described herein may bind a peptide containing the KCSPG motif (SEQ ID NO: 40) with an affinity that is, e.g., 10-fold, 15-fold, 20-fold, 30-fold, 40-fold, 50-fold, 60-fold, 70-fold, 80-fold, 90-fold, 100-fold, 200-fold, 300-fold, 400-fold, 500-fold, 600-fold, 700-fold, 800-fold, 900-fold, 1000-fold, or more than 1000-fold greater than the affinity of the agonistic polypeptide for a peptide containing the amino acid sequence of KCRPG (SEQ ID NO: 41).

The Agonistic TNFR2 Antibody TNFRAG1

Exemplary agonistic TNFR2 polypeptides described herein, such as single-chain polypeptides, antibodies, antigen-binding fragments thereof, and constructs thereof, may include one or more, or all, of the CDRs of TNFRAG1, a monoclonal antibody that specifically binds TNFR2 at epitopes that promote TNFR2 signal transduction, and thus, the proliferation of Treg cells and MDSCs, the regeneration, healing, and protection of TNFR2+ parenchymal cells, and the death of T effector cells (e.g., CD8+T effector cells). For instance, the CDR-H1, CDR-H2, CDR-H3, CDR-L1, CDR-L2, and/or CDR-L3 of TNFRAG1, and variants of these CDRs (e.g., variants that exhibit conservative amino acid substitutions relative to these CDR sequences) can be used to generate additional agonistic TNFR2 polypeptides (e.g., single-chain polypeptides, antibodies, antigen-binding fragments thereof, and constructs) of the disclosure, for example, by way of antibody humanization methods described herein or known in the art.

Agonistic TNFR2 polypeptides (e.g., single-chain polypeptides, antibodies, and antigen-binding fragments) of the disclosure may exhibit binding properties that are the same as or similar to those of TNFRAG1. Particularly, TNFRAG1 specifically binds human TNFR2 at one or more of the following residues:

```
(a) amino acids 56-60 of SEQ ID NO: 1
(KCSPG);

(b) amino acids 101-107 of SEQ ID NO: 1
(CSSDQVET);

(c) amino acids 115-142 of SEQ ID NO: 1
(NRICTCRPGWYCALSKQEGCRLCAPLRK);

(d) amino acids 26-45 of SEQ ID NO: 1
(QTAQMCCSKCSPGQHAKVFC);

(e) amino acids 90-109 of SEQ ID NO: 1
(REQNRICTCRPGWYCALSKQ);

(f) amino acids 98-117 of SEQ ID NO: 1
(CRPGWYCALSKQEGCRLCAP);

(g) amino acids 106-125 of SEQ ID NO: 1
(LSKQEGCRLCAPLRKCRPGF); and/or (h) amino acids 108-127 of SEQ ID NO: 1
(KQEGCRLCAPLRKCRPGFGV).
```

TNFRAG1 may contain one or both of the heavy chain variable regions set forth set forth in SEQ ID NOs: 14 and 15, below. The CDRs of each of these regions are indicated in bold:

```
                                         (SEQ ID NO: 14)
EVQLQQFGAELVKPGASVKISCKASGYTFTDYNIDW

VKQSHGKSLEWIGDINPNYDSTSYSQKFRGKATLTV

DKSSSTAYMELRSLTSEDTAVYYCARGNSWYFDVWG

AGTTVTVSS
                                         (SEQ ID NO: 15)
EVQLQQFGAELVKPGASVKISCKASGYTFTDYNLDW

VKQSHGKSLEWIGDINPNYDSTSYSQKFRGKATLTV
```

DKSSSTAYMELRSLTSEDTAVYYCARGNSWYFDVWG

AGTTVTVSS

Additionally, TNFRAG1 contains a light chain variable region set forth in SEQ ID NO: 42, below. The CDRs of this region are indicated in bold.

(SEQ ID NO: 42)
QIVLTQSPALMSASPGEKVTMTCSASSSVRYMYVVYQQ

KPRSSPKPWIYLTSNLASGVPARFSGSGSGTSYSLTIS

SMEAEDAATYYCQQWSSNPLTFGAGTKLELK

The section that follows provides a detailed description of methods that can be used to prepare human, humanized, primatized, chimeric, and other polypeptides (e.g., single-chain polypeptides, antibodies, antigen-binding fragments thereof, and constructs) based on, for example, the molecular features of TNFRAG1.

Fully Human, Humanized, Primatized, and Chimeric Antibodies

Antibodies described herein include fully human, humanized, primatized, and chimeric antibodies that contain one or more, or all, of the CDR sequences of TNFRAG1. Additionally, antibodies described herein include fully human, humanized, primatized, and chimeric antibodies that contain one or more, or all, of the CDR-H1, CDR-H2, CDR-H3, CDR-L1, CDR-L2, and CDR-L3 sequences in which one or more, or all, of the CDR sequences exhibits at least 85% sequence identity (e.g., 90%, 95%, 96%, 97%, 98%, 99%, or 100% sequence identity) to the corresponding CDR sequence of TNFRAG1). Agonistic TNFR2 antibodies described herein further include fully human, humanized, primatized, and chimeric antibodies that contain one or more, or all, of the CDR-H1, CDR-H2, CDR-H3, CDR-L1, CDR-L2, and CDR-L3 sequences in which one or more, or all, of the CDR sequences contains one or more (for instance, up to 3) amino acid substitutions (e.g., one or more conservative amino acid substitutions) relative to the corresponding CDR sequence and important to the shared heavy chain framework sequence where versions are also found in human heavy chain sequences.

As an example, one strategy that can be used to design humanized antibodies described herein is to align the sequences of the heavy chain variable region and light chain variable region of TNFRAG1 with the heavy chain variable region and light chain variable region of a consensus human antibody. Consensus human antibody heavy chain and light chain sequences are known in the art (see e.g., the "VBASE" human germline sequence database; see also Kabat, et al., Sequences of Proteins of Immunological Interest, Fifth Edition, U.S. Department of Health and Human Services, NIH Publication No. 91-3242, 1991; Tomlinson et al., J. Mol. Biol. 227:776-98, 1992; and Cox et al, Eur. J. Immunol. 24:827-836, 1994; the disclosure of which is incorporated herein by reference). In this way, the variable domain framework residues and CDRs can be identified by sequence alignment (see Kabat, supra). One can substitute, for example, one or more of the CDRs of the consensus human antibody with the corresponding CDR(s) of TNFRAG1 in order to produce a humanized TNFR2 agonist antibody. Exemplary variable domains of a consensus human antibody include the heavy chain variable domain:

(SEQ ID NO: 43)
EVQLVESGGGLVQPGGSLRLSCAASGFTFSDYAMSWVRQ

APGKGLEWVAVISENGSDTYYADSVKGRFTISRDDSKNT

LYLQMNSLRAEDTAVYYCARDRGGAVSYFDVWGQGTLVT

VSS and the light chain variable domain:

(SEQ ID NO: 44)
DIQMTQSPSSLSASVGDRVTITCRASQDVSSYLAWYQQK

PGKAPKLLIYAASSLESGVPSRFSGSGSGTDFTLTISSL

QPEDFATYYCQQYNSLPYTFGQGTKVEIKRT identified in U.S. Pat. No. 6,054,297; the disclosure of which is incorporated herein by reference (CDRs are shown in bold were determined according to the method of Chothia, et al., J. Mol. Biol, 196:901-917, 1987). These amino acid substitutions can be made, for example, by recombinant expression of polynucleotides encoding the heavy and light chains of a humanized antibody in a host cell using methods known in the art or described herein.

Similarly, this strategy can also be used to produce primatized agonistic TNFR2 antibodies, as one can substitute, for example, one or more, or all, of the CDRs of a primate antibody consensus sequence with, for example, one or more, or all, of the CDRs of TNFRAG1. Consensus primate antibody sequences known in the art (see e.g., U.S. Pat. Nos. 5,658,570; 5,681,722; and 5,693,780; the disclosures of each of which are incorporated herein by reference).

In some embodiments, it may be desirable to import particular framework residues in addition to CDR sequences from an agonistic TNFR2 antibody, such as TNFRAG1, into the heavy and/or light chain variable domains of a human antibody. For instance, U.S. Pat. No. 6,054,297 identifies several instances when it may be advantageous to retain certain framework residues from a particular antibody heavy chain or light chain variable region in the resulting humanized antibody. In some embodiments, framework residues may engage in non-covalent interactions with the antigen and thus contribute to the affinity of the antibody for the target antigen. In some embodiments, individual framework residues may modulate the conformation of a CDR, and thus indirectly influence the interaction of the antibody with the antigen. Certain framework residues may form the interface between VH and VL domains, and may therefore contribute to the global antibody structure. In some cases, framework residues may constitute functional glycosylation sites (e.g., Asn-X-Ser/Thr) which may dictate antibody structure and antigen affinity upon attachment to carbohydrate moieties. In cases such as those described above, it may be beneficial to retain certain framework residues of a TNFR2 agonist antibody (e.g., TNFRAG1) in, e.g., a humanized or primatized agonistic antibody or antigen-binding fragment thereof, as various framework residues may promote high epitope affinity and improved biochemical activity of the antibody or antigen-binding fragment thereof.

Antibodies described herein also include antibody fragments, Fab domains, F(ab') molecules, F(ab')$_2$ molecules, single-chain variable fragments (scFvs), tandem scFv fragments, diabodies, triabodies, dual variable domain immunoglobulins, multi-specific antibodies, bispecific antibodies, and heterospecific antibodies that (i) contain one or more, or all, of the CDRs of TNFRAG1, and/or (ii) have one or more, or all, of the CDR-H1, CDR-H2, CDR-H3, CDR-L1, CDR-L2, and CDR-L3 sequences in which one or more, or all, of the CDR sequences exhibits at least 85% sequence identity (e.g., 90%, 95%, 96%, 97%, 98%, 99%, or 100% sequence identity) to the corresponding CDR sequence of TNFRAG1. These molecules can be expressed recombinantly, e.g., by incorporating polynucleotides encoding these proteins into expression vectors for transfection in a eukaryotic or prokaryotic cell using techniques described herein or known in the art, or synthesized chemically, e.g., by solid phase peptide synthesis methods described herein or known in the art.

Polypeptides described herein additionally include antibody-like scaffolds that contain, for example, one or more, or all, of the CDRs of TNFRAG1, or in which one or more, or all, of the CDR-H1, CDR-H2, CDR-H3, CDR-L1, CDR-L2, and CDR-L3 sequences exhibits at least 85% sequence identity (e.g., 90%, 95%, 96%, 97%, 98%, 99%, or 100% sequence identity) to the corresponding CDR sequence of TNFRAG1 and/or contains one or more (for instance, up to 3) amino acid substitutions (e.g., one or more conservative amino acid substitutions) relative to the corresponding CDR sequence of TNFRAG1. Examples of antibody-like scaffolds include proteins that contain a tenth fibronectin type III domain ($^{10}$Fn3), which contains BC, DE, and FG structural loops analogous to canonical antibodies. The tertiary structure of the $^{10}$Fn3 domain resembles that of the variable region of the IgG heavy chain, and one of skill in the art can graft, e.g., one or more, or all, of the CDR sequences of TNFRAG1 or sequences having at least 85% sequence identity (e.g., 90%, 95%, 97%, 99%, or 100% sequence identity) to any one or more of these CDR sequences or sequences containing amino acid substitutions, such as conservative or nonconservative amino acid substitutions (e.g., up to 3 amino acid substitutions) relative to one or more of these CDR sequences onto the fibronectin scaffold by replacing residues of the BC, DE, and FG loops of $^{10}$Fn3 with residues of the corresponding CDR sequence of TNFRAG1. This can be achieved by recombinant expression of a modified $^{10}$Fn3 domain in a prokaryotic or eukaryotic cell (e.g., using the vectors and techniques described herein). Examples of using the $^{10}$Fn3 domain as an antibody-like scaffold for the grafting of CDRs from antibodies onto the BC, DE, and FG structural loops are reported in WO 2000/034784, WO 2009/142773, WO 2012/088006, and U.S. Pat. No. 8,278,419; the disclosures of each of which are incorporated herein by reference.

Molecular Determinants of TNFR2 Affinity and Agonism

The polypeptides of the disclosure may exhibit a series of shared structural features that give rise to a TNFR2 agonist phenotype (e.g., a dominant TNFR2 agonist phenotype). For example, alignment of the amino acid sequences of the CDR-H1 of each of TNRAG1 and two additional agonistic TNFR2 monoclonal antibodies, TNFRAG2 and TNFRAG3, demonstrate that these antibodies feature a conserved consensus CDR-H1 sequence, as shown below:

```
              (TNFRAG1 CDR-H1, SEQ ID NO: 45)
  G    Y    T    F    T    D    Y    N    (I/L)

(TNFRAG2 CDR-H1, SEQ ID NO: 46)
  G    F    T    F    T    D    Y    D (TNFRAG3 CDR-H1, SEQ ID NO: 47)
  G    Y    T    F    T    D    Y    -    I (Consensus sequence, SEQ ID NO: 48)
  G   (Y/F)  T    F    T    D    Y   (N/D)  -
```

Alignment of the sequences reveals a shared CDR-H1 motif, such as the motif set forth as GZ$^1$TFZ$^3$Z$^2$YZ$^3$Z$^4$ (SEQ ID NO: 2), in which each Z$^1$ is independently a naturally occurring amino acid including a side-chain including an aromatic substituent, each Z$^2$ is independently a naturally occurring amino acid including an anionic side-chain at physiological pH, each Z$^3$ is independently a naturally occurring amino acid including a polar, uncharged side-chain at physiological pH, and each Z$^4$ is independently leucine or isoleucine. Agonistic TNFR2 polypeptides of the disclosure may have a CDR-H1 sequence as set forth in any one of SEQ ID NOs: 45-47, above, and/or a CDR-H1 represented by the conserved motif of SEQ ID NO: 2.

Nucleic Acids and Expression Systems

Agonistic TNFR2 polypeptides (e.g., single-chain polypeptides, antibodies, antigen-binding fragments thereof, and constructs thereof) described herein can be prepared by any of a variety of established techniques. For instance, an agonistic TNFR2 antibody or antigen-binding fragment thereof described herein can be prepared by recombinant expression of immunoglobulin light and heavy chain genes in a host cell. To express an antibody recombinantly, a host cell can be transfected with one or more recombinant expression vectors carrying DNA fragments encoding the immunoglobulin light and heavy chains of the antibody such that the light and heavy chains are expressed in the host cell and, optionally, secreted into the medium in which the host cells are cultured, from which medium the antibodies can be recovered. Standard recombinant DNA methodologies are used to obtain antibody heavy and light chain genes, incorporate these genes into recombinant expression vectors and introduce the vectors into host cells, such as those described in Molecular Cloning; A Laboratory Manual, Second Edition (Sambrook, Fritsch and Maniatis (eds), Cold Spring Harbor, N. Y., 1989), Current Protocols in Molecular Biology (Ausubel et al., eds., Greene Publishing Associates, 1989), and in U.S. Pat. No. 4,816,397; the disclosures of each of which are incorporated herein by reference.

Vectors for Expression of Agonistic TNFR2 Polypeptides

Viral genomes provide a rich source of vectors that can be used for the efficient delivery of exogenous genes into the genome of a cell (e.g., a eukaryotic or prokaryotic cell). Viral genomes are particularly useful vectors for gene delivery because the polynucleotides contained within such genomes are typically incorporated into the genome of a target cell by generalized or specialized transduction. These processes occur as part of the natural viral replication cycle, and do not require added proteins or reagents in order to induce gene integration. Examples of viral vectors include a retrovirus, adenovirus (e.g., Ad5, Ad26, Ad34, Ad35, and Ad48), parvovirus (e.g., adeno-associated viruses), coronavirus, negative strand RNA viruses such as orthomyxovirus (e.g., influenza virus), rhabdovirus (e.g., rabies and vesicular stomatitis virus), paramyxovirus (e.g. measles and Sendai), positive strand RNA viruses, such as picornavirus and alphavirus, and double stranded DNA viruses including adenovirus, herpesvirus (e.g., Herpes Simplex virus types 1 and 2, Epstein-Barr virus, cytomegalovirus), and poxvirus (e.g., vaccinia, modified vaccinia Ankara (MVA), fowlpox and canarypox). Other viruses useful for delivering polynucleotides encoding antibody light and heavy chains or antibody fragments described herein include Norwalk virus, togavirus, flavivirus, reoviruses, papovavirus, hepadnavirus, and hepatitis virus, for example. Examples of retroviruses include: avian leukosis-sarcoma, mammalian C-type, B-type viruses, D-type viruses, HTLV-BLV group, lentivirus, spumavirus (Coffin, J. M., Retroviridae: The viruses and their replication, *In Fundamental Virology*, Third Edition, B. N. Fields, et al., Eds., Lippincott-Raven Publishers, Philadelphia, 1996). Other examples include murine leukemia viruses, murine sarcoma viruses, mouse mammary tumor virus, bovine leukemia virus, feline leukemia virus, feline sarcoma virus, avian leukemia virus, human T cell leukemia virus, baboon endogenous virus, Gibbon ape leukemia virus, Mason Pfizer monkey virus, simian immunodeficiency virus, simian sarcoma virus, Rous sarcoma virus and lentiviruses. Other examples of vectors are described, for example, in McVey et al., (U.S. Pat. No. 5,801,030); the disclosures of each of which are incorporated herein by reference.

Non-viral vectors, such as plasmids, are also well known in the art and include, but are not limited to prokaryotic and eukaryotic vectors (e.g., yeast- and bacteria-based plasmids), as well as plasmids for expression in mammalian cells. Methods of introducing the vectors into a host cell and isolating and purifying the expressed protein are also well known in the art (e.g., Molecular Cloning; A Laboratory Manual, Second Edition (Sambrook, Fritsch and Maniatis (eds), Cold Spring Harbor, N. Y., 1989)).

Genome Editing Techniques

In addition to viral vectors, a variety of additional methods have been developed for the incorporation of genes, e.g., those encoding antibody light and heavy chains, single-chain polypeptides, single-chain variable fragments (scFvs), tandem scFvs, Fab domains, F(ab')$_2$ domains, diabodies, and triabodies, among others, into the genomes of target cells for polypeptide expression. One such method that can be used for incorporating polynucleotides encoding agonistic TNFR2 polypeptides (e.g., single-chain polypeptides, antibodies, antigen-binding fragments thereof, or constructs thereof) into prokaryotic or eukaryotic cells includes the use of transposons. Transposons are polynucleotides that encode transposase enzymes and contain a polynucleotide sequence or gene of interest flanked by excision sites at the 5' and 3' positions. Once a transposon has been delivered into a cell, expression of the transposase gene commences and results in active enzymes that cleave the gene of interest from the transposon. This activity is mediated by the site-specific recognition of transposon excision sites by the transposase. In some embodiments, these excision sites may be terminal repeats or inverted terminal repeats. Once excised from the transposon, the gene of interest can be integrated into the genome of a prokaryotic or eukaryotic cell by transposase-catalyzed cleavage of similar excision sites that exist within nuclear genome of the cell. This allows the gene encoding an agonistic TNFR2 polypeptide described herein to be inserted into the cleaved nuclear DNA at the excision sites, and subsequent ligation of the phosphodiester bonds that join the gene of interest to the DNA of the prokaryotic or eukaryotic cell genome completes the incorporation process. In some embodiments, the transposon is a retrotransposon, such that the gene encoding the polypeptide is first transcribed to an RNA product and then reverse-transcribed to DNA before incorporation in the prokaryotic or eukaryotic cell genome. Exemplary transposon systems include the piggybac transposon (described in detail in WO 2010/085699) and the sleeping beauty transposon (described in detail in US20050112764); the disclosures of each of which are incorporated herein by reference.

Another useful method for the integration of nucleic acid molecules encoding agonistic TNFR2 polypeptides (e.g., single-chain polypeptides, antibodies, or antigen-binding fragments thereof) into the genome of a prokaryotic or eukaryotic cell is the clustered regularly interspaced short palindromic repeats (CRISPR)/Cas system, which is a system that originally evolved as an adaptive defense mechanism in bacteria and archaea against infection by viruses. The CRISPR/Cas system consists of palindromic repeat sequences within plasmid DNA and an associated Cas9 nuclease. This ensemble of DNA and protein directs site specific DNA cleavage of a target sequence by first incorporating foreign DNA into CRISPR loci. Polynucleotides containing these foreign sequences and the repeat-spacer elements of the CRISPR locus are in turn transcribed in a host cell to create a guide RNA, which can subsequently anneal to a target sequence and localize the Cas9 nuclease to this site. In this manner, highly site-specific cas9-mediated DNA cleavage can be engendered in a foreign polynucleotide because the interaction that brings cas9 within close proximity of the target DNA molecule is governed by RNA:DNA hybridization. As a result, one can theoretically design a CRISPR/Cas system to cleave any target DNA molecule of interest. This technique has been exploited in order to edit eukaryotic genomes (Hwang et al., Nat. Biotech., 31:227-229, 2013) and can be used as an efficient means of site-specifically editing eukaryotic or prokaryotic genomes in order to cleave DNA prior to the incorporation of a polynucleotide encoding an agonistic TNFR2 polypeptides (e.g., single-chain polypeptides, antibodies, or antigen-binding fragments thereof) described herein. The use of CRISPR/Cas to modulate gene expression has been described in U.S. Pat. No. 8,697,359, the disclosure of which is incorporated herein by reference.

Alternative methods for site-specifically cleaving genomic DNA prior to the incorporation of a polynucleotide encoding a TNFR2 antibody or antibody fragment described herein include the use of zinc finger nucleases and transcription activator-like effector nucleases (TALENs). Unlike the CRISPR/Cas system, these enzymes do not contain a guiding polynucleotide to localize to a specific target sequence. Target specificity is instead controlled by DNA binding domains within these enzymes. Zinc finger nucleases and TALENs for use in genome editing applications are described in Urnov et al. (Nat. Rev. Genet., 11:636-646, 2010); and in Joung et al., (Nat. Rev. Mol. Cell. Bio. 14:49-55, 2013); incorporated herein by reference. Additional genome editing techniques that can be used to incorporate polynucleotides encoding antibodies described herein into the genome of a prokaryotic or eukaryotic cell include the use of ARCUS™ meganucleases that can be rationally designed so as to site-specifically cleave genomic DNA. The use of these enzymes for the incorporation of polynucleotides encoding agonistic TNFR2 polypeptides (e.g., single-chain polypeptides, antibodies, antigen-binding fragments thereof, or constructs thereof) described herein into the genome of a prokaryotic or eukaryotic cell is particularly advantageous in view of the structure-activity relationships that have been established for such enzymes. Single-chain meganucleases can thus be modified at certain amino acid positions in order to create nucleases that selectively cleave DNA at desired locations. These single-chain nucleases have been described extensively, e.g., in U.S. Pat. Nos. 8,021,867 and 8,445,251; the disclosures of each of which are incorporated herein by reference.

Polynucleotide Sequence Elements

To express agonistic TNFR2 polypeptides described herein (e.g., single-chain polypeptides, antibodies, antigen-binding fragments thereof, or constructs thereof), polynucleotides encoding partial or full-length light and heavy chains, e.g., polynucleotides that encode a one or more, or all, of the CDR sequences of an antibody or antigen-binding fragment thereof described herein, can be inserted into expression vectors such that the genes are operatively linked to transcriptional and translational control sequences. The expression vector and expression control sequences are chosen to be compatible with the expression host cell used. Polynucleotides encoding the light chain gene and the heavy chain of a TNFR2 polypeptide can be inserted into separate vectors, or, optionally, both polynucleotides can be incorporated into the same expression vector using established techniques described herein or known in the art.

In addition to polynucleotides encoding the heavy and light chains of an antibody (or a polynucleotide encoding a single-chain polypeptide, an antibody fragment, such as a scFv molecule, or a construct described herein), the recombinant expression vectors described herein may carry regulatory sequences that control the expression of the antibody chain genes in a host cell. The design of the expression vector, including the selection of regulatory sequences, may depend on such factors as the choice of the host cell to be transformed or the level of expression of protein desired. For instance, suitable regulatory sequences for mammalian host cell expression include viral elements that direct high levels of protein expression in mammalian cells, such as promoters and/or enhancers derived from cytomegalovirus (CMV) (such as the CMV promoter/enhancer), Simian Virus 40 (SV40) (such as the SV40 promoter/enhancer), adenovirus, (e.g., the adenovirus major late promoter (AdMLP)) and polyoma. Viral regulatory elements, and sequences thereof, are described in detail, for instance, in U.S. Pat. Nos. 5,168,062, 4,510,245, and 4,968,615, the disclosures of each of which are incorporated herein by reference.

In addition to the antibody chain genes and regulatory sequences, the recombinant expression vectors described herein can carry additional sequences, such as sequences that regulate replication of the vector in host cells (e.g., origins of replication) and selectable marker genes. A selectable marker gene facilitates selection of host cells into which the vector has been introduced (see e.g., U.S. Pat. Nos. 4,399,216, 4,634,665 and 5,179,017). For example, typically the selectable marker gene confers resistance to cytotoxic drugs, such as G418, puromycin, blasticidin, hygromycin or methotrexate, to a host cell into which the vector has been introduced. Suitable selectable marker genes include the dihydrofolate reductase (DHFR) gene (for use in DHFR⁻ host cells with methotrexate selection/amplification) and the neo gene (for G418 selection). In order to express the light and heavy chains of a TNFR2 antibody or a TNFR2 antibody fragment, the expression vector(s) containing polynucleotides encoding the heavy and light chains can be transfected into a host cell by standard techniques.

Polynucleotides Encoding Modified Agonistic TNFR2 Polypeptides

Using the compositions and methods of the disclosure, agonistic TNFR2 polypeptides can be produced, e.g., by importing one or more CDRs from a given TNFR2 agonist polypeptide into a germline antibody sequence, such as a human germline antibody sequence in the case of developing a human or humanized antibody. By way of example, agonistic TNFR2 polypeptides (e.g., single-chain polypeptides, antibodies, antigen-binding fragments thereof, or constructs thereof) described herein may contain one or more, or all, of the CDRs of TNFRAG1 (set forth in SEQ ID NOs: 2-4 and 10-13), or one or more, or all, of the CDR-H1, CDR-H2, CDR-H3, CDR-L1, CDR-L2, and CDR-L3 sequences in which one or more, or all, of the CDR sequences exhibits at least 85% sequence identity (e.g., 90%, 95%, 96%, 97%, 98%, 99%, or 100% sequence identity) to the corresponding CDR sequence of TNFRAG1 or contains one or more (for instance, up to 3) amino acid substitutions (e.g., one or more conservative amino acid substitutions) relative to the corresponding CDR sequence of TNFRAG1. Optionally, the TNFR2 agonist polypeptide may feature differences in one or more framework regions relative to those of TNFRAG1, such as a framework region that is positioned between CDR-H1 and CDR-H2. For instance, one or more framework regions of TNFRAG1 may be substituted with the framework region of a human antibody. Exemplary framework regions include, for example, human framework regions described in U.S. Pat. No. 7,829,086, and primate framework regions as described in EP 1945668; the disclosures of each of which are incorporated herein by reference. To generate nucleic acids encoding such TNFR2 antibodies, DNA fragments encoding, e.g., at least one, or both, of the light chain variable regions and the heavy chain variable regions can be produced by chemical synthesis (e.g., by solid phase polynucleotide synthesis techniques), in vitro gene amplification (e.g., by polymerase chain reaction techniques), or by replication of the polynucleotide in a host organism.

In some embodiments, a humanized agonistic TNFR2 antibody may include one or more, or all, of the CDR-H1, CDR-H2, CDR-H3, CDR-L1, CDR-L2, and CDR-L3 sequences in which one or more, or all, of the CDR sequences exhibits at least 85% sequence identity (e.g., 90%, 95%, 96%, 97%, 98%, 99%, or 100% sequence identity) to the corresponding CDR sequence of TNFRAG1 or contains one or more (for instance, up to 3) amino acid substitutions (e.g., one or more conservative amino acid substitutions) relative to the corresponding CDR sequence of TNFRAG1. This can be achieved, for example, by performing site-directed mutagenesis of germline DNA or cDNA and amplifying the resulting polynucleotides using the polymerase chain reaction (PCR) according to established procedures. Germline DNA sequences for human heavy and light chain variable region genes are known in the art (see, e.g., the "VBASE" human germline sequence database; see also Kabat et al., Sequences of Proteins of Immunological Interest, Fifth Edition, U.S. Department of Health and Human Services, NIH Publication No. 91-3242, 1991; Tomlinson et al., J. Mol. Biol. 227:776-798, 1992; and Cox et al., Eur. J. Immunol. 24:827-836, 1994; incorporated herein by reference). Chimeric nucleic acid constructs encoding human heavy and light chain variable regions containing one or more, or all, of the CDRs of TNFRAG1, or a similar sequence as described above, can be produced, e.g., using established cloning techniques known in the art. Additionally, a polynucleotide encoding a heavy chain variable region containing the one or more of the CDRs of TNFRAG1, or a similar sequence as described above, can be synthesized and used as a template for mutagenesis to generate a variant as described herein using routine mutagenesis techniques. Alternatively, a DNA fragment encoding the variant can be directly synthesized (e.g., by established solid phase nucleic acid chemical synthesis procedures).

DNA fragments encoding VH segments containing one or more, or all, of the CDR-H1, CDR-H2, and CDR-H3 sequences of TNFRAG1 can be further manipulated by standard recombinant DNA techniques, e.g., to convert the variable region genes to full-length antibody chain genes, to Fab fragment genes or to a scFv gene. In these manipulations, a VL- or VH-encoding DNA fragment is operatively linked to another DNA fragment encoding another protein, such as an antibody constant region or a flexible linker.

The isolated DNA encoding the VH region of an agonistic TNFR2 antibody described herein can be converted to a full-length heavy chain gene (as well as a Fab heavy chain gene), e.g., by operatively linking the VH-encoding DNA to another DNA molecule encoding heavy chain constant region domains (CH1, CH2, CH3, and, optionally, CH4). The sequences of human heavy chain constant region genes are known in the art (see e.g., Kabat et al., Sequences of Proteins of Immunological Interest, Fifth Edition, U.S. Department of Health and Human Services, NIH Publication No. 91-3242, 1991) and DNA fragments encompassing these regions can be obtained by standard PCR amplification. The heavy chain constant region can be an IgG1, IgG2, IgG3, IgG4, IgA, IgE, IgM or IgD constant region, and in certain embodiments is an IgG1 constant region. For a Fab fragment heavy chain gene, the VH-encoding DNA can be operatively linked to another DNA molecule encoding only the heavy chain CH1 domain.

Isolated DNA encoding the VL region of an agonistic TNFR2 antibody can be converted to a full-length light chain gene (as well as a Fab light chain gene) by operatively linking the VL-encoding DNA to another DNA molecule encoding the light chain constant region, CL. The sequences of human light chain constant region genes are known in the art (see e.g., Kabat et al., Sequences of Proteins of Immunological Interest, Fifth Edition (U.S. Department of Health and Human Services, NIH Publication No. 91-3242, 1991)) and DNA fragments encompassing these regions can be obtained, e.g., by amplification in a prokaryotic or eukaryotic cell of a polynucleotide encoding these regions, by PCR amplification, or by chemical polynucleotide synthesis. The light chain constant region can be a kappa (κ) or lambda (λ) constant region, but in certain embodiments is a kappa constant region. To create a scFv gene, the VH and VL-encoding DNA fragments are operatively linked to another fragment encoding a flexible linker, e.g., a polynucleotide encoding a flexible, hydrophilic amino acid sequence, such as the amino acid sequence $(Gly_4Ser)_3$, such that the $V_H$ and $V_L$ sequences can be expressed as a contiguous single-chain protein, with the $V_L$ and $V_H$ regions joined by the linker (see e.g., Bird et al., Science 242:423-426, 1988; Huston et al., Proc. Natl. Acad. Sci. USA 85:5879-5883, 1988; McCafferty et al., Nature 348:552-554, 1990).

Recombinant DNA technology can also be used to remove some or all of the DNA encoding either or both of the light and heavy chains that is not necessary for binding to TNFR2. The molecules expressed from such truncated DNA molecules are also encompassed by the antibodies described herein. In addition, bifunctional antibodies can be produced in which one heavy contains one or more, or all, of the CDRs of TNFRAG1, or a similar CDR sequence as described above, and the other heavy chain and/or the light chains are specific for an antigen other than TNFR2. Such antibodies can be generated, e.g., by crosslinking a heavy chain and light chain containing one or more, or all, of the CDRs of TNFRAG1, or a similar CDR sequence as described above, to a heavy chain and light chain of a second antibody specific for a different antigen, for instance, using standard chemical crosslinking methods (e.g., by disulfide bond formation). Bifunctional antibodies can also be made by expressing a nucleic acid molecule engineered to encode a bifunctional antibody in a prokaryotic or eukaryotic cell.

Dual specific antibodies, i.e., antibodies that bind TNFR2 and a different antigen using the same binding site, can be produced by mutating amino acid residues in the light chain and/or heavy chain CDRs. In some embodiments, dual specific antibodies that bind two antigens, such as TNFR2 and a second cell-surface receptor, can be produced by mutating amino acid residues in the periphery of the antigen binding site (Bostrom et al., Science 323: 1610-1614, 2009). Dual functional antibodies can be made by expressing a polynucleotide engineered to encode a dual specific antibody.

Modified agonistic TNFR2 antibodies and antibody fragments described herein can also be produced by chemical synthesis (e.g., by the methods described in Solid Phase Peptide Synthesis, 2nd ed., 1984 The Pierce Chemical Co., Rockford, 111; incorporated herein by reference). Variant antibodies can also be generated using a cell-free synthetic platform (see, e.g., Chu et al., Biochemia No. 2, 2001 (Roche Molecular Biologicals); incorporated herein by reference).

Host Cells for Expression of Agonistic TNFR2 Polypeptides

It is possible to express the polypeptides (e.g., single-chain polypeptides, antibodies, antigen-binding fragments thereof, and constructs thereof) described herein in either prokaryotic or eukaryotic host cells. In some embodiments, expression of polypeptides (e.g., single-chain polypeptides, antibodies, or antigen-binding fragments thereof) is performed in eukaryotic cells, e.g., mammalian host cells, for optimal secretion of a properly folded and immunologically active antibody. Exemplary mammalian host cells for expressing the recombinant antibodies or antigen-binding fragments thereof described herein include Chinese Hamster Ovary (CHO cells) (including DHFR CHO cells, described in Urlaub and Chasin (1980, Proc. Natl. Acad. Sci. USA 77:4216-4220), used with a DHFR selectable marker, e.g., as described in Kaufman and Sharp (1982, Mol. Biol. 159:601-621), NS0 myeloma cells, COS cells, 293 cells, and SP2/0 cells. Additional cell types that may be useful for the expression of antibodies and fragments thereof include bacterial cells, such as BL-21(DE3) *E. coli* cells, which can be transformed with vectors containing foreign DNA according to established protocols. Additional eukaryotic cells that may be useful for expression of antibodies include yeast cells, such as auxotrophic strains of *S. cerevisiae*, which can be transformed and selectively grown in incomplete media according to established procedures known in the art. When recombinant expression vectors encoding antibody genes are introduced into mammalian host cells, the antibodies are produced by culturing the host cells for a period of time sufficient to allow for expression of the antibody in the host cells or secretion of the antibody into the culture medium in which the host cells are grown.

Polypeptides (e.g., single-chain polypeptides, antibodies, antigen-binding fragments thereof, and constructs thereof) can be recovered from the culture medium using standard protein purification methods. Host cells can also be used to produce portions of intact antibodies, such as Fab fragments or scFv molecules. Also included herein are methods in which the above procedure is varied according to established protocols known in the art. For example, it can be desirable to transfect a host cell with DNA encoding either the light chain or the heavy chain (but not both) of an agonistic TNFR2 antibody described herein in order to produce an antigen-binding fragment of the antibody.

Once an agonistic TNFR2 polypeptide (e.g., single-chain polypeptide, antibody, antigen-binding fragment thereof, or construct thereof) described herein has been produced by recombinant expression, it can be purified by any method known in the art, such as a method useful for purification of an immunoglobulin molecule, for example, by chromatography (e.g., ion exchange, affinity, particularly by affinity for TNFR2 after Protein A or Protein G selection, and sizing column chromatography), centrifugation, differential solubility, or by any other standard technique for the purification of proteins. Further, the agonistic TNFR2 polypeptides described herein or fragments thereof can be fused to heterologous polypeptide sequences described herein or otherwise known in the art to facilitate purification or to produce therapeutic conjugates.

Once isolated, an agonistic TNFR2 single-chain polypeptide, antibody, antigen-binding fragment thereof, or construct can, if desired, be further purified, e.g., by high performance liquid chromatography (see, e.g., Fisher, Laboratory Techniques in Biochemistry and Molecular Biology (Work and Burdon, eds., Elsevier, 1980); incorporated herein by reference), or by gel filtration chromatography, such as on a Superdex™ 75 column (Pharmacia Biotech AB, Uppsala, Sweden).

Platforms for Generating and Affinity-Maturing Agonistic TNFR2 Polypeptides

Mapping Epitopes of TNFR2 that Promote Receptor Agonism

Agonistic TNFR2 polypeptides (e.g., single-chain polypeptides, antibodies, antigen-binding fragments thereof, and constructs thereof) described herein can be produced by screening libraries of polypeptides (e.g., single-chain polypeptides, antibodies, antigen-binding fragments thereof, and constructs thereof) for functional molecules that are capable of binding epitopes within TNFR2 that selectively promote receptor agonism rather than receptor inhibition. Such epitopes can be modeled by screening antibodies or antigen-binding fragments thereof against a series of linear or cyclic peptides containing residues that correspond to a desired epitope within TNFR2.

As an example, peptides containing individual fragments isolated from TNFR2 that promote receptor agonism can be synthesized by peptide synthesis techniques described herein or known in the art. These peptides can be immobilized on a solid surface and screened for molecules that bind agonistic TNFR2 polypeptides (e.g., single-chain polypeptides, antibodies, antigen-binding fragments thereof, and constructs thereof), e.g., using an ELISA-based screening platform using established procedures. Using this assay, peptides that specifically bind, e.g., TNFRAG1 with high affinity therefore contain residues within epitopes of TNFR2 that preferentially bind these antibodies. Peptides identified in this manner can be used to screen libraries of polypeptides (e.g., single-chain polypeptides, antibodies, antigen-binding fragments thereof, and constructs thereof) in order to identify agonistic TNFR2 polypeptides. Moreover, since these peptides act as surrogates for epitopes within TNFR2 that promote receptor agonism, polypeptides generated using this screening technique may bind the corresponding epitopes in TNFR2 and are expected to be agonistic of receptor activity.

Screening of Libraries for Agonistic TNFR2 Polypeptides

Methods for high throughput screening of polypeptide (e.g., single-chain polypeptide, antibody, antibody fragment, or construct thereof) libraries for molecules capable of binding epitopes within TNFR2 (e.g., amino acids 56-60, 101-107, and/or 115-142 of SEQ ID NO: 1) include, without limitation, display techniques including phage display, bacterial display, yeast display, mammalian display, ribosome display, mRNA display, and cDNA display. The use of phage display to isolate ligands that bind biologically relevant molecules has been reviewed, e.g., in Felici et al. (Biotechnol. Annual Rev. 1:149-183, 1995), Katz (Annual Rev. Biophys. Biomol. Struct. 26:27-45, 1997), and Hoogenboom et al. (Immunotechnology 4:1-20, 1998). Several randomized combinatorial peptide libraries have been constructed to select for polypeptides that bind different targets, e.g., cell surface receptors or DNA (reviewed by Kay (Perspect. Drug Discovery Des. 2, 251-268, 1995), Kay et al., (Mol. Divers. 1:139-140, 1996)). Proteins and multimeric proteins have been successfully phage-displayed as functional molecules (see EP 0349578A, EP 4527839A, EP 0589877A; Chiswell and McCafferty (Trends Biotechnol. 10, 80-84 1992)). In addition, functional antibody fragments (e.g. Fab, single-chain Fv [scFv]) have been expressed (McCafferty et al. (Nature 348: 552-554, 1990), Barbas et al. (Proc. Natl. Acad Sci. USA 88:7978-7982, 1991), Clackson et al. (Nature 352:624-628, 1991)). These references are hereby incorporated by reference in their entirety.

(i) Phage Display Techniques

As an example, phage display techniques can be used in order to screen libraries of polypeptides (e.g., single-chain polypeptides, antibodies, antigen-binding fragments thereof, and constructs thereof) for functional molecules capable of binding cyclic or polycyclic peptides containing epitopes within TNFR2 that promote receptor activation (e.g., amino acids 56-60, 101-107, and/or 115-142 of SEQ ID NO: 1). For instance, libraries of polynucleotides encoding single-chain antibody fragments, such as scFv fragments, that contain randomized hypervariable regions can be obtained using established procedures (e.g., solid phase polynucleotide synthesis or error-prone PCR techniques, see McCullum et al. (Meth. Mol. Biol., 634:103-109, 2010); incorporated herein by reference). These randomized polynucleotides can subsequently be incorporated into a viral genome such that the randomized antibody chains encoded by these genes are expressed on the surface of filamentous phage, e.g., by a covalent bond between the antibody chain and a coat protein (e.g., pill coat protein on the surface of M13 phage). This provides a physical connection between the genotype and phenotype of the antibody chain. In this way, libraries of phage that display diverse antibody chains containing random mutations in hypervariable regions can be screened for the ability of the exterior antibody chains to bind TNFR2 epitopes (e.g., amino acids 56-60, 101-107, and/or 115-142 of SEQ ID NO: 1) that are immobilized to a surface using established procedures. For instance, such peptides can be physically bound to the surface of a microtiter plate by forming a covalent bond between the peptide and an epitope tag (e.g., biotin) and incubating the peptide in wells of a microtiter plate that have been previously coated with a complementary tag (e.g., avidin) that binds the tag attached to the peptide with high affinity. Suitable epitope tags include, without limitation, maltose-binding protein, glutathione-S-transferase, a polyhistidine tag, a FLAG-tag, a myc-tag, human influenza hemagglutinin (HA) tag, biotin, streptavidin. Peptides containing the epitopes presented by these molecules are capable of being immobilized on surfaces containing such complementary molecules as maltose, glutathione, a nickel-containing complex, an anti-FLAG antibody, an anti-myc antibody, an anti-HA antibody, streptavidin, or biotin, respectively. In this way, phage can be incubated with a surface containing an immobilized TNFR2-derived peptide for a time suitable to allow binding of the antibody to the constrained peptide and in the presence of an appropriate buffer system (e.g., one that contains physiological salt concentration, ionic strength, and is maintained at physiological pH by a buffering agent). The surface can then be washed (e.g., with phosphate buffer containing 0.1% Tween-20) so as to remove phage that do not present antibody chains that interact with the TNFR2-derived peptides with an affinity greater than a particular threshold value.

The affinity of the polypeptides that remain after this initial panning (i.e., screening) step can be modulated by adjusting the conditions of the washing step (e.g., by including mildly acidic or basic components, or by including other TNFR2-derived peptides at a low concentration in order to compete with immobilized peptides for antigen-binding sites). In this way, the population of phage that remains bound to the surfaces of the microtiter plate following the washing step is enriched for phage that bind TNFR2-derived peptide epitopes that promote receptor activation. The remaining phage can then be amplified by eluting the phage from the surface containing these peptides (e.g., by altering the ambient pH, ionic strength, or temperature) so as to diminish protein-protein interaction strength. The isolated phage can then be amplified, e.g., by infecting bacterial cells, and the resulting phage can optionally be subjected to panning by additional iterations of screening so as to further enrich the population of phage for those harboring higher-affinity agonistic TNFR2 polypeptides. Following these panning stages, phage that display high-affinity antibodies or antigen-binding fragments thereof can subsequently be isolated and the genomes of these phage can be sequenced in order to identify the polynucleotide and polypeptide sequences of the encoded antibodies. Phage display techniques such as this can be used to generate, e.g., antibody chains, such as scFv fragments, tandem scFv fragments, and other antigen-binding fragments described herein that can be used as agonists of TNFR2. Exemplary phage display protocols for the identification of antibody chains and antigen-binding fragments thereof that bind a particular antigen with high affinity are well-established and are described, e.g., in U.S. Pat. No. 7,846,892, WO 1997/002342, U.S. Pat. No. 8,846,867, and WO 2007/132917; the disclosures of each of which are incorporated herein by reference. Similar phage display techniques can be used to generate antibody-like scaffolds (e.g., $^{10}$Fn3 domains) described herein that bind epitopes within TNFR2 that promote receptor activation (e.g., amino acids 56-60, 101-107, and/or 115-142 of SEQ ID NO: 1). Exemplary phage display protocols for the identification of antibody-like scaffold proteins are described, e.g., in WO 2009/086116; the disclosure of which is incorporated herein by reference).

(ii) Cell-Based Display Techniques

Other in vitro display techniques that exploit the linkage between genotype and phenotype of a solvent-exposed polypeptide include yeast and bacterial display. Yeast display techniques are established in the art and are often advantageous in that high quantities of antibodies (often up to 30,000) can be presented on the surface of an individual yeast cell (see, e.g., Boder et al. (Nat Biotechno. 15:553, 1997); incorporated herein by reference). The larger size of yeast cells over filamentous phage enables an additional screening strategy, as one can use flow cytometry to both analyze and sort libraries of yeast. For instance, established procedures can be used to generate libraries of bacterial cells or yeast cells that express polypeptides (e.g., single-chain polypeptides, antibodies, and antigen-binding fragments thereof) containing randomized hypervariable regions (see, e.g., see U.S. Pat. No. 7,749,501 and US 2013/0085072; the teachings of each which are incorporated herein by reference). For instance, large libraries of yeast cells that express polynucleotides encoding naïve scFv fragments can be made using established procedures (de Bruin et al., Nat Biotechnol 17:397, 1999; incorporated herein by reference). Yeast cells expressing these polynucleotides can then be incubated with two different fluorescent molecules during the panning steps: one dye that binds conserved residues within the antibody and thus reflects the amount of antibody displayed, and another dye that fluoresces at a different wavelength and binds the antigen and thus indicates the amount of antigen bound. For instance, one of skill in the art can use a TNFR2-derived peptide containing amino acids 56-60, 101-107, and/or 115-142 of SEQ ID NO: 1 that has been conjugated to an epitope tag (e.g., biotin), optionally at the N- or C-terminus of the peptide or at a residue that is not expected to interfere with antibody-antigen binding. This enables a fluorescent dye labeled with a complementary tag (e.g., avidin) to localize to the antibody-antigen complex. This results in great flexibility and immediate feedback on the progress of a selection. In contrast to phage display, by normalizing to antibody display levels, antibodies with higher affinities, rather than greater expression levels can easily be selected. In fact, it is possible to distinguish and sort antibodies whose affinities differ by only two-fold (VanAntwerp and Wittrup (*Biotechnol Prog* 16:31, 2000)).

(iii) Nucleotide Display Techniques

Display techniques that utilize in vitro translation of randomized polynucleotide libraries also provide a powerful approach to generating agonistic TNFR2 polypeptides described herein. For instance, randomized DNA libraries encoding polypeptides (e.g., single-chain polypeptides, antibodies, and antigen-binding fragments thereof) that contain mutations within designated hypervariable regions can be obtained, e.g., using established PCR-based mutagenesis techniques as described herein. The polynucleotides of these libraries may contain transcription regulating sequences, such as promoters and transcription terminating sequences, and may additionally encode sequences that increase the rate of translation of the resulting mRNA construct (e.g., IRES sequences, 5' and 3' UTRs, a poly-adenylation tract, etc). These polynucleotide libraries can be incubated in an appropriately buffered solution containing RNA polymerase and RNA nucleoside triphosphates (NTPs) in order to enable transcription of the DNA sequences to competent mRNA molecules, which can subsequently be translated by large and small ribosomal subunits, aminoacyl tRNA molecules, and translation initiation and elongation factors present in solution (e.g., using the PURExpress® In Vitro Protein Synthesis Kit, New England Biolabs®). Designed mRNA modifications can enable the antibody product to remain covalently bound to the mRNA template by a chemical bond to puromycin (e.g., see Keefe (Curr. Protoc. Mol. Biol., Chapter 24, Unit 24.5, 2001); incorporated herein by reference). This genotype-phenotype linkage can thus be used to select for antibodies that bind a TNFR2-derived peptide by incubating mRNA:antibody fusion constructs with a peptide immobilized to a surface and panning in a fashion similar to phage display techniques (see, e.g., WO 2006/072773; incorporated herein by reference).

Optionally, polypeptides (e.g., single-chain polypeptides, antibodies, and antigen-binding fragments thereof) described herein can be generated using a similar technique, except the antibody product may be bound non-covalently to the ribosome-mRNA complex rather than covalently via a puromycin linker. This platform, known as ribosome display, has been described, e.g., in U.S. Pat. No. 7,074,557; incorporated herein by reference. Alternatively, antibodies can be generated using cDNA display, a technique analogous to mRNA display with the exception that cDNA, rather than mRNA, is covalently bound to an antibody product via a puromycin linker. cDNA display techniques offer the advantage of being able to perform panning steps under increasingly stringent conditions, e.g., under conditions in which the salt concentration, ionic strength, pH, and/or temperature of the environment is adjusted in order to screen for antibodies with particularly high affinity for TNFR2-derived peptides. This is due to the higher natural stability of double-stranded cDNA over single-stranded mRNA. cDNA display screening techniques are described, e.g., in Ueno et al. (Methods Mol. Biol., 805:113-135, 2012); incorporated herein by reference.

In addition to generating agonistic TNFR2 polypeptides (e.g., single-chain polypeptides, antibodies, antigen-binding fragments thereof, and constructs thereof) described herein, in vitro display techniques (e.g., those described herein and those known in the art) also provide methods for improving the affinity of an agonistic TNFR2 polypeptide described herein. For instance, rather than screening libraries of antibodies and fragments thereof containing completely randomized hypervariable regions, one can screen narrower libraries of antibodies and antigen-binding fragments thereof that feature targeted mutations at specific sites within hypervariable regions. This can be accomplished, e.g., by assembling libraries of polynucleotides encoding antibodies or antigen-binding fragments thereof that encode random mutations only at particular sites within hypervariable regions. These polynucleotides can then be expressed in, e.g., filamentous phage, bacterial cells, yeast cells, mammalian cells, or in vitro using, e.g., ribosome display, mRNA display, or cDNA display techniques in order to screen for antibodies or antigen-binding fragments thereof that specifically bind TNFR2 epitopes with improved binding affinity. Yeast display, for instance, is well-suited for affinity maturation, and has been used previously to improve the affinity of a single-chain antibody to a $K_D$ of 48 fM (Boder et al. (Proc Natl Acad Sci USA 97:10701, 2000)).

Additional in vitro techniques that can be used for the generation and affinity maturation of agonistic TNFR2 polypeptides (e.g., single-chain polypeptides, antibodies, and antigen-binding fragments thereof) described herein include the screening of combinatorial libraries of antibodies or antigen-binding fragments thereof for functional molecules capable of specifically binding TNFR2-derived peptides. Combinatorial antibody libraries can be obtained, e.g., by expression of polynucleotides encoding randomized hypervariable regions of an antibody or antigen-binding fragment thereof in a eukaryotic or prokaryotic cell. This can be achieved, e.g., using gene expression techniques described herein or known in the art. Heterogeneous mixtures of antibodies can be purified, e.g., by Protein A or Protein G selection, sizing column chromatography), centrifugation, differential solubility, and/or by any other standard technique for the purification of proteins. Libraries of combinatorial libraries thus obtained can be screened, e.g., by incubating a heterogeneous mixture of these antibodies with a peptide derived from TNFR2 that has been immobilized to a surface for a period of time sufficient to allow antibody-antigen binding. Non-binding antibodies or fragments thereof can be removed by washing the surface with an appropriate buffer (e.g., a solution buffered at physiological pH (approximately 7.4) and containing physiological salt concentrations and ionic strength, and optionally containing a detergent, such as TWEEN-20). Antibodies that remain bound can subsequently be detected, e.g., using an ELISA-based detection protocol (see, e.g., U.S. Pat. No. 4,661,445; the disclosure of which is incorporated herein by reference).

Additional techniques for screening combinatorial libraries of polypeptides (e.g., single-chain polypeptides, antibodies, antigen-binding fragments thereof, and constructs thereof) for those that specifically bind TNFR2-derived peptides include the screening of one-bead-one-compound libraries of antibody fragments. Antibody fragments can be chemically synthesized on a solid bead (e.g., using established split-and-pool solid phase peptide synthesis protocols) composed of a hydrophilic, water-swellable material such that each bead displays a single antibody fragment. Heterogeneous bead mixtures can then be incubated with a TNFR2-derived peptide that is optionally labeled with a detectable moiety (e.g., a fluorescent dye) or that is conjugated to an epitope tag (e.g., biotin, avidin, FLAG tag, HA tag) that can later be detected by treatment with a complementary tag (e.g., avidin, biotin, anti-FLAG antibody, anti-HA antibody, respectively). Beads containing antibody fragments that specifically bind a TNFR2-derived peptide can be identified by analyzing the fluorescent properties of the beads following incubation with a fluorescently-labeled antigen or complementary tag (e.g., by confocal fluorescent microscopy or by fluorescence-activated bead sorting; see, e.g., Muller et al. (J. Biol. Chem., 16500-16505, 1996); incorporated herein by reference). Beads containing antibody fragments that specifically bind TNFR2-derived peptides can thus be separated from those that do not contain high-affinity antibody fragments. The sequence of an antibody fragment that specifically binds a TNFR2-derived peptide can be determined by techniques known in the art, including, e.g., Edman degradation, tandem mass spectrometry, matrix-assisted laser-desorption time-of-flight mass spectrometry (MALDI-TOF MS), nuclear magnetic resonance (NMR), and 2D gel electrophoresis, among others (see, e.g., WO 2004/062553; the disclosures of each of which are incorporated herein by reference).

Negative Screens of Polypeptides

In addition to the above-described methods for screening for a single-chain polypeptide, antibody, or antibody fragment that specifically binds to an epitope derived from human TNFR2 that promotes receptor activation, one can additionally perform negative screens in order to eliminate antibodies or antibody fragments that may also bind an epitope that promotes receptor antagonism, such as the KCRPG sequence. This can be accomplished using any of the above-described methods or variations thereof, e.g., such that the antibodies or antibody fragments being screened are those that were previously identified as having agonistic TNFR2 activity. Exemplary techniques useful for a negative screen include those described above or known in the art, such as phage display, yeast display, bacterial display, ribosome display, mRNA display, cDNA display, or surface-based combinatorial library screens (e.g., in an ELISA format). This screening technique represents a useful strategy for identifying an agonistic TNFR2 antibody or antibody fragment, as antibodies or antibody fragments capable of binding TNFR2 epitopes containing the KCRPG sequence lack, or have significantly reduced, agonistic activity.

Immunization of a Non-Human Mammal

Another strategy that can be used to produce agonistic TNFR2 antibodies and antigen-binding fragments thereof described herein includes immunizing a non-human mammal. Examples of non-human mammals that can be immunized in order to produce agonistic TNFR2 antibodies and fragments thereof described herein include rabbits, mice, rats, goats, guinea pigs, hamsters, horses, and sheep, as well as non-human primates. For instance, established procedures for immunizing primates are known in the art (see, e.g., WO 1986/6004782; incorporated herein by reference). Immunization represents a robust method of producing monoclonal antibodies by exploiting the antigen specificity of B lymphocytes. For example, monoclonal antibodies can be prepared by the Kohler-Millstein procedure (described, e.g., in EP 0110716; incorporated herein by reference), wherein spleen cells from a non-human animal (e.g., a primate) immunized with a peptide that presents a TNFR2-derived antigen that promotes receptor activation. A clonally-expanded B lymphocyte produced by immunization can be isolated from the serum of the animal and subsequently fused with a myeloma cell in order to form a hybridoma. Hybridomas are particularly useful agents for antibody production, as these immortalized cells can provide a lasting supply of an antigen-specific antibody. Antibodies from such hybridomas can subsequently be isolated using techniques known in the art, e.g., by purifying the antibodies from the cell culture medium by affinity chromatography, using reagents such as Protein A or Protein G.

Agonistic TNFR2 polypeptide Conjugates

Prior to administration of agonistic TNFR2 polypeptides (e.g., single-chain polypeptides, antibodies, and antigen-binding fragments thereof) described herein to a mammalian subject (e.g., a human), it may be desirable to conjugate the antibody or fragment thereof to a second molecule, e g., to modulate the activity of the antibody in vivo. Agonistic TNFR2 antibodies and fragments thereof can be conjugated to other molecules at either the N-terminus or C-terminus of a light or heavy chain of the antibody using any one of a variety of established conjugation strategies that are well-known in the art. Examples of pairs of reactive functional groups that can be used to covalently tether an agonistic TNFR2 antibody or fragment thereof to another molecule include, without limitation, thiol pairs, carboxylic acids and amino groups, ketones and amino groups, aldehydes and amino groups, thiols and alpha,beta-unsaturated moieties (such as maleimides or dehydroalanine), thiols and alpha-halo amides, carboxylic acids and hydrazides, aldehydes and hydrazides, and ketones and hydrazides.

Agonistic TNFR2 polypeptides (e.g., single-chain polypeptides, antibodies, antigen-binding fragments thereof, and constructs thereof) can be covalently appended directly to another molecule by chemical conjugation as described. Alternatively, fusion proteins containing agonistic TNFR2 antibodies and fragments thereof can be expressed recombinantly from a cell (e.g., a eukaryotic cell or prokaryotic cell). This can be accomplished, for example, by incorporating a polynucleotide encoding the fusion protein into the nuclear genome of a cell (e.g., using techniques described herein or known in the art). Optionally, antibodies and fragments thereof described herein can be joined to a second molecule by forming a covalent bond between the antibody and a linker. This linker can then be subsequently conjugated to another molecule, or the linker can be conjugated to another molecule prior to ligation to the agonistic TNFR2 antibody or fragment thereof. Examples of linkers that can be used for the formation of a conjugate include polypeptide linkers, such as those that contain naturally occurring or non-naturally occurring amino acids. In some embodiments, it may be desirable to include D-amino acids in the linker, as these residues are not present in naturally-occurring proteins and are thus more resistant to degradation by endogenous proteases. Fusion proteins containing polypeptide linkers can be made using chemical synthesis techniques, such as those described herein, or through recombinant expression of a polynucleotide encoding the fusion protein in a cell (e.g., a prokaryotic or eukaryotic cell). Linkers can be prepared using a variety of strategies that are well known in the art, and depending on the reactive components of the linker, can be cleaved by enzymatic hydrolysis, photolysis, hydrolysis under acidic conditions, hydrolysis under basic conditions, oxidation, disulfide reduction, nucleophilic cleavage, or organometallic cleavage (Leriche et al., Bioorg. Med. Chem., 20:571-582, 2012).

Drug-Polypeptide Conjugates

An agonistic TNFR2 polypeptide (e.g., single-chain polypeptide, antibody, and antigen-binding fragment thereof) described herein can additionally be conjugated to, admixed with, or administered separately from a therapeutic agent, such as an agent used to treat autoimmunity and/or inflammation. Exemplary agents that may be conjugated to, admixed with, or administered separately from an agonistic TNFR2 polypeptide described herein include Bacillus Calmette-Guérin (BCG). Additional agents that may be conjugated to, admixed with, or administered separately from an agonistic TNFR2 polypeptide described herein include non-steroidal anti-inflammatory drugs (NSAIDs), such as (i) salicylic acid derivatives, including acetylsalicylic acid (aspirin), diflunisal, and sulfasalazine, (ii) para-aminophenol derivatives, including acetaminophen, (iii) fenamates, including mefenamic acid, meclofenamate, and flufenamic acid, (iv) propionic acid derivatives, including ibuprofen, naproxen, fenoprofen, ketoprofen, flurbiprofen, and oxaprozin, and (v) enolic acid (oxicam) derivatives, including piroxicam and tenoxicam. Additional agents that may be conjugated to, admixed with, or administered separately from an agonistic TNFR2 polypeptide described herein include glucocorticoids. The agonistic TNFR2 polypeptides described herein may, additionally or alternatively, be conjugated to, admixed with, or administered separately from a disease-modifying anti-Rheumatic drug (DMARD), such as methotrexate, leflunomide, gold compounds, sulfasalazine, azathioprine, cyclophosphamide, antimalarials, D-penicillamine, and cyclosporine. Additional agents that may be conjugated to, admixed with, or administered separately from an agonistic TNFR2 polypeptide described herein include infliximab, etanercept, adalimumab, golimumab, and certolizumab pegol, among others. Additional agents that may be conjugated to, admixed with, or administered separately from an agonistic TNFR2 polypeptide of the disclosure are described, for example, in Li et al., Front. Pharmacol. 8:460, 2017, the disclosure of which is incorporated herein by reference in its entirety.

In some embodiments, the agonistic TNFR2 polypeptides described herein are conjugated to, admixed with, or administered separately from an immunotherapy agent, such as an agonistic anti-CTLA-4 agent, an agonistic anti-PD-1 agent, an agonistic anti-PD-L1 agent, an agonistic anti-PD-L2 agent, an agonistic anti-CD27 agent, an agonistic anti-CD30 agent, an agonistic anti-CD40 agent, an agonistic anti-4-1 BB agent, an agonistic anti-GITR agent, an agonistic anti-OX40 agent, an agonistic anti-TRAILR1 agent, an agonistic anti-TRAILR2 agent, an agonistic anti-TWEAK agent, an agonistic anti-TWEAKR agent, an agonistic anti-cell surface lymphocyte protein agent, an agonistic anti-BRAF agent, an agonistic anti-MEK agent, an agonistic anti-CD33 agent, an agonistic anti-CD20 agent, an agonistic anti-HLA-DR agent, an agonistic anti-HLA class I agent, an agonistic anti-CD52 agent, an agonistic anti-A33 agent, an agonistic anti-GD3 agent, an agonistic anti-PSMA agent, an agonistic anti-Ceacan 1 agent, an agonistic anti-Galedin 9 agent, an agonistic anti-HVEM agent, an agonistic anti-VISTA agent, an agonistic anti-B7 H4 agent, an agonistic anti-HHLA2 agent, an agonistic anti-CD155 agent, an agonistic anti-CD80 agent, an agonistic anti-BTLA agent, an agonistic anti-CD160 agent, an agonistic anti-CD28 agent, an agonistic anti-CD226 agent, an agonistic anti-CEACAM1 agent, an agonistic anti-TIM3 agent, an agonistic anti-TIGIT agent, an agonistic anti-CD96 agent, an agonistic anti-CD70 agent, an agonistic anti-CD27 agent, an agonistic anti-LIGHT agent, an agonistic anti-CD137 agent, an agonistic anti-DR4 agent, an agonistic anti-CR5 agent, an agonistic anti-TNFRS agent, an agonistic anti-TNFR1 agent, an agonistic anti-FAS agent, an agonistic anti-CD95 agent, an agonistic anti-TRAIL agent, an agonistic anti-DR6 agent, an agonistic anti-EDAR agent, an agonistic anti-NGFR agent, an agonistic anti-OPG agent, an agonistic anti-RANKL agent, an agonistic anti-LTβ receptor agent, an agonistic anti-BCMA agent, an agonistic anti-TACI agent, an agonistic anti-BAFFR agent, an agonistic anti-EDAR2 agent, an agonistic anti-TROY agent, and an agonistic anti-RELT agent. For example, the immunotherapy agent may be an agonistic anti-CTLA-4 agent, an agonistic anti-PD-1 agent, or an agonistic anti-PD-L1 agent.

In some embodiments, the immunotherapy agent is selected from the group consisting of an agonistic anti-CTLA-4 antibody or antigen-binding fragment thereof, an agonistic anti-PD-1 antibody or antigen-binding fragment thereof, an agonistic anti-PD-L1 antibody or antigen-binding fragment thereof, an agonistic anti-PD-L2 antibody or antigen-binding fragment thereof, an agonistic anti-CD27 antibody or antigen-binding fragment thereof, an agonistic anti-CD30 antibody or antigen-binding fragment thereof, an agonistic anti-CD40 antibody or antigen-binding fragment thereof, an agonistic anti-4-1 BB antibody or antigen-binding fragment thereof, an agonistic anti-GITR antibody or antigen-binding fragment thereof, an agonistic anti-OX40 antibody or antigen-binding fragment thereof, an agonistic anti-TRAILR1 antibody or antigen-binding fragment thereof, an agonistic anti-TRAILR2 antibody or antigen-binding fragment thereof, an agonistic anti-TWEAK antibody or antigen-binding fragment thereof, an agonistic anti-TWEAKR antibody or antigen-binding fragment thereof, an agonistic anti-cell surface lymphocyte protein antibody or antigen-binding fragment thereof, an agonistic anti-BRAF antibody or antigen-binding fragment thereof, an agonistic anti-MEK antibody or antigen-binding fragment thereof, an agonistic anti-CD33 antibody or antigen-binding fragment thereof, an agonistic anti-CD20 antibody or antigen-binding fragment thereof, an agonistic anti-HLA-DR antibody or antigen-binding fragment thereof, an agonistic anti-HLA class I antibody or antigen-binding fragment thereof, an agonistic anti-CD52 antibody or antigen-binding fragment thereof, an agonistic anti-A33 antibody or antigen-binding fragment thereof, an agonistic anti-GD3 antibody or antigen-binding fragment thereof, an agonistic anti-PSMA antibody or antigen-binding fragment thereof, an agonistic anti-Ceacan 1 antibody or antigen-binding fragment thereof, an agonistic anti-Galedin 9 antibody or antigen-binding fragment thereof, an agonistic anti-HVEM antibody or antigen-binding fragment thereof, an agonistic anti-VISTA antibody or antigen-binding fragment thereof, an agonistic anti-B7 H4 antibody or antigen-binding fragment thereof, an agonistic anti-HHLA2 antibody or antigen-binding fragment thereof, an agonistic anti-CD155 antibody or antigen-binding fragment thereof, an agonistic anti-CD80 antibody or antigen-binding fragment thereof, an agonistic anti-BTLA antibody or antigen-binding fragment thereof, an agonistic anti-CD160 antibody or antigen-binding fragment thereof, an agonistic anti-CD28 antibody or antigen-binding fragment thereof, an agonistic anti-CD226 antibody or antigen-binding fragment thereof, an agonistic anti-CEACAM1 antibody or antigen-binding fragment thereof, an agonistic anti-TIM3 antibody or antigen-binding fragment thereof, an agonistic anti-TIGIT antibody or antigen-binding fragment thereof, an agonistic anti-CD96 antibody or antigen-binding fragment thereof, an agonistic anti-CD70 antibody or antigen-binding fragment thereof, an agonistic anti-CD27 antibody or antigen-binding fragment thereof, an agonistic anti-LIGHT antibody or antigen-binding fragment thereof, an agonistic anti-CD137 antibody or antigen-binding fragment thereof, an agonistic anti-DR4 antibody or antigen-binding fragment thereof, an agonistic anti-CR5 antibody or antigen-binding fragment thereof, an agonistic anti-TNFRS antibody or antigen-binding fragment thereof, an agonistic anti-TNFR1 antibody or antigen-binding fragment thereof, an agonistic anti-FAS antibody or antigen-binding fragment thereof, an agonistic anti-CD95 antibody or antigen-binding fragment thereof, an agonistic anti-TRAIL antibody or antigen-binding fragment thereof, an agonistic anti-DR6 antibody or antigen-binding fragment thereof, an agonistic anti-EDAR antibody or antigen-binding fragment thereof, an agonistic anti-NGFR antibody or antigen-binding fragment thereof, an agonistic anti-OPG antibody or antigen-binding fragment thereof, an agonistic anti-RANKL antibody or antigen-binding fragment thereof, an agonistic anti-LTβ receptor antibody or antigen-binding fragment thereof, an agonistic anti-BCMA antibody or antigen-binding fragment thereof, an agonistic anti-TACI antibody or antigen-binding fragment thereof, an agonistic anti-BAFFR antibody or antigen-binding fragment thereof, an agonistic anti-EDAR2 antibody or antigen-binding fragment thereof, an agonistic anti-TROY antibody or antigen-binding fragment thereof, and an agonistic anti-RELT antibody or antigen-binding fragment thereof. For example, the immunotherapy agent may be an agonistic anti-CTLA-4 antibody or antigen-binding fragment thereof, an agonistic anti-PD-1 antibody or antigen-binding fragment thereof, or an agonistic anti-PD-L1 antibody or antigen-binding fragment thereof.

In some embodiments, the immunotherapy agent is an agonistic anti-cell surface lymphocyte protein antibody or antigen-binding fragment thereof, such as an antibody or antigen-binding fragment thereof that binds and promotes the activity of one or more of CD1, CD2, CD3, CD4, CD5, CD6, CD7, CD8, CD9, CD10, CD11, CD12, CD13, CD14, CD15, CD16, CD17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42, CD43, CD44, CD45, CD46, CD47, CD48, CD49, CD50, CD51, CD52, CD53, CD54, CD55, CD56, CD57, CD58, CD59, CD60, CD61, CD62, CD63, CD64, CD65, CD66, CD67, CD68, CD69, CD70, CD71, CD72, CD73, CD74, CD75, CD76, CD77, CD78, CD79, CD80, CD81, CD82, CD83, CD84, CD85, CD86, CD87, CD88, CD89, CD90, CD91, CD92, CD93, CD94, CD95, CD96, CD97, CD98, CD99, CD100, CD101, CD102, CD103, CD104, CD105, CD106, CD107, CD108, CD109, CD110, CD111, CD112, CD113, CD114, CD115, CD116, CD117, CD118, CD119, CD120, CD121, CD122, CD123, CD124, CD125, CD126, CD127, CD128, CD129, CD130, CD131, CD132, CD133, CD134, CD135, CD136, CD137, CD138, CD139, CD140, CD141, CD142, CD143, CD144, CD145, CD146, CD147, CD148, CD149, CD150, CD151, CD152, CD153, CD154, CD155, CD156, CD157, CD158, CD159, CD160, CD161, CD162, CD163, CD164, CD165, CD166, CD167, CD168, CD169, CD170, CD171, CD172, CD173, CD174, CD175, CD176, CD177, CD178, CD179, CD180, CD181, CD182, CD183, CD184, CD185, CD186, CD187, CD188, CD189, CD190, CD191, CD192, CD193, CD194, CD195, CD196, CD197, CD198, CD199, CD200, CD201, CD202, CD203, CD204, CD205, CD206, CD207, CD208, CD209, CD210, CD211, CD212, CD213, CD214, CD215, CD216, CD217, CD218, CD219, CD220, CD221, CD222, CD223, CD224, CD225, CD226, CD227, CD228, CD229, CD230, CD231, CD232, CD233, CD234, CD235, CD236, CD237, CD238, CD239, CD240, CD241, CD242, CD243, CD244, CD245, CD246, CD247, CD248, CD249, CD250, CD251, CD252, CD253, CD254, CD255, CD256, CD257, CD258, CD259, CD260, CD261, CD262, CD263, CD264, CD265, CD266, CD267, CD268, CD269, CD270, CD271, CD272, CD273, CD274, CD275, CD276, CD277, CD278, CD279, CD280, CD281, CD282, CD283, CD284, CD285, CD286, CD287, CD288, CD289, CD290, CD291, CD292, CD293, CD294, CD295, CD296, CD297, CD298, CD299, CD300, CD301, CD302, CD303, CD304, CD305, CD306, CD307, CD308, CD309, CD310, CD311, CD312, CD313, CD314, CD315, CD316, CD317, CD318, CD319, and/or CD320.

In some embodiments, the immunotherapy agent is an agent (e.g., a polypeptide, antibody, antigen-binding fragment thereof, a single-chain polypeptide, or construct thereof) that binds a chemokine or lymphokine. For instance, the immunotherapy agent may be an agent (e.g., polypeptide, antibody, antigen-binding fragment thereof, single-chain polypeptide, or construct thereof) that bind and activates one or more, or all, of CXCL1, CXCL2, CXCL3, CXCL8, CCL2 and CCL5. In some embodiments, the immunotherapy agent is an agent (e.g., a polypeptide, antibody, antigen-binding fragment thereof, a single-chain polypeptide, or construct thereof) that binds and activates one or more, or all, of CCL3, CCL4, CCL8, and CCL22.

Labeled TNFR2 Polypeptides

In some embodiments, agonistic TNFR2 single-chain polypeptides, antibodies, antigen-binding fragments thereof, or constructs described herein are conjugated to another molecule (e.g., an epitope tag) for the purpose of purification or detection. Examples of such molecules that are useful in protein purification include those that present structural epitopes capable of being recognized by a second molecule. This is a common strategy that is employed in protein purification by affinity chromatography, in which a molecule is immobilized on a solid support and exposed to a heterogeneous mixture containing a target protein conjugated to a molecule capable of binding the immobilized compound. Examples of epitope tag molecules that can be conjugated to agonistic TNFR2 polypeptides for the purposes of molecular recognition include, without limitation, maltose-binding protein, glutathione-S-transferase, a poly-histidine tag, a FLAG-tag, a myc-tag, human influenza hemagglutinin (HA) tag, biotin, streptavidin. Conjugates containing the epitopes presented by these molecules are capable of being recognized by such complementary molecules as maltose, glutathione, a nickel-containing complex, an anti-FLAG antibody, an anti-myc antibody, an anti-HA antibody, streptavidin, or biotin, respectively. For example, one can purify an agonistic TNFR2 antibody or fragment thereof described herein that has been conjugated to an epitope tag from a complex mixture of other proteins and biomolecules (e.g., DNA, RNA, carbohydrates, phospholipids, etc) by treating the mixture with a solid phase resin containing an complementary molecule that can selectively recognize and bind the epitope tag of the agonistic TNFR2 antibody or fragment thereof. Examples of solid phase resins include agarose beads, which are compatible with purifications in aqueous solution.

An agonistic TNFR2 polypeptide described herein can also be covalently appended to a fluorescent molecule, e.g., to detect the antibody or antigen-binding fragment thereof by fluorimetry and/or by direct visualization using fluorescence microscopy. Exemplary fluorescent molecules that can be conjugated to antibodies described herein include green fluorescent protein, cyan fluorescent protein, yellow fluorescent protein, red fluorescent protein, phycoerythrin, allophycocyanin, hoescht, 4',6-diamidino-2-phenylindole (DAPI), propidium iodide, fluorescein, coumarin, rhodamine, tetramethylrhoadmine, and cyanine. Additional examples of fluorescent molecules suitable for conjugation to antibodies described herein are well-known in the art and have been described in detail in, e.g., U.S. Pat. Nos. 7,417,131 and 7,413,874, each of which is incorporated by reference herein.

Agonistic TNFR2 polypeptides containing a fluorescent molecule are particularly useful for monitoring the cell-surface localization properties of antibodies and fragments thereof described herein. For instance, one can expose cultured mammalian cells (e.g., Treg cells) to agonistic TNFR2 polypeptides described herein that have been covalently conjugated to a fluorescent molecule and subsequently analyze these cells using conventional fluorescent microscopy techniques known in the art. Confocal fluorescent microscopy is a particularly powerful method for determining cell-surface localization of agonistic TNFR2 polypeptides, as individual planes of a cell can be analyzed in order to distinguish antibodies or fragments thereof that have been internalized into a cell's interior, e.g., by receptor-mediated endocytosis, from those that are bound to the external face of the cell membrane. Additionally, cells can be treated with agonistic TNFR2 antibodies conjugated to a fluorescent molecule that emits visible light of a particular wavelength (e.g., fluorescein, which fluoresces at about 535 nm) and an additional fluorescent molecule that is known to localize to a particular site on the Treg cell surface and that fluoresces at a different wavelength (e.g., a molecule that localizes to CD25 and that fluoresces at about 599 nm). The resulting emission patterns can be visualized by confocal fluorescence microscopy and the images from these two wavelengths can be merged in order to reveal information regarding the location of the agonistic TNFR2 antibody or antigen-binding fragment thereof on the Treg cell surface with respect to other receptors.

Bioluminescent proteins can also be incorporated into a fusion protein for the purposes of detection and visualization of an agonistic TNFR2 polypeptide, such as a single-chain polypeptide, antibody, or fragment thereof. Bioluminescent proteins, such as Luciferase and aequorin, emit light as part of a chemical reaction with a substrate (e.g., luciferin and coelenterazine). Exemplary bioluminescent proteins suitable for use as a diagnostic sequence and methods for their use are described in, e.g., U.S. Pat. Nos. 5,292,658, 5,670,356, 6,171,809, and 7,183,092, each of which is herein incorporated by reference. Agonistic TNFR2 antibodies or fragments thereof labeled with bioluminescent proteins are a useful tool for the detection of antibodies described herein following an in vitro assay. For instance, the presence of an agonistic TNFR2 antibody that has been conjugated to a bioluminescent protein can be detected among a complex mixture of additional proteins by separating the components of the mixture using gel electrophoresis methods known in the art (e.g., native gel analysis) and subsequently transferring the separated proteins to a membrane in order to perform a Western blot. Detection of the agonistic TNFR2 polypeptide among the mixture of other proteins can be achieved by treating the membrane with an appropriate Luciferase substrate and subsequently visualizing the mixture of proteins on film using established protocols.

The polypeptides (e.g., single-chain polypeptides, antibodies, antigen-binding fragments thereof, and constructs thereof) described herein can also be conjugated to a molecule comprising a radioactive nucleus, such that an antibody or fragment thereof described herein can be detected by analyzing the radioactive emission pattern of the nucleus. Alternatively, an agonistic TNFR2 antibody or fragment thereof can be modified directly by incorporating a radioactive nucleus within the antibody during the preparation of the protein. Radioactive isotopes of methionine ($^{35}$S), nitrogen ($^{15}$N), or carbon ($^{13}$C) can be incorporated into antibodies or fragments thereof described herein by, e.g., culturing bacteria in media that has been supplemented with nutrients containing these isotopes. Optionally, tyrosine derivatives containing a radioactive halogen can be incorporated into an agonistic TNFR2 polypeptide by, e.g., culturing bacterial cells in media supplemented with radiolabeled tyrosine. It has been shown that tyrosine functionalized with a radioactive halogen at the C2 position of the phenol system are rapidly incorporated into elongating polypeptide chains using the endogenous translation enzymes in vivo (U.S. Pat. No. 4,925,651; incorporated herein by reference). The halogens include fluorine, chlorine, bromine, iodine, and astatine. Additionally, agonistic TNFR2 polypeptides can be modified following isolation and purification from cell culture by functionalizing polypeptides described herein with a radioactive isotope. The halogens represent a class of isotopes that can be readily incorporated into a purified protein by aromatic substitution at tyrosine or tryptophan, e.g., via reaction of one or more of these residues with an electrophilic halogen species. Examples of radioactive halogen isotopes include $^{18}$F, $^{75}$Br, $^{77}$Br, $^{122}$I, $^{123}$I, $^{124}$I, $^{125}$I, $^{129}$I, $^{131}$I, or $^{211}$At.

Another alternative strategy for the incorporation of a radioactive isotope is the covalent attachment of a chelating group to the agonistic TNFR2 polypeptide, such as a single-chain polypeptide, antibody, fragment thereof, or construct. Chelating groups can be covalently appended to an agonistic TNFR2 antibody or fragment thereof by attachment to a reactive functional group, such as a thiol, amino group, alcohol, or carboxylic acid. The chelating groups can then be modified to contain any of a variety of metallic radioisotopes, including, without limitation, such radioactive nuclides as $^{125}$I, $^{67}$Ga, $^{111}$In, $^{99}$Tc, $^{169}$Yb, $^{186}$Re, $^{123}$I, $^{124}$I, $^{125}$I, $^{131}$I, $^{99m}$Tc, $^{111}$In, $^{64}$Cu, $^{67}$Cu, $^{186}$Re, $^{188}$Re, $^{177}$Lu, $^{90}$Y, $^{77}$As, $^{72}$Aa, $^{86}$Y, $^{89}$Zr, $^{211}$At, $^{212}$Bi, $^{213}$Bi, or $^{225}$Ac.

In some embodiments, it may be desirable to covalently conjugate the polypeptides (e.g., single-chain polypeptides, antibodies, fragments thereof, or construct thereof) described herein with a chelating group capable of binding a metal ion from heavy elements or rare earth ions, such as $Gd^{3+}$, $Fe^{3+}$, $Mn^{3+}$, or $Cr^{2+}$. Conjugates containing chelating groups that are coordinated to such paramagnetic metals are useful as in MRI imaging applications. Paramagnetic metals include, but are not limited to, chromium (III), manganese (II), iron (II), iron (III), cobalt (II), nickel (II), copper (II), praseodymium (III), neodymium (III), samarium (III), gadolinium (III), terbium (III), dysprosium (III), holmium (III), erbium (III), and ytterbium (III). In this way, agonistic TNFR2 polypeptides can be detected by MRI spectroscopy. For instance, one can administer agonistic TNFR2 antibodies or fragments thereof conjugated to chelating groups bound to paramagnetic ions to a mammalian subject (e.g., a human patient) in order to monitor the distribution of the antibody following administration. This can be achieved by administration of the antibody to a patient by any of the administration routes described herein, such as intravenously, and subsequently analyzing the location of the administered antibody by recording an MRI of the patient according to established protocols.

Agonistic TNFR2 polypeptides (e.g., single-chain polypeptides, antibodies, antigen-binding fragments thereof, and constructs thereof) can additionally be conjugated to other molecules for the purpose of improving the solubility and stability of the protein in aqueous solution. Examples of such molecules include PEG, PSA, bovine serum albumin (BSA), and human serum albumin (HSA), among others. For instance, one can conjugate an agonistic TNFR2 polypeptide to carbohydrate moieties in order to evade detection of the antibody or fragment thereof by the immune system of the patient receiving treatment. This process of hyperglycosylation reduces the immunogenicity of therapeutic proteins by sterically inhibiting the interaction of the protein with B cell receptors in circulation. Alternatively, agonistic TNFR2 antibodies or fragments thereof can be conjugated to molecules that prevent clearance from human serum and improve the pharmacokinetic profile of antibodies described herein. Exemplary molecules that can be conjugated to or inserted within TNFR2 antibodies or fragments thereof described herein so as to attenuate clearance and improve the pharmacokinetic profile of these antibodies and fragments include salvage receptor binding epitopes. These epitopes are found within the Fc region of an IgG immunoglobulin and have been shown to bind Fc receptors and prolong antibody half-life in human serum. The insertion of salvage receptor binding epitopes into TNFR2 antibodies or fragments thereof can be achieved, e.g., as described in U.S. Pat. No. 5,739,277; incorporated herein by reference.

Modified Agonistic TNFR2 Polypeptides

In addition to conjugation to other therapeutic agents and labels for identification or visualization, agonistic TNFR2 polypeptides (e.g., single-chain polypeptides, antibodies, antigen-binding fragments thereof, and constructs thereof) described herein can also be modified so as to improve their pharmacokinetic profile, biophysical stability, or agonistic capacity. For instance, any cysteine residue not involved in maintaining the proper conformation of the agonistic TNFR2 polypeptide may be substituted with an isosteric or isoelectronic amino acid (e.g., serine) in order to improve the oxidative stability of the molecule and prevent aberrant crosslinking. Conversely, cystine bond(s) may be added to the antibody or fragment thereof to improve its stability (particularly where the antibody is an antibody fragment, such as an Fv fragment). This can be accomplished, e.g., by altering a polynucleotide encoding the antibody heavy and light chains or a polynucleotide encoding an antibody fragment so as to encode one or more additional pairs of cysteine residues that can form disulfide bonds under oxidative conditions in order to reinforce antibody tertiary structure (see, e.g., U.S. Pat. No. 7,422,899; incorporated herein by reference).

Another useful modification that may be made to agonistic TNFR2 polypeptides (e.g., single-chain polypeptides, antibodies, antigen-binding fragments thereof, and constructs thereof) described herein includes altering the glycosylation profile of these antibodies and fragments thereof. This can be achieved, e.g., by substituting, inserting, or deleting amino acids in an agonistic TNFR2 antibody so as to insert or remove a glycosylation site. Glycosylation of antibodies typically occurs in N-linked or O-linked fashion. N-linked glycosylation is a process whereby the attachment of a carbohydrate moiety to an antibody occurs at the side-chain of an asparagine residue. Consensus amino acid sequences for N-linked glycosylation include the tripeptide sequences asparagine-X-serine (NXS) and asparagine-X-threonine (NXT), where X is any amino acid except proline. The insertion of either of these tripeptide sequences in a polypeptide (e.g., an agonistic TNFR2 antibody) creates a potential glycosylation site. 0-linked glycosylation refers to the attachment of one of the sugars N-acetylgalactosamine, galactose, or xylose to a hydroxyamino acid, most commonly serine or threonine, although 5-hydroxyproline or 5-hydroxylysine are also competent substrates for glycoside formation. Addition of glycosylation sites to a TNFR2 antibody can thus be accomplished by altering the amino acid sequence of the antibody (e.g., using recombinant expression techniques as described herein) such that it contains one or more of the above-described tripeptide sequences to promote N-linked glycosylation, or one or more serine or threonine residues to the sequence of the original antibody engender O-linked glycosylation (see, e.g., U.S. Pat. No. 7,422,899; incorporated herein by reference).

In alternative cases, it may be desirable to modify the antibody or fragment thereof described herein with respect to effector function, e.g., so as to enhance antigen-dependent cell-mediated cytotoxicity (ADCC) and/or complement dependent cytotoxicity (CDC) of the antibody. This may be achieved by introducing one or more amino acid substitutions in an Fc region of the antibody. For instance, cysteine residues may be introduced in the Fc region of a TNFR2 antibody or fragment thereof (e.g., by recombinant expression techniques as described herein), so as to facilitate additional inter-chain disulfide bond formation in this region. The homodimeric antibody thus generated may have increased conformational constraint, which may foster improved internalization capability and/or increased complement-mediated cell killing and antibody-dependent cellular cytotoxicity (ADCC). Homodimeric antibodies with enhanced anti-tumor activity may also be prepared using heterobifunctional cross-linkers as described, for example, in Wolff et al. (Canc. Res., 53:2560-2565, 1993); incorporated herein by reference. Alternatively, an antibody can be engineered which has dual Fc regions and may thereby have enhanced complement lysis and ADCC capabilities (see Stevenson et al. (Anti-Canc. Drug Des., 3:219-230, 1989); incorporated herein by reference).

The serum half-life of agonistic TNFR2 polypeptides (e.g., single-chain polypeptides, antibodies, and antigen-binding fragments thereof) described herein can be improved in some embodiments by incorporating one more amino acid modifications, such as by altering the CH1 or CL region of the Fab domain to introduce a salvage receptor motif, e.g., that found in the two loops of a CH2 domain of an Fc region of an IgG. Such alterations are described, for instance, in U.S. Pat. Nos. 5,869,046 and 6,121,022; incorporated herein by reference. Additional framework modifications can also be made to reduce immunogenicity of the antibody or fragment thereof or to reduce or remove T cell epitopes that reside therein, as described for instance in US2003/0153043; incorporated herein by reference.

Methods of Treatment

Agonistic TNFR2 polypeptides of the disclosure (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions and/or other agonist TNFR2 antibodies as described herein) are useful therapeutics for the treatment of a wide array of immunological disorders. Agonistic TNFR2 polypeptides described herein can be administered to a subject, e.g., a mammalian subject, such as a human, in order to treat such conditions as autoimmune diseases, neurological diseases, metabolic diseases (e.g., diabetes), macular diseases (e.g., macular degeneration), muscular atrophy, diseases related to miscarriage, vascular diseases (e.g., atherosclerosis), diseases related to bone loss (e.g., bone loss as a result of menopause or osteoporosis), allergies, asthma, a blood disorder (e.g., hemophilia), a musculoskeletal disorder, a disease related to growth receptor expression or activity, obesity, graft-versus-host disease (GVHD), or an allograft rejection, among other indications. Agonistic TNFR2 polypeptides of the disclosure can also be used, for example, to treat a patient in need of organ repair or regeneration, e.g., by inducing the proliferation of cells within a damaged tissue or organ. Agonistic TNFR2 polypeptides described herein can be administered to a mammalian subject, such as a human, to stimulate the proliferation of Treg cells (e.g., CD4+, CD25+, FOXP3+ Treg cells) and/or MDSCs. This response can have the effect of reducing populations of cytotoxic T-lymphocytes (e.g., CD8+ T-cells) that are often associated with mounting an inappropriate immune response that can cause an immunological disorder. Agonistic TNFR2 polypeptides may, additionally or alternatively, directly kill T effector cells, such as CD8+T effector cells, and may promote the proliferation, regeneration, healing, and/or protection of TNFR2-expressing parenchymal cells, as described above.

Agonistic TNFR2 polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) can be administered to a subject, e.g., a mammalian subject, such as a human, suffering from a graft rejection. Agonistic TNFR2 polypeptides described herein may treat graft rejections, e.g., by binding TNFR2 receptors on the surface of autoreactive CD8+ T-cells that bind antigens presented on the surface of the graft and inducing apoptosis in these CD8+ T-cells, or by inducing the expansion of Treg cells and/or MDSCs that may subsequently eliminate autoreactive CD8+ T-cells. Examples of graft rejections that can be treated by administration of the polypeptides described herein include, without limitation, skin graft rejection, bone graft rejection, vascular tissue graft rejection, ligament graft rejection (e.g., cricothyroid ligament graft rejection, periodontal ligament graft rejection, suspensory ligament of the lens graft rejection, palmar radiocarpal ligament graft rejection, dorsal radiocarpal ligament graft rejection, ulnar collateral ligament graft rejection, radial collateral ligament graft rejection, suspensory ligament of the breast graft rejection, anterior sacroiliac ligament graft rejection, posterior sacroiliac ligament graft rejection, sacrotuberous ligament graft rejection, sacrospinous ligament graft rejection, inferior pubic ligament graft rejection, superior pubic ligament graft rejection, anterior cruciate ligament graft rejection, lateral collateral ligament graft rejection, posterior cruciate ligament graft rejection, medial collateral ligament graft rejection, cranial cruciate ligament graft rejection, caudal cruciate ligament graft rejection, patellar ligament graft rejection) and organ graft rejection (e.g., heart, lung, kidney, liver, pancreas, intestine, and thymus graft rejection, among others).

Agonistic TNFR2 polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) may, additionally or alternatively, be administered to a subject, e.g., a mammalian subject, such as a human) suffering from a graft-versus-host disease (GVHD). Exemplary graft-versus-host diseases that can be treated using the compositions and methods of the invention include those that arises from a bone marrow transplant, as well as from the transplantation of blood cells, such as hematopoietic stem cells, common myeloid progenitor cells, common lymphoid progenitor cells, megakaryocytes, monocytes, basophils, eosinophils, neutrophils, macrophages, T-cells, B-cells, natural killer cells, and/or dendritic cells.

Agonistic TNFR2 polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) can also be administered to a subject, e.g., a mammalian subject, such as a human, suffering from an immunological disease, e.g., in order to bind a TNFR2 receptor on the surface of an autoreactive T-cell and induce apoptosis, and/or to promote Treg cell growth and thus suppress the activity of inappropriately reactive cytotoxic T-lymphocytes and B-lymphocytes in the patient. Antibodies of the invention can be administered to a subject, e.g., via any of the routes of administration described herein.

Immunological diseases that can be treated by administration of polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) include allergies, such as food allergy, seasonal allergy, pet allergy, hives, hay fever, allergic conjunctivitis, poison ivy allergy oak allergy, mold allergy, drug allergy, dust allergy, cosmetic allergy, and chemical allergy.

Diseases that can be treated by administration of an agonistic TNFR2 polypeptide described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) include autoimmune diseases, such as type I diabetes, alopecia areata, ankylosing spondylitis, antiphospholipid syndrome, autoimmune Addison's Disease, autoimmune hemolytic anemia, autoimmune hepatitis, Behcet's Disease, bullous pemphigoid, cardiomyopathy, celiac sprue-dermatitis, chronic fatigue immune dysfunction syndrome (CFIDS), chronic inflammatory demyelinating polyneuropathy, Churg-Strauss Syndrome, cicatricial pemphigoid, limited scleroderma (CREST Syndrome), cold agglutinin disease, Crohn's Disease, discoid lupus, essential mixed cryoglobulinemia, fibromyalgia-fibromyositis, Graves' Disease, Guillain-Barré Syndrome, Hashimoto's Thyroiditis, hypothyroidism, Inflammatory Bowel Disease, autoimmune lymphoproliferative syndrome (ALPS), idiopathic pulmonary fibrosis, idiopathic thrombocytopenia purpura (ITP), IgA nephropathy, juvenile arthritis, lichen planus, lupus, Ménière's Disease, mixed connective tissue disease, multiple sclerosis, myasthenia gravis, pemphigus vulgaris, pernicious anemia, polyarteritis *nodosa*, polychondritis, polyglandular syndromes, polymyalgia rheumatica, polymyositis, dermatomyositis, primary agammaglobulinemia, primary biliary cirrhosis, psoriasis, Raynaud's Phenomenon, Reiter's Syndrome, rheumatic fever, rheumatoid arthritis, sarcoidosis, scleroderma, Sjögren's Syndrome, Stiff-Man syndrome, Takayasu Arteritis, temporal arteritis/giant cell arteritis, ulcerative colitis, uveitis, vasculitis, vitiligo, and Wegener's Granulomatosis.

Agonistic TNFR2 polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) can additionally be used to treat patients in need of organ repair or regeneration. For instance, agonistic TNFR2 antibodies or antigen-binding fragments thereof of the invention may be used to stimulate organ repair or regeneration, e.g., by binding TNFR2 on the surface of cells within damaged tissue so as to induce TRAF2/3- and/or NFκB-mediated cell proliferation. Examples of tissues and organs that may be induced to regenerate by administration of an agonistic TNFR2 antibody or antigen-binding fragment thereof of the invention to a subject (e.g., a mammalian subject, such as a human) include the pancreas, salivary gland, pituitary gland, kidney, heart, lung, hematopoietic system, cranial nerves, heart, blood vessels including the aorta, olfactory gland, ear, nerves, structures of the head, eye, thymus, tongue, bone, liver, small intestine, large intestine, gut, lung, brain, skin, peripheral nervous system, central nervous system, spinal cord, breast, embryonic structures, embryos, and testes.

Agonistic TNFR2 polypeptides described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) can also be administered to a subject (e.g., a mammalian subject, such as a human) in order to treat a neurological disease or condition, such as a brain tumor, a brain metastasis, a spinal cord injury, schizophrenia, epilepsy, Amyotrophic lateral sclerosis (ALS), Parkinson's disease, Alzheimer's disease, Huntington's disease, or stroke.

A physician of ordinary skill in the art can readily determine an effective amount of an agonistic TNFR2 polypeptide described herein for administration to a mammalian subject (e.g., a human) in need thereof. For example, a physician could start prescribing doses of an agonistic TNFR2 polypeptide at levels lower than that required to achieve the desired therapeutic effect and gradually increase the dosage until the desired effect is achieved. Alternatively, a physician may begin a treatment regimen by administering an agonistic TNFR2 polypeptide at a high dose and subsequently administer progressively lower doses until a therapeutic effect is achieved (e.g., a reduction in the proliferation of a population of CD8+ T-cells or a decrease in the peripheral secretion of IFNγ). In general, a suitable daily dose of an antibody or antigen-binding fragment thereof of the invention will be an amount of the antibody which is the lowest dose effective to produce a therapeutic effect. An antibody or antigen-binding fragment thereof of the invention may be administered by injection, e.g., by intravenous, intramuscular, intraperitoneal, or subcutaneous injection, optionally proximal to the site of a target tissue. A daily dose of a therapeutic composition of an antibody or antigen-binding fragment thereof of the invention may be administered as a single dose or as two, three, four, five, six or more doses administered separately at appropriate intervals throughout the day, week, month, or year, optionally, in unit dosage forms. While it is possible for an antibody or fragment thereof of the invention to be administered alone, it may also be administered as a pharmaceutical formulation in combination with excipients, carriers, and optionally, additional therapeutic agents.

Polypeptides of the disclosure can be monitored for their ability to attenuate the progression of an immunological disease, such as an autoimmune disease, by any of a variety of methods known in the art. For instance, a physician may monitor the response of a mammalian subject (e.g., a human) to treatment with an agonistic TNFR2 polypeptide by analyzing the quantity of IFNγ secreted by CD8+ T-cells within a particular patient. For example, antibodies of the invention may be capable of reducing IFNγ secretion by between 1% and 100% (e.g., 1%, 5%, 10%, 20%, 30%, 40%, 50%, 60%, 70%, 80%, 90%, 95%, 99%, or 100%). Alternatively, a physician may monitor the responsiveness of a subject (e.g., a human) to treatment with agonistic TNFR2 antibodies or antigen-binding fragments thereof of the invention by analyzing the Treg cell population in the lymph of a particular subject. For instance, a physician may withdraw a sample of blood from a mammalian subject (e.g., a human) and determine the quantity or density of a population of Treg cells (e.g., CD4+ CD25+ FOXP3+ Treg cells or CD17+ Treg cells) using established procedures, such as fluorescence activated cell sorting. In these cases, high counts of Treg cells is indicative of efficacious therapy, while lower Treg cell counts may indicate that the patient is to be prescribed or administered higher dosages of the TNFR2 antibody of the invention until, e.g., an ideal Treg cell count is achieved. In addition, a physician of skill in the art may monitor the effect of treatment by administration of agonistic TNFR2 antibodies of antigen-binding fragments thereof to a patient suffering from an immunological disorder, such as an autoimmune disease described herein, by analyzing the quantity of autoreactive CD8+ T-cells within a lymph sample isolated from the patient. Agonistic TNFR2 antibodies and antigen-binding fragments thereof of the invention may attenuate the proliferation of autoreactive T-cells, e.g., by binding TNFR2 at the surface of an autoreactive T-cell and inducing apoptosis, and/or by stimulating the expansion of Treg cells that subsequently eliminate autoreactive T lymphocytes. Treatment with agonistic TNFR2 antibodies or antigen-binding fragments thereof can lead to reduced quantities of autoreactive T-cells within the lymph isolated from a patient receiving treatment, and a rapid decline in the population of autoreactive T-cells in a lymph sample isolated from such a patient indicates effective treatment. In cases where a lymph sample isolated from a patient exhibits an autoreactive T-cell count that has not declined in response to agonistic TNFR2 antibody therapy, a physician may prescribe the patient higher doses of the antibody or an antigen-binding fragment thereof or may administer the agonistic TNFR2 antibody or antigen-binding fragment thereof with higher frequency, e.g., multiple times per day, week, or month.

Pharmaceutical Compositions

Pharmaceutical compositions containing an agonistic TNFR2 polypeptide, such as a single-chain polypeptide, antibody, antigen-binding fragment thereof, or construct described herein can be prepared using methods known in the art. Exemplary agonistic TNFR2 polypeptides that can be incorporated into pharmaceutical compositions of the disclosure include those with at least two TNFR2 binding sites in which the binding sites are spatially separated from one another by less than about 133 Å, as well as those having a human IgG1 isotype, IgG2 isotype (e.g., with a C127S mutation in the CH1 domain, thereby producing, for example, a human IgG2-B isotype), IgG3 isotype, or IgG4 isotype. The TNFR2 agonist may be, for example, an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions.

Pharmaceutical compositions described herein may contain an agonistic TNFR2 polypeptide described herein in combination with one or more pharmaceutically acceptable excipients. For instance, pharmaceutical compositions described herein can be prepared using, e.g., physiologically acceptable carriers, excipients or stabilizers (*Remington's Pharmaceutical Sciences* 16th edition, Osol, A. Ed. (1980); incorporated herein by reference), and in a desired form, e.g., in the form of lyophilized formulations or aqueous solutions. The compositions can also be prepared so as to contain the active agent (e.g., an agonistic TNFR2 antibody or fragment thereof) at a desired concentration. For example, a pharmaceutical composition described herein may contain at least 10% (e.g., 10%, 20%, 30%, 40%, 50%, 60%, 70%, 80%, 90%, 95%, 97%, 98%, 99%, 99.5%, 99.9%, or 100%) active agent by weight (w/w).

Additionally, an active agent (e.g., an agonistic TNFR2 polypeptide described herein, such as a dominant agonistic TNFR2 polypeptide described herein) that can be incorporated into a pharmaceutical formulation can itself have a desired level of purity. For example, a polypeptide, such as a single-chain polypeptide, antibody, or antigen-binding fragment thereof described herein may be characterized by a certain degree of purity after isolating the antibody from cell culture media or after chemical synthesis, e.g., of a single-chain antibody fragment (e.g., scFv) by established solid phase peptide synthesis methods or native chemical ligation as described herein. An agonistic TNFR2 polypeptide described herein may be at least 10% pure prior to incorporating the antibody into a pharmaceutical composition (e.g., 10%, 20%, 30%, 40%, 50%, 60%, 70%, 80%, 90%, 95%, 97%, 98%, 99%, 99.5%, 99.9%, 99.99%, or 100% pure).

Additionally, agonistic TNFR2 polypeptides of the disclosure (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) may be incorporated into a pharmaceutical composition such that many of the polypeptides present in the pharmaceutical composition adopt a single disulfide-bonded isoform. For example, pharmaceutical compositions of the disclosure include those containing an agonist TNFR2 polypeptide in which, e.g., 10%, 20%, 30%, 40%, 50%, 60%, 70%, 80%, 90%, 95%, 96%, 97%, 98%, 99%, 99.9%, 99.99%, or more, of the polypeptide in the pharmaceutical composition is present in a single disulfide-bonded isoform, such as the IgG2-B isoform described herein.

Pharmaceutical compositions of agonistic TNFR2 polypeptides described herein can be prepared for storage as lyophilized formulations or aqueous solutions by mixing the antibody having the desired degree of purity with optional pharmaceutically acceptable carriers, excipients or stabilizers typically employed in the art, e.g., buffering agents, stabilizing agents, preservatives, isotonifiers, non-ionic detergents, antioxidants, and other miscellaneous additives. See, e.g., Remington's Pharmaceutical Sciences, 16th edition (Osol, ed. 1980; incorporated herein by reference). Such additives must be nontoxic to the recipients at the dosages and concentrations employed.

Buffering Agents

Buffering agents help to maintain the pH in the range which approximates physiological conditions. They can be present at concentration ranging from about 2 mM to about 50 mM. Suitable buffering agents for use with agonistic TNFR2 polypeptides (e.g., single-chain polypeptides, antibodies, and antigen-binding fragments thereof) described herein include both organic and inorganic acids and salts thereof such as citrate buffers {e.g., monosodium citrate-disodium citrate mixture, citric acid-trisodium citrate mixture, citric acid-monosodium citrate mixture, etc.), succinate buffers {e.g., succinic acid-monosodium succinate mixture, succinic acid-sodium hydroxide mixture, succinic acid-disodium succinate mixture, etc.), tartrate buffers (e.g., tartaric acid-sodium tartrate mixture, tartaric acid-potassium tartrate mixture, tartaric acid-sodium hydroxide mixture, etc.), fumarate buffers {e.g., fumaric acid-monosodium fumarate mixture, fumaric acid-disodium fumarate mixture, monosodium fumarate-disodium fumarate mixture, etc.), gluconate buffers (e.g., gluconic acid-sodium gluconate mixture, gluconic acid-sodium hydroxide mixture, gluconic acid-potassium gluconate mixture, etc.), oxalate buffer (e.g., oxalic acid-sodium oxalate mixture, oxalic acid-sodium hydroxide mixture, oxalic acid-potassium oxalate mixture, etc.), lactate buffers (e.g., lactic acid-sodium lactate mixture, lactic acid-sodium hydroxide mixture, lactic acid-potassium lactate mixture, etc.) and acetate buffers {e.g., acetic acid-sodium acetate mixture, acetic acid-sodium hydroxide mixture, etc.). Additionally, phosphate buffers, histidine buffers and trimethylamine salts such as Tris can be used.

Preservatives

Preservatives can be added to a composition described herein to retard microbial growth, and can be added in amounts ranging from 0.2%-1% (w/v). Suitable preservatives for use with agonistic TNFR2 polypeptides (e.g., single-chain polypeptides, antibodies, antigen-binding fragments thereof, and constructs thereof) described herein include phenol, benzyl alcohol, meta-cresol, methyl paraben, propyl paraben, octadecyldimethylbenzyl ammonium chloride, benzalconium halides {e.g., chloride, bromide, and iodide), hexamethonium chloride, and alkyl parabens such as methyl or propyl paraben, catechol, resorcinol, cyclohexanol, and 3-pentanol. Isotonifiers sometimes known as "stabilizers" can be added to ensure isotonicity of liquid compositions described herein and include polyhydric sugar alcohols, for example trihydric or higher sugar alcohols, such as glycerin, arabitol, xylitol, sorbitol and mannitol. Stabilizers refer to a broad category of excipients which can range in function from a bulking agent to an additive which solubilizes the therapeutic agent or helps to prevent denaturation or adherence to the container wall. Typical stabilizers can be polyhydric sugar alcohols (enumerated above); amino acids such as arginine, lysine, glycine, glutamine, asparagine, histidine, alanine, ornithine, L-leucine, 2-phenylalanine, glutamic acid, threonine, etc., organic sugars or sugar alcohols, such as lactose, trehalose, stachyose, mannitol, sorbitol, xylitol, ribitol, myoinisitol, galactitol, glycerol and the like, including cyclitols such as inositol; polyethylene glycol; amino acid polymers; sulfur containing reducing agents, such as urea, glutathione, thioctic acid, sodium thioglycolate, thioglycerol, a-monothioglycerol and sodium thio sulfate; low molecular weight polypeptides (e.g., peptides of 10 residues or fewer); proteins such as human serum albumin, bovine serum albumin, gelatin or immunoglobulins; hydrophilic polymers, such as polyvinylpyrrolidone monosaccharides, such as xylose, mannose, fructose, glucose; disaccharides such as lactose, maltose, sucrose and trisaccharides such as raffinose; and polysaccharides such as dextran. Stabilizers can be present in the range from 0.1 to 10,000 weights per part of weight active protein.

Detergents

Non-ionic surfactants or detergents (also known as "wetting agents") can be added to help solubilize the therapeutic agent as well as to protect the therapeutic protein against agitation-induced aggregation, which also permits the formulation to be exposed to shear surface stressed without causing denaturation of the protein. Suitable non-ionic surfactants include polysorbates (20, 80, etc.), polyoxamers (184, 188 etc.), Pluronic polyols, polyoxyethylene sorbitan monoethers (TWEEN®-20, TWEEN®-80, etc.). Non-ionic surfactants can be present in a range of about 0.05 mg/mL to about 1.0 mg/mL, for example about 0.07 mg/mL to about 0.2 mg/mL.

Additional miscellaneous excipients include bulking agents (e.g., starch), chelating agents (e.g., EDTA), antioxidants (e.g., ascorbic acid, methionine, vitamin E), and cosolvents.

Other Pharmaceutical Carriers

Alternative pharmaceutically acceptable carriers that can be incorporated into a pharmaceutical composition described herein may include dextrose, sucrose, sorbitol, mannitol, starch, rubber arable, potassium phosphate, arginate, gelatin, potassium silicate, microcrystalline cellulose, polyvinylpyrrolidone, cellulose, water, syrups, methyl cellulose, methylhydroxy benzoate, propylhydroxy benzoate, talc, magnesium stearate, and mineral oils, but not limited to. A composition containing an agonistic TNFR2 antibody described herein may further include a lubricant, a humectant, a sweetener, a flavoring agent, an emulsifier, a suspending agent, and a preservative. Details of suitable pharmaceutically acceptable carriers and formulations can be found in *Remington's Pharmaceutical Sciences* (19th ed., 1995), which is incorporated herein by reference.

Immunotherapy Agents

Using the methods described herein, an agonistic TNFR2 polypeptide (e.g., a single-chain polypeptide, antibody, antigen-binding fragment thereof, or construct thereof) described herein may be co-administered with (e.g., admixed with) or administered separately from an immunotherapy agent. For example, an agonistic TNFR2 polypeptide described herein (such as a single-chain polypeptide, antibody, antigen-binding fragment thereof, or construct described herein) may be administered to a patient, such as a human patient suffering from inflammation. In some embodiments, the agonistic TNFR2 polypeptide (e.g., a single-chain polypeptide, antibody, antigen-binding fragment thereof, or construct described herein) is administered to the patient prior to administration of an immunotherapy agent or other agent to decrease inflammation or pain to the patient. Alternatively, the agonistic TNFR2 polypeptide (e.g., a single-chain polypeptide, antibody, antigen-binding fragment thereof, or construct described herein) may be administered to the patient after an immunotherapy agent. For example, the agonistic TNFR2 polypeptide (e.g., a single-chain polypeptide, antibody, antigen-binding fragment thereof, or construct described herein) may be administered to the patient after a failed immunotherapy treatment.

Blood-Brain Barrier Penetration

In certain embodiments, agonistic TNFR2 polypeptides (e.g., single-chain polypeptides, antibodies, antigen-binding fragments thereof, and constructs thereof) described herein can be formulated to ensure proper distribution in vivo. For example, the blood-brain barrier (BBB) excludes many highly hydrophilic compounds. To ensure that the therapeutic compositions described herein cross the BBB (if desired), they can be formulated, for example, in liposomes. Methods of manufacturing liposomes have been described, e.g., U.S. Pat. Nos. 4,522,811; 5,374,548; and 5,399,331. The liposomes may comprise one or more moieties that are selectively transported into specific cells or organs, thereby enhancing targeted drug delivery (see, e.g., V. V. Ranade (*J. Clin. Pharmacol.* 29:685, 1989)). Exemplary targeting moieties include, e.g., folate or biotin (see, e.g., U.S. Pat. No. 5,416,016); mannosides (Umezawa et al. (Biochem. Biophys. Res. Commun. 153:1038, 1988)); antibodies (P. G. Bloeman et al. (FEBS Lett. 357:140, 1995); M. Owais et al. (Antimicrob. Agents Chemother. 39:180, 1995)); surfactant protein A receptor (Briscoe et al. (Am. J. Physiol. 1233:134, 1995)); the disclosures of each of which are incorporated herein by reference.

Routes of Administration and Dosing

Agonistic TNFR2 polypeptides (e.g., single-chain polypeptides, antibodies, antigen-binding fragments thereof, and constructs thereof) described herein can be administered to a mammalian subject (e.g., a human) by a variety of routes such as orally, transdermally, subcutaneously, intranasally, intravenously, intramuscularly, intraocularly, intratumorally, parenterally, topically, intrathecally and intracerebroventricularly. The most suitable route for administration in any given case will depend on the particular polypeptide administered, the patient, pharmaceutical formulation methods, administration methods (e.g., administration time and administration route), the patients age, body weight, sex, severity of the diseases being treated, the patient's diet, and the patient's excretion rate.

The effective dose of an agonistic TNFR2 polypeptide described herein can range, for instance, from about 0.0001 to about 100 mg/kg of body weight per single (e.g., bolus) administration, multiple administrations or continuous administration (e.g., a continuous infusion), or to achieve a serum concentration of 0.0001-5000 pg/mL serum concentration per single (e.g., bolus) administration, multiple administrations or continuous administration (e.g., continuous infusion), or any effective range or value therein depending on the condition being treated, the route of administration and the age, weight, and condition of the subject. In certain embodiments, each dose can range from about 0.0001 mg to about 500 mg/kg of body weight. For instance, a pharmaceutical composition described herein may be administered in a daily dose in the range of 0.001-100 mg/kg (body weight). The dose may be administered one or more times (e.g., 2-10 times) per day, week, month, or year to a mammalian subject (e.g., a human) in need thereof.

Agonistic TNFR2 polypeptides described herein (e.g., single-chain polypeptides, antibodies, antigen-binding fragments thereof, and constructs thereof) can be administered to a patient by way of a continuous intravenous infusion or as a single bolus administration. The agonistic TNFR2 polypeptides described herein (e.g., e.g., single-chain polypeptides, antibodies, antigen-binding fragments thereof, and constructs thereof) may be administered to a patient in an amount of, for example, from 0.01 pg to about 5 g in a volume of, for example, from 10 μL to 10 mL. The agonistic TNFR2 polypeptides may be administered to a patient over the course of several minutes to several hours. For example, the agonistic TNFR2 polypeptides described herein may be administered to a patient over the course of from 5 minutes to 5 hours, such as over the course of 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 80 minutes, 90 minutes, 95 minutes, 100 minutes, 105 minutes, 110 minutes, 115 minutes, 120 minutes, 125 minutes, 130 minutes, 135 minutes, 140 minutes, 145 minutes, 150 minutes, 155 minutes, 160 minutes, 165 minutes, 170 minutes, 175 minutes, 180 minutes, 185 minutes, 190 minutes, 195 minutes, 200 minutes, 205 minutes, 210 minutes, 215 minutes, 220 minutes, 225 minutes, 230 minutes, 235 minutes, 240 minutes, 245 minutes, 250 minutes, 255 minutes, 260 minutes, 265 minutes, 270 minutes, 275 minutes, 280 minutes, 285 minutes, 290 minutes, 295 minutes, or 300 minutes, or more.

Agonistic TNFR2 polypeptides (e.g., single-chain polypeptides, antibodies, antigen-binding fragments thereof, and constructs thereof) described herein may be administered in combination with an immunotherapy agent, such as an agonist of PD-1 such as an antibody or antigen-binding fragment thereof, a PD-L1 agonist antibody or antigen-binding fragment thereof, and/or agonistic CTLA-4 antibody or antigen-binding fragment thereof.

Kits Containing Agonistic TNFR2 Polypeptides

Also included herein are kits that contain agonistic TNFR2 polypeptides (e.g., single-chain polypeptides, antibodies, antigen-binding fragments thereof, and constructs thereof). The kits provided herein may contain any of the agonistic TNFR2 polypeptides described above, as well as any of the polynucleotides encoding these polypeptides, vectors containing these polynucleotides, or cells engineered to express and secrete antibodies described herein (e.g., prokaryotic or eukaryotic cells).

Exemplary compositions of the disclosure that can be incorporated into a kit described herein include agonistic TNFR2 polypeptides, such as those with at least two TNFR2 binding sites in which the binding sites are spatially separated from one another by about 133 Å or less, as well as those having a human IgG2 isotype, for example, a human IgG2-B isotype. Compositions of the disclosure that can be incorporated into kits described herein also include pharmaceutical compositions containing agonistic TNFR2 polypeptides that adopt a single disulfide-bonded isoform, such as those in which, e.g., 10%, 20%, 30%, 40%, 50%, 60%, 70%, 80%, 90%, 95%, 96%, 97%, 98%, 99%, 99.9%, 99.99%, or more, of the polypeptide in the pharmaceutical composition is present in a single disulfide-bonded isoform.

A kit described herein may include reagents that can be used to produce the compositions described herein (e.g., agonistic TNFR2 polypeptides, such as single-chain polypeptides, antibodies, constructs, conjugates containing agonistic TNFR2 polypeptides, polynucleotides encoding agonistic TNFR2 polypeptides, vectors containing these polynucleotides). Optionally, kits described herein may include reagents that can induce the expression of agonistic TNFR2 polypeptides within cells (e.g., mammalian cells), such as doxycycline or tetracycline. In other cases, a kit described herein may contain a compound capable of binding and detecting a fusion protein that contains an agonistic TNFR2 antibody and an epitope tag. For instance, in such cases a kit described herein may contain maltose, glutathione, a nickel-containing complex, an anti-FLAG antibody, an anti-myc antibody, an anti-HA antibody, biotin, or streptavidin.

Kits described herein may also include reagents that are capable of detecting an agonistic TNFR2 polypeptide (e.g., single-chain polypeptide, antibody, fragment thereof, or construct thereof) directly. Examples of such reagents include secondary antibodies that selectively recognize and bind particular structural features within the Fc region of a TNFR2 antibody described herein. Kits described herein may contain secondary antibodies that recognize the Fc region of an agonistic TNFR2 antibody and that are conjugated to a fluorescent molecule. These antibody-fluorophore conjugates provide a tool for analyzing the localization of agonistic TNFR2 antibodies, e.g., in a particular tissue or cultured mammalian cell using established immunofluorescence techniques. In some embodiments, kits described herein may include additional fluorescent compounds that exhibit known sub-cellular localization patterns. These reagents can be used in combination with another antibody-fluorophore conjugate, e.g., one that specifically recognizes a different receptor on the cell surface in order to analyze the localization of a TNFR2 antibody relative to other cell-surface proteins.

Kits described herein may also contain a reagent that can be used for the analysis of a patient's response to treatment by administration of agonistic TNFR2 polypeptides (e.g., single-chain polypeptides, antibodies, antigen-binding fragments thereof, and constructs thereof) described herein. For instance, kits described herein may include an agonistic TNFR2 antibody and one or more reagents that can be used to determine the quantity of Treg cells in a blood sample withdrawn from a subject (e.g., a human) that is undergoing treatment with an antibody described herein. Such a kit may contain, e.g., antibodies that selectively bind cell-surface antigens presented by Treg cells, such as CD4 and CD25. Optionally, these antibodies may be labeled with a fluorescent dye, such as fluorescein or tetramethylrhodamine, in order to facilitate analysis of Treg cells by fluorescence-activated cell sorting (FACS) methods known in the art. Kits described herein may optionally contain one or more reagents that can be used to quantify tumor-reactive T lymphocytes in order to determine the effectiveness of an agonistic TNFR2 polypeptide described herein in restoring tumor-infiltrating lymphocyte proliferation. For instance, kits described herein may contain an antibody that selectively binds cell-surface markers on the surface of a cytotoxic T cell, such as CD8 or CD3. Optionally, these antibodies may be labeled with fluorescent molecules so as to enable quantitation by FACS analysis.

A kit described herein may also contain one or more reagents useful for determining the affinity and selectivity of an agonistic TNFR2 polypeptide described herein for one or more peptides derived from TNFR2. For instance, a kit may contain an agonistic TNFR2 polypeptide and one or more reagents that can be used in an ELISA assay to determine the $K_D$ of an antibody described herein for one or more peptides that present a TNFR2 epitope in a conformation similar to that of the epitope in the native protein. A kit may contain, e.g., a microtiter plate containing wells that have been previously conjugated to avidin, and may contain a library of TNFR2-derived peptides, each of which conjugated to a biotin moiety. Such a kit may optionally contain a secondary antibody that specifically binds to the Fc region of an agonistic TNFR2 antibody described herein, and the secondary antibody may be conjugated to an enzyme (e.g., horseradish peroxidase) that catalyzes a chemical reaction that results in the emission of luminescent light.

Kits described herein may also contain agonistic TNFR2 polypeptides described herein and reagents that can be conjugated to such an antibody, including those previously described (e.g., a cytotoxic agent, a fluorescent molecule, a bioluminescent molecule, a molecule containing a radioactive isotope, a molecule containing a chelating group bound to a paramagnetic ion, etc). These kits may additionally contain instructions for how the conjugation of an agonistic TNFR2 antibody described herein to a second molecule, such as those described above, can be achieved.

A kit described herein may also contain a vector containing a polynucleotide that encodes an agonistic TNFR2 polypeptide, such as any of the vectors described herein. Alternatively, a kit may include mammalian cells (e.g., CHO cells) that have been genetically altered to express and secrete agonistic TNFR2 antibodies or fragments thereof from the nuclear genome of the cell. Such a kit may also contain instructions describing how expression of the agonistic TNFR2 antibody or fragment thereof from a polynucleotide can be induced, and may additionally include reagents (such as, e.g., doxycycline or tetracycline) that can be used to promote the transcription of these polynucleotides. Such kits may be useful for the manufacture of agonistic TNFR2 antibodies or antigen-binding fragments thereof described herein.

Other kits described herein may include tools for engineering a prokaryotic or eukaryotic cell (e.g., a CHO cell or a BL21(DE3) E. coli cell) so as to express and secrete an agonistic TNFR2 polypeptide described herein from the nuclear genome of the cell. For example, a kit may contain CHO cells stored in an appropriate media and optionally frozen according to methods known in the art. The kit may also provide a vector containing a polynucleotide that encodes a nuclease (e.g., such as the CRISPER/Cas, zinc finger nuclease, TALEN, ARCUS™ nucleases described herein) as well as reagents for expressing the nuclease in the cell. The kit can additionally provide tools for modifying the polynucleotide that encodes the nuclease so as to enable one to alter the DNA sequence of the nuclease in order to direct the cleavage of a specific target DNA sequence of interest. Examples of such tools include primers for the amplification and site-directed mutagenesis of the polynucleotide encoding the nuclease of interest. The kit may also include restriction enzymes that can be used to selectively excise the nuclease-encoding polynucleotide from the vector and subsequently re-introduce the modified polynucleotide back into the vector once the user has modified the gene. Such a kit may also include a DNA ligase that can be used to catalyze the formation of covalent phosphodiester linkages between the modified nuclease-encoding polynucleotide and the target vector. A kit described herein may also provide a polynucleotide encoding an agonistic TNFR2 polypeptide, as well as a package insert describing the methods one can use to selectively cleave a particular DNA sequence in the genome of the cell in order to incorporate the polynucleotide encoding an agonistic TNFR2 antibody into the genome at this site. Optionally, the kit may provide a polynucleotide encoding a fusion protein that contains an agonistic TNFR2 antibody or fragment thereof and an additional polypeptide, such as, e.g., those described herein.

EXAMPLES

The following examples are put forth so as to provide those of ordinary skill in the art with a description of how the compositions and methods claimed herein are performed, made, and evaluated, and are intended to be purely exemplary described herein and are not intended to limit the scope of what the inventor regards as her invention.

Example 1. Mapping the Discrete Epitopes within TNFR2 that are Bound by Agonistic TNFR2 Polypeptides Libraries of linear, cyclic, and bicyclic peptides derived from human TNFR2 were screened for distinct sequences within the protein that exhibit high affinity for monoclonal TNFR2 antibody TNFRAG1. In order to screen conformational epitopes within TFNR2, peptides from distinct regions of the primary protein sequence were conjugated to one another to form chimeric peptides. These peptides contained cysteine residues at strategic positions within their primary sequences. This facilitated an intramolecular cross-linking strategy that was used to constrain individual peptides to a one of a wide array of three-dimensional conformations. Unprotected thiols of cysteine residues were cross-linked via nucleophilic substitution reactions with divalent and trivalent electrophiles, such as 2,6-bis(bromomethyl) pyridine and 1,3,5-tris(bromomethyl)benzene, so as to form conformationally restricted cyclic and bicyclic peptides, respectively. In this way, peptides containing unique combinations of amino acids from disparate regions of the TNFR2 primary sequence were constrained so as to structurally pre-organize epitopes that may resemble those presented in the native TNFR2 tertiary structure. Libraries containing these peptides were screened by immobilizing peptides to distinct regions of a solid surface and treating the surface in turn with the agonistic TNFR2 antibody TNFRAG1, followed by a secondary antibody conjugated to horseradish peroxidase (HRP), and HRP substrate (2,2'-azino-di-3-ethylbenzthiazoline sulfonate) in the presence of hydrogen peroxide. The solid surface was washed in between treatment with successive reagents so as to remove excess or non-specifically bound materials. The luminescence of each region of each surface was subsequently analyzed using a charge coupled device (CCD)—camera and an image processing system.

The "Constrained Libraries of Peptides on Surfaces" (CLIPS) platform starts with the conversion of the target protein, e.g., TNFR2, into a library of up to 10,000 overlapping peptide constructs, using a combinatorial matrix design (Timmerman et al., J. Mol. Recognit., 20: 283-29, 2007). On a solid carrier, a matrix of linear peptides is synthesized, which are subsequently shaped into spatially defined CLIPS constructs. Constructs representing multiple parts of the discontinuous epitope in the correct conformation bind the antibody with high affinity, which is detected and quantified. Constructs presenting the incomplete epitope bind the antibody with lower affinity, whereas constructs not containing the epitope do not bind at all. Affinity information is used in iterative screens to define the sequence and conformation of epitopes in detail. The raw luminescence data obtained from these ELISA experiments informed the analysis of epitopes present on the surface of TNFR2 that bind agonistic TNFR2 antibodies.

Peptide Synthesis

To reconstruct epitopes of the target molecule a library of peptides was synthesized. An amino functionalized polypropylene support was obtained by grafting a proprietary hydrophilic polymer formulation via reaction with t-butyloxycarbonyl-hexamethylenediamine (BocHMDA) using dicyclohexylcarbodiimide (DCC) with N-hydroxybenzotriazole (HOBt) and subsequent cleavage of the Boc-groups using trifluoroacetic acid (TFA). Standard Fmoc-peptide synthesis was used to synthesize peptides on the amino-functionalized solid support by custom modified JANUS® liquid handling stations (Perkin Elmer). CLIPS technology allows one to structure peptides into single loops, double-loops, triple loops, sheet-like folds, helix-like folds and combinations thereof. CLIPS templates are coupled to cysteine residues. The side-chains of multiple cysteines in the peptides are coupled to one or two CLIPS templates. For example, a 0.5 mM solution of the CLIPS template (2,6-bis (bromomethyl)pyridine) is dissolved in ammonium bicarbonate (20 mM, pH 7.8)/acetonitrile (1:3 (v/v)). This solution is added to a surface-bound peptide array. The CLIPS template will react with side-chains of two cysteines as present in the solid-phase bound peptides of the peptide-arrays (455 wells plate with 3 µl wells). The peptide arrays are gently shaken in the solution for 30 to 60 minutes while completely covered in solution. Finally, the peptide arrays are washed extensively with excess of $H_2O$ and sonicated in disrupt-buffer containing 1% SDS/0.1% beta-mercaptoethanol in PBS (pH 7.2) at 70° C. for 30 minutes, followed by sonication in H₂O for another 45 minutes.

Analysis of Binding Affinities of Agonistic TNFR2 Antibodies by Surface Plasmon Resonance The affinities of agonistic TNFR2 antibodies for recombinant human TNFR2 were measured using BIACORE™ Analysis Services (Precision Antibody). Briefly, the antibody was biotinylated at a 5:1 stoichiometric ratio using biotinyl-LC-LC-NOSE (Thermo-Fisher) in PBS. Excess biotinylation reagent was removed by centrifugation chromatography and the biotinylated antibody was captured on 3000 RU of streptavidin surface to a level of 100 RU. Theoretical maximum of signal with TNFR2 with that level of antibody capture was 26 RU and that signal was reached with a preliminary experiment using 500 nM TNFR2 in the running buffer. Analysis of the kinetics of antigen binding was performed at a flow of 60 µL/min with 2 min injections. Antibodies were injected at a concentration of 1 mg/ml to the final capture of 100 RU. The instrument used was BIACORE™ 3000 with the BioCap chip (GE Healthcare). Double reference method was used for analysis. Reference channel contained the identical level of streptavidin.

ELISA Screening

The binding of antibody to each of the synthesized peptides was tested in an ELISA format. Surface-immobilized peptide arrays were incubated with primary antibody solution (overnight at 4° C.). After washing, the peptide arrays were incubated with a 1/1000 dilution of an appropriate antibody peroxidase conjugate (SBA) for one hour at 25° C. After washing, the peroxidase substrate 2,2'-azino-di-3-ethylbenzthiazoline sulfonate (ABTS) and 2 µl/ml of 3 percent H₂O₂ were added. After one hour, the color development was measured. The color development was quantified with a charge coupled device (CCD)—camera and an image processing system. The values obtained from the CCD camera range from 0 to 3000 mAU, similar to a standard 96-well plate ELISA-reader.

The affinities of a series of peptide fragments of human TNFR2 for TNFRAG1, as assessed by ELISA, are summarized in Table 2, below. Affinity is reported qualitatively using a categorical four-point scale, such that an affinity score of "0" denotes lowest affinity and an affinity score of "4" denotes highest affinity.

TABLE 2

Affinities of human TNFR2 peptide fragments for agonistic TNFR2 antibody TNFRAG1

| SEQ ID NO. | Portion of Human TNFR2 | Amino Acid Sequence | Affinity Score |
|---|---|---|---|
| 1 | Full-length human TNFR2 | MAPVAVWAALAVGLE LWAAAHALPAQVAFT PYAPEPGSTCRLREY YDQTAQMCCSKCSPG QHAKVFCTKTSDTVC DSCEDSTYTQLWNWV PECLSCGSRCSSDQV ETQACTREQNRICTC RPGWYCALSKQEGCR LCAPLRKCRPGFGVA RPGTETSDVVCKPCA PGTFSNTTSSTDICR PHQICNVVAIPGNAS MDAVCTSTSPTRSMA PGAVHLPQPVSTRSQ HTQPTPEPSTAPSTS FLLPMGPSPPAEGSQ VKKKPLCLQREAKVP HLPADKARGTQGPEQ QHLLITAPSSSSSSL ESSASALDRRAPTRN QPQAPGVEASGAGEA RASTGSSDSSPGGHG TQVNVTCIVNVCSSS DHSSQCSSQASSTMG DTDSSPSESPKDEQV PFSKEECAFRSQLET PETLLGSTEEKPLPL GVPDAGMKPS | 4 |
| 49 | Amino acid residues 1-20 of human TNFR2 | LPAQVAFTPYAPEPG STCRL | 0 |
| 50 | Amino acid residues 9-28 of human TNFR2 | PYAPEPGSTCRLREY YDQTA | 0 |
| 51 | Amino acid residues 17-36 of human TNFR2 | TCRLREYYDQTAQMC CSKCS | 0 |
| 52 | Amino acid residues 26-45 of human TNFR2 | QTAQMCCSKCSPGQH AKVFC | 1 |
| 53 | Amino acid residues 34-53 of human TNFR2 | KCSPGQHAKVFCTKT SDTVC | 0 |
| 54 | Amino acid residues 42-61 of human TNFR2 | KVFCTKTSDTVCDSC EDSTY | 0 |
| 55 | Amino acid residues 50-69 of human TNFR2 | DTVCDSCEDSTYTQL WNWVP | 0 |
| 56 | Amino acid residues 58-77 of human TNFR2 | DSTYTQLWNWVPECL SCGSR | 0 |
| 57 | Amino acid residues 66-85 of human TNFR2 | NWVPECLSCGSRCSS DQVET | 0 |
| 58 | Amino acid residues 74-93 of human TNFR2 | CGSRCSSDQVETQAC TREQN | 0 |
| 59 | Amino acid residues 82-101 of human TNFR2 | QVETQACTREQNRIC TCRPG | 0 |
| 60 | Amino acid residues 90-109 of human TNFR2 | REQNRICTCRPGWYC ALSKQ | 2 |
| 61 | Amino acid residues 98-117 of human TNFR2 | CRPGWYCALSKQEGC RLCAP | 1 |
| 62 | Amino acid residues 106-125 of human TNFR2 | LSKQEGCRLCAPLRK CRPGF | 2 |
| 63 | Amino acid residues 108-127 of human TNFR2 | KQEGCRLCAPLRKCR PGFGV | 2 |

TABLE 2-continued

Affinities of human TNFR2 peptide fragments for agonistic TNFR2 antibody TNFRAG1

| SEQ ID NO. | Portion of Human TNFR2 | Amino Acid Sequence | Affinity Score |
|---|---|---|---|
| 64 | Amino acid residues 114-133 of human TNFR2 | LCAPLRKCRPGFGVA RPGTE | 0 |
| 65 | Amino acid residues 122-141 of human TNFR2 | RPGFGVARPGTETSD VVCKP | 0 |
| 66 | Amino acid residues 130-149 of human TNFR2 | PGTETSDVVCKPCAP GTFSN | 0 |
| 67 | Amino acid residues 138-157 of human TNFR2 | VCKPCAPGTFSNTTS STDIC | 0 |
| 68 | Amino acid residues 146-165 of human TNFR2 | TFSNTTSSTDICRPH QICNV | 0 |
| 69 | Amino acid residues 154-174 of human TNFR2 | TDICRPHQICNVVAI PGNAS | 0 |
| 70 | Amino acid residues 162-181 of human TNFR2 | ICNVVAIPGNASMDA VCTST | 0 |
| 71 | Amino acid residues 170-189 of human TNFR2 | GNASMDAVCTSTSPT RSMAP | 0 |

To verify the quality of the synthesized peptides, a separate set of positive and negative control peptides was synthesized in parallel. These were screened with a negative control, antibody 57.9, which does not specifically bind TNFR2 (Posthumus et al. (J. Virology. 64:3304-3309, 1990)).

Epitope Mapping

ELISA was also used to determine linear epitopes present on the extracellular surface of TNFR2. Linear peptides corresponding to various regions within the TNFR2 primary sequence were purchased from GenScript (Piscataway, NJ), diluted in coating buffer and placed on Immulon 4HBX Flat Bottom Microtiter Plates (Thermo Scientific) at a concentration of 1 µg/well. Primary TNFR2 agonistic antibodies (0.1 µg/well) were incubated with substrates. Secondary antibodies against rodent IgG were used to detect the primary antibodies. Absorbance was measured using the SPECTRAMAX® 190 Absorbance Plate Reader and analyzed with SoftMax Pro 6.3 (Molecular Devices).

Figure 14:
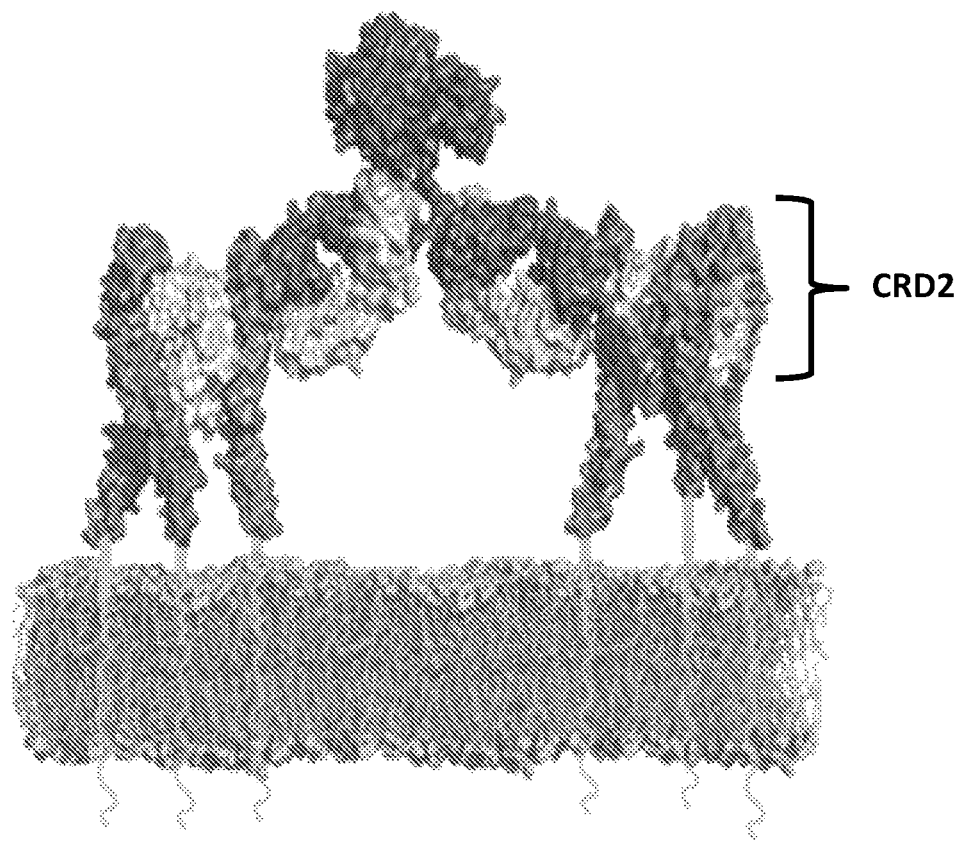
FIG. 14 is a structural model of a TNFR2 agonist antibody bound to CRD2 of TNFR2.

Results of the epitope mapping analysis are shown in FIG. 1, which displays the primary structure of human TNFR2 highlighting the regions that are bound by exemplary agonistic TNFR2 antibodies of the disclosure, such as TNFRAG1. Additional results of the epitope mapping study are shown in FIGS. 13A and 13B. Together, these data demonstrate that TNFRAG1 specifically binds TNFR2 at an epitope within complementarity-determining region 2 (CRD2) of human TNFR2, which corresponds to amino acid residues 78-120 of SEQ ID NO: 1. A structural model of an agonistic TNFR2 antibody bound to CRD2 of TNFR2 is shown in FIG. 14.

Example 2. Agonistic TNFR2 Polypeptides Expand Treg Cells in a Manner that can be Facilitated by Endogenous TNFR2 Ligands and Inhibited by Anti-TNFα Antibodies To investigate the ability of agonistic TNFR2 antibody TNFRAG1 to promote the proliferation of Treg cells, a series of experiments was conducted in which populations of Treg cells were incubated with varying concentrations of TNFRAG1 in vitro for 48-72 hours. At the end of the incubation period, the proportion of Treg cells in each population was assessed using flow cytometry methods. As shown in FIG. 2, agonistic TNFR2 antibody TNFRAG1 was found to exert a dose-dependent proliferative effect on Treg cells. The data shown in FIG. 2 represent the average of 35 individual experiments. These results demonstrate that agonistic TNFR2 polypeptides having molecular properties similar to TNFRAG1 (e.g., those that (i) contain a human IgG1 or IgG2 CH1 domain having a deletion or substitution at residue Cys 127, such as a C127S mutation; (ii) contain antigen-binding sites separated from one another by a distance of fewer than about 133 Å; (iii) contain a CDR-H1 having the amino acid sequence of any one of SEQ ID NOs: 2-4 or an amino acid sequence that differs from any one of SEQ ID NOs: 2-4 by way of conservative amino acid substitutions; (iv) contain a framework region having the amino acid sequence of any one of SEQ ID NOs: 5 and 16-23 or an amino acid sequence that differs from any one of SEQ ID NOs: 5 and 16-23 by way of conservative amino acid substitutions; and/or binds an epitope on human TNFR2 within residues 56-60, 101-107, and/or 115-142 of SEQ ID NO: 1) are capable of effectuating the expansion of Treg cells.

Figure 3:
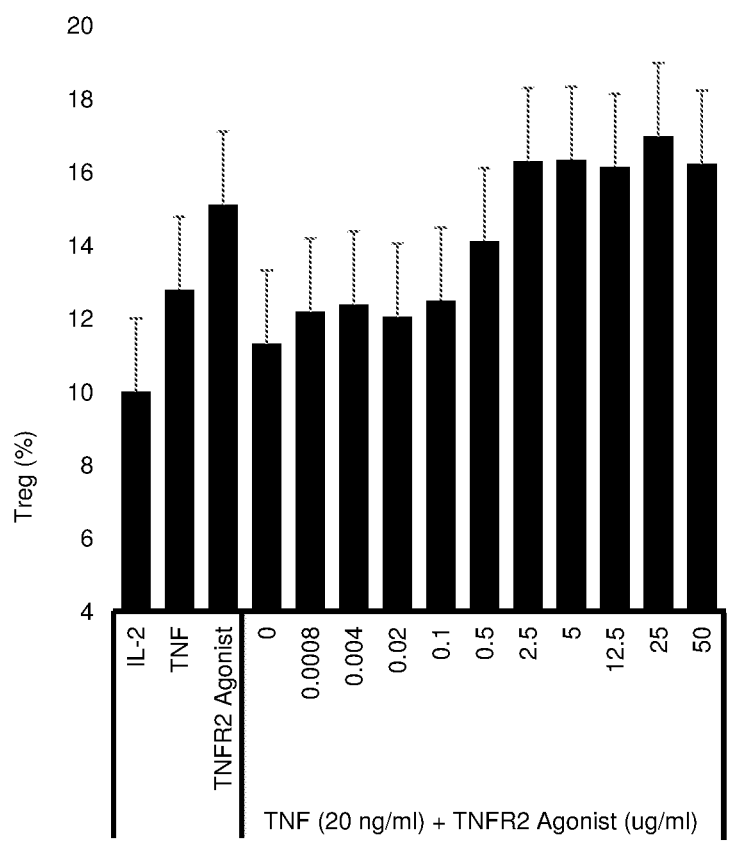
FIG. 3 is a graph showing the effect of a natural TNFR2 agonist, TNFα, on the expansion of Treg cells induced by a TNFR2 agonist antibody of the disclosure, TNFRAG1. Values along the x-axis denote the presence, in an in vitro population of Treg cells, of either IL-2, TNFα, or antibody TNFRAG1 alone, or of increasing concentrations of antibody TNFRAG1 in combination with 20 ng/ml of TNFα. Values along the y-axis represent the percentage of Treg cells in the cell population studied. These data demonstrate that the presence of TNFα further increases the ability of TNFR2 agonist antibodies of the disclosure, such as TNFRAG1, to stimulate Treg cell proliferation. These data are consistent with the ability of TNFR2 agonist antibodies of the disclosure to promote TNFR2 activation by binding TNFR2 monomers so as to form a trimeric structure. This binding event brings individual TNFR2 molecules into close proximity with one another, and sterically exposes sites on the TNFR2 surface that may be bound by an endogenous ligand, such as TNFα. Without being limited by mechanism, this sequence of events represents a pathway by which TNFR2 agonist polypeptides of the disclosure (e.g., single-chain polypeptides, antibodies, antigen-binding fragments thereof, and constructs) may effectuate TNFR2 activation in vivo.

Having determined the proliferative effect of TNFRAG1 on Treg cells, a series of experiments was conducted in order to study the effect of an agonistic TNFR2 ligand, such as TNFα, on the Treg expansion capacity of TNFRAG1. Populations of Treg cells were incubated with 20 ng/ml of TNFα in vitro, either alone or in combination with varying concentrations of TNFRAG1. As shown in FIG. 3, the presence of TNFα was found to further increase the ability of TNFRAG1 to stimulate Treg cell proliferation. Without being limited by mechanism, these data support a TNFRAG1-TNFR2 binding model in which TNFRAG1 binds TNFR2 monomers and brings these individual molecules into a proximity sufficient to form a trimeric structure. This binding event sterically exposes sites on the TNFR2 surface that may be bound by another TNFR2 ligand, such as TNFα, thereby further promoting TNFR2 activation. These results demonstrate that TNFR2 agonist polypeptides of the disclosure, such as those having molecular properties similar to TNFRAG1, can be combined with TNFα or another agonistic TNFR2 ligand described herein, in order to further augment the expansion of TNFR2-expressing cells, such as Treg cells, MDSCs, or TNFR2+ somatic cells.

Figure 4:
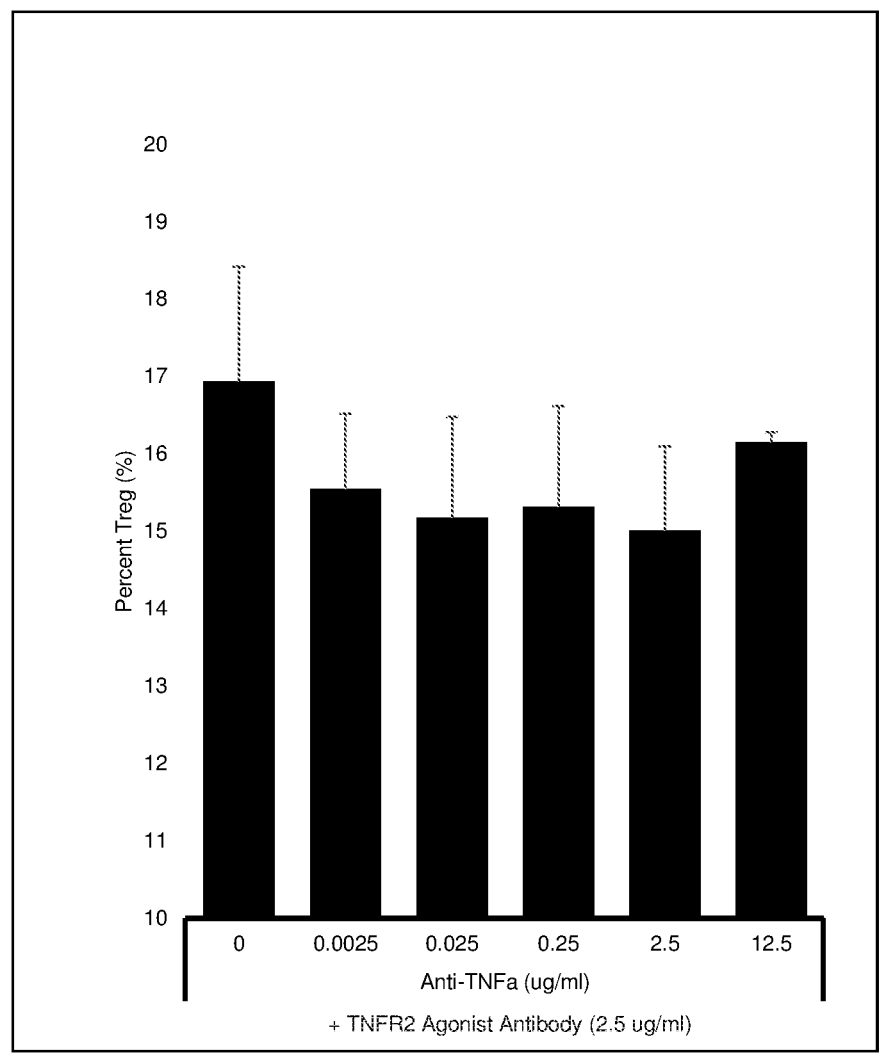
FIG. 4 is a graph demonstrating the inhibitory effect of an anti-TNFα antibody on the ability of an agonistic TNFR2 antibody of the disclosure, TNFRAG1, to stimulate Treg cell proliferation. Values along the x-axis represent the concentration of anti-TNFα antibody, in µg/ml, present in an in vitro population of Treg cells. All conditions shown along the x-axis include 2.5 µg/ml of TNFRAG1. Values along the y-axis represent the percentage of Treg cells in the cell population studied.

To further test the model of TNFRAG1-TNFR2 binding described above, Treg cells were incubated in vitro with 2.5 µg/ml of TNFRAG1 and varying concentrations of an anti-TNFα antibody. The effects of this combination on Treg proliferation are shown in FIG. 4, which demonstrates that anti-TNFα antibodies have the ability to suppress Treg expansion induced by agonistic TNFR2 polypeptides of the disclosure, such as TNFRAG1.

Taken together, these data demonstrate that agonistic TNFR2 polypeptides described herein, such as TNFRAG1 and those having TNFR2-binding properties similar to those of TNFRAG1, have the ability to promote the proliferation of TNFR2-expressing cells, such as Treg cells, MDSCs, and TNFR+ somatic cells (e.g., cells of the pancreas, salivary gland, pituitary gland, kidney, heart, lung, hematopoietic system, cranial nerves, heart, aorta, olfactory gland, ear, nerves, structures of the head, eye, thymus, tongue, bone, liver, small intestine, large intestine, gut, lung, brain, skin, peripheral nervous system, central nervous system, spinal cord, breast, embryonic structures, embryos, and testes). These results further illustrate that expansion of TNFR2-expressing cells by an agonistic TNFR2 polypeptide of the disclosure may be further enhanced by a TNFR2-activating ligand, such as TNFα or an agonistic TNFα mutein.

Example 3. Generating Agonistic TNFR2 Antibodies by Phage Display

An exemplary method for in vitro protein evolution of agonistic TNFR2 antibodies described herein is phage display, a technique which is well known in the art. Phage display libraries can be created by making a designed series of mutations or variations within a coding sequence for the CDRs of an antibody or the analogous regions of an antibody-like scaffold (e.g., the BC, CD, and DE loops of $^{10}$Fn3 domains). The template antibody-encoding sequence into which these mutations can be introduced may be, e.g., a naive human germline sequence as described herein. These mutations can be performed using standard mutagenesis techniques described herein or known in the art. Each mutant sequence thus encodes an antibody corresponding in overall structure to the template except having one or more amino acid variations in the sequence of the template. Retroviral and phage display vectors can be engineered using standard vector construction techniques as described herein or known in the art. P3 phage display vectors along with compatible protein expression vectors, as is well known in the art, can be used to generate phage display vectors for antibody diversification as described herein.

The mutated DNA provides sequence diversity, and each transformant phage displays one variant of the initial template amino acid sequence encoded by the DNA, leading to a phage population (library) displaying a vast number of different but structurally related amino acid sequences. Due to the well-defined structure of antibody hypervariable regions, the amino acid variations introduced in a phage display screen are expected to alter the binding properties of the binding peptide or domain without significantly altering its structure.

In a typical screen, a phage library is contacted with and allowed to bind a TNFR2-derived peptide, or a particular subcomponent thereof. To facilitate separation of binders and non-binders, it is convenient to immobilize the target on a solid support. Phage bearing a TNFR2-binding moiety can form a complex with the target on the solid support whereas non-binding phage remain in solution and can be washed away with excess buffer. Bound phage can then liberated from the target by changing the buffer to an extreme pH (pH 2 or pH 10), changing the ionic strength of the buffer, adding denaturants, or other known means. To isolate the binding phage, a protein elution can be performed.

The recovered phage can then be amplified through infection of bacterial cells and the screening process can be repeated with the new pool that is now depleted in non-binding antibodies and enriched for antibodies that bind the target peptide. The recovery of even a few binding phage is sufficient to amplify the phage for a subsequent iteration of screening. After a few rounds of selection, the gene sequences encoding the antibodies or antigen-binding fragments thereof derived from selected phage clones in the binding pool are determined by conventional methods, thus revealing the peptide sequence that imparts binding affinity of the phage to the target. During the panning process, the sequence diversity of the population diminishes with each round of selection until desirable peptide-binding antibodies remain. The sequences may converge on a small number of related antibodies or antigen-binding fragments thereof, typically 10-50 out of about $10^9$ to $10^{10}$ original candidates from each library. An increase in the number of phage recovered at each round of selection is a good indication that convergence of the library has occurred in a screen. After a set of binding polypeptides is identified, the sequence information can be used to design other secondary phage libraries, biased for members having additional desired properties (see, e.g., WO 2014/152660; the disclosure of which is incorporated herein by reference).

Example 4. Producing a Humanized Agonistic TNFR2 Antibody

One method for producing humanized TNFR2 antibodies described herein is to import one or more, or all, of the CDRs of a non-human agonistic TNFR2 antibody into a human antibody consensus sequence. Consensus human antibody heavy chain and light chain sequences are known in the art (see, e.g., the "VBASE" human germline sequence database; Kabat et al. (Sequences of Proteins of Immunological Interest, Fifth Edition, U.S. Department of Health and Human Services, NIH Publication No. 91-3242, 1991); Tomlinson et al. (J. Mol. Biol. 227:776-798, 1992); and Cox et al. (Eur. J. Immunol. 24:827-836, 1994); the disclosures of each of which are incorporated herein by reference). Using established procedures, one can identify the variable domain framework residues and CDRs of a consensus antibody sequence (e.g., by sequence alignment (see Kabat, supra)). One can substitute, e.g., one or more, or all, of the CDR-H1, CDR-H2, CDR-H3, CDR-L1, CDR-L2, and CDR-L3 sequences of the consensus antibody with the corresponding CDR sequence(s) of a non-human agonistic TNFR2 antibody described herein (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR (s) of TNFRAG1 by way of conservative amino acid substitutions) in order to produce a humanized, agonistic TNFR2 antibody described herein. Polynucleotides encoding the above-described CDRs sequences can be produced synthetically or recombinantly, e.g., using the techniques described herein or known in the art.

One example of a variable domain of a consensus human antibody includes the heavy chain variable domain (SEQ ID NO: 43)
EVQLVESGGGLVQPGGSLRLSCAASGFTFSDYAMSWVRQAPGKGLEWVAV

ISENGSDTYYADSVKGRFTISRDDSKNTLYLQMNSLRAEDTAVYYCARDR

GGAVSYFDVWGQGTLVTVSS and the light chain variable domain (SEQ ID NO: 44)
DIQMTQSPSSLSASVGDRVTITCRASQDVSSYLAWYQQKPGKAPKLLIYA

ASSLESGVPSRFSGSGSGTDFTLTISSLQPEDFATYYCQQYNSLPYTFGQ

GTKVEIKRT, identified in U.S. Pat. No. 6,054,297; the disclosure of which is incorporated herein by reference (CDRs are shown in bold). In order to produce a humanized, agonistic TNFR2 antibody of the present disclosure, one can recombinantly express a polynucleotide encoding the variable domains of the above consensus sequences in which one or more, or all, of the CDR-H1, CDR-H2, CDR-H3, CDR-L1, CDR-L2, and CDR-L3 sequences are replaced with the corresponding CDR sequences of a non-human agonistic TNFR2 antibody (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions).

A polynucleotide encoding the above heavy chain and light chain variable domains operatively linked to one another can be incorporated into an expression vector (e.g., an expression vector optimized for protein expression in prokaryotic or eukaryotic cells as described herein or known in the art). The humanized antibody can be expressed in a host cell and subsequently purified from the host cell medium or the host cell using established techniques, such as size-exclusion chromatography and/or affinity chromatography as described herein.

Example 5. Treatment of Type I Diabetes in a Human Patient by Administration of Agonistic TNFR2 Polypeptides The agonistic TNFR2 polypeptides of the disclosure can be administered to a human patient in order to treat type I diabetes. For instance, a human patient suffering from type I diabetes can be treated by administering an agonistic TNFR2 antibody of the invention (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) by an appropriate route (e.g., intravenously) at a particular dosage (e.g., between 0.001 and 100 mg/kg/day) over a course of days, weeks, months, or years. If desired, the agonistic TNFR2 antibody can be co-administered with, admixed with, or administered separately from, another therapeutic effective for treating type I diabetes, such as BCG.

The progression of type I diabetes that is treated with an agonistic TNFR2 antibody of the invention can be monitored by any one or more of several established methods. A physician can monitor the patient by direct observation in order to evaluate how the symptoms exhibited by the patient have changed in response to treatment. A urine sample isolated from the patient may be analyzed in order to determine the content of glucose in the sample, which can indicate the effectiveness of the TNFR2 antibody therapy. For instance, if the content of glucose in the urine sample is high, may indicate that the patient is to be administered higher dosages of an agonistic TNFR2 antibody of the invention until a minimal urine glucose concentration has been maintained.

Example 6. Treatment of Allograft Rejection in a Human Patient by Administration of Agonistic TNFR2 Polypeptides The agonistic TNFR2 polypeptides of the disclosure can be administered to a human patient in order to treat allograft rejection. Administration of these antibodies induces the proliferation of a population of Treg cells, which attenuates immune responses mounted by self-reactive cytotoxic T-cells that are associated with the rejection of a tissue graft following transplantation. For instance, a human patient presenting with allograft rejection can be treated by administering an agonistic TNFR2 antibody of the invention (e.g., a TNFR2 antibody that specifically binds an epitope containing one or more residues of the KCSPG sequence of TNFR2 (residues 56-60 of SEQ ID NO: 1), such as an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) by an appropriate route (e.g., intravenously) at a particular dosage (e.g., between 0.001 and 100 mg/kg/day) over a course of days, weeks, months, or years. If desired, the agonistic TNFR2 antibody can be modified, e.g., by hyperglycosylation or by conjugation with PEG, so as to evade immune recognition and/or to improve the pharmacokinetic profile of the antibody.

The progression of the allograft rejection that is treated with an agonistic TNFR2 antibody of the invention can be monitored by any one or more of several established methods. A physician can monitor the patient by direct observation in order to evaluate how the symptoms exhibited by the patient have changed in response to treatment. A blood sample can also be withdrawn from the patient in order to analyze the cell count of one or more CD8+ T-cells in order to determine if the quantity of cells has changed (e.g., decreased) in response to treatment with an agonistic TNFR2 antibody of the invention. A physician may also monitor the fluctuation in the volume of the allograft within the patient during the course of TNFR2 antibody therapy. Based on the results of these analyses, a physician may prescribe higher/lower dosages or more/less frequent dosing of the agonistic TNFR2 antibody in subsequent rounds of treatment in order to preserve the allograft.

Example 7. Treatment of Rheumatoid Arthritis in a Human Patient by Administration of Agonistic TNFR2 Polypeptides The agonistic TNFR2 polypeptides of the disclosure can be administered to a human patient in order to treat rheumatoid arthritis. For instance, a human patient suffering from rheumatoid arthritis can be treated by administering an agonistic TNFR2 antibody of the invention (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) by an appropriate route (e.g., intravenously) at a particular dosage (e.g., between 0.001 and 100 mg/kg/day) over a course of days, weeks, months, or years. If desired, the agonistic TNFR2 antibody can be co-administered with, admixed with, or administered separately from, another therapeutic effective for treating rheumatoid arthritis, such as BCG.

The progression of rheumatoid arthritis that is treated with an agonistic TNFR2 antibody of the invention can be monitored by any one or more of several established methods. A physician can monitor the patient by direct observation in order to evaluate how the symptoms exhibited by the patient have changed in response to treatment. For instance, a physician of skill in the art may monitor the level of joint pain, joint stiffness, or muscle range exhibited by the patient in response to TNFR2 antibody therapy. Additionally, a lymph sample isolated from the patient may be analyzed in order to determine the quantity of autoreactive CD8+ T-cells in the sample, e.g., by FACS analysis, which can indicate the effectiveness of the TNFR2 antibody therapy. For instance, if the count of autoreactive CD8+ T-cells in the lymph sample is high, may indicate that the patient is to be administered higher dosages of an agonistic TNFR2 antibody of the invention, e.g., until the autoreactive T-cell population within the patient has been eliminated.

Example 8. Treatment of Multiple Sclerosis in a Human Patient by Administration of Agonistic TNFR2 Polypeptides The agonistic TNFR2 polypeptides of the disclosure can be administered to a human patient in order to treat multiple sclerosis. For instance, a human patient suffering from multiple sclerosis can be treated by administering an agonistic TNFR2 antibody of the invention (e.g., an antibody, antigen-binding fragment thereof, single-chain polypeptide, or construct having one or more of the CDRs of the agonistic TNFR2 antibody TNFRAG1, set forth in SEQ ID NOs: 2-4 and 10-13, or having one or more CDRs that exhibit at least 85% sequence identity (e.g., 85%, 97%, 87%, 88%, 89%, 90%, 91%, 92%, 93%, 94%, 95%, 96%, 97%, 98%, 99%, or 100% sequence identity) to the corresponding CDR(s) of TNFRAG1 and/or that differ from the corresponding CDR(s) of TNFRAG1 by way of conservative amino acid substitutions) by an appropriate route (e.g., intravenously) at a particular dosage (e.g., between 0.001 and 100 mg/kg/day) over a course of days, weeks, months, or years. If desired, the agonistic TNFR2 antibody can be co-administered with, admixed with, or administered separately from, another therapeutic effective for treating multiple sclerosis, such as BCG.

The progression of multiple sclerosis that is treated with an agonistic TNFR2 antibody of the invention can be monitored by any one or more of several established methods. A physician can monitor the patient by direct observation in order to evaluate how the symptoms exhibited by the patient have changed in response to treatment. For instance, a physician of skill in the art may monitor the patient to determine if he or she is exhibiting improved vision and/or coordination, faster reflexes, increased motor activity, and/or improved cognitive performance in response to TNFR2 antibody therapy. If improvements in these traits are not observed, a physician may prescribe the patient higher doses or more frequent administration of the agonistic TNFR antibody or antigen-binding fragment thereof. Additionally, a lymph sample isolated from the patient may be analyzed in order to determine the quantity of autoreactive CD8+ T-cells in the sample, e.g., by FACS analysis, which can indicate the effectiveness of the TNFR2 antibody therapy. For instance, if the count of autoreactive CD8+ T-cells in the lymph sample that recognize myelin sheath-producing cells is high, this may indicate that the patient is to be administered higher dosages of an agonistic TNFR2 antibody of the invention, e.g., until the autoreactive T-cell population within the patient has been eliminated.

Example 9. TNFR2 Agonist Antibodies Selectively Upregulate Treg Proliferation Upon Incubation with Peripheral Human CD4+ Cells TNFR2 agonist antibodies can be used to upregulate Treg cell activity, a beneficial attribute for the treatment of diseases characterized by an autoimmune response. The agonistic TNFR2 antibody, TNFRAG1, selectively induces Treg cells upon incubation with peripheral human CD4+ cells. This was ascertained by evaluating the gene expression and metabolic properties of isolated peripheral human CD4+ cells following incubation with the TNFR2 agonist antibody. The ability of a TNFR2 agonist antibody to selectively induce Treg cells further evidences the utility of such antibodies to treat pathologies associated with an aberrant or excessive immune response.

Materials and Methods

Research Study Participants

Human studies that involved blood drawing were approved by Massachusetts General Hospital and Partners Health Care (Study #2007P001347, 2012P002243 and 2013P002633). Informed consent was obtained from all subjects and the experiments conformed to the principles set out in the World Medical Association Declaration of Helsinki and the Department of Health and Human Services Belmont Report. Whole blood was collected from research study participants in BD Vacutainer EDTA tubes (BD Diagnostics) and processed within two hrs of phlebotomy.

Isolation of Human CD4+ T Cells

Fresh human whole blood was washed twice with 1×HBSS (Invitrogen) plus 2% FBS (Sigma-Aldrich). CD4+ T cells were isolated using magnetic EASYSEP™ Direct Human Monocyte Isolation kit or EASYSEP™ Direct Human CD4+ T Cell isolation kit (STEMCELL Technologies), following the instructions of the manufacturer. Briefly, 1,200 μL of Isolation Cocktail and 1,200 μL of RAPIDSPHERES™ was mixed with 24 mL of whole blood in a 50 mL centrifuge tube and incubated for 5 min at room temperature. Then, 24 mL of $Ca^{2+}$ and $Mg^{2+}$-free PBS was added and the tube placed into an Easy 50 EASYSEP™ magnet (STEMCELL Technologies). This immobilized the unwanted cells at the side of the tube. After 10 min, the CD4+ T cell enriched suspension was transferred into a new tube and the magnetic separation process repeated for 5 min with fresh RAPIDSPHERES™. The resulting highly enriched CD4⁺ T cell suspension was transferred into a new tube and purified for a third time using the EasySep™ magnet. The resulting purity of the final CD4⁺ T cell preparation was >95%. Isolated CD4⁺ cells were cultured in RPMI GLUTAMAX™ (Life Technologies) plus 10% FBS (Sigma-Aldrich) with 1% penicillin-streptomycin (Life Technologies). Cells were seeded in 96-well round-bottom plates at a concentration of 0.2 to $1\times10^6$ cells/well, treated with various reagents, and incubated for up to 72 hrs at 37° C. with 5% $CO_2$. All in vitro cell culture experiments included low level IL-2 (200 U/ml) in the media.

Reagents and Flow Cytometry

Reagents and flow cytometry mAbs against human TNFR2 and secreted TNFR2 (sTNFR2) were produced internally or obtained from external commercial vendors. Recombinant human TNFα and IL-2 were purchased from Sigma-Aldrich. F(ab')2 fragments of mAbs were prepared using Pierce F(ab')2 Preparation Kit (Life Technologies). Antibody MAB2261 (R&D Systems) was used for measuring TNFR2 cell surface expression. Cross-linking antibody against rodent IgG (ab9165) was purchased from Abcam. Cells were prepared for flow cytometry using Human Treg Flow Kit (BioLegend) according to the manufacturer's instructions. Fluorescently stained cells were resuspended in 1×HBSS (Invitrogen) and analyzed using a BD FACS Calibur flow cytometer machine (Becton Dickinson). Antibodies used for FACS analysis of Tregs included Alexa Fluor 488 anti-human FoxP3 (Clone 259D; BioLegend) for intracellular staining of FoxP3 and phycoerythrin anti-human CD25 (Clone BC96; BioLegend) for cell surface staining of CD25, Treg populations were assessed by FACS with FL2 (red) versus FL1 (green) and defined as $CD25^{hi}$ and $FoxP3^+$, whereas Teff populations were defined as $CD25^{hi}$ and $FoxP3^+$. For cell suppression assays, responders were stained with carboxyfluorescein diacetate succinimidyl ester (CFSE) (BioLegend) and CD8-allophycocyanin (APC) (Clone SK1; BD Biosciences) and analyzed by FACS with FL4 (far red) versus FL1 (green) (FIG. 3). Monoclonal antibodies against TNFR2 were produced in house or purchased from commercial vendors as previously described for this paper. FACS data was processed using FlowJo software (Version 10.0.8) and analyzed on Prism (GraphPad Software, La Jolla, CA).

Measurement of Secreted TNFR2

Secreted TNFR2 (sTNFR2) was measured from cell culture supernatants using Quantikine ELISA (R&D Systems) with some modifications. Briefly, supernatants were collected after 24-42 hrs of incubation of CD4⁺ cells with IL-2 (200 U/ml) alone or with TNFα (20 ng/ml) or TNFR2 mAbs (12.5 mg/ml) and incubated on either the commercial plates or custom plates coated with 2 mg per well of TNFR2-directed antibodies. ELISA was performed according to the manufacturer's instructions. Absorbance was measured using the SPECTRAMAX™ 190 Absorbance Plate Reader and analyzed with SOFTMAX PRO™ 6.3 (Molecular Devices). For RNA isolation and gene expression analysis, isolated CD4+ T cells were incubated for 3 hrs in the presence of IL-2 (50 U/ml) and TNFα (20 ng/ml) or TNFR2 antagonist mAb (2.5 µg/ml).

Cell Proliferation and Suppression Assays

For peripheral blood leukocytes (PBL) proliferation experiments, PBLs were stained with 1 µM of CFSE. Cells were plated at the density of $2\times10^5$ cells per well in 96-well plate precoated with anti-CD3 mAb (5 pg ml-1) (OKT3, eBiosciences). Four days later, cells were collected and analyzed by flow cytometry. The proliferation rate was calculated by the percentage of cells undergoing division. For Treg suppression assay, autologous PBMCs were used as responder cells. PBMCs were collected at the day of venipuncture by density gradient separation using Ficoll-Hypaque Plus (GE Healthcare, Piscataway, NJ, USA) cryopreserved at −80° C., and thawed at the day before mixed with Tregs and rested overnight in RPMI 1640 medium supplemented with 1% FBS, and 10 U/mL IL-2. On the following day, responder cells were stained with CFSE (1 µM). Responder cells ($5\times10^4$ cells) and expanded Tregs were mixed at the ratio of 0:1, 1:1, 2:1 and 4:1 in culture media, and stimulated with anti-CD3 mAb (HIT3a, BD Biosciences) and IL-2 (50 U ml⁻¹). After 4 days, cells were collected and analyzed by flow cytometry. Suppression index was calculated by the percentage of CD8⁺ T cells in responder cells that underwent division. Suppression index was calculated using following equation: (Treg proliferation without Treg Tresp proliferation with Treg)/Tresp proliferation without Treg.

Cell Suppression Assays

For suppression assays, peripheral blood mononuclear cells (PBMCs) were used as responders. PBMCs were isolated on the day of venipuncture using a Ficoll-Plaque Plus (GE Healthcare) density gradient and cryopreserved at −80° C. Cells were thawed the day before mixing with Tregs and rested overnight in RPMI 1640 and IL-2 (10 U/ml). The next day, responder cells were stained with 1 mM CFSE. Responder cells ($5\times10^4$ cells) were then mixed at various ratios (0:1, 4:1, 2:1, 1:1) with Tregs that had been expanded for 14-17 days. The mixtures stimulated with either anti-CD3 mAb, an antibody directed to human CD3 protein (HIT3a, BD Biosciences), or Dynabeads Human T-Activator CD3/CD28 (Gibco) at a ratio of 2:1 (cells/beads) and IL-2 (50 to 200 U/ml), Cells were collected after 4 to 6 days and stained with CD8-APC (Clone SK1; BD Biosciences), and suppression of cell division was assessed by FACS analysis of CD8⁺ T cell counts versus CFSE.

Transcription Profiling Analysis (RNAseq)

Total RNA was isolated from peripheral blood CD4⁺ T cells from normal donors using the RNeasy Plus Mini Kit of QIAGEN (QIAGEN Sciences) and processed by the CCCB (Center for Cancer Computational Biology) at Dana Farber Cancer Institute (Boston, Mass.). mRNA was prepared from isolated fresh CD4⁺ T cells cultured with or without TNFR2 antibodies at a concentration of 2.5 ug/ml for 6 hrs. RNA quality was determined using an Agilent 2100 bioanalyzer. RNA with a RIN value greater than 6 and less than 10% DNA contamination was used for library preparation. Using an input of 100 ng of total RNA, poly-A selection was performed using a NEBNEXT™ Poly(A) mRNA Magnetic Isolation Module. The resulting mRNA was used for library preparation using the NEBNEXT™ Ultra™ Directional RNA Library Prep Kit for Illumina®. The RNAseq libraries were run on a high sensitivity DNA chip on the Agilent 2100 Bioanalyzer, and the functional concentration of the library was determined through qPCR using the KAPA Biosystems Illumina Library Quantification kit. Libraries to be sequenced were pooled at a concentration of 2 nM then denatured and diluted to a final concentration of 2 pM and loaded onto the Illumina NextSeq 500. Alignment of reads against reference genome HG19 was performed using TopHat and analyzed using Cufflinks. The resulting data was then normalized using DESeq, part of the R-Bioconductor package (Anders, Huber REF). Normalized data was analyzed using the Ingenuity Pathway Analysis software (QIAGEN Sciences), the R Statistical Programming language and Microsoft Excel.

Statistical Methods

Statistical significance was determined using ANOVA and Tukey's or Dunnett's multiple comparison test, Student's t-test, as well as Grubb's test to remove outliers using Excel (Microsoft) or GraphPad Prism-5 software (GraphPad Software, La Jolla, CA). Computations were performed using SAS version 9.4 (SAS Institute, Inc, Cary, NC), the R Statistical Computing Language, or in Microsoft Excel. Confidence levels were set to 0.05.

Results

TNFR2 Expression and TNFR2 Agonism

Figure 6A:
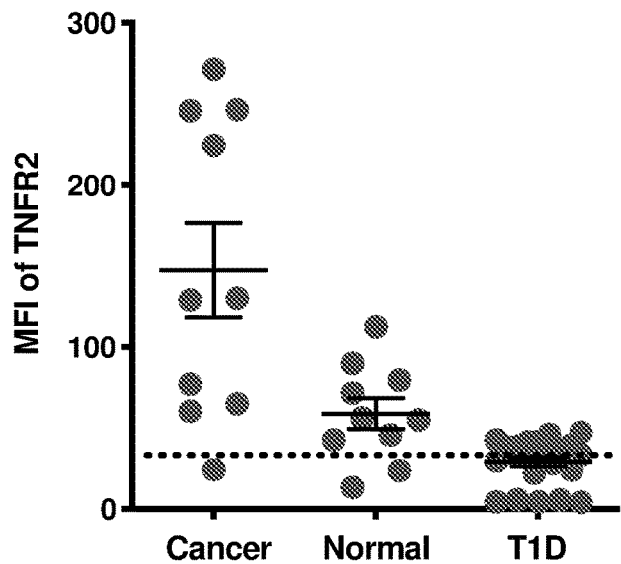
FIG. 6A is a graph showing the expression density, as assessed by immunofluorescence, of TNFR2 in Treg cells from human subjects with cancer, Treg cells from healthy human subjects, and Treg cells from human type 1 diabetes patients. The mean fluorescent intensity (MFI) of TNFR2 in Treg cells obtained from subjects with cancer was 147.435 (SEM 29.053, n=10); the MFI of TNFR2 in Treg cells obtained from healthy subjects was 59.055 (SEM 9.545, n=10); and the MFI of TNFR2 in Treg cells obtained from type 1 diabetes patients was 29.313 (SEM 2.894, n=24). Grubb's test outliers were removed.
Figure 6B:
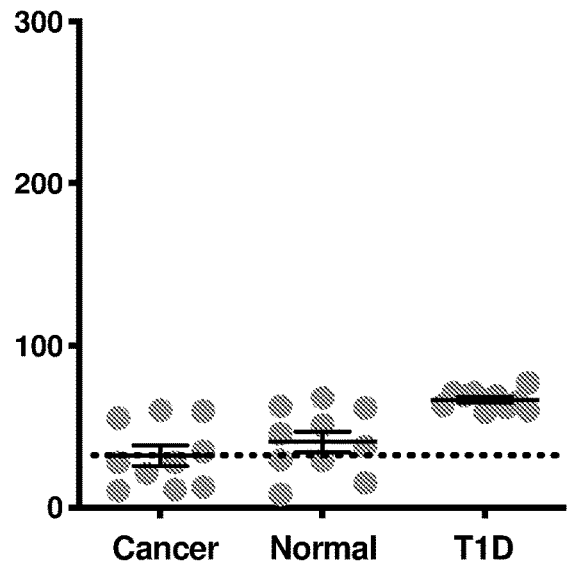
FIG. 6B is a graph showing the expression density, as assessed by immunofluorescence, of TNFR2 in T effector (Teff) cells from human subjects with cancer, Teff cells from healthy human subjects, and Teff cells from human type 1 diabetes patients. The mean fluorescent intensity (MFI) of TNFR2 in Teff cells obtained from subjects with cancer was 32.070 (SEM 6.290, n=10); the MFI of TNFR2 in Teff cells obtained from healthy subjects was 40.811 (SEM 6.466, n=10); and the MFI of TNFR2 in Teff cells obtained from type 1 diabetes patients was 66.600 (SEM 1.815, n=10). Grubb's test outliers were removed.
Figure 6C:
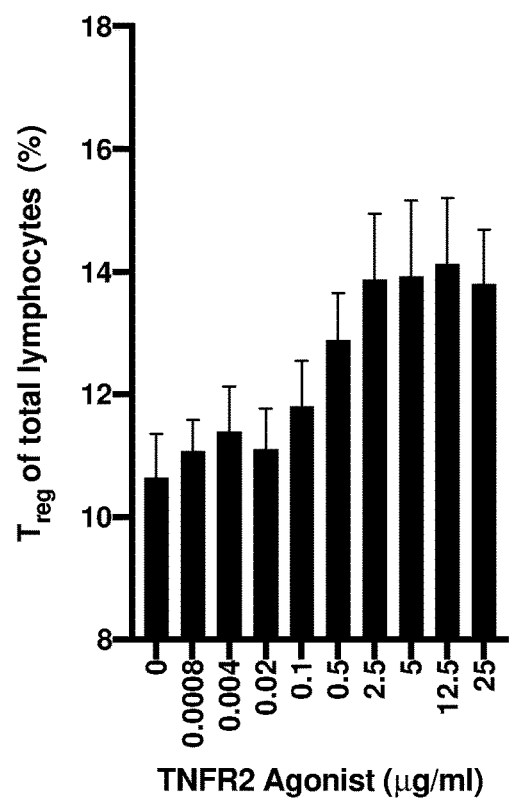
FIG. 6C is a graph showing the effect of agonist TNFR2 antibody TNFRAG1 on the proliferation of Treg cells upon incubating TNFRAG1 with a population of freshly isolated peripheral human CD4+ cells for 48 hours (n=13). Values along the x-axis represent the concentration of antibody; values along the y-axis represent the percentage of Treg cells within the population of lymphocytes. Data are mean±SEM.
Figure 6D:
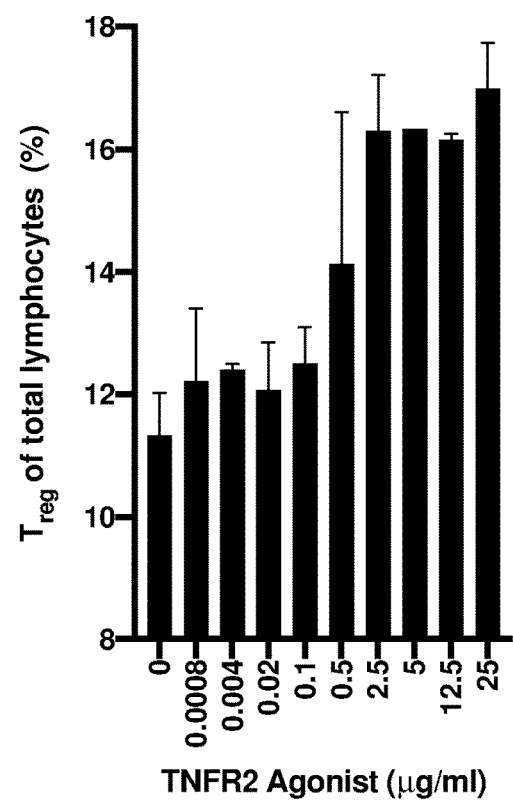
FIG. 6D is a graph showing the effect of agonist TNFR2 antibody TNFRAG1 on the proliferation of Treg cells upon incubating TNFRAG1 with a population of freshly isolated peripheral human CD4+ cells in the presence of endogenous TNFR2 ligand, TNFα (20 ng/ml) for 48 hours (n=2). Values along the x-axis represent the concentration of antibody; values along the y-axis represent the percentage of Treg cells within the population of lymphocytes. Data are mean±SEM.

Evaluation of TNFR2 expression in human T cell populations demonstrates significant difference among cohorts of human subjects. In terms of mean fluorescent intensity (MFI), cancer subjects express significantly higher levels of TNFR2 on Treg of normal healthy subjects or type 1 diabetics (T1D) (FIG. 6A). Conversely, T1D subjects express significantly higher levels of TNFR2 on Teff than either normal subjects of cancer patients (FIG. 6B). When CD4+ T cells are treated with TNFR2 agonist antibody, there is dose dependent proliferation of Treg cells (FIG. 6C). Even in the presence of the natural ligand TNFα (20 ng/ml), there is no significant difference (Paired T test, p>0.5) with escalating concentrations of TNFR2 agonist antibody (FIG. 6D). This demonstrates that TNFα does not augment the efficacy of the TNFR2 agonist antibody, even though TNFα itself is effective in Treg proliferation. Therefore, agonist antibody TNFRAG1 operates in a TNFα-independent manner.

Expansion of Treg and Assessment of Soluble TNFR2

Figure 7A:
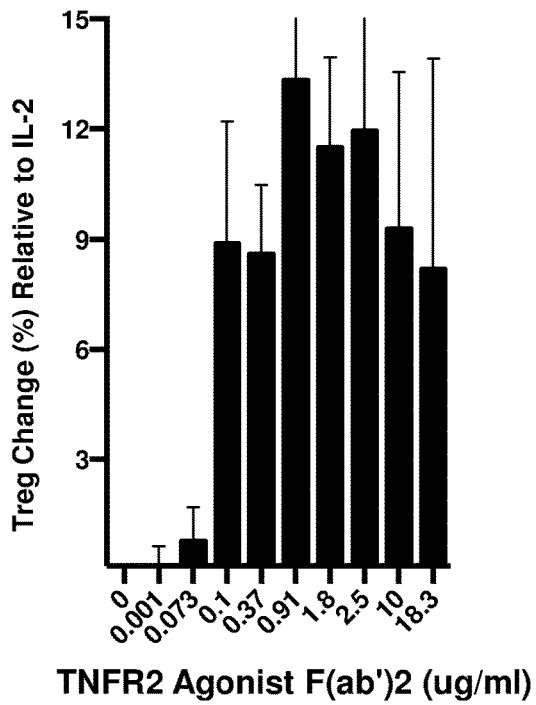
FIG. 7A is a graph showing the effect of an F(ab')$_2$ antibody fragment, with the complementarity determining regions (CDRs) of TNFRAG1, on the proliferation of Treg cells. Values along the x-axis represent the concentration of antibody fragment; values along the y-axis represent the relative increase in Treg cell quantity, normalized with respect to Treg cells treated with interleukin-2 (IL-2). Data are mean±SEM. These data demonstrate that a functional Fc region, which is absent in an F(ab')$_2$ antibody fragment, is not necessary for TNFRAG1 to induce Treg proliferation.
Figure 7B:
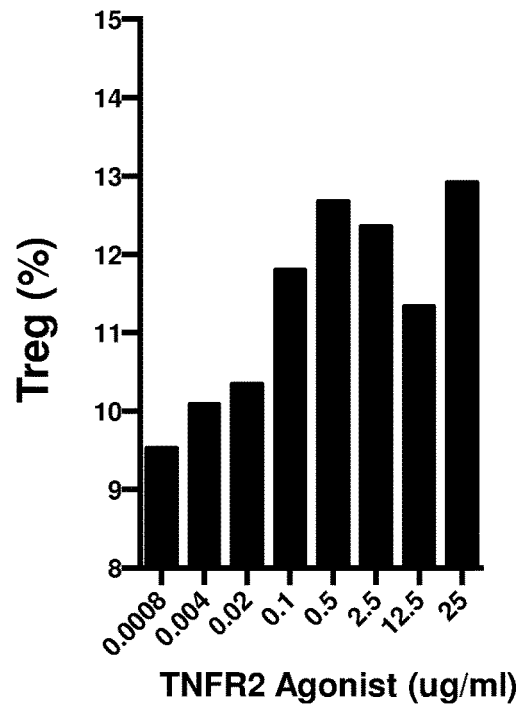
FIG. 7B is a graph showing the effect of TNFRAG1 in the presence of a cross-linking antibody (2.5 µg/ml) on the proliferation of Treg cells. The cross-linking antibody, ab9165 (Abcam), binds the Fc regions of neighboring TNFRAG1 antibodies and, thus, increases the local density of TNFRAG1 on the Treg cell surface. Data are mean±SEM.
Figure 7C:
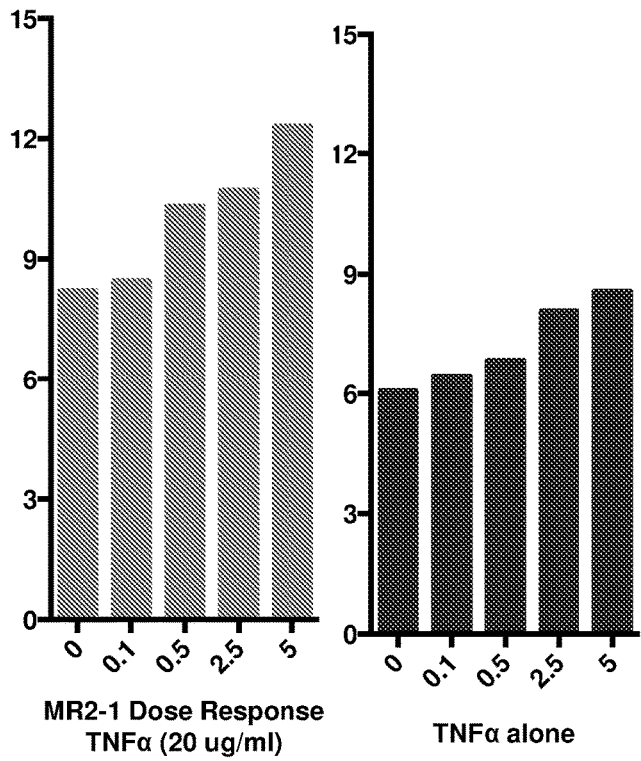
FIG. 7C shows two graphs comparing the effect of agonist TNFR2 antibody, MR2-1 (Abcam), on the proliferation of Treg cells in the presence of TNFα (20 mg/ml, left) with the effect of TNFα alone on the proliferation of Treg cells (right). Values along the x-axes represent the concentration of TNFR2 agonist; values along the y-axes represent the relative increase in Treg cell quantity.
Figure 7D:
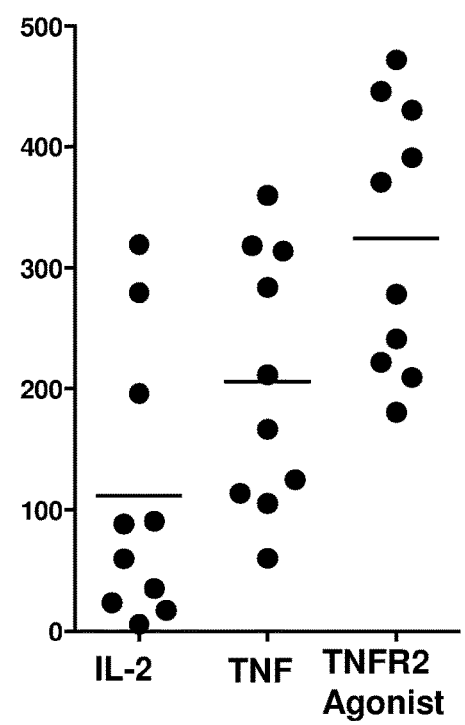
FIG. 7D is a graph showing the effects of IL-2, TNFα, and TNFRAG1 on the secretion of soluble TNFR2 in a population of peripheral human CD4+ cells. Values along the y-axis are fluorescence intensity measurements obtained from an enzyme-linked immunosorbant assay (ELISA) quantifying soluble TNFR2.
Figure 9A:
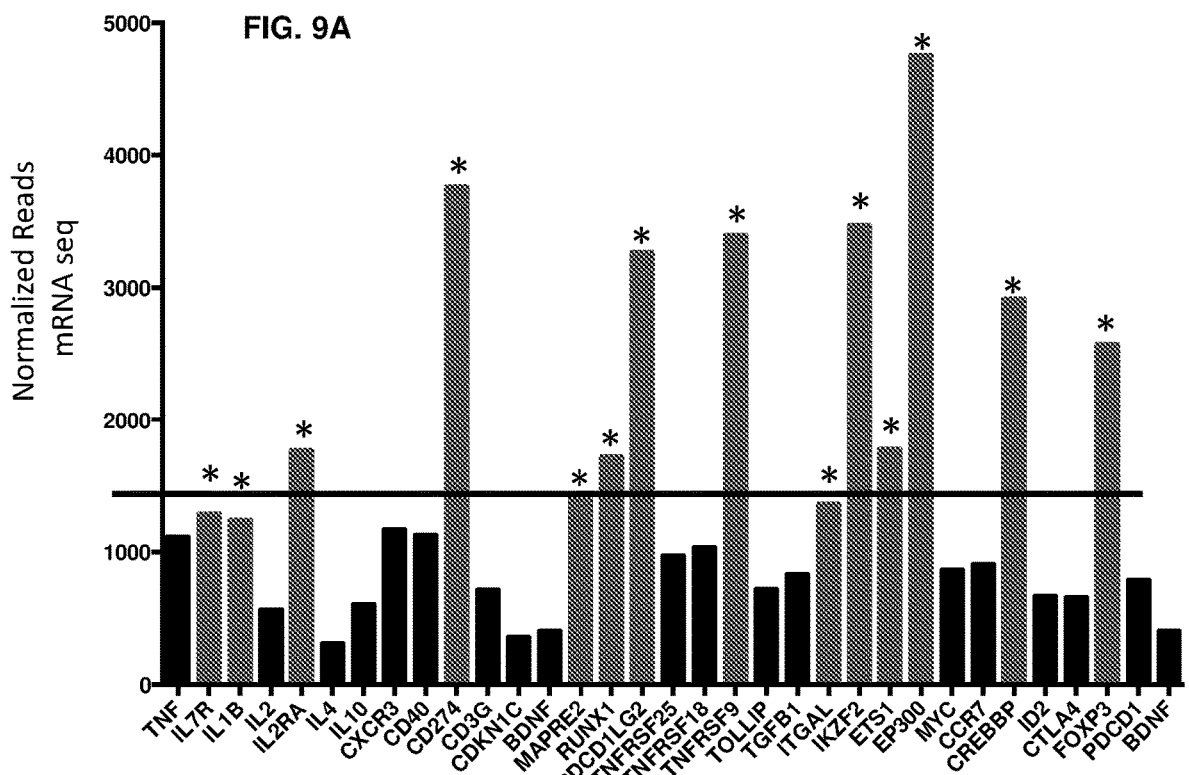
FIG. 9A is a graph showing the effect of TNFRAG1 on gene expression in peripheral human CD4+ cells. Expression of genes that are characteristic of Treg cells (indicated with an asterisk) is selectively upregulated.
Figure 9B:
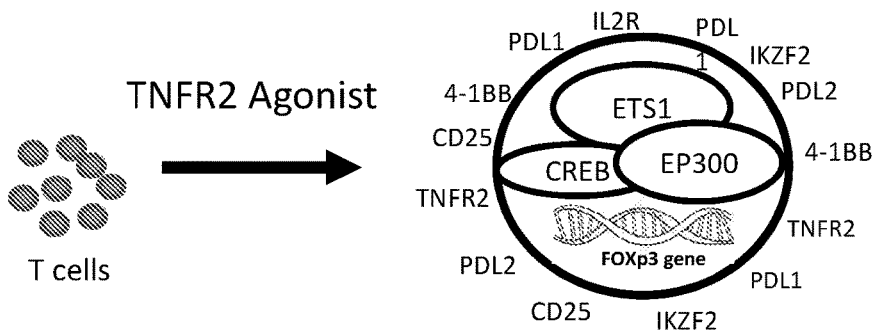
FIG. 9B is a diagram showing particular genes that are upregulated upon incubating peripheral CD4+ cells with TNFRAG1.
Figure 9C:
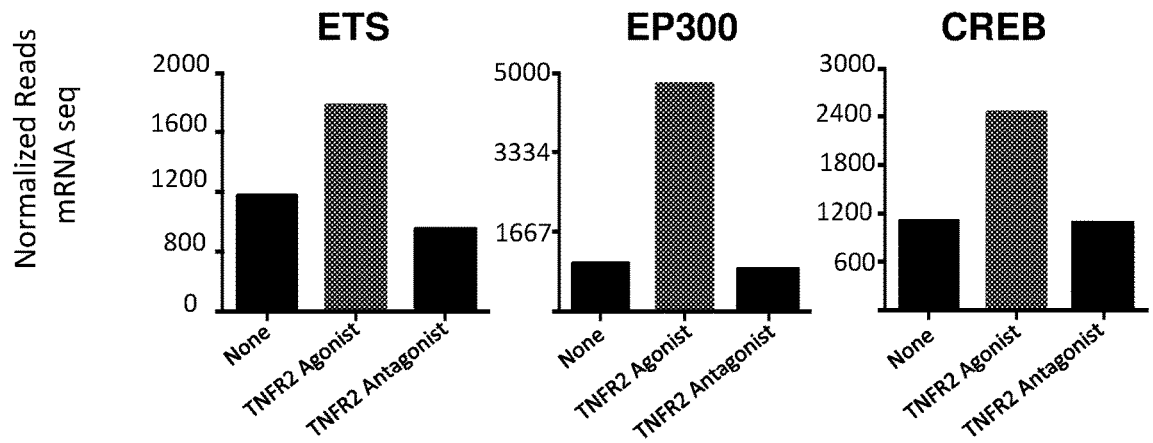
FIG. 9C shows graphs that demonstrate the effect of TNFRAG1 on the expression of genes ETS (left), EP300 (middle), and CREB (right), which are characteristic of Treg cells. For comparison purposes, cells were treated with either IL-2 alone ("none"), TNFRAG1 ("TNFR2 agonist"), or a TNFR2 antagonist antibody ("TNFR2 antagonist").

Evaluation of the F(ab')2 fragment of TNFR2 agonist antibody demonstrates that the activity of the TNFR2 agonist antibody on Treg proliferation is independent of the Fc region (FIG. 7A). Functional activity of the TNFR2 agonist antibody is also independent of receptor cross-linking, as is evidenced by the observation that co-culturing of rodent anti-IgG antibody with TNFR2 agonist does not inhibit dose dependent Treg proliferation (FIG. 7B). These data suggest that the mechanism of action of the TNFR2 agonist antibody is through an activation pathway that overrides the effect of crosslinking or Fc binding. Consistently, similar dose dependent increases are observed for the proportion of Tregs with escalating concentration of the natural ligand, TNFα, when compared to activation mediated by a TNFR2 agonist antibody (FIG. 7C). Additionally, treatment of CD4+ cells with TNFα leads to a trend of increased soluble TNFR2 in the culture media in the presence of the TNFR2 agonist (FIG. 7D).

Functional Evaluation of Expanded Treg Cells

To determine the functional capacity of Treg cells expanded in vitro with the TNFR2 agonist, their ability to suppress autologous CD8+ T cells from a type 1 diabetes patient was tested. In co-culture, it was found that the proliferative capacity of the responder, CD8+ T cells (stained with carboxyfluorescein succinimidyl ester (CFSE)) was inhibited by the presence of a greater proportion of Tregs relative to responders (FIGS. 8C-8E, left). Additionally, the proliferative capacity of the responder, CD8+ T cells (stained with CFSE) was inhibited by Treg cells that were expanded (i) in the presence of TNFα (FIGS. 8C-8E, middle) or TNFR2 agonist antibody and rapamycin (FIGS. 8C-8E, right). Of the conditions tested, the greatest suppression of CD8+ T cell proliferation was observed when responder cells were incubated with Treg cells at the lowest ratio of Treg:Responders (1:1), as well as when responder cells were incubated with Treg cells that had been expanded with TNFR2 agonist antibody.

Taken together, these experiments demonstrate the ability of TNFR2 agonist antibody TNFRAG1, as well as antibodies having similar structural properties (e.g., antibodies having one or more, or all, of the CDRs of TNFRAG1) and/or TNFR2-binding properties as TNFRAG1, to suppress CD8+ T cell proliferation. This phenotype provides an important therapeutic benefit, particularly for treating autoimmune diseases and other conditions, such as those described herein, that are caused by an abnormal immune response against self tissue, as TNFRAG1 and similar antibodies can suppress the CD8+ T cells that mount an inappropriate immune response against self tissue and give rise to the autoimmune disease or other condition.

Evaluation of Treg Expansion by Assessment of Metabolic Activity

Figure 10A:
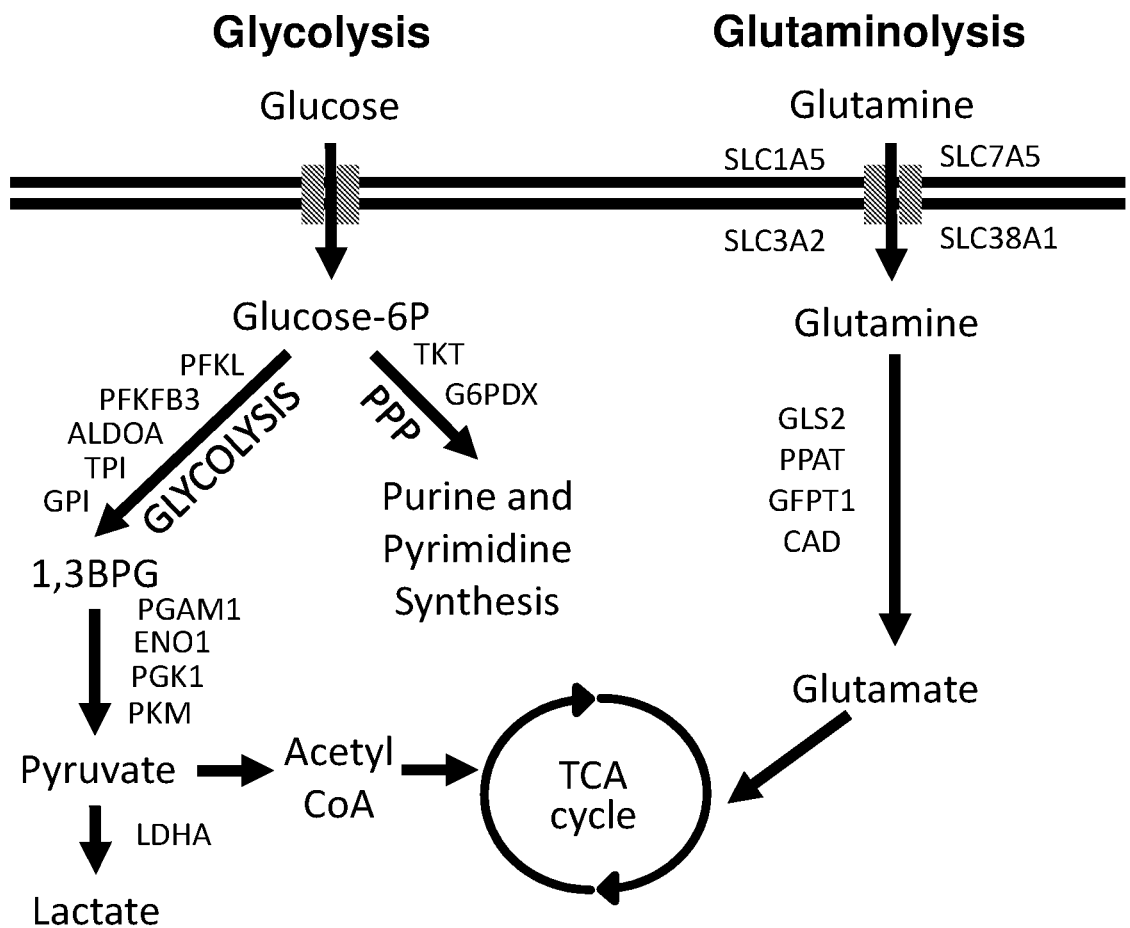
FIG. 10A is a diagram showing the glycolysis pathway, as well as the various genes that are expressed during glycolysis, and the glutaminolysis pathway, as well as the various genes that are expressed during glutaminolysis.
Figure 10B:
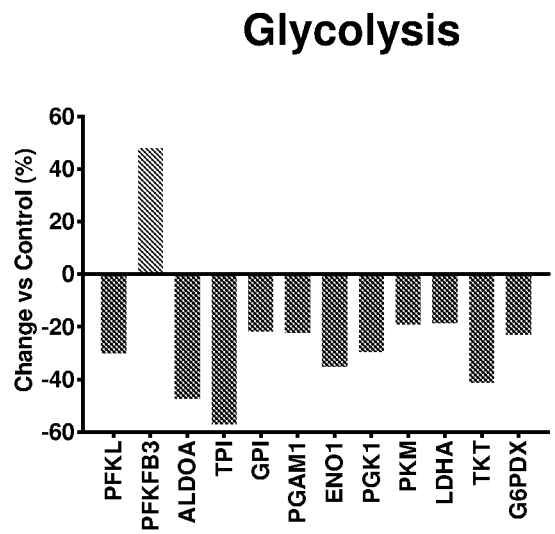
FIG. 10B is a graph showing the effect of TNFRAG1 on the expression of genes involved in glycolysis upon incubation of TNFRAG1 with peripheral human CD4+ cells. Treg cells are characterized by reduced glycolysis. These data demonstrate that TNFRAG1 induces an increase in the relative amount of Treg cells upon incubation with peripheral human CD4+ cells.
Figure 10C:
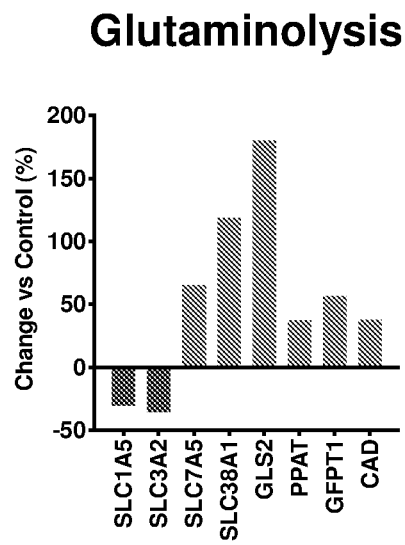
FIG. 10C is a graph showing the effect of TNFRAG1 on the expression of genes involved in glutaminolysis upon incubation of TNFRAG1 with peripheral human CD4+ cells. Treg cells are characterized by increased glutaminolysis. These data demonstrate that TNFRAG1 induces an increase in the relative amount of Treg cells upon incubation with peripheral human CD4+ cells.
Figure 11A:
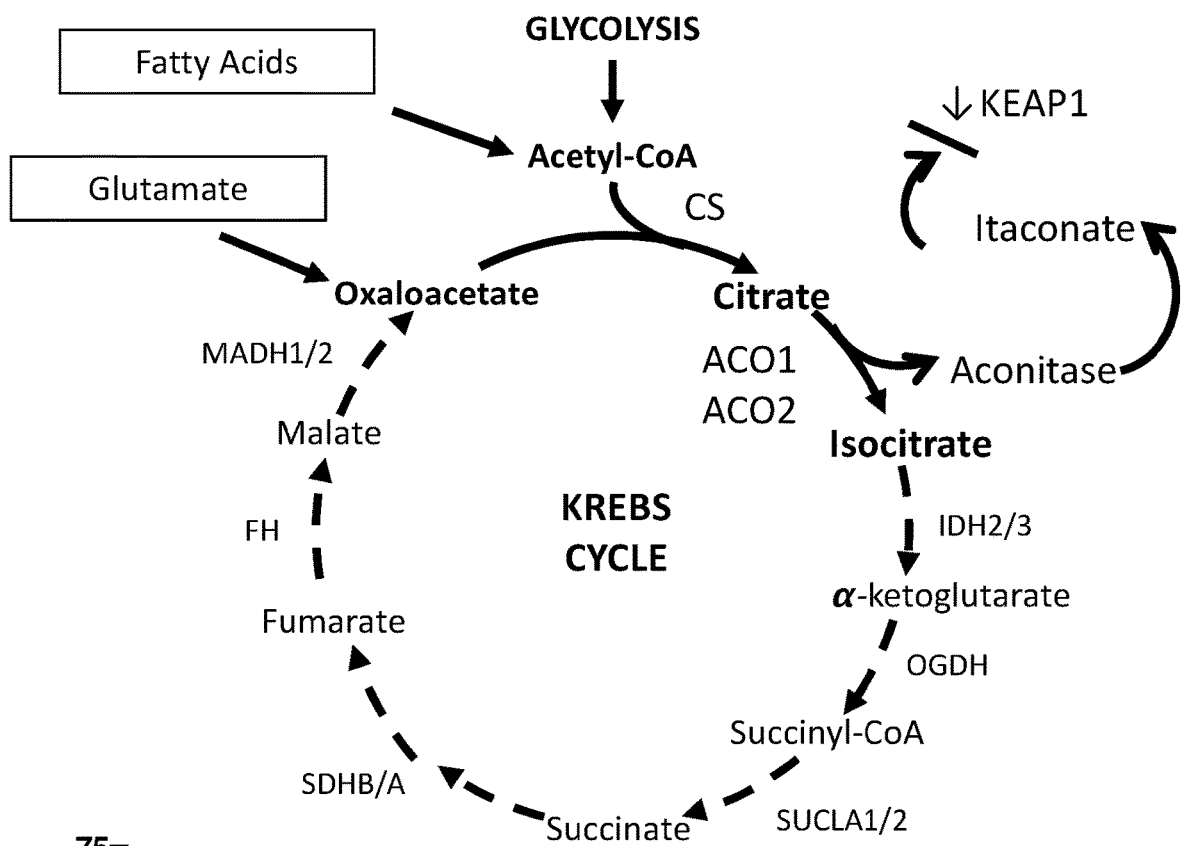
FIG. 11A is a diagram showing the Krebs cycle and the effect that the early steps in this pathway have on upregulating itaconate, a suppressor of autoimmunity.
Figure 11B:
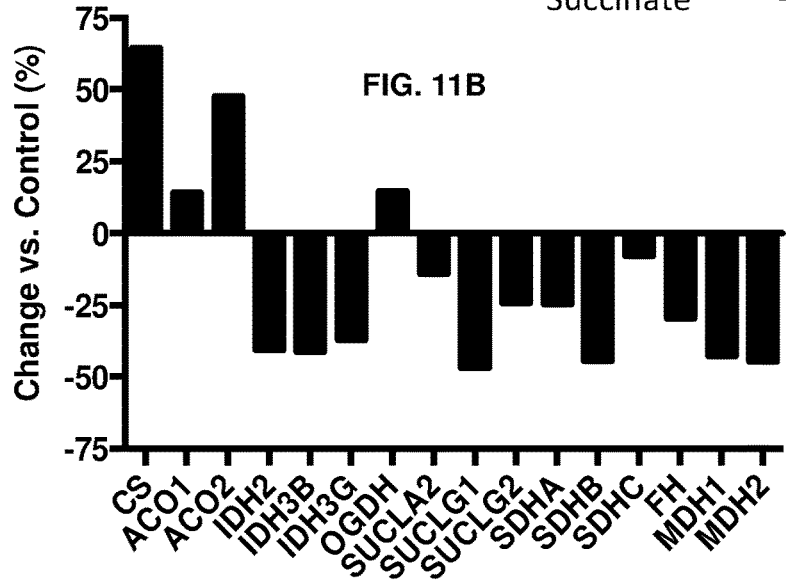
FIG. 11B is a graph showing the effects of TNFRAG1 on the expression of genes involved in the Krebs cycle upon incubation of TNFRAG1 with peripheral human CD4+ cells. These data demonstrate that TNFRAG1 upregulates the expression of early genes in the Krebs cycle, which results in an increase in itaconate.
Figure 11C:
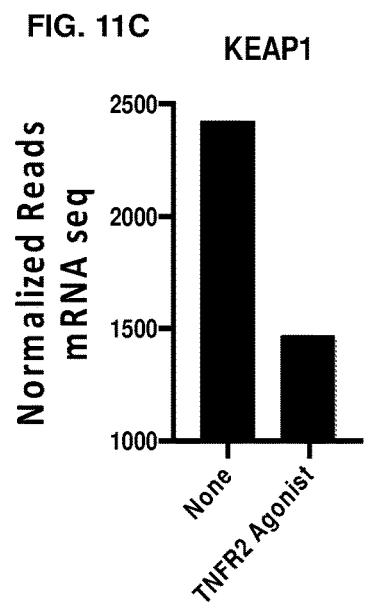
FIG. 11C is a graph showing the effects of TNFRAG1 on the expression of KEAP1, a known known inducer of inflammation and autoimmunity, upon incubation of TNFRAG1 with peripheral human CD4+ cells.
Figure 12A:
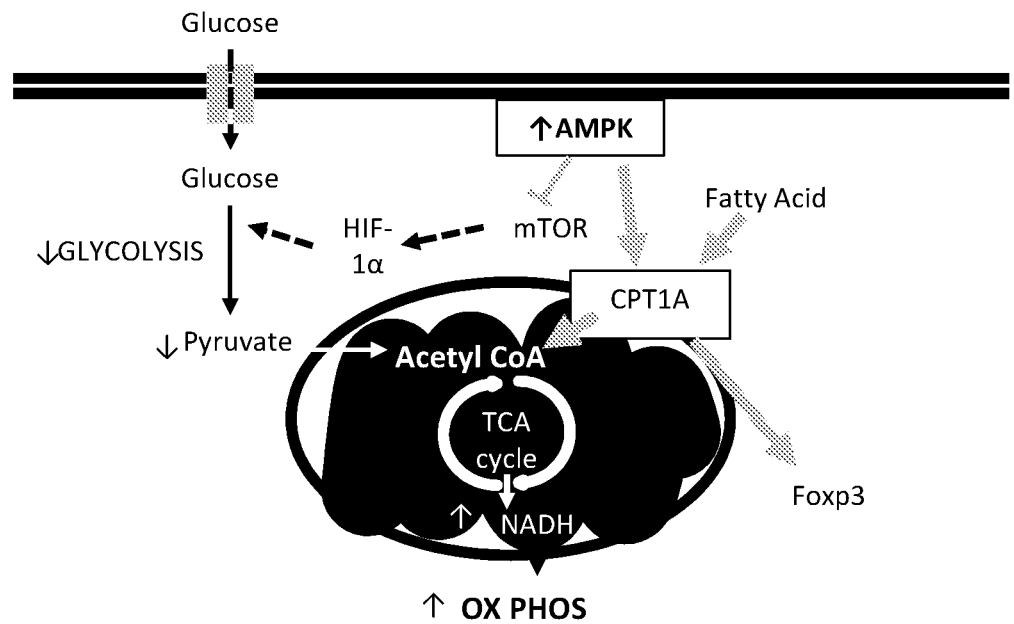
FIG. 12A is a diagram showing the metabolic preferences of Treg cells. Treg cells exhibit reduced glycolysis, elevated glutaminolysis, and an increase in fatty acid consumption.
Figure 12B:
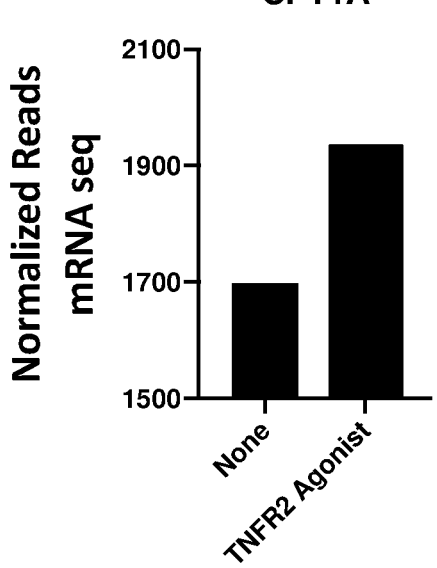
FIGS. 12B-12D are a series of graphs showing the effects of TNFRAG1 on the expression of CPT1A (FIG. 12B), CPT1B (FIG. 12C), and AMPK (FIG. 12D), genes involved in fatty acid metabolism, upon incubation of TNFRAG1 with peripheral human CD4+ cells. These data further demonstrate the ability of TNFRAG1 to selectively induce Treg cell proliferation.
Figure 12C:
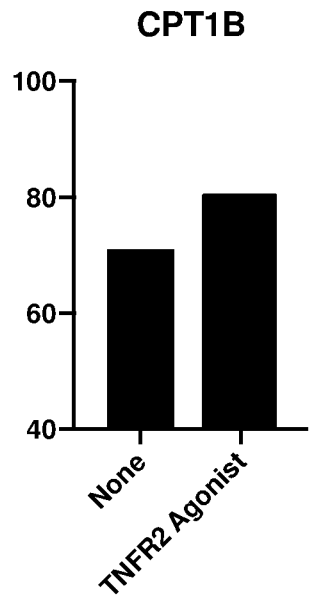
Figure 12D:
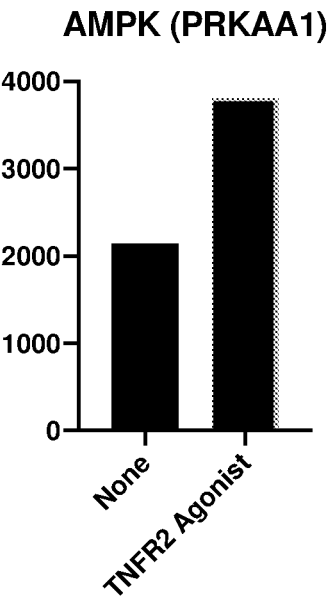

Additional evidence for the expansion of Treg cells by TNFRAG1 is provided by the observation that the agonist antibody induces a metabolic shift in isolated, peripheral CD4+ cells. Particularly, upon incubating TNFRAG1 with such cells, it was observed that the cells exhibited reduced glycolysis (FIG. 10B), elevated glutaminolysis (FIG. 10C), and elevated fatty acid metabolism (FIGS. 12A-12D). This metabolic shift demonstrates that a TNFR2 agonist antibody, such as TNFRAG1, selectively upregulated Treg cell proliferation among isolated lymphocytes. Additionally, TNFRAG1 was found to increase the expression of early genes involved in the Krebs cycle, and decrease expression of genes involved later in the Krebs cycle (FIGS. 11A-11C). This observation is significant not only because it is further evidence of Treg expansion, but also because one of the metabolites that results from the early phase of the Krebs cycle, itaconate, is a potent suppressor of autoimmunity. Taken together, these data demonstrate that TNFRAG1, and antibodies that have similar structural properties (e.g., antibodies that have one or more, or all, of the CDRs of TNFRAG1, or a CDR having at least 85%, 86%, 87%, 88%, 89%, 90%, 91%, 92%, 93%, 94%, 95%, 96%, 97%, 98%, 99%, or more, sequence identity with respect to the corresponding CDR in TNFRAG1) and/or epitope-binding properties can suppress autoimmunity by selectively inducing Treg cell proliferation and by upregulating an anti-inflammatory metabolite.

CONCLUSION

The results of these experiments demonstrate that agonistic TNFR2 antibody TNFRAG1, as well as antibodies having similar structural and/or epitope-binding properties, can be used to selectively upregulate (i) Treg cells and (ii) an important anti-inflammatory metabolite. Without being limited by mechanism, these features represent two possible modalities by which TNFR2 agonist antibodies of the disclosure may be used to treat diseases associated with an aberrant immune response against self antigens.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations described herein following, in general, the principles described herein and including such departures from the invention that come within known or customary practice within the art to which the invention pertains and may be applied to the essential features hereinbefore set forth, and follows in the scope of the claims.

Other embodiments are within the claims.

The invention claimed is:

1. An isolaed humanized or chimeric antibody or antigen-binding fragment thereof that binds human tumor necrosis factor receptor 2 (TNFR2), wherein the antibody or antigen-binding fragment thereof comprises the following complementarity determining regions (CDRs):
   (i) a complementarity determining region-heavy chain 1 (CDR-H1) comprising the amino acid sequence GYTFTDYNI (SEQ ID NO: 3) or GYTFTDYNL (SEQ ID NO: 4);
   (ii) a CDR-H2 comprising the amino acid sequence INPNYDST (SEQ ID NO: 10);
   (iii) a CDR-H3 comprising the amino acid sequence CARGNSWYFDV (SEQ ID NO: 11);
   (iv) a complementarity determining region-light chain 1 (CDR-L1) comprising the amino acid sequence SSVRY (SEQ ID NO: 12);
   (v) a CDR-L2 comprising the amino acid sequence LTS; and
   (vi) a CDR-L3 comprising the amino acid sequence CQQWSSNPLT (SEQ ID NO: 13).

2. The antibody or antigen-binding fragment thereof of claim 1, wherein the antibody or antigen-binding fragment thereof has an IgG3 or IgG4 isotype.

3. The antibody or antigen-binding fragment thereof of claim 1, wherein:
   (a) the antibody or antigen-binding fragment thereof has an IgG3 isotype;
   (b) the antibody or antigen-binding fragment thereof comprises a heavy chain variable domain ($V_H$) comprising an amino acid sequence that is at least 85% identical to the amino acid sequence of SEQ ID NO: 14; or
   (c) the antibody or antigen-binding fragment thereof comprises a heavy chain variable domain ($V_H$) comprising an amino acid sequence that is at least 85% identical to the amino acid sequence of SEQ ID NO: 15.

4. The antibody or antigen-binding fragment thereof of claim 3, wherein
   (i) the CDR-H1 has the amino acid sequence GYTFTDYNI (SEQ ID NO: 3);
   (ii) the antibody or antigen-binding fragment thereof comprises a heavy chain variable domain ($V_H$) comprising the amino acid sequence of SEQ ID NO: 14;
   (iii) the CDR-H1 has the amino acid sequence GYTFTDYNL (SEQ ID NO: 4); or
   (iv) the antibody or antigen-binding fragment thereof comprises a heavy chain variable domain ($V_H$) comprising the amino acid sequence of SEQ ID NO: 15.

5. A construct comprising a first polypeptide domain and a second polypeptide domain, wherein the first polypeptide domain and the second polypeptide domain each independently comprise a single-chain polypeptide comprising the antibody or antigen-binding fragment thereof of claim 1.

6. The construct of claim 5, wherein the first polypeptide domain and the second polypeptide domain are bound by a covalent linker, wherein the covalent linker comprises an amide bond or a disulfide bond.

7. A pharmaceutical composition comprising the antibody or antigen-binding fragment thereof of claim 1 or a construct comprising the antibody or antigen-binding fragment thereof of claim 1, and a pharmaceutically acceptable carrier or excipient.

8. The pharmaceutical composition of claim 7, wherein said antibody or antigen-binding fragment thereof is present in the pharmaceutical composition in an amount of from about 0.001 mg/ml to about 100 mg/ml.

9. The pharmaceutical composition of claim 7, wherein the pharmaceutical composition further comprises an additional therapeutic agent.

10. The pharmaceutical composition of claim 9, wherein the additional therapeutic agent is an immunotherapy agent.

11. A kit comprising the antibody or antigen-binding fragment thereof of claim 1 or a construct comprising the antibody or antigen-binding fragment thereof of claim 1.

12. The antibody or antigen-binding fragment thereof of claim 1, wherein the antibody or antigen-binding fragment thereof comprises a human IgG1 or IgG2 heavy chain constant 1 (CH1) domain comprising a deletion or substitution at cysteine residue 127 according to the Kabat numbering scheme.

13. The antibody or antigen-binding fragment thereof of claim 12, wherein the antibody or antigen-binding fragment thereof comprises a human IgG1 or IgG2 CH1 domain comprising a C127S mutation according to the Kabat numbering scheme.

14. The antibody or antigen-binding fragment thereof of claim 12, wherein the antibody or antigen-binding fragment thereof comprises:
   (a) a human IgG1 CH1 domain comprising an amino acid sequence that is at least 85% identical to the amino acid sequence of SEQ ID NO: 6; or
   (b) a human IgG1 CH1 domain comprising the amino acid sequence of SEQ ID NO: 7.

15. The antibody or antigen-binding fragment thereof of claim 12, wherein the antibody or antigen-binding fragment thereof comprises:
   (a) a human IgG2 CH1 domain comprising an amino acid sequence that is at least 85% identical to the amino acid sequence of SEQ ID NO: 8; or
   (b) a human IgG2 CH1 domain comprising the amino acid sequence of SEQ ID NO: 9.

16. The antibody or antigen-binding fragment thereof of claim 14, wherein the human IgG1 CH1 domain has the amino acid sequence of SEQ ID NO: 7.

17. The antibody or antigen-binding fragment thereof of claim 15, wherein the human IgG2 CH1 domain has the amino acid sequence of SEQ ID NO: 9.

18. The antibody or antigen-binding fragment thereof of claim 1, wherein the antibody or antigen-binding fragment thereof comprises a framework region comprising the amino acid sequence of TJDJSJJJX$_1$YX$_2$X$_3$LJX$_4$LJS (SEQ ID NO: 5) or an amino acid sequence comprising 10 or more of the residues of SEQ ID NO: 5, wherein each J is independently a naturally occurring amino acid; each X$_1$ is independently A, V, or F; each X$_2$ is independently M or I; each X$_3$ is independently E or Q; and each X$_4$ is independently S or R.

\* \* \* \* \*

SEQUENCE LISTING

<160> NUMBER OF SEQ ID NOS: 71

<210> SEQ ID NO 1
<211> LENGTH: 461
<212> TYPE: PRT
<213> ORGANISM: Homo sapiens

<400> SEQUENCE: 1

```
Met Ala Pro Val Ala Val Trp Ala Ala Leu Ala Val Gly Leu Glu Leu
 1               5                  10                  15

Trp Ala Ala Ala His Ala Leu Pro Ala Gln Val Ala Phe Thr Pro Tyr
            20                  25                  30

Ala Pro Glu Pro Gly Ser Thr Cys Arg Leu Arg Glu Tyr Tyr Asp Gln
        35                  40                  45

Thr Ala Gln Met Cys Cys Ser Lys Cys Ser Pro Gly Gln His Ala Lys
50                  55                  60

Val Phe Cys Thr Lys Thr Ser Asp Thr Val Cys Asp Ser Cys Glu Asp
65                  70                  75                  80

Ser Thr Tyr Thr Gln Leu Trp Asn Trp Val Pro Glu Cys Leu Ser Cys
                85                  90                  95

Gly Ser Arg Cys Ser Ser Asp Gln Val Glu Thr Gln Ala Cys Thr Arg
            100                 105                 110

Glu Gln Asn Arg Ile Cys Thr Cys Arg Pro Gly Trp Tyr Cys Ala Leu
        115                 120                 125

Ser Lys Gln Glu Gly Cys Arg Leu Cys Ala Pro Leu Arg Lys Cys Arg
130                 135                 140

Pro Gly Phe Gly Val Ala Arg Pro Gly Thr Glu Thr Ser Asp Val Val
145                 150                 155                 160

Cys Lys Pro Cys Ala Pro Gly Thr Phe Ser Asn Thr Thr Ser Ser Thr
                165                 170                 175

Asp Ile Cys Arg Pro His Gln Ile Cys Asn Val Val Ala Ile Pro Gly
            180                 185                 190

Asn Ala Ser Met Asp Ala Val Cys Thr Ser Thr Ser Pro Thr Arg Ser
        195                 200                 205

Met Ala Pro Gly Ala Val His Leu Pro Gln Pro Val Ser Thr Arg Ser
210                 215                 220

Gln His Thr Gln Pro Thr Pro Glu Pro Ser Thr Ala Pro Ser Thr Ser
225                 230                 235                 240

Phe Leu Leu Pro Met Gly Pro Ser Pro Ala Glu Gly Ser Thr Gly
                245                 250                 255

Asp Phe Ala Leu Pro Val Gly Leu Ile Val Gly Val Thr Ala Leu Gly
            260                 265                 270

Leu Leu Ile Ile Gly Val Val Asn Cys Val Ile Met Thr Gln Val Lys
        275                 280                 285

Lys Lys Pro Leu Cys Leu Gln Arg Glu Ala Lys Val Pro His Leu Pro
290                 295                 300

Ala Asp Lys Ala Arg Gly Thr Gln Gly Pro Glu Gln Gln His Leu Leu
305                 310                 315                 320

Ile Thr Ala Pro Ser Ser Ser Ser Ser Ser Leu Glu Ser Ser Ala Ser
                325                 330                 335

Ala Leu Asp Arg Arg Ala Pro Thr Arg Asn Gln Pro Gln Ala Pro Gly
            340                 345                 350

Val Glu Ala Ser Gly Ala Gly Glu Ala Arg Ala Ser Thr Gly Ser Ser
        355                 360                 365
```

```
Asp Ser Ser Pro Gly Gly His Gly Thr Gln Val Asn Val Thr Cys Ile
    370                 375                 380

Val Asn Val Cys Ser Ser Asp His Ser Ser Gln Cys Ser Ser Gln
385                 390                 395                 400

Ala Ser Ser Thr Met Gly Asp Thr Asp Ser Ser Pro Ser Glu Ser Pro
                405                 410                 415

Lys Asp Glu Gln Val Pro Phe Ser Lys Glu Cys Ala Phe Arg Ser
                420                 425                 430

Gln Leu Glu Thr Pro Glu Thr Leu Gly Ser Thr Glu Glu Lys Pro
            435                 440                 445

Leu Pro Leu Gly Val Pro Asp Ala Gly Met Lys Pro Ser
            450                 455                 460

<210> SEQ ID NO 2
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: Xaa is Tyr, Phe, Trp, or His
<220> FEATURE:
<221> NAME/KEY: MISC_FEATURE
<222> LOCATION: (5)..(5)
<223> OTHER INFORMATION: Xaa is Ser, Thr, Cys, Gln, or Asn
<220> FEATURE:
<221> NAME/KEY: MISC_FEATURE
<222> LOCATION: (6)..(6)
<223> OTHER INFORMATION: Xaa is Glu or Asp
<220> FEATURE:
<221> NAME/KEY: MISC_FEATURE
<222> LOCATION: (8)..(8)
<223> OTHER INFORMATION: Xaa is Ser, Thr, Cys, Gln, or Asn
<220> FEATURE:
<221> NAME/KEY: MISC_FEATURE
<222> LOCATION: (9)..(9)
<223> OTHER INFORMATION: Xaa is Leu or Ile

<400> SEQUENCE: 2

Gly Xaa Thr Phe Xaa Xaa Tyr Xaa Xaa
1               5

<210> SEQ ID NO 3
<211> LENGTH: 9
<212> TYPE: PRT
<213> ORGANISM: Artificial Sequence
<220> FEATURE:
<223> OTHER INFORMATION: Synthetic Construct

<400> SEQUENCE: 3

Gly Tyr Thr Phe Thr Asp Tyr Asn Ile
1               5

<210> SEQ ID NO 4
<211> LENGTH: 9
<212> TYPE: PRT
<213> ORGANISM: Artificial Sequence
<220> FEATURE:
<223> OTHER INFORMATION: Synthetic Construct

<400> SEQUENCE: 4

Gly Tyr Thr Phe Thr Asp Tyr Asn Leu
1               5

<210> SEQ ID NO 5
```

```
<211> LENGTH: 18
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: Xaa is any amino acid
<220> FEATURE:
<221> NAME/KEY: MISC_FEATURE
<222> LOCATION: (4)..(4)
<223> OTHER INFORMATION: Xaa is any amino acid
<220> FEATURE:
<221> NAME/KEY: MISC_FEATURE
<222> LOCATION: (6)..(8)
<223> OTHER INFORMATION: Xaa is any amino acid
<220> FEATURE:
<221> NAME/KEY: MISC_FEATURE
<222> LOCATION: (9)..(9)
<223> OTHER INFORMATION: Xaa is Ala, Val, or Phe
<220> FEATURE:
<221> NAME/KEY: MISC_FEATURE
<222> LOCATION: (11)..(11)
<223> OTHER INFORMATION: Xaa is Met or Ile
<220> FEATURE:
<221> NAME/KEY: MISC_FEATURE
<222> LOCATION: (12)..(12)
<223> OTHER INFORMATION: Xaa is Glu or Gln
<220> FEATURE:
<221> NAME/KEY: MISC_FEATURE
<222> LOCATION: (14)..(14)
<223> OTHER INFORMATION: Xaa is any amino acid
<220> FEATURE:
<221> NAME/KEY: MISC_FEATURE
<222> LOCATION: (15)..(15)
<223> OTHER INFORMATION: Xaa is Ser or Arg
<220> FEATURE:
<221> NAME/KEY: MISC_FEATURE
<222> LOCATION: (17)..(17)
<223> OTHER INFORMATION: Xaa is any amino acid

<400> SEQUENCE: 5

Thr Xaa Asp Xaa Ser Xaa Xaa Xaa Xaa Tyr Xaa Xaa Leu Xaa Xaa Leu
1               5                   10                  15

Xaa Ser

<210> SEQ ID NO 6
<211> LENGTH: 98
<212> TYPE: PRT
<213> ORGANISM: Homo sapiens

<400> SEQUENCE: 6

Ala Ser Thr Lys Gly Pro Ser Val Phe Pro Leu Ala Pro Cys Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val

<210> SEQ ID NO 7
```

```
<211> LENGTH: 98
<212> TYPE: PRT
<213> ORGANISM: Artificial Sequence
<220> FEATURE:
<223> OTHER INFORMATION: Synthetic Construct

<400> SEQUENCE: 7

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val

<210> SEQ ID NO 8
<211> LENGTH: 98
<212> TYPE: PRT
<213> ORGANISM: Homo sapiens

<400> SEQUENCE: 8

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val

<210> SEQ ID NO 9
<211> LENGTH: 98
<212> TYPE: PRT
<213> ORGANISM: Artificial Sequence
<220> FEATURE:
<223> OTHER INFORMATION: Synthetic Construct

<400> SEQUENCE: 9

Ala Ser Thr Lys Gly Pro Ser Val Phe Pro Leu Ala Pro Ser Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
```

```
                65                  70                  75                  80
Tyr Thr Cys Asn Val Asp His Lys Pro Ser Asn Thr Lys Val Asp Lys
                    85                  90                  95

Thr Val

<210> SEQ ID NO 10
<211> LENGTH: 8
<212> TYPE: PRT
<213> ORGANISM: Artificial Sequence
<220> FEATURE:
<223> OTHER INFORMATION: Synthetic Construct

<400> SEQUENCE: 10

Ile Asn Pro Asn Tyr Asp Ser Thr
1               5

<210> SEQ ID NO 11
<211> LENGTH: 11
<212> TYPE: PRT
<213> ORGANISM: Artificial Sequence
<220> FEATURE:
<223> OTHER INFORMATION: Synthetic Construct

<400> SEQUENCE: 11

Cys Ala Arg Gly Asn Ser Trp Tyr Phe Asp Val
1               5                   10

<210> SEQ ID NO 12
<211> LENGTH: 5
<212> TYPE: PRT
<213> ORGANISM: Artificial Sequence
<220> FEATURE:
<223> OTHER INFORMATION: Synthetic Construct

<400> SEQUENCE: 12

Ser Ser Val Arg Tyr
1               5

<210> SEQ ID NO 13
<211> LENGTH: 10
<212> TYPE: PRT
<213> ORGANISM: Artificial Sequence
<220> FEATURE:
<223> OTHER INFORMATION: Synthetic Construct

<400> SEQUENCE: 13

Cys Gln Gln Trp Ser Ser Asn Pro Leu Thr
1               5                   10

<210> SEQ ID NO 14
<211> LENGTH: 117
<212> TYPE: PRT
<213> ORGANISM: Artificial Sequence
<220> FEATURE:
<223> OTHER INFORMATION: Synthetic Construct

<400> SEQUENCE: 14

Glu Val Gln Leu Gln Gln Phe Gly Ala Glu Leu Val Lys Pro Gly Ala
1               5                   10                  15

Ser Val Lys Ile Ser Cys Lys Ala Ser Gly Tyr Thr Phe Thr Asp Tyr
            20                  25                  30

Asn Ile Asp Trp Val Lys Gln Ser His Gly Lys Ser Leu Glu Trp Ile
        35                  40                  45

Gly Asp Ile Asn Pro Asn Tyr Asp Ser Thr Ser Tyr Ser Gln Lys Phe
```

```
                    50                  55                  60
Arg Gly Lys Ala Thr Leu Thr Val Asp Lys Ser Ser Thr Ala Tyr
 65                  70                  75                  80

Met Glu Leu Arg Ser Leu Thr Ser Glu Asp Thr Ala Val Tyr Tyr Cys
                 85                  90                  95

Ala Arg Gly Asn Ser Trp Tyr Phe Asp Val Trp Gly Ala Gly Thr Thr
                100                 105                 110

Val Thr Val Ser Ser
            115

<210> SEQ ID NO 15
<211> LENGTH: 117
<212> TYPE: PRT
<213> ORGANISM: Artificial Sequence
<220> FEATURE:
<223> OTHER INFORMATION: Synthetic Construct

<400> SEQUENCE: 15

Glu Val Gln Leu Gln Gln Phe Gly Ala Glu Leu Val Lys Pro Gly Ala
 1               5                  10                  15

Ser Val Lys Ile Ser Cys Lys Ala Ser Gly Tyr Thr Phe Thr Asp Tyr
                20                  25                  30

Asn Leu Asp Trp Val Lys Gln Ser His Gly Lys Ser Leu Glu Trp Ile
             35                  40                  45

Gly Asp Ile Asn Pro Asn Tyr Asp Ser Thr Tyr Ser Gln Lys Phe
         50                  55                  60

Arg Gly Lys Ala Thr Leu Thr Val Asp Lys Ser Ser Thr Ala Tyr
 65                  70                  75                  80

Met Glu Leu Arg Ser Leu Thr Ser Glu Asp Thr Ala Val Tyr Tyr Cys
                 85                  90                  95

Ala Arg Gly Asn Ser Trp Tyr Phe Asp Val Trp Gly Ala Gly Thr Thr
                100                 105                 110

Val Thr Val Ser Ser
            115

<210> SEQ ID NO 16
<211> LENGTH: 18
<212> TYPE: PRT
<213> ORGANISM: Artificial Sequence
<220> FEATURE:
<223> OTHER INFORMATION: Synthetic Construct

<400> SEQUENCE: 16

Thr Val Asp Lys Ser Ser Ser Thr Ala Tyr Met Glu Leu Arg Ser Leu
 1               5                  10                  15

Thr Ser

<210> SEQ ID NO 17
<211> LENGTH: 18
<212> TYPE: PRT
<213> ORGANISM: Artificial Sequence
<220> FEATURE:
<223> OTHER INFORMATION: Synthetic Construct

<400> SEQUENCE: 17

Thr Ala Asp Thr Ser Ser Asn Thr Ala Tyr Ile Gln Leu Ser Ser Leu
 1               5                  10                  15

Thr Ser
```

```
<210> SEQ ID NO 18
<211> LENGTH: 18
<212> TYPE: PRT
<213> ORGANISM: Artificial Sequence
<220> FEATURE:
<223> OTHER INFORMATION: Synthetic Construct

<400> SEQUENCE: 18

Thr Ala Asp Thr Ser Thr Asp Thr Ala Tyr Met Glu Leu Ser Ser Leu
1               5                   10                  15

Arg Ser

<210> SEQ ID NO 19
<211> LENGTH: 18
<212> TYPE: PRT
<213> ORGANISM: Artificial Sequence
<220> FEATURE:
<223> OTHER INFORMATION: Synthetic Construct

<400> SEQUENCE: 19

Thr Arg Asp Thr Ser Ile Ser Thr Ala Tyr Met Glu Leu Ser Arg Leu
1               5                   10                  15

Thr Ser

<210> SEQ ID NO 20
<211> LENGTH: 11
<212> TYPE: PRT
<213> ORGANISM: Artificial Sequence
<220> FEATURE:
<223> OTHER INFORMATION: Synthetic Construct

<400> SEQUENCE: 20

Thr Phe Tyr Met Glu Leu Ser Ser Leu Arg Ser
1               5                   10

<210> SEQ ID NO 21
<211> LENGTH: 18
<212> TYPE: PRT
<213> ORGANISM: Artificial Sequence
<220> FEATURE:
<223> OTHER INFORMATION: Synthetic Construct

<400> SEQUENCE: 21

Thr Arg Asp Thr Ser Ile Ser Thr Ala Tyr Met Glu Leu Asn Arg Leu
1               5                   10                  15

Thr Ser

<210> SEQ ID NO 22
<211> LENGTH: 18
<212> TYPE: PRT
<213> ORGANISM: Artificial Sequence
<220> FEATURE:
<223> OTHER INFORMATION: Synthetic Construct

<400> SEQUENCE: 22

Thr Arg Asp Thr Ser Thr Asn Thr Val Tyr Met Glu Leu Thr Ser Leu
1               5                   10                  15

Arg Ser

<210> SEQ ID NO 23
<211> LENGTH: 18
<212> TYPE: PRT
<213> ORGANISM: Artificial Sequence
<220> FEATURE:
<223> OTHER INFORMATION: Synthetic Construct
```

<400> SEQUENCE: 23

Thr Ala Asp Thr Ser Thr Asp Arg Ala Tyr Met Glu Leu Ser Ser Leu
1               5                   10                  15

Arg Ser

<210> SEQ ID NO 24
<211> LENGTH: 5
<212> TYPE: PRT
<213> ORGANISM: Mus musculus

<400> SEQUENCE: 24

Ala Asp Ala Ala Pro
1               5

<210> SEQ ID NO 25
<211> LENGTH: 5
<212> TYPE: PRT
<213> ORGANISM: Homo sapiens

<400> SEQUENCE: 25

Thr Val Ala Ala Pro
1               5

<210> SEQ ID NO 26
<211> LENGTH: 11
<212> TYPE: PRT
<213> ORGANISM: Mus musculus

<400> SEQUENCE: 26

Ala Asp Ala Ala Pro Thr Val Ser Ile Phe Pro
1               5                   10

<210> SEQ ID NO 27
<211> LENGTH: 12
<212> TYPE: PRT
<213> ORGANISM: Homo sapiens

<400> SEQUENCE: 27

Thr Val Ala Ala Pro Ser Val Phe Ile Phe Pro Pro
1               5                   10

<210> SEQ ID NO 28
<211> LENGTH: 6
<212> TYPE: PRT
<213> ORGANISM: Homo sapiens

<400> SEQUENCE: 28

Gln Pro Lys Ala Ala Pro
1               5

<210> SEQ ID NO 29
<211> LENGTH: 13
<212> TYPE: PRT
<213> ORGANISM: Homo sapiens

<400> SEQUENCE: 29

Gln Pro Lys Ala Ala Pro Ser Val Thr Leu Phe Pro Pro
1               5                   10

<210> SEQ ID NO 30
<211> LENGTH: 5
<212> TYPE: PRT
<213> ORGANISM: Artificial Sequence

```
<220> FEATURE:
<223> OTHER INFORMATION: Synthetic Construct

<400> SEQUENCE: 30

Gly Gly Ser Gly Gly
1               5

<210> SEQ ID NO 31
<211> LENGTH: 9
<212> TYPE: PRT
<213> ORGANISM: Artificial Sequence
<220> FEATURE:
<223> OTHER INFORMATION: Synthetic Construct

<400> SEQUENCE: 31

Gly Gly Ser Gly Gly Gly Gly Ser Gly
1               5

<210> SEQ ID NO 32
<211> LENGTH: 13
<212> TYPE: PRT
<213> ORGANISM: Artificial Sequence
<220> FEATURE:
<223> OTHER INFORMATION: Synthetic Construct

<400> SEQUENCE: 32

Gly Gly Ser Gly Gly Gly Gly Ser Gly Gly Gly Gly Ser
1               5                   10

<210> SEQ ID NO 33
<211> LENGTH: 6
<212> TYPE: PRT
<213> ORGANISM: Mus musculus

<400> SEQUENCE: 33

Ala Lys Thr Thr Ala Pro
1               5

<210> SEQ ID NO 34
<211> LENGTH: 6
<212> TYPE: PRT
<213> ORGANISM: Homo sapiens

<400> SEQUENCE: 34

Ala Ser Thr Lys Gly Pro
1               5

<210> SEQ ID NO 35
<211> LENGTH: 13
<212> TYPE: PRT
<213> ORGANISM: Mus musculus

<400> SEQUENCE: 35

Ala Lys Thr Thr Ala Pro Ser Val Tyr Pro Leu Ala Pro
1               5                   10

<210> SEQ ID NO 36
<211> LENGTH: 13
<212> TYPE: PRT
<213> ORGANISM: Homo sapiens

<400> SEQUENCE: 36

Ala Ser Thr Lys Gly Pro Ser Val Phe Pro Leu Ala Pro
1               5                   10
```

<210> SEQ ID NO 37
<211> LENGTH: 6
<212> TYPE: PRT
<213> ORGANISM: Artificial Sequence
<220> FEATURE:
<223> OTHER INFORMATION: Synthetic Construct

<400> SEQUENCE: 37

Gly Gly Gly Gly Ser Gly
1               5

<210> SEQ ID NO 38
<211> LENGTH: 10
<212> TYPE: PRT
<213> ORGANISM: Artificial Sequence
<220> FEATURE:
<223> OTHER INFORMATION: Synthetic Construct

<400> SEQUENCE: 38

Gly Gly Gly Gly Ser Gly Gly Gly Gly Ser
1               5                   10

<210> SEQ ID NO 39
<211> LENGTH: 14
<212> TYPE: PRT
<213> ORGANISM: Artificial Sequence
<220> FEATURE:
<223> OTHER INFORMATION: Synthetic Construct

<400> SEQUENCE: 39

Gly Gly Gly Gly Ser Gly Gly Gly Ser Gly Gly Gly Gly
1               5                   10

<210> SEQ ID NO 40
<211> LENGTH: 5
<212> TYPE: PRT
<213> ORGANISM: Homo sapiens

<400> SEQUENCE: 40

Lys Cys Ser Pro Gly
1               5

<210> SEQ ID NO 41
<211> LENGTH: 5
<212> TYPE: PRT
<213> ORGANISM: Homo sapiens

<400> SEQUENCE: 41

Lys Cys Arg Pro Gly
1               5

<210> SEQ ID NO 42
<211> LENGTH: 106
<212> TYPE: PRT
<213> ORGANISM: Artificial Sequence
<220> FEATURE:
<223> OTHER INFORMATION: Synthetic Construct

<400> SEQUENCE: 42

Gln Ile Val Leu Thr Gln Ser Pro Ala Leu Met Ser Ala Ser Pro Gly
1               5                   10                  15

Glu Lys Val Thr Met Thr Cys Ser Ala Ser Ser Ser Val Arg Tyr Met
                20                  25                  30

Tyr Trp Tyr Gln Gln Lys Pro Arg Ser Ser Pro Lys Pro Trp Ile Tyr
            35                  40                  45

```
Leu Thr Ser Asn Leu Ala Ser Gly Val Pro Ala Arg Phe Ser Gly Ser
     50                  55                  60
Gly Ser Gly Thr Ser Tyr Ser Leu Thr Ile Ser Ser Met Glu Ala Glu
 65                  70                  75                  80
Asp Ala Ala Thr Tyr Tyr Cys Gln Gln Trp Ser Ser Asn Pro Leu Thr
                 85                  90                  95
Phe Gly Ala Gly Thr Lys Leu Glu Leu Lys
            100                 105
```

<210> SEQ ID NO 43
<211> LENGTH: 120
<212> TYPE: PRT
<213> ORGANISM: Homo sapiens

<400> SEQUENCE: 43

```
Glu Val Gln Leu Val Glu Ser Gly Gly Gly Leu Val Gln Pro Gly Gly
  1               5                  10                  15
Ser Leu Arg Leu Ser Cys Ala Ala Ser Gly Phe Thr Phe Ser Asp Tyr
                 20                  25                  30
Ala Met Ser Trp Val Arg Gln Ala Pro Gly Lys Gly Leu Glu Trp Val
             35                  40                  45
Ala Val Ile Ser Glu Asn Gly Ser Asp Thr Tyr Tyr Ala Asp Ser Val
     50                  55                  60
Lys Gly Arg Phe Thr Ile Ser Arg Asp Asp Ser Lys Asn Thr Leu Tyr
 65                  70                  75                  80
Leu Gln Met Asn Ser Leu Arg Ala Glu Asp Thr Ala Val Tyr Tyr Cys
                 85                  90                  95
Ala Arg Asp Arg Gly Gly Ala Val Ser Tyr Phe Asp Val Trp Gly Gln
            100                 105                 110
Gly Thr Leu Val Thr Val Ser Ser
            115                 120
```

<210> SEQ ID NO 44
<211> LENGTH: 109
<212> TYPE: PRT
<213> ORGANISM: Homo sapiens

<400> SEQUENCE: 44

```
Asp Ile Gln Met Thr Gln Ser Pro Ser Ser Leu Ser Ala Ser Val Gly
  1               5                  10                  15
Asp Arg Val Thr Ile Thr Cys Arg Ala Ser Gln Asp Val Ser Ser Tyr
                 20                  25                  30
Leu Ala Trp Tyr Gln Gln Lys Pro Gly Lys Ala Pro Lys Leu Leu Ile
             35                  40                  45
Tyr Ala Ala Ser Ser Leu Glu Ser Gly Val Pro Ser Arg Phe Ser Gly
     50                  55                  60
Ser Gly Ser Gly Thr Asp Phe Thr Leu Thr Ile Ser Ser Leu Gln Pro
 65                  70                  75                  80
Glu Asp Phe Ala Thr Tyr Tyr Cys Gln Gln Tyr Asn Ser Leu Pro Tyr
                 85                  90                  95
Thr Phe Gly Gln Gly Thr Lys Val Glu Ile Lys Arg Thr
            100                 105
```

<210> SEQ ID NO 45
<211> LENGTH: 9
<212> TYPE: PRT
<213> ORGANISM: Artificial Sequence
<220> FEATURE:

```
<223> OTHER INFORMATION: Synthetic Construct
<220> FEATURE:
<221> NAME/KEY: MISC_FEATURE
<222> LOCATION: (9)..(9)
<223> OTHER INFORMATION: Xaa is Leu or Ile

<400> SEQUENCE: 45

Gly Tyr Thr Phe Thr Asp Tyr Asn Xaa
1               5

<210> SEQ ID NO 46
<211> LENGTH: 8
<212> TYPE: PRT
<213> ORGANISM: Artificial Sequence
<220> FEATURE:
<223> OTHER INFORMATION: Synthetic Construct

<400> SEQUENCE: 46

Gly Phe Thr Phe Thr Asp Tyr Asp
1               5

<210> SEQ ID NO 47
<211> LENGTH: 8
<212> TYPE: PRT
<213> ORGANISM: Artificial Sequence
<220> FEATURE:
<223> OTHER INFORMATION: Synthetic Construct

<400> SEQUENCE: 47

Gly Tyr Thr Phe Thr Asp Tyr Ile
1               5

<210> SEQ ID NO 48
<211> LENGTH: 8
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: Xaa is Tyr or Phe
<220> FEATURE:
<221> NAME/KEY: MISC_FEATURE
<222> LOCATION: (8)..(8)
<223> OTHER INFORMATION: Xaa is Asn or Asp

<400> SEQUENCE: 48

Gly Xaa Thr Phe Thr Asp Tyr Xaa
1               5

<210> SEQ ID NO 49
<211> LENGTH: 20
<212> TYPE: PRT
<213> ORGANISM: Artificial Sequence
<220> FEATURE:
<223> OTHER INFORMATION: Synthetic Construct

<400> SEQUENCE: 49

Leu Pro Ala Gln Val Ala Phe Thr Pro Tyr Ala Pro Glu Pro Gly Ser
1               5                   10                  15

Thr Cys Arg Leu
            20

<210> SEQ ID NO 50
<211> LENGTH: 20
<212> TYPE: PRT
<213> ORGANISM: Artificial Sequence
```

<220> FEATURE:
<223> OTHER INFORMATION: Synthetic Construct

<400> SEQUENCE: 50

Pro Tyr Ala Pro Glu Pro Gly Ser Thr Cys Arg Leu Arg Glu Tyr Tyr
1               5                   10                  15
Asp Gln Thr Ala
            20

<210> SEQ ID NO 51
<211> LENGTH: 20
<212> TYPE: PRT
<213> ORGANISM: Artificial Sequence
<220> FEATURE:
<223> OTHER INFORMATION: Synthetic Construct

<400> SEQUENCE: 51

Thr Cys Arg Leu Arg Glu Tyr Tyr Asp Gln Thr Ala Gln Met Cys Cys
1               5                   10                  15
Ser Lys Cys Ser
            20

<210> SEQ ID NO 52
<211> LENGTH: 20
<212> TYPE: PRT
<213> ORGANISM: Artificial Sequence
<220> FEATURE:
<223> OTHER INFORMATION: Synthetic Construct

<400> SEQUENCE: 52

Gln Thr Ala Gln Met Cys Cys Ser Lys Cys Ser Pro Gly Gln His Ala
1               5                   10                  15
Lys Val Phe Cys
            20

<210> SEQ ID NO 53
<211> LENGTH: 20
<212> TYPE: PRT
<213> ORGANISM: Artificial Sequence
<220> FEATURE:
<223> OTHER INFORMATION: Synthetic Construct

<400> SEQUENCE: 53

Lys Cys Ser Pro Gly Gln His Ala Lys Val Phe Cys Thr Lys Thr Ser
1               5                   10                  15
Asp Thr Val Cys
            20

<210> SEQ ID NO 54
<211> LENGTH: 20
<212> TYPE: PRT
<213> ORGANISM: Artificial Sequence
<220> FEATURE:
<223> OTHER INFORMATION: Synthetic Construct

<400> SEQUENCE: 54

Lys Val Phe Cys Thr Lys Thr Ser Asp Thr Val Cys Asp Ser Cys Glu
1               5                   10                  15
Asp Ser Thr Tyr
            20

<210> SEQ ID NO 55
<211> LENGTH: 20
<212> TYPE: PRT

```
<213> ORGANISM: Artificial Sequence
<220> FEATURE:
<223> OTHER INFORMATION: Synthetic Construct

<400> SEQUENCE: 55

Asp Thr Val Cys Asp Ser Cys Glu Asp Ser Thr Tyr Thr Gln Leu Trp
1               5                   10                  15

Asn Trp Val Pro
            20

<210> SEQ ID NO 56
<211> LENGTH: 20
<212> TYPE: PRT
<213> ORGANISM: Artificial Sequence
<220> FEATURE:
<223> OTHER INFORMATION: Synthetic Construct

<400> SEQUENCE: 56

Asp Ser Thr Tyr Thr Gln Leu Trp Asn Trp Val Pro Glu Cys Leu Ser
1               5                   10                  15

Cys Gly Ser Arg
            20

<210> SEQ ID NO 57
<211> LENGTH: 20
<212> TYPE: PRT
<213> ORGANISM: Artificial Sequence
<220> FEATURE:
<223> OTHER INFORMATION: Synthetic Construct

<400> SEQUENCE: 57

Asn Trp Val Pro Glu Cys Leu Ser Cys Gly Ser Arg Cys Ser Ser Asp
1               5                   10                  15

Gln Val Glu Thr
            20

<210> SEQ ID NO 58
<211> LENGTH: 20
<212> TYPE: PRT
<213> ORGANISM: Artificial Sequence
<220> FEATURE:
<223> OTHER INFORMATION: Synthetic Construct

<400> SEQUENCE: 58

Cys Gly Ser Arg Cys Ser Ser Asp Gln Val Glu Thr Gln Ala Cys Thr
1               5                   10                  15

Arg Glu Gln Asn
            20

<210> SEQ ID NO 59
<211> LENGTH: 20
<212> TYPE: PRT
<213> ORGANISM: Artificial Sequence
<220> FEATURE:
<223> OTHER INFORMATION: Synthetic Construct

<400> SEQUENCE: 59

Gln Val Glu Thr Gln Ala Cys Thr Arg Glu Gln Asn Arg Ile Cys Thr
1               5                   10                  15

Cys Arg Pro Gly
            20

<210> SEQ ID NO 60
<211> LENGTH: 20
```

```
<212> TYPE: PRT
<213> ORGANISM: Artificial Sequence
<220> FEATURE:
<223> OTHER INFORMATION: Synthetic Construct

<400> SEQUENCE: 60

Arg Glu Gln Asn Arg Ile Cys Thr Cys Arg Pro Gly Trp Tyr Cys Ala
1               5                   10                  15

Leu Ser Lys Gln
            20

<210> SEQ ID NO 61
<211> LENGTH: 20
<212> TYPE: PRT
<213> ORGANISM: Artificial Sequence
<220> FEATURE:
<223> OTHER INFORMATION: Synthetic Construct

<400> SEQUENCE: 61

Cys Arg Pro Gly Trp Tyr Cys Ala Leu Ser Lys Gln Glu Gly Cys Arg
1               5                   10                  15

Leu Cys Ala Pro
            20

<210> SEQ ID NO 62
<211> LENGTH: 20
<212> TYPE: PRT
<213> ORGANISM: Artificial Sequence
<220> FEATURE:
<223> OTHER INFORMATION: Synthetic Construct

<400> SEQUENCE: 62

Leu Ser Lys Gln Glu Gly Cys Arg Leu Cys Ala Pro Leu Arg Lys Cys
1               5                   10                  15

Arg Pro Gly Phe
            20

<210> SEQ ID NO 63
<211> LENGTH: 20
<212> TYPE: PRT
<213> ORGANISM: Artificial Sequence
<220> FEATURE:
<223> OTHER INFORMATION: Synthetic Construct

<400> SEQUENCE: 63

Lys Gln Glu Gly Cys Arg Leu Cys Ala Pro Leu Arg Lys Cys Arg Pro
1               5                   10                  15

Gly Phe Gly Val
            20

<210> SEQ ID NO 64
<211> LENGTH: 20
<212> TYPE: PRT
<213> ORGANISM: Artificial Sequence
<220> FEATURE:
<223> OTHER INFORMATION: Synthetic Construct

<400> SEQUENCE: 64

Leu Cys Ala Pro Leu Arg Lys Cys Arg Pro Gly Phe Gly Val Ala Arg
1               5                   10                  15

Pro Gly Thr Glu
            20

<210> SEQ ID NO 65
```

```
<211> LENGTH: 20
<212> TYPE: PRT
<213> ORGANISM: Artificial Sequence
<220> FEATURE:
<223> OTHER INFORMATION: Synthetic Construct

<400> SEQUENCE: 65

Arg Pro Gly Phe Gly Val Ala Arg Pro Gly Thr Glu Thr Ser Asp Val
1               5                   10                  15

Val Cys Lys Pro
            20

<210> SEQ ID NO 66
<211> LENGTH: 20
<212> TYPE: PRT
<213> ORGANISM: Artificial Sequence
<220> FEATURE:
<223> OTHER INFORMATION: Synthetic Construct

<400> SEQUENCE: 66

Pro Gly Thr Glu Thr Ser Asp Val Val Cys Lys Pro Cys Ala Pro Gly
1               5                   10                  15

Thr Phe Ser Asn
            20

<210> SEQ ID NO 67
<211> LENGTH: 20
<212> TYPE: PRT
<213> ORGANISM: Artificial Sequence
<220> FEATURE:
<223> OTHER INFORMATION: Synthetic Construct

<400> SEQUENCE: 67

Val Cys Lys Pro Cys Ala Pro Gly Thr Phe Ser Asn Thr Thr Ser Ser
1               5                   10                  15

Thr Asp Ile Cys
            20

<210> SEQ ID NO 68
<211> LENGTH: 20
<212> TYPE: PRT
<213> ORGANISM: Artificial Sequence
<220> FEATURE:
<223> OTHER INFORMATION: Synthetic Construct

<400> SEQUENCE: 68

Thr Phe Ser Asn Thr Thr Ser Ser Thr Asp Ile Cys Arg Pro His Gln
1               5                   10                  15

Ile Cys Asn Val
            20

<210> SEQ ID NO 69
<211> LENGTH: 20
<212> TYPE: PRT
<213> ORGANISM: Artificial Sequence
<220> FEATURE:
<223> OTHER INFORMATION: Synthetic Construct

<400> SEQUENCE: 69

Thr Asp Ile Cys Arg Pro His Gln Ile Cys Asn Val Val Ala Ile Pro
1               5                   10                  15

Gly Asn Ala Ser
            20
```

```
<210> SEQ ID NO 70
<211> LENGTH: 20
<212> TYPE: PRT
<213> ORGANISM: Artificial Sequence
<220> FEATURE:
<223> OTHER INFORMATION: Synthetic Construct

<400> SEQUENCE: 70

Ile Cys Asn Val Val Ala Ile Pro Gly Asn Ala Ser Met Asp Ala Val
1               5                   10                  15

Cys Thr Ser Thr
            20

<210> SEQ ID NO 71
<211> LENGTH: 20
<212> TYPE: PRT
<213> ORGANISM: Artificial Sequence
<220> FEATURE:
<223> OTHER INFORMATION: Synthetic Construct

<400> SEQUENCE: 71

Gly Asn Ala Ser Met Asp Ala Val Cys Thr Ser Thr Ser Pro Thr Arg
1               5                   10                  15

Ser Met Ala Pro
            20
```